(12) United States Patent
Werner et al.

(10) Patent No.: US 7,715,471 B2
(45) Date of Patent: May 11, 2010

(54) SIGNALING SYSTEM WITH SELECTIVELY-INHIBITED ADAPTIVE EQUALIZATION

(75) Inventors: Carl W. Werner, Los Gatos, CA (US); Andrew Ho, Palo Alto, CA (US)

(73) Assignee: Rambus, Inc., Los Altos, CA (US)

( * ) Notice: Subject to any disclaimer, the term of this patent is extended or adjusted under 35 U.S.C. 154(b) by 1451 days.

(21) Appl. No.: 11/022,292

(22) Filed: Dec. 24, 2004

(65) Prior Publication Data

US 2005/0157780 A1 Jul. 21, 2005

Related U.S. Application Data

(63) Continuation-in-part of application No. 10/740,087, filed on Dec. 17, 2003, now Pat. No. 7,126,378, and a continuation-in-part of application No. 10/875,086, filed on Jun. 23, 2004, now Pat. No. 7,233,164, and a continuation-in-part of application No. 10/851,505, filed on May 21, 2004, now Pat. No. 7,030,657.

(51) Int. Cl.
*H03K 5/159* (2006.01)

(52) U.S. Cl. .................. 375/232; 375/220; 375/233; 375/358

(58) Field of Classification Search ................. 375/232, 375/220, 233, 258
See application file for complete search history.

(56) References Cited

U.S. PATENT DOCUMENTS

| 3,534,273 A | 10/1970 | Thomas |
| 3,582,879 A | 6/1971 | Sullivan |
| 3,775,688 A | 11/1973 | Hinoshita et al. |
| 3,992,616 A | 11/1976 | Acker |
| 4,584,559 A | 4/1986 | Penney |

(Continued)

FOREIGN PATENT DOCUMENTS

EP 180066 5/1986

(Continued)

OTHER PUBLICATIONS

Aboulnasr, T. et al., ""Characterization of a Symbol Rate Timing Recovery Technique for a 2B1Q Digital Receiver,"" IEEE Trans. on Communications, vol. 42, Nos. 2/3/4, pp. 1409-1414, Feb.-Apr. 1994.

(Continued)

*Primary Examiner*—Shuwang Liu
*Assistant Examiner*—Kabir A Timory
(74) *Attorney, Agent, or Firm*—Mahamedi Paradice Kreisman LLP

(57) ABSTRACT

An integrated circuit having a receiver that selectively inhibits incoming data from being used to update adaptively generated controls. Sampling circuitry generates a plurality of samples of an incoming signal. Control circuitry generates an inhibit signal in either a first state or a second state according to whether the plurality of samples meets a randomness criterion. Tap weight update circuitry receives the inhibit signal from the control circuitry and updates a plurality of equalizer tap weights based on the plurality of samples if the inhibit signal is in the first state. The tap weight update circuitry refrains from updating the plurality of equalizer tap weights based on the plurality of samples if the inhibit signal is in the second state.

34 Claims, 45 Drawing Sheets

U.S. PATENT DOCUMENTS

| | | |
|---|---|---|
| 4,615,038 A | 9/1986 | Lim et al. |
| 4,709,376 A | 11/1987 | Kage |
| 4,719,369 A | 1/1988 | Asano et al. |
| 4,730,343 A | 3/1988 | Kanemasa et al. |
| 4,970,609 A | 11/1990 | Cunningham et al. |
| 4,992,677 A | 2/1991 | Ishibashi et al. |
| 5,014,226 A | 5/1991 | Horstmann et al. |
| 5,036,525 A | 7/1991 | Wong |
| 5,122,690 A | 6/1992 | Bianchi |
| 5,191,462 A | 3/1993 | Gitlin |
| 5,268,930 A | 12/1993 | Sendyk et al. |
| 5,402,378 A | 3/1995 | Min et al. |
| 5,402,445 A | 3/1995 | Matsuura |
| 5,425,033 A | 6/1995 | Jessop et al. |
| 5,448,200 A | 9/1995 | Fernandez |
| 5,455,844 A | 10/1995 | Ishikawa et al. |
| 5,459,762 A | 10/1995 | Wang et al. |
| 5,465,093 A | 11/1995 | Kusumoto et al. |
| 5,490,169 A | 2/1996 | Blackwell et al. |
| 5,546,424 A | 8/1996 | Miyake |
| 5,596,285 A | 1/1997 | Marbot et al. |
| 5,659,581 A | 8/1997 | Betts et al. |
| 5,668,830 A | 9/1997 | Georgiou et al. |
| 5,675,394 A * | 10/1997 | Choi .................... 348/614 |
| 5,675,588 A | 10/1997 | Maruyama |
| 5,742,798 A | 4/1998 | Goldrian |
| 5,757,297 A | 5/1998 | Ferraiolo et al. |
| 5,757,857 A | 5/1998 | Buchwald |
| 5,778,217 A | 7/1998 | Kao |
| 5,802,105 A | 9/1998 | Tiedemann, Jr. et al. |
| 5,852,630 A * | 12/1998 | Langberg et al. ............ 375/219 |
| 5,875,177 A | 2/1999 | Uriu |
| 5,877,647 A | 3/1999 | Vajapey et al. |
| 5,896,067 A | 4/1999 | Williams |
| 5,898,321 A | 4/1999 | Ilkbahar et al. |
| 5,940,442 A | 8/1999 | Wong |
| 6,108,801 A | 8/2000 | Malhotra et al. |
| 6,118,824 A | 9/2000 | Smith et al. |
| 6,122,757 A | 9/2000 | Kelley .................... 714/39 |
| 6,212,144 B1 * | 4/2001 | Asano .................... 369/47.25 |
| 6,262,591 B1 | 7/2001 | Hui |
| 6,288,563 B1 | 9/2001 | Muljono et al. |
| 6,304,071 B1 | 10/2001 | Popplewell et al. ...... 324/76.58 |
| 6,377,076 B1 | 4/2002 | Gauthier .................... 326/86 |
| 6,380,758 B1 | 4/2002 | Hsu et al. |
| 6,417,700 B1 | 7/2002 | Hirata et al. |
| 6,448,806 B1 | 9/2002 | Roth |
| 6,509,756 B1 | 1/2003 | Yu et al. |
| 6,541,966 B1 | 4/2003 | Keene |
| 6,541,996 B1 | 4/2003 | Rosefield |
| 6,574,758 B1 | 6/2003 | Eccles |
| 6,628,621 B1 | 9/2003 | Appleton |
| 6,707,325 B2 | 3/2004 | Taguchi et al. |
| 6,717,985 B1 | 4/2004 | Poon |
| 6,724,329 B2 | 4/2004 | Casper |
| 6,760,389 B1 | 7/2004 | Mukherjee et al. |
| 6,760,574 B1 | 7/2004 | Lu et al. |
| 6,839,861 B2 | 1/2005 | Hoke et al. |
| 6,885,691 B1 | 4/2005 | Lyu |
| 6,897,712 B2 | 5/2005 | Ficken et al. |
| 6,941,483 B2 | 9/2005 | Brown |
| 6,970,681 B2 | 11/2005 | Darabi et al. |
| 6,979,987 B2 | 12/2005 | Kernahan et al. |
| 7,016,445 B2 | 3/2006 | Bronfer et al. |
| 7,054,402 B2 | 5/2006 | Muellner |
| 7,092,472 B2 | 8/2006 | Stojanovic |
| 7,099,400 B2 | 8/2006 | Yang et al. |
| 2001/0026578 A1 * | 10/2001 | Ando .................... 375/130 |
| 2001/0043649 A1 | 11/2001 | Farjad-Rad |
| 2002/0057101 A1 | 5/2002 | Tang et al. .................... 326/29 |
| 2002/0150184 A1 | 10/2002 | Hafeez et al. |
| 2002/0184564 A1 | 12/2002 | Muellner |
| 2003/0002602 A1 | 1/2003 | Kwon et al. |
| 2003/0016091 A1 | 1/2003 | Casper |
| 2003/0063664 A1 * | 4/2003 | Bodenschatz ............ 375/232 |
| 2003/0070126 A1 | 4/2003 | Werner |
| 2003/0084385 A1 | 5/2003 | Zerbe et al. |
| 2003/0093713 A1 | 5/2003 | Werner |
| 2003/0108096 A1 | 6/2003 | Steinbach |
| 2003/0159094 A1 | 8/2003 | Smith et al. |
| 2003/0208707 A9 | 11/2003 | Zerbe |
| 2004/0001567 A1 | 1/2004 | Wei .................... 375/371 |
| 2004/0022311 A1 | 2/2004 | Zerbe et al. |
| 2004/0071203 A1 | 4/2004 | Gorecki |
| 2004/0071204 A1 | 4/2004 | Gorecki |
| 2004/0071205 A1 | 4/2004 | Gorecki |
| 2004/0076192 A1 | 4/2004 | Zerbe |
| 2004/0141567 A1 | 7/2004 | Yang |
| 2004/0203559 A1 | 10/2004 | Stojanovic et al. |

FOREIGN PATENT DOCUMENTS

| | | |
|---|---|---|
| EP | 0365257 A2 | 4/1990 |
| EP | 1331779 | 7/2003 |
| JP | 2000-35831 | 2/2000 |
| WO | WO 00/11830 A2 | 3/2000 |
| WO | WO 03/025599 A1 | 3/2003 |
| WO | WO 03/032652 | 4/2003 |
| WO | WO 2004/008490 A2 | 1/2004 |
| WO | WO 2004/093144 A2 | 10/2004 |

OTHER PUBLICATIONS

Vladimir Stojanovic, George Ginis and Mark A. Horowitz, "Transmit Pre-emphasis for High-Speed Time-Division-Multiplexed Serial-Link Transceiver," International Conference on Communications, New York, NY, May 2, 2002, pp. 1-6.

Zerbe, Jared et al., "Equalization and Clock Recovery for a 2.5-10-Gb/s 2-PAM/4-PAM Backplane Transceiver Cell." IEEE Journal of Solid-State Circuits, vol. 38, No. 12, Dec. 2003. pp. 2121-2130.

\* cited by examiner

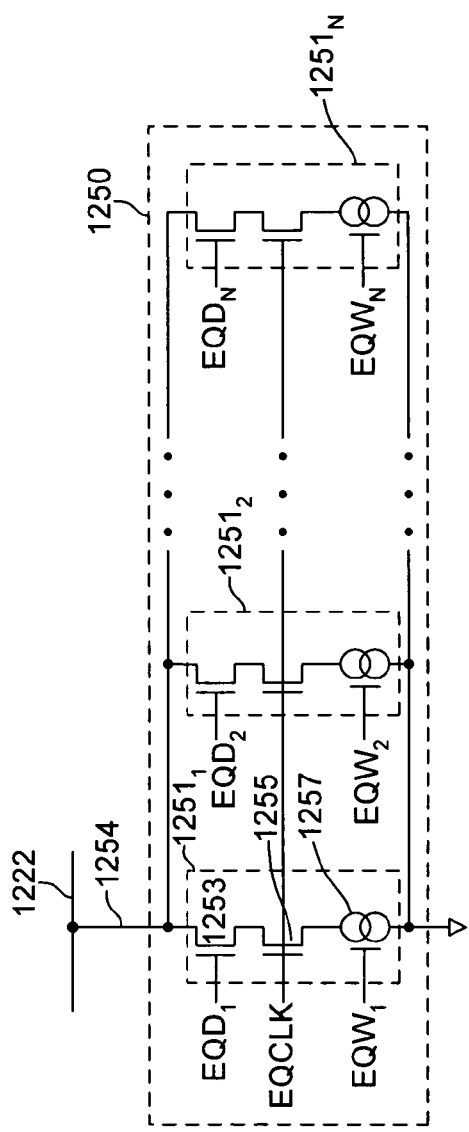
FIG.
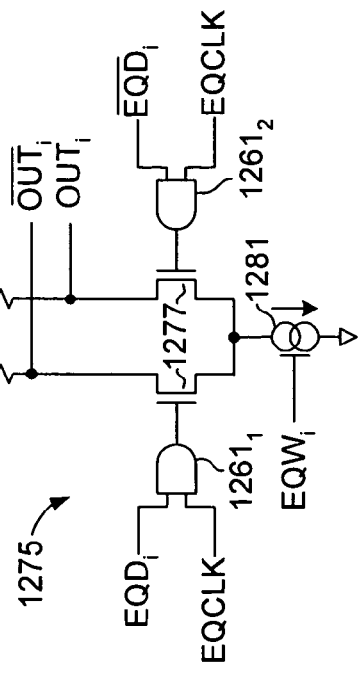
FIG. 63
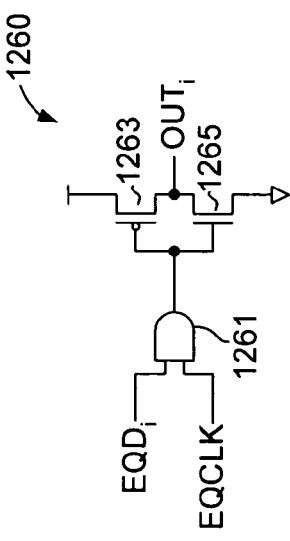
FIG. 62

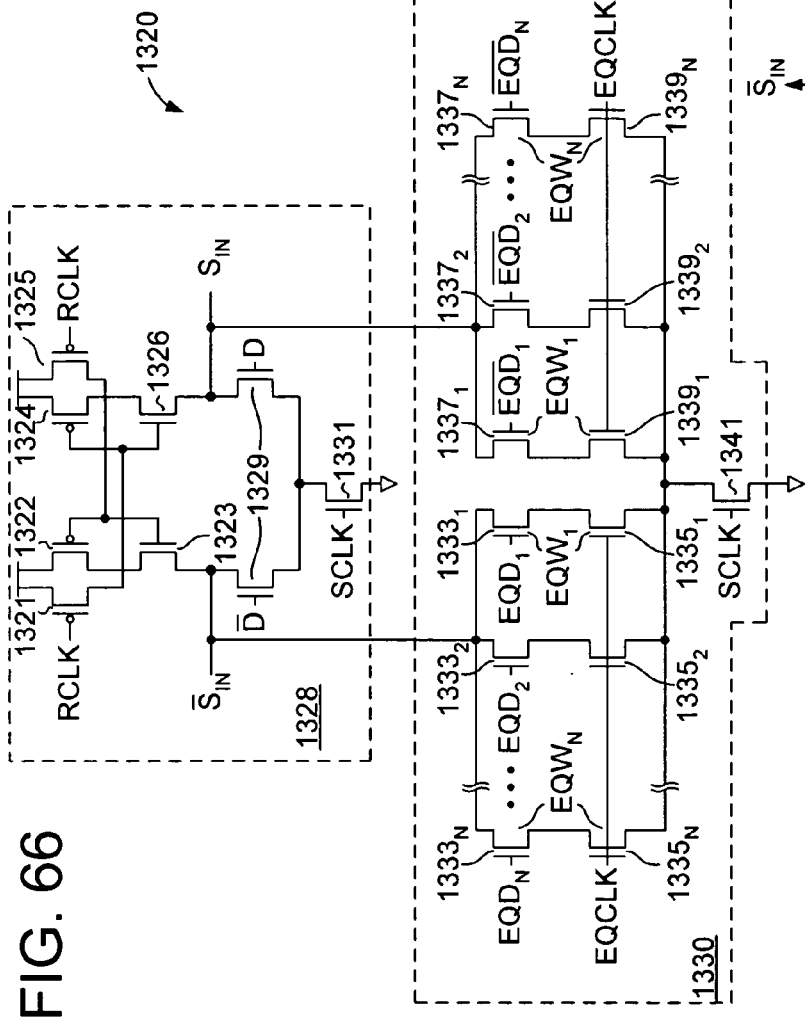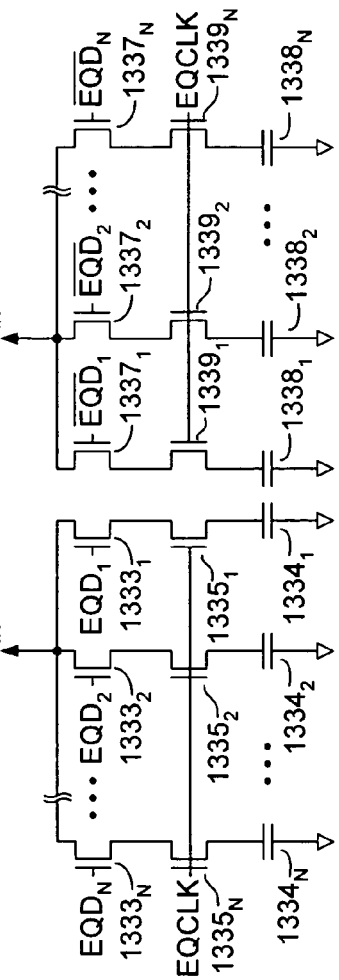
FIG. 66
FIG. 67

SIGNALING SYSTEM WITH SELECTIVELY-INHIBITED ADAPTIVE EQUALIZATION

CROSS-REFERENCE TO RELATED APPLICATIONS

This application is a continuation-in-part of, and hereby incorporates by reference, each of the following U.S. patent applications:

| application Ser. No. | Filed | Title |
| --- | --- | --- |
| 10/740,087 now U.S. Pat. No. 7,126,378 | 17 Dec. 2003 | HIGH SPEED SIGNALING SYSTEM WITH ADAPTIVE TRANSMIT PRE-EMPHASIS |
| 10/851,505 now U.S. Pat. No. 7,030,657 | 21 May 2004 | HIGH SPEED SIGNALING SYSTEM WITH ADAPTIVE TRANSMIT PRE-EMPHASIS AND REFLECTION CANCELLATION |
| 10/875,086 now U.S. Pat. No. 7,233,164 | 23 Jun. 2004 | OFFSET CANCELLATION IN A MULTI-LEVEL SIGNALING SYSTEM |

FIELD OF THE INVENTION

The present invention relates to high speed signaling within and between integrated circuit devices.

BACKGROUND

Electrical pulses transmitted on a band-limited signaling path disperse in time as they travel from source to destination. In systems in which data is transmitted as a sequence of level-encoded electrical pulses, such time-domain dispersion results in a blending of neighboring pulses; an effect known as dispersion-type inter-symbol interference (ISI). Dispersion-type ISI becomes more pronounced at faster signaling rates, ultimately degrading the signal quality to the point at which distinctions between originally transmitted signal levels may be lost.

FIG. 1 illustrates a prior-art signaling system having a transmitter 101, signal path 102 and receiver 103. The transmitter includes post- and pre-tap output drivers 109 that mitigate dispersion-type ISI by generating dispersion-countering, pre-emphasis signals based on previously transmitted values (post-tap data) and the next-to-be-transmitted data value (pre-tap data), stored in shift register elements 107 and 104, respectively. The pre-emphasis signals are wire-summed with a primary output signal, generated by primary output driver 105, that corresponds to the data value being transmitted.

In a low-noise system, the drive strengths of the post- and pre-tap output drivers would theoretically be adjusted based on errors between receiver-sampled signal levels and expected signal levels (e.g., as shown by error indication, "e" at 112) until the pre-emphasis signals generated by the transmitter effect a transfer function (W) that is an exact inverse of the transfer function (P) of the signal path 102, thereby yielding a waveform at the input of receiver 103 that is identical to the primary output signal (i.e., W*P=1). This effect is illustrated in the waveforms of FIG. 2, which illustrates received signal levels with and without pre-emphasis at 116 and 114, respectively. In practical high-speed signaling systems, however, the transmitter is usually peak power constrained and therefore unable to provide the level of pre-emphasis needed to restore received signals to originally transmitted levels, illustrated as normalized +/−1 signal levels in FIG. 2. Also, as shown at 118, in a level-encoded signaling protocol (e.g., pulse amplitude modulation (PAM)), the overall attenuation of the received signal is a function of the transmitted data pattern itself, with low frequency components (e.g., sequences of same-level transmissions) having a higher amplitude, approaching the +/−1 levels, than high frequency components (e.g., alternating sequences of different-level transmissions) which are attenuated to +/−a levels.

Together, the transmitter power constraint and the data-dependent attenuation present a number of challenges in the prior-art signaling system 100. A fundamental problem is how to generate the error signal used to adjust the drive strengths of the transmitter output drivers considering that no known data level can be reached for all data patterns. That is, if the known reference levels +/−1 cannot be reached in high-frequency data patterns, attempting to converge to such levels tends to produce non-optimal drive-strength settings from the standpoint of link performance.

One prior-art solution for generating error signals that may be used to update the drive strengths of the transmitter output drivers is to provide a variable gain element, G (shown in dashed outline in FIG. 1), at the receive-side of the signaling path 102. In theory, the gain element may be used to restore the incoming signal to the desired signaling level. While some improvement may be realized by such an approach, as signaling rates progress deeper into the gigahertz range, signals are often attenuated 10 to 20 db and more. Consequently, the gain-bandwidth product required to restore such high data rate signals to originally transmitted levels is beyond the capability of most practical amplifiers.

In view of the challenges involved in dynamically updating drive strengths of transmit-side output drivers, many system designers opt for a simpler approach, setting the drive strengths based on empirical results obtained in particular system configurations. While such static drive strength settings work well in many systems, non-optimal settings often result in systems which are subject to post-production configuration changes (e.g., adding modules, circuit boards or other components that affect signaling system characteristics), and systems that are sensitive to process variations and to changes in environmental factors such as voltage and temperature.

BRIEF DESCRIPTION OF THE DRAWINGS

The present invention is illustrated by way of example, and not by way of limitation, in the figures of the accompanying drawings and in which like reference numerals refer to similar elements and in which:

FIG. 61 illustrates a current-sinking output driver that may be used within the equalizing receiver of FIG. 58;

FIG. 62 illustrates an embodiment of a push-pull type of sub-driver circuit that may be used within an equalizing output driver;

FIG. 63 illustrates another embodiment of a sub-driver circuit that may be used within an equalizing output driver;

FIG. 66 illustrates another type of equalizing circuit that may be used in embodiments of the invention;

FIG. 67 illustrates an embodiment of a level shifting circuit that used within the equalizing circuit of FIG. 66.

DETAILED DESCRIPTION

Figure 1:
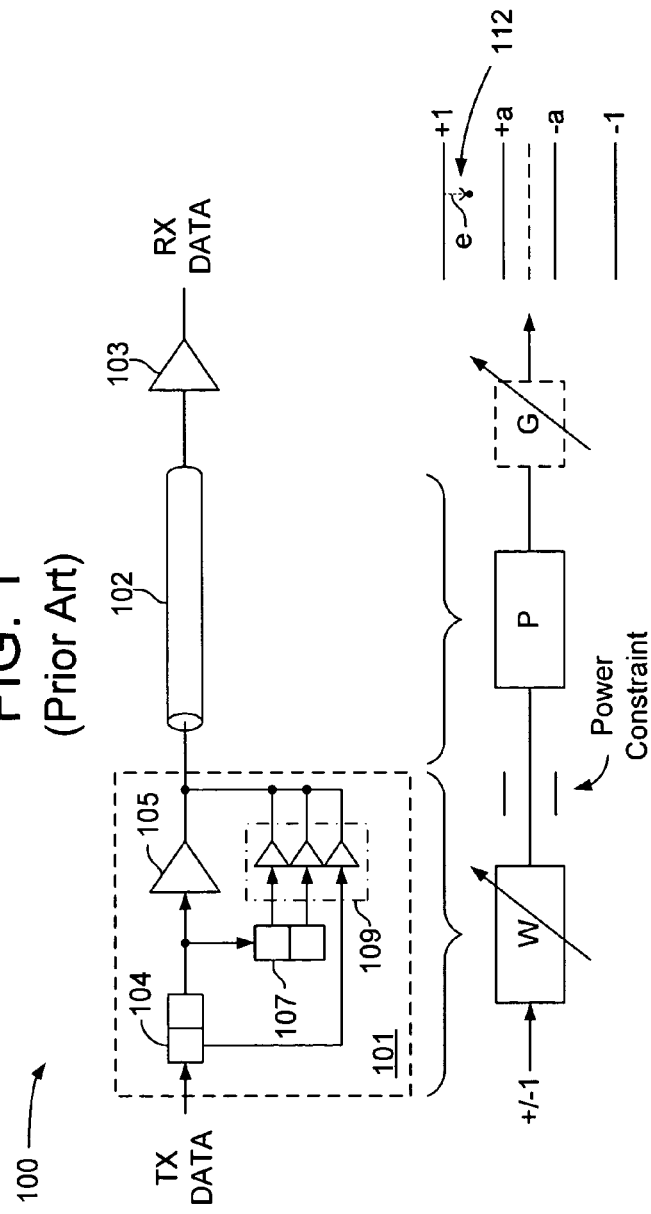
FIG. 1 illustrates a prior-art signaling system.

In the following description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments. As another example, circuits described or depicted as including metal oxide semiconductor (MOS) transistors may alternatively be implemented using bipolar technology or any other technology in which a signal-controlled current flow may be achieved. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "terminal" is used to mean a point of electrical connection. The term "exemplary" is used to express but an example, and not a preference or requirement.

Signaling systems having a multiple-output driver transmit circuit are disclosed in various embodiments. In one embodiment, the drive strengths of output drivers within the transmit circuit are adaptively adjusted concurrently with adaptive determination of a target, receive-side signal level. Thus, even as adaptive determination of the target signal level is ongoing, the target signal level is compared with received signals to generate error signals that are used, in turn, to adjust the drive strengths of the output drivers. By this operation, a target signal level is determined and used to establish drive strength values that yield a substantially flattened channel response to different-frequency transmit data patterns.

In one embodiment, the error signals that result from comparison of received signals with the target signal level are input to a circuit that generates updated drive strength values, referred to herein as tap weights, in a manner that converges to a least-mean-square (LMS) error. In an alternative embodiment, the target signal level is used to establish a trap range, with signals falling within the trap range being used to update the drive strength values. In either embodiment, after being updated, the set of drive strength values may be scaled according to the transmit circuit power constraint. By this operation, the adaptive determination of the target signal level converges to a level that corresponds to the peak (or average) power available to the signal transmitter. Thus, a target level that corresponds to a substantially flattened frequency response at the peak or average power available to the signal transmitter is, in effect, learned by the system and used as an error reference for continued adjustment of output driver drive strengths.

In one implementation, a Taylor series approximation is used to simplify the power scaling of the drive strength values, enabling the scaling operation to be carried out in a relatively small logic circuit. In alternative implementation, drive strength values for pre- and post-tap output drivers of the transmit circuit are first updated and the drive strength of the data driver adjusted up or down to maintain the overall transmit power level within a predefined range.

In other embodiments of the invention, DC offsets within individual samplers of the receive circuit are adaptively canceled; multiplexing circuitry is provided to enable one or more samplers within the receive circuit to be temporarily removed from service and replaced by another sampler; and single- and two-phase techniques are applied to generate drive strength update values.

In other embodiments, adaptive updates to tap weights, decision thresholds and other controls are selectively inhibited according to whether incoming data meets a predetermined randomness criteria. Also, data precessing may be used to mitigate the effects of repeating data patterns on adaptively generated controls. These and other embodiments and features of the invention are disclosed below.

Signaling System Overview

Figure 3:
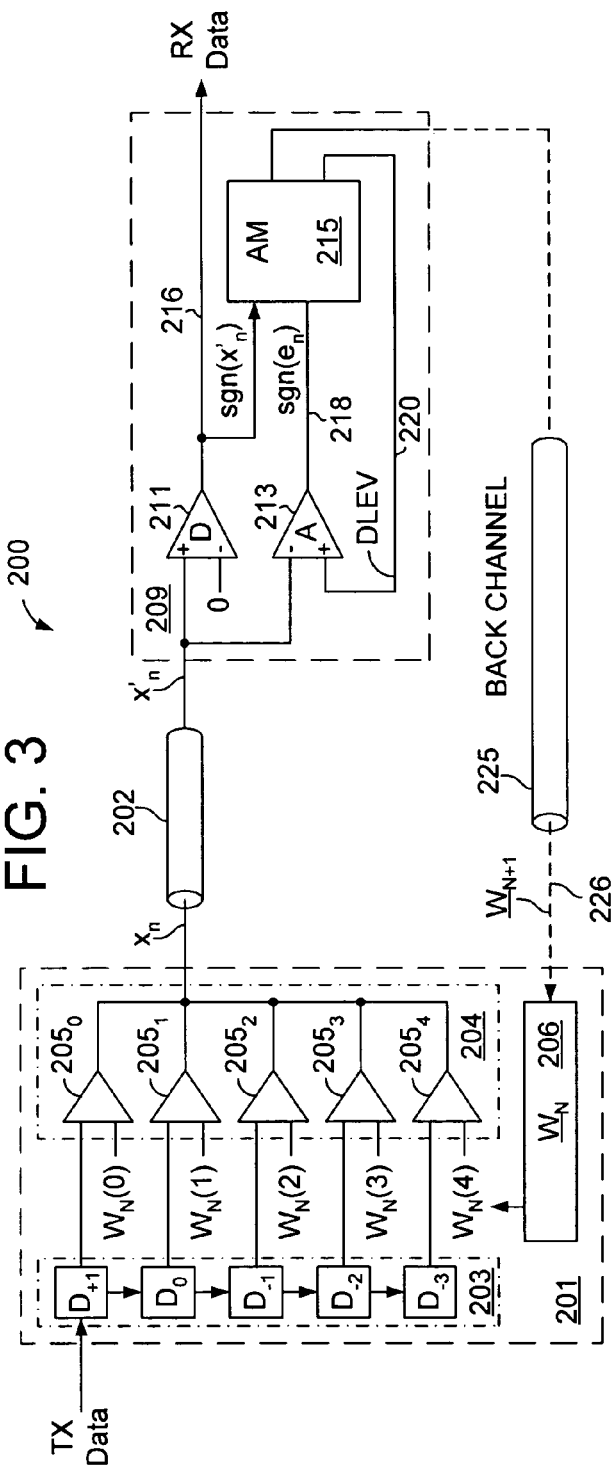
FIG. 3 illustrates a signaling system according to an embodiment of the invention.

FIG. 3 illustrates a signaling system 200 according to an embodiment of the invention. The signaling system 200 includes a multi-output driver transmitter 201 (referred to herein as a multi-tap transmitter) and multi-sample receiver 209 coupled to one another via a high-speed signal path 202. In many of the embodiments described herein, the signal path 202 is a differential signal path having a pair of component signal lines to conduct differential signals generated by the transmitter 201. In all such embodiments, the signal path 202 may alternatively be singe-ended (i.e., single conductor path) for transmission of single-ended signals generated by the transmitter 201. The signal path 202 may be formed in multiple segments disposed on different layers of a circuit board and/or multiple circuit boards. For example, in one application the signal path 202 extends between two backplane-mounted daughterboards, and includes a printed trace segment on the backplane that extends between daughterboard connectors and counterpart trace segments on the daughterboards coupled to one another, via the daughterboard connectors and the backplane trace segment. The transmitter 201 and receiver 209 are implemented in respective integrated circuit (IC) devices that are mounted on a common circuit board or different circuit boards (e.g., as in the case of backplane-mounted daughterboards). In alternative embodiments, IC dice (i.e., chips) containing the transmitter 201 and receiver 209 may be packaged within a single, multi-chip module with the chip-to-chip signaling path formed by bond wires or other signal conducting structures. Also, the transmitter 201 and receiver may be formed on the same IC die (e.g., system on chip) and the signaling path 202 implemented by a metal layer or other conducting structure of the die.

Figure 4:
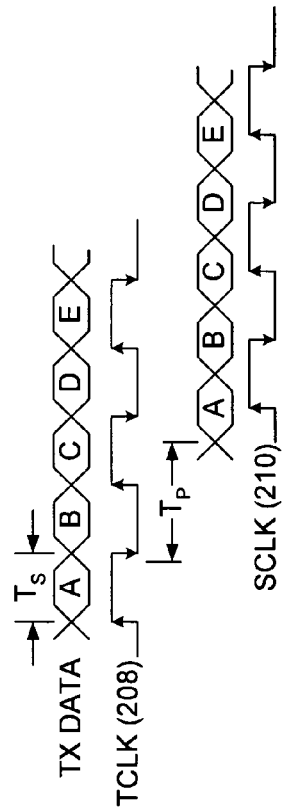
FIG. 4 illustrates a relationship between clock and data signals in one embodiment of the signaling system of FIG. 3.

Referring to FIG. 4, the transmitter 201 transmits data on the signaling path 202 during successive time intervals, referred to herein as symbol times, $T_S$. In the double-data-rate timing shown, each symbol time corresponds to a half cycle of a transmit clock signal 208 (TCLK) such that two data values (e.g., values A and B) are transmitted on signaling path 202 per cycle of the transmit clock signal 208. The transmitted data signal arrives at the input of the receiver 209 after propagation time, $T_P$, and is sampled by the receiver 209 in response to edges of a sampling clock signal 210 (SCLK). The sampling clock signal 210 may be supplied to the receive circuit 209 via an external clock line, or may be a recovered version of a reference clock signal (e.g., recovered by a delay-locked loop or phase locked loop circuit). In other embodiments, discussed below, the sampling clock signal 210 may be recovered from the incoming data signal itself by a clock data recovery (CDR) circuit. Still referring to FIG. 4, the sampling clock signal 210 has a quadrature phase relation to data valid windows (i.e., data eyes) in the incoming data signal such that each sample of the incoming signal is captured at the midpoint of a data eye. In alternative embodiments, the sampling instant may be skewed relative to data eye midpoints as necessary to satisfy signal setup and hold time requirements of the samplers 211 and 213, and/or to compensate for asymmetry in the channel pulse response. Also, more or fewer symbols may be transmitted per cycle of the transmit clock signal 208. For example, the embodiment of FIG. 3 may alternatively be a single data rate system, quad data rate system, octal data rate system, decade data rate system, and so forth.

In the receive circuit 209, a single symbol is captured during each cycle of the sampling clock signal 210. That is, a rising (or falling) edge of the sample clock is used to capture a sample of the incoming signal, $x'_n$. In a multi-data rate system, multiple symbols are captured per cycle of the sampling clock signal 210 as shown in FIG. 4. In such systems, clock generation circuitry may be provided within the receive-side device (e.g., an IC device containing the receiver 209) to generate multiple instances of the sampling clock signal 210 that are phase-distributed through a period (1/frequency) of the sampling clock signal. In the double-data-rate timing arrangement of FIG. 4, for example, two instances of the sampling clock signal 210 are provided: an even-phase sampling clock signal, $SCLK_E$, to sample even-numbered symbols $x'_n, x'_{n+2}, x'_{n+4} \ldots$; and an odd-phase sampling clock signal, $SCLK_O$, to sample odd-numbered symbols $x'_n, x'_{n+2}, x'_{n+3} \ldots$. This technique may be extended to achieve virtually any data rate, including quad data rate (4 symbols per sampling clock cycle), octal data rate (8 symbols per sampling clock cycle), decade data rate (10 symbols per sampling clock cycle), and so forth.

Still referring to FIG. 3, the transmitter 201 includes a transmit shift register 203, output driver bank 204 and tap weight register 206. In the particular embodiment shown, the transmit shift register 203 is five elements deep and used to store a pre-tap data value $D_{+1}$, primary data value $D_0$, and three post-tap data values $D_{-1}, D_{-2}$ and $D_{-3}$. The primary data value is the data value to be transmitted to the receiver 209 during a given transmit interval, and the pre- and post-tap data values are the next-to-be transmitted and previously transmitted data values, respectively (i.e., the subscript indicating the number of transmit intervals to transpire before the data value will be transmitted). Each of the shift register storage elements is coupled to a respective one of output drivers $205_0$-$205_4$ within the output driver bank 204, with output driver $205_1$ forming the primary data driver, output driver $205_0$ forming the pre-tap data driver and output drivers $205_2$-$205_4$ forming the post-tap data drivers (such drivers being referred to herein as pre-tap, primary and post-tap drivers, for brevity).

The tap weight register is used to store a set of drive strength values, $\underline{W}_N$, referred to herein as tap weights. As described below, the tap weights are iteratively updated, with each new set of tap weights being designated by an incrementally higher subscript (i.e., N, N+1, N+2, etc.). Each tap weight of a given set, $W_N(0)$-$W_N(4)$, is supplied to a respective one of the output drivers $205_0$-$205_4$ to control the level of the output signal generated by the output driver. In one embodiment, the signal path 202 is pulled up to a predetermined voltage level (e.g., at or near supply voltage) by single-ended or double-ended termination elements, and the output drivers $205_0$-$205_4$ generate signals on the signal path 202 by drawing a pull-down current, $I_{PD}$ (i.e., discharge current), in accordance with the corresponding tap weight and data value. As a specific example, in a binary signaling system, each output driver $205_0$-$205_4$ draws a current according to the following expression:

$$I_{PD}(i)=S(i)\cdot[W_N(i)*I_{UNIT}] \quad (1),$$

where '·' denotes a logic AND operation, '*' denotes multiplication, $I_{UNIT}$ is a reference current, $W_N(i)$ is the tap weight of the i$^{th}$ output driver (i ranging from 0-4 in this example), and S(i) is the sign of the output driver contribution. The individual currents drawn by the output drivers 205$_0$-205$_4$ are wire-summed (i.e., drawn from the same node) to form a total pull-down current, I$_{TPD}$, and therefore each contribute to the total output signal level in accordance with the sign of the output driver contribution and the tap weight. By this arrangement, pre- and post-tap drivers are enabled to provide additive and subtractive contributions to the output signal level, as necessary to compensate for dispersion-type ISI.

It should be noted that the particular numbers of pre-tap and post-tap drivers (and corresponding tap weights and shift register elements) shown in FIG. 3 and the figures that follow have been selected for purposes of example only. In alternative embodiments, more or fewer pre-tap drivers and/or post-tap drivers may be provided, along with more or fewer storage elements within shift register 203 and tap weights within tap weight register 206.

In one embodiment, each of the tap weights, W$_N$(0)-W$_N$(4) is a digital value having a sign component and magnitude component. The sign component of the tap weight (e.g., sign bit) is exclusive-NORed with the corresponding transmit data value to generate the sign of the signal contribution to be generated by the corresponding output driver 205. The exclusive-NOR operation effectively multiplies the signs of the tap weight and transmit data value, yielding a logic '1' (i.e., interpreted as a positive sign in one embodiment) if the signs of the tap weight and transmit data value are the same, and a logic '0' (i.e., negative sign) if the signs of the tap weight and transmit data value are different. The magnitude component of the tap weight is a multi-bit value used, for example, to control a digital-to-analog converter (DAC) within the output driver. Thus, the expression (1) may be rewritten as follows:

$$I_{PD}(i) = [D(i)/\oplus sgn(W_N(i))] \cdot [|W_N(i)| * I_{UNIT}] \quad (2),$$

where '/⊕' denotes an exclusive-NOR operation, D(i) is a data value received from the transmit shift register, "sgn(W$_N$(i))" is the sign of the i$^{th}$ tap weight and |W$_N$(i)| is the magnitude of the i$^{th}$ tap weight. By this arrangement, the sign of the signal contribution generated by the i$^{th}$ output driver is positive (i.e., logic '1') if the sign of the corresponding tap weight and source data value match, and negative otherwise. That is, if a logic '1' is to be transmitted (i.e., positive data) and the tap weight is positive (indicated by a logic '1' sign bit), the signal contribution is positive, thereby increasing the signal level generated on signal path 202. The signal contribution is also positive if a logic '0' is to be transmitted (i.e., negative data) and the tap weight is negative, the negative tap weight effectively flipping the otherwise negative signal contribution indicated by the logic '0' data. If the tap weight sign and source data value do not match, then a negative signal contribution is generated by the output driver. In a multi-level signaling embodiment, the sign of the tap weight may similarly be used to change the sign of the transmitted symbol.

Figure 5:
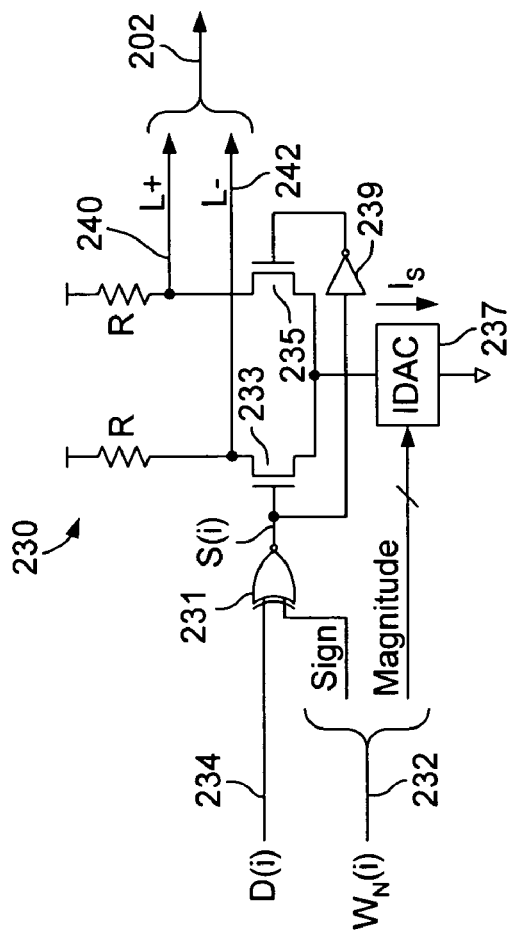
FIG. 5 illustrates an embodiment of a differential output driver that may be used to implement each of the output drivers shown in FIG. 3.

FIG. 5 illustrates an embodiment of a differential, current-mode output driver 230 that may be used to implement each of the output drivers 205$_0$-205$_4$ of FIG. 3. The output driver includes a pair of transistors 233 and 235, each having drain terminals pulled up by respective load elements R (resistors are depicted in FIG. 5, but active load elements or other types of resistive elements may alternatively be used) and coupled to negative and positive lines 240 and 242 (L- and L+ respectively) of differential signal path 202. Source terminals of the transistors 233 and 235 are coupled in common to a current DAC 237 (IDAC) which draws a current, I$_S$, in accordance with the magnitude component of tap weight, W$_N$(i). That is, I$_S$=|W$_N$(i)|×I$_{UNIT}$. An exclusive-NOR gate 231 is provided to exclusive-NOR the sign of the tap weight 232 with the corresponding source data value 234, thereby generating a signal contribution sign, S(i), that is supplied to the gate of transistor 233. The complement of the signal contribution sign, /S(i) is generated by inverter 239 and supplied to the gate of transistor 235. By this arrangement, when a logic '1' data value 234 is received in the output driver, and the tap weight 232 is positive, a positive contribution sign is generated by the exclusive-NOR gate (i.e., S(i) is high) to switch on transistor 233 and switch off transistor 235, thereby causing line 242 (L-) to be pulled down relative to line 240 (L+) to establish a positive differential signal contribution. The potential difference between lines L+ and L- is controlled by the current I$_S$ (i.e., V$_{L+}$=V$_S$-I$_S$R, where the supply voltage, V$_S$, and the resistance, R, are substantially fixed) which, in turn, is controlled by the magnitude component of the tap weight 232. Thus, the signs of the tap weight 232 and source data value 234 control whether the differential signal contribution generated on lines 240 and 242 by a given output driver (i.e., V$_{L+}$-V$_{L-}$) is positive or negative, and the magnitude of the tap weight 232 controls the amplitude of the differential signal. In alternative embodiments, described in greater detail below, multi-level signaling (i.e., signaling protocols in which each transmitted symbol carries more than one bit of information) may be used instead of binary signaling, with different pull down currents being used to establish different signal levels for different combinations of source data bits. Also push-pull type output drivers or other types of output drivers may be used instead of the current mode driver 230 shown in FIG. 5.

Output Driver Tap Weight Determination

Referring again to FIG. 3, the tap weights stored in tap weight register 206 are ideally set to exactly cancel the dispersion-type ISI (and/or other systematic sources of signal distortion) resulting from transmission of the pre-tap and post-tap data values. For example, if transmission of a logic '1' value that starts at a normalized signal level of +1.0 results in reception of signals having levels of 0.7 and 0.3 in successive reception intervals, then the signal is being dispersed and attenuated by the signal path 202 (also referred to herein as a channel). Consequently, an immediately subsequent transmission of a logic '0' that starts at a normalized signal level of −1.0 results in reception of signals having levels of −0.4 (i.e., −0.7+0.3), and −0.3. That is, the residue of the initial transmission (i.e., 0.3) destructively combines (i.e., interferes) with the subsequent negative-level signal, attenuating the received signal level. In this simple example, it can be seen that the source of the ISI in any given symbol transmission is the immediately preceding symbol. Thus, by setting the post-tap driver 205$_2$ to generate a subtractive pre-emphasis signal that exactly cancels the residue of the preceding transmission, the signal received within a given sampling interval, while not fully restored to the originally transmitted level, is free from ISI. In a practical application, the ISI will not be fully canceled, as numerous other channel effects (reflections, crosstalk, noise) mask the true level of ISI at any given time, making it difficult to ascertain the exact tap weight that should be applied to the pre- and post-tap drivers (i.e., 205$_0$ and 205$_2$-205$_4$) to compensate for the pre- and post-tap residue. Also, the pre-emphasis signal itself will generate ISI, which in turn may be mitigated by additional pre-emphasis signals generated by one or more others of the pre- and post-tap drivers.

In one embodiment, the receiver 209 generates updated tap weights, $\underline{W}_{N+1}$, based upon a comparison of incoming signals with an adaptively determined target signal level 220, referred to herein as a data level threshold, DLEV. The receiver 209 includes an adaptive module 215 (AM) and a pair of sampling circuits referred to herein as a data sampler 211 (D) and an adaptive sampler 213 (A). The data sampler samples the incoming signal, referred to herein as $x'_n$, to emphasize the channel transformation of originally transmitted signal, $x_n$, and generates a data sample 216 (RX Data) having a logic '1' or logic '0' state according to whether the incoming signal exceeds a zero reference. In a single-ended signaling system, the zero reference may be generated by a DAC, voltage divider or other circuit and set to a point midway between steady-state high and steady-state low signaling levels. In a differential signaling system, the common mode of the incoming differential signal may constitute the zero reference so that if the signal level on the positive signal line (e.g., line 240 of FIG. 5) exceeds the signal level on the negative signal line (e.g., line 242 of FIG. 5), a logic '1' is captured by the data sampler 211 and, conversely, if the signal level on the negative signal line exceeds the signal level on the positive signal line, a logic '0' is captured by the sampler 211. Thus, the data sample 216 has a logic state that corresponds to the sign of the incoming data signal, positive or negative, and is referred to herein as a data sign value.

The adaptive sampler 213 also samples the incoming signal, $x'_n$, and generates an error sample 218 having a logic '1' or logic '0' state according to whether the incoming signal exceeds the data level threshold 220 generated by the adaptive module 215. In one embodiment, the data level threshold 220 corresponds to an expected data level of logic '1' transmission, so that if the incoming signal is determined to have a positive sign (i.e., RX Data=$sgn(x'_n)$='1'), then the error sample 218 generated by the adaptive sampler 213 represents the sign of an error between the incoming signal level and the expected signal level (i.e., the data level threshold 220, DLEV). Accordingly, the error sample 218 is referred to herein as an error sign value ($sgn(e_n)$) and is a logic '1' (i.e., positive) if $x'_n$ <DLEV, and a logic '0' (i.e., negative) if $x'_n \geq$ DLEV).

Figure 2:
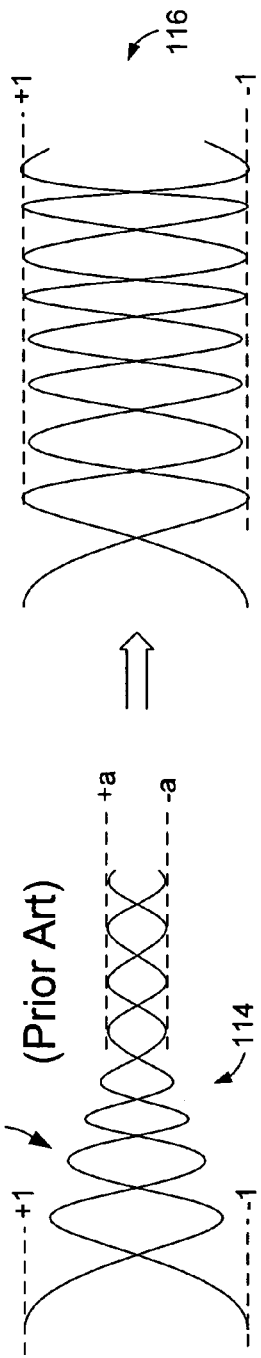
FIG. 2 illustrates an idealized amplification of a channel-attenuated waveform.
Figure 6:
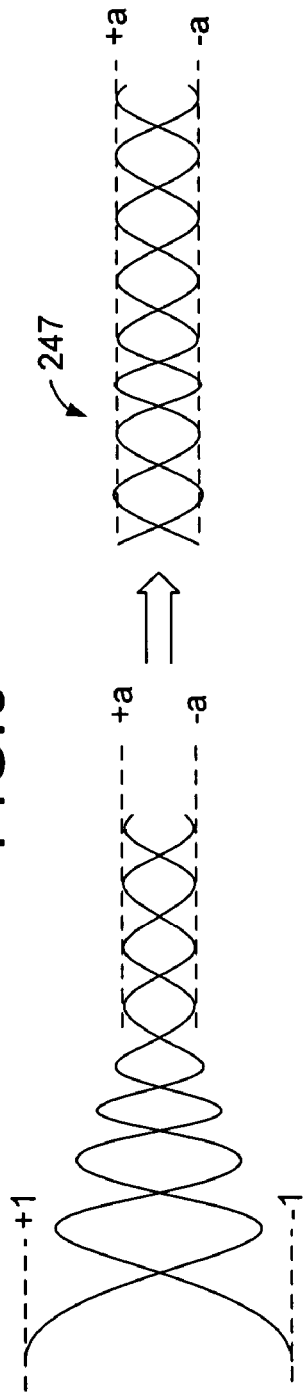
FIG. 6 illustrates waveforms that correspond to a substantially flattened channel response obtained in the signaling system of FIG. 3.

The adaptive module 215 receives the data sign and error sign values, 216 and 218, from the data sampler 211 and adaptive sampler 213, respectively, and adaptively updates the data level threshold 220 and pre-emphasis tap weights 226 in response. Referring to FIG. 6, by updating the data level threshold 220 and tap weights 226 concurrently (i.e., at least partly overlapping in time at the same or different loop update rates), and by maintaining the updated tap weights 226 in an aggregate setting that corresponds to the peak (or average) power of the transmit circuit 201, the data level threshold converges to the attenuated levels, +/−a exhibited by the highest frequency data patterns transmitted over the signal path 202, and the tap weights 226 converge to a setting that substantially flattens the channel response as shown at 247. That is, instead of attempting to adapt the tap weights according to originally transmitted signal levels (e.g., normalized +/−1 levels as discussed in reference to FIGS. 1 and 2), the attenuated signal levels +/−a of high frequency data patterns (e.g., signal levels alternating in each successive transmission) are learned and used to generate error signals that, when applied in an error reduction circuit, drive the pre-emphasis tap weights 226 toward a solution that flattens the channel response at the +/−a threshold levels, and yet meets the peak power constraint of the transmit circuit. By this operation, a more optimal tap weight convergence may be achieved than in the prior-art signaling system of FIG. 1, potentially improving signaling margins, particularly in multi-PAM systems where finer distinctions between signaling levels are needed.

In some systems, it is desirable to shape the frequency response differently from the flattened response described in reference to FIG. 6. This may be done, for example, by updating both the tap weights and data level threshold using the error filtered by appropriate data sequences. As an example, in a system where it is desired to pass the additive or subtractive component (i.e., partial response) of a neighboring symbol that appears in the same transmit interval as the symbol of interest (i.e., not zeroing the ISI from a selected neighboring symbol). This data filtering, however, does not change the operations described above with regard to concurrent updating of both the data level threshold and tap weights (with or without power scaling). Rather, the target shape of the pulse is changed. In other embodiments, the tap weights updated using other error filtering functions to improve any number of performance measures (e.g., eye opening in voltage or timing, reduced bit error rate or other overall system performance parameter).

In one embodiment, each new set of updated tap weights 226 is communicated to the transmitter via a back channel 225. The back channel 225 may be formed, for example, by a relatively low-speed signaling path, or by out-of-band signaling over the signaling path 202 (e.g., using an otherwise unused code space within a signal encoding protocol such as 8b/10b or other signal encoding). In an alternative embodiment, a separate back channel may be omitted and the signaling path 202 may be used to communicate updated tap weights 226 (or update values that enable transmit-side generate of updated tap weights 226) to the transmit-side device.

Adaptive Module

Figure 7:
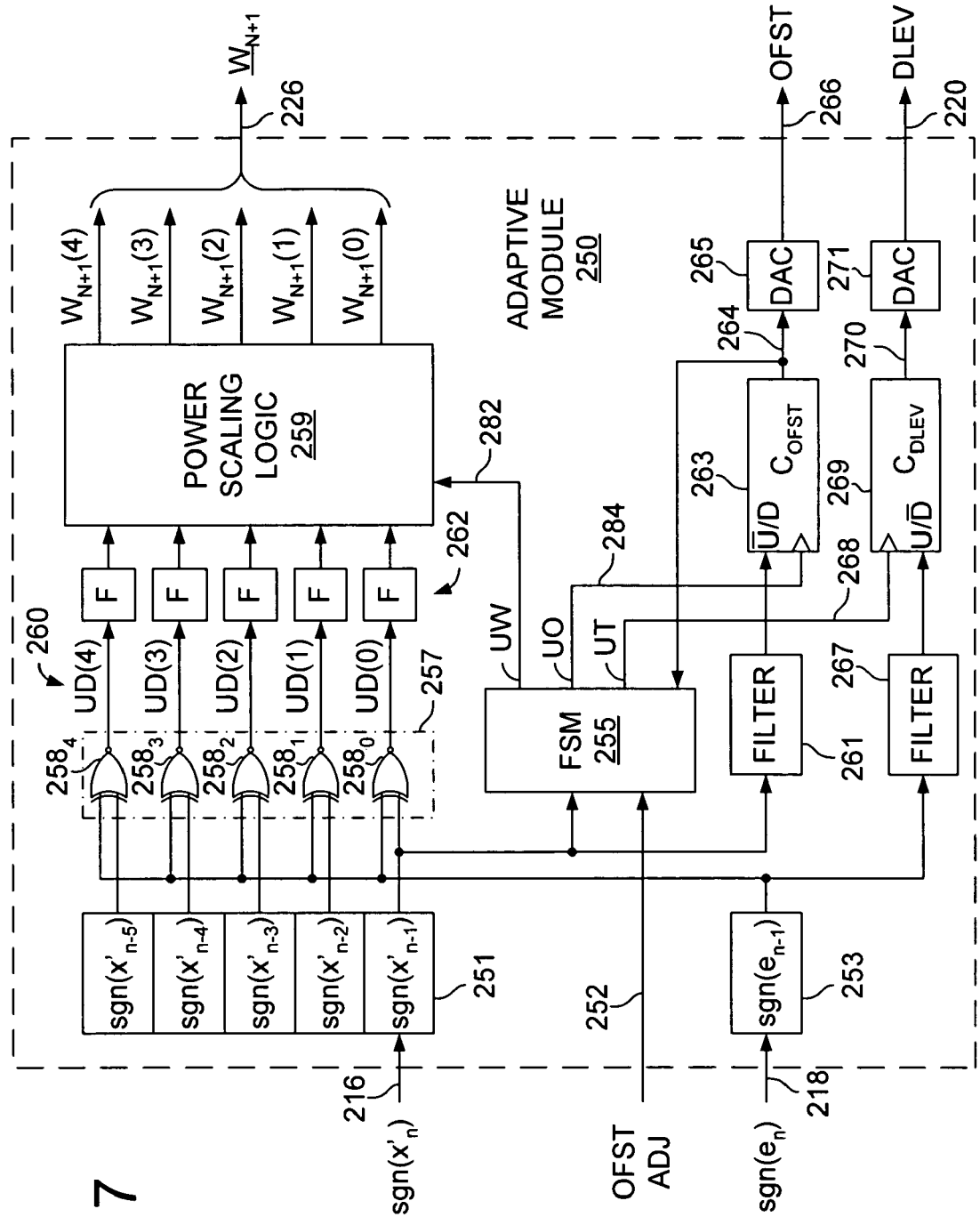
FIG. 7 illustrates an adaptive module according to an embodiment of the invention.

FIG. 7 illustrates an embodiment of an adaptive module 250 that may be used to implement the adaptive module 215 of FIG. 3. The adaptive module 250 includes a data sign register 251, error sign register 253, sign multiplier 257, finite state machine 255, power scaling logic 259, filter 261, threshold counter 269 and DAC 271. The error sign value 218 and data sign value 216 generated during reception interval 'n' are supplied to the error sign register 253 and data sign register 251, respectively, and clocked into the registers in response to transitions of a sampling clock signal, not shown (or other, related clock signal). The data sign register 251 is a shift register used to store the most recently generated data sign values. In the embodiment of FIG. 7, the data sign register 251 is depicted as being five elements deep (i.e., to store data sign values, $x'_{n-1}$-$x'_{n-4}$); a depth that corresponds to the number of tap weights applied within the transmit circuit 201 of FIG. 3. In alternative embodiments, the data sign register 251 may have more or fewer storage elements, for example, to accommodate more or fewer tap weights and/or to store data sign values used for other purposes including, without limitation, reflection cancellation, cross-talk cancellation and offset cancellation. Similarly, the error sign register 253 is a one-deep register in the embodiment of FIG. 7, to store error sign value $sgn(e_{n-1})$, but may include any number of shift register elements in alternative embodiments (e.g., to enable selection of an error sign value having a desired latency).

The sign multiplier 257 includes a set of exclusive-NOR gates $258_0$-$258_4$ each having a first input coupled in common to receive the stored error sign value from the error sign register 253 and each having a second input coupled to receive a respective data sign value from the data sign register 251. By this arrangement, each of the exclusive-NOR gates $258_0$-$258_4$ generates a respective one of update values 260, UD(0)-UD(4), in a logic '1' state if the corresponding data sign value matches the error sign value, and in a logic '0' state if the data sign value and error sign value do not match. Thus, each of the update values 260 represents a multiplication of the signs of the input signal (i.e., $x'_{n-1}$-$x_{n-4}$, respectively) and error signal $e_{n-1}$ and therefore is a logic '1' if the signs are both positive or both negative, and a logic '0' if the signs are different. In one embodiment, each of the update values 260 is filtered within a respective one of filter elements 262 (F) to decrease update dither due to noise in the update estimate. In an alternative embodiment, the filter elements 262 are omitted.

In one embodiment, a tap weight is made more positive in response to a logic '1' update (i.e., a positive update) and more negative in response to a logic '0' update value (a negative update). More specifically, a positive tap weight is incremented (e.g., by a predetermined step size) and a negative tap weight decremented in a positive update. Conversely, a positive tap weight is decremented and a negative tap weight incremented in a negative update. In one embodiment, the positive and negative updates applied to the tap weights constitute a sign-sign least-mean-square (LMS) update that may be expressed as follows:

$$\underline{W}_{N+1} = \underline{W}_N + \text{stepsize} * \text{sign}(e_n) * \text{sign}(\underline{x}') \quad (3),$$

which corresponds to the following scalar expressions:

$$W_{N+1}(0) = W_N(0) + \text{stepsize} * \text{sign}(e_n) * \text{sign}(x'_{n+1})$$

$$W_{N+1}(1) = W_N(1) + \text{stepsize} * \text{sign}(e_n) * \text{sign}(x'_n)$$

$$W_{N+1}(2) = W_N(2) + \text{stepsize} * \text{sign}(e_n) * \text{sign}(x'_{n-1})$$

$$W_{N+1}(3) = W_N(3) + \text{stepsize} * \text{sign}(e_n) * \text{sign}(x'_{n-2})$$

$$W_{N+1}(4) = W_N(4) + \text{stepsize} * \text{sign}(e_n) * \text{sign}(x'_{n-3})$$

Thus, each tap weight update is in the direction of the estimate of the quantized negative gradient of the quadratic, least-mean-squared error cost function (i.e., a quadratic cost function). Other cost functions may be used in alternative embodiments. In order to provide a meaningful error signal, the data level threshold is updated according to the error sign value, sign($e_n$). In the embodiment of FIG. 3, for example, the data level threshold is updated according to the following expression:

$$DLEV_{N+1} = DLEV_N - \text{stepsize} * \text{sign}(e_n) * \text{sign}(x'_n)$$

In the embodiment of FIG. 7, the adaptive module 250 outputs the updated tap weight values 226 generated by the power scaling logic 259 to the transmit-side device, for example, via the back channel 225 depicted in FIG. 3 (or via another signaling path). In an alternative embodiment, the power scaling logic 259 is provided within the transmit-side device rather than the receive-side device, so that only the tap weight updates (or component signals used to generate the tap weight updates) need be communicated to the transmit-side device.

Still referring to FIG. 7, the most recently stored data sign value and error sign value, sgn($x'_n$) and sgn($e_{n-1}$), are provided to the finite state machine 255 which, in turn, asserts an update-weight signal 282 (UW) to enable the power scaling logic 259 to apply the update values 260 to the existing set of tap weights ($\underline{W}_N$), and scale the resulting values to generate updated tap weights $\underline{W}_{N+}$226. In the embodiment of FIG. 7, the finite state machine asserts the update-weight signal upon determining that the shift register 251 is fully loaded, or fully reloaded, with a set of data sign values, and that the most recently stored data sign value has a predetermined state. The predetermined state may be either positive or negative in different embodiments, according to whether the data level threshold 220 generated by the adaptive module 250 corresponds to positive or negative incoming signals. That is, if the data level threshold 220 is adjusted to the level of logic '1' data, then the error signal, $e_n$, has meaning with respect to $x'_n$ if the sign of $x'_n$ is positive (i.e., the data sign value is a logic '1') and is ignored if the sign of $x'_n$ is negative. Conversely, if the data level threshold 220 is adjusted to the level of logic '0' data, then the error signal, $e_n$, has meaning with respect to $x'_n$ if the sign of $x'_x$ is negative and is ignored if the sign of $x'_n$ is positive. Further, two adaptive samplers may be provided to generate positive and negative data level thresholds when positive and negative data signals are received, respectively. As discussed below, in a multi-PAM embodiment, an adaptive sampler may be provided to generate error information for each different data level.

In the embodiment of FIG. 7, the adaptive module 250 generates a data level threshold 220 (DLEV) that constitutes a target data level for incoming, positive data signals. When the finite state machine 255 detects storage of a positive data sign value (i.e., a logic '1'), the finite state machine 255 asserts an update threshold signal 268 (UT), thereby enabling a threshold count 270 maintained by threshold counter 269 to be incremented or decremented according to the state of the corresponding error sign value, $e_{n-1}$, stored in register 253. Filter 267 is provided to decrease update dither due to noise in the update estimate, and may be omitted in alternative embodiments. Also, the finite state machine 255 may also generate the update threshold signal 268, upon determining that a predetermined pattern of incoming signals has been received (e.g., a high-frequency pattern such as 10101).

In the embodiment of FIG. 7, the threshold counter 269 outputs the threshold count 270 to a DAC 271 which, in turn, generates a corresponding data level threshold 220. Although depicted as being part of the adaptive module 250, the DAC may alternatively be a component within the adaptive sampler 213 (e.g., a DAC that operates to bias the sampler to establish the data level threshold). In such an embodiment, a digital control value (i.e., the threshold count 270) is output from the adaptive module 250 rather than an analog threshold level (or analog biasing signal). Sampling circuit embodiments having biasing circuitry to establish a data level threshold in response to a digital control value are described below.

Still referring to FIG. 7, the adaptive module may additionally include a filter 261, offset counter 263 and DAC 265 to control offset cancellation within the data sampler. During an offset cancellation operation, an offset adjust signal 252 is asserted at an input of the finite state machine, and a null signal is generated at the data sampler input, for example, by switchably coupling the sampler inputs together, or by transmitting null data over the signal path (i.e., signal levels impressed on component lines of the differential signal path have the same levels). A steady-state positive or negative output from the data sampler in response to the null data input indicates a DC error within the sampler. That is, if the sampler repeatably interprets nominally equal signal levels at its differential inputs as indicating a logic '1' or logic '0' value, then the sampler exhibits a DC offset. Accordingly, the data sign value, after being filtered by the filter 261 (which may be omitted in alternative embodiments), is supplied to an up/down input of the offset counter 263. The finite state machine responds to assertion of the offset adjust signal by asserting an update-offset signal 284 (UO) after each new data sign value is loaded into the shift register (or after a predetermined number of data sign values have been loaded), thereby enabling the offset count 264 maintained within the offset counter 263 to be adjusted up or down. In the embodiment of FIG. 7, the offset count 264 is supplied to DAC 265 which, in turn, generates an analog control value 266 (OFST)

that is applied within the data sampler to bias the sampler in a direction counter to the DC offset. Alternatively, the offset count 264 itself may be supplied to the sampler. In either case, a negative feedback loop is created in which the data sampler bias is adjusted to drive the DC offset to zero, a condition indicated by a dithering offset count 264. In one embodiment, the offset count 264 is supplied to the finite state machine 255 (or other control circuit) to enable the finite state machine 255 to determine when a target DC offset count has been reached (i.e., offset calibration operation complete). In alternative embodiments, the finite state machine 255 continues to assert the update-offset signal 284 (i.e., continuing the DC offset calibration operation) until the offset adjust signal 252 is deasserted. The offset adjust signal 252 may be asserted, for example and without limitation, for a predetermined time, or until a predetermined number of data sign values have been generated, or until a dithering offset count is detected.

In one embodiment, the offset count 264 (or DAC output 266) is supplied to both the adaptive sampler and the data sampler (e.g., elements 213 and 211 of FIG. 3), on the assumption that the DC offset of the adaptive sampler is likely to track the DC offset of the data sampler. This may be the case, for example, when a contributor to DC offset is the signal path itself, or when the DC offset is process dependent. In an alternative embodiment, additional offset calibration circuitry (e.g., filter, offset counter and, if needed, DAC) is provided within the adaptive module 250 to enable DC offset calibration of the adaptive sampler. In another alternative embodiment, multiplexing circuitry is used to select the error sign register 253 to provide the sample value to the filter 261 instead of the data sign register 251. In such alternative embodiments, the threshold count applied to the adaptive sampler is temporarily zeroed (or disabled from being applied within the adaptive sampler) to enable determination of the DC offset.

Power Scaling

Still referring to FIG. 7, after the power scaling logic 259 (or other circuitry within the adaptive module) updates the transmit pre-emphasis tap weights according to the update values, the power scaling logic 259 scales the updated tap weights to ensure that the total power indicated by the aggregate magnitudes of the tap weights does not exceed the power constraint (peak or average) of the transmit circuit. In one embodiment, the power constraint of the transmit circuit corresponds to the maximum DAC setting of the primary driver which, in an 8-bit sign-magnitude implementation, is $2^7-1=127$ (alternatively, the maximum DAC setting, and therefore the power constraint, may be programmed into a configuration circuit within the receive-side and/or transmit-side device, or supplied to the receive-side and/or transmit-side devices during system initialization). Thus, assuming an initial condition in which the primary driver tap weight is set to max power (i.e., sign bit=1, magnitude=127), then as the magnitudes of the initially-zero pre- and post-tap weights increase, the power constraint may be exceeded. As discussed above, the sign-sign LMS update logic of FIG. 7 updates the tap weights according to the following equation:

$$\underline{W}_{N+1}=\underline{W}_N+\text{stepsize}*\text{sign}(e_n)*\text{sign}(\underline{x}') \quad (3).$$

Thus, the tap weight updates are obtained by multiplying the stepsize, error sign value and data sign value, so that expression (3) may be rewritten as follows:

$$\underline{W}_{N+1}=\underline{W}_N+\underline{\text{Update}}_N \quad (4).$$

The transmit circuit power constraint may be expressed as a sum of the magnitudes of the output driver tap weights. That is:

$\Sigma|Wn|<=W_{MAX}$, where $W_{MAX}$ is the square root of the normalized power limitation (i.e., in the case of a peak power constraint; in the case of an average power constraint, the expression becomes the L2 norm: $\Sigma Wn^2<=W_{MAX}^2$). In a current mode transmitter, the tap weights, W, control the current contribution of each output driver, which in turn controls the voltage level developed on the signaling path and therefore the power output of the drivers. In a voltage mode transmitter, the tap weights control the voltage contribution of each output driver, and therefore the power output of the drivers. In the tap weight update expressions herein, the term, $W_{MAX}$, refers to the square root of the normalized peak or average power constraint.

In one embodiment, transmit pre-emphasis tap weights are re-scaled directly after each update by multiplying each tap weight magnitude by a ratio of the power constraint to the power represented by the updated tap weights. That is:

$$\underline{W}_{N+1}=(\underline{W}_N+\underline{\text{Update}}_N)*(W_{MAX}/|\underline{W}_N+\underline{\text{Update}}_N|_1) \quad (5),$$

where $|W_N+\underline{\text{Update}}_N|_1$ is the sum of the magnitudes of the tap weights that would result if the updates were applied (i.e., $|W_N(0)+\text{Update}(0)|+|W_N(1)+\text{Update}(1)|+\ldots+|W_N(4)+\text{Update}(4)|$). Direct re-scaling may be carried out by a processing unit (e.g., digital signal processor, special purposes processor, or general purposes processor) within either the receive-side IC device or transmit-side IC device (i.e., the IC devices that include the receiver 209 and transmitter 201, respectively, of FIG. 3) or by another device. Alternatively, a state machine or dedicated logic circuit for carrying out the direct re-scaling operation (e.g., using integer arithmetic) may also be used.

In an alternative embodiment, circuitry within the adaptive module itself is used to carry out re-scaling based on a Taylor-series approximation that reduces computational complexity relative to the direct re-scaling approach. That is, rewriting expression (4), the following expression for residual power (i.e., amount of power by which the updated tap weights exceed or fall below the power constraint) is obtained:

$$W_{RES}=|\underline{W}_N+\underline{\text{Update}}_N|_1-W_{MAX}=\\ [sgn(W_N(i))*\text{Update}_N(i)] \quad (6).$$

Combining expressions (5) and (6), the direct re-scaling operation may be expressed as a ratio of the residual power and the power limit:

$$\underline{W}_{N+1}=(\underline{W}_N+\underline{\text{Update}}_N)*[1+W_{RES}/W_{MAX}]^{-1} \quad (7).$$

Using the Taylor-series approximation, $[1+W_{RES}/W_{MAX}]^{-1} \approx [1-W_{RES}/W_{MAX}]$, expression (7) may be rewritten as follows:

$$\underline{W}_{N+1} \approx (\underline{W}_N+\underline{\text{Update}}_N)-[(\underline{W}_N+\underline{\text{Update}}_N)*W_{RES}/W_{MAX}] \quad (8).$$

Expression (8) may be implemented in a relatively small logic circuit considering that the term $(\underline{W}_N+\underline{\text{Update}}_N)$ may be obtained through integer addition, and, because $W_{RES}$ will usually be significantly smaller than $W_{MAX}$, the multiplication by $W_{RES}/W_{MAX}$ can be reduced to a right-shift, binary division operation. That is, $1/W_{MAX}$ involves a right shift by $\log2(W_{MAX})$ bits, so long as $W_{MAX}$ is a power-of-two value (e.g., 128). Similarly, $W_{RES}$, which ranges from +5 to −5 in the five-driver embodiment of FIGS. 3 and 7, will be a power of 2 value in all cases except for +/−3 or +/−5, which may be rounded to a power of 2 number. In one embodiment, for example, +/−3 $W_{RES}$ values are alternately rounded to +/−2 and +/−4. $W_{RES}$ values of +/−5 are rounded to +/−4. Different rounding schemes may be used in alternative embodiments. For example, $W_{RES}$ values of +/−5 may be rounded by toggling between 8 and 4 (e.g., rounding to 8 once for every three roundings to 4).

Figure 8:
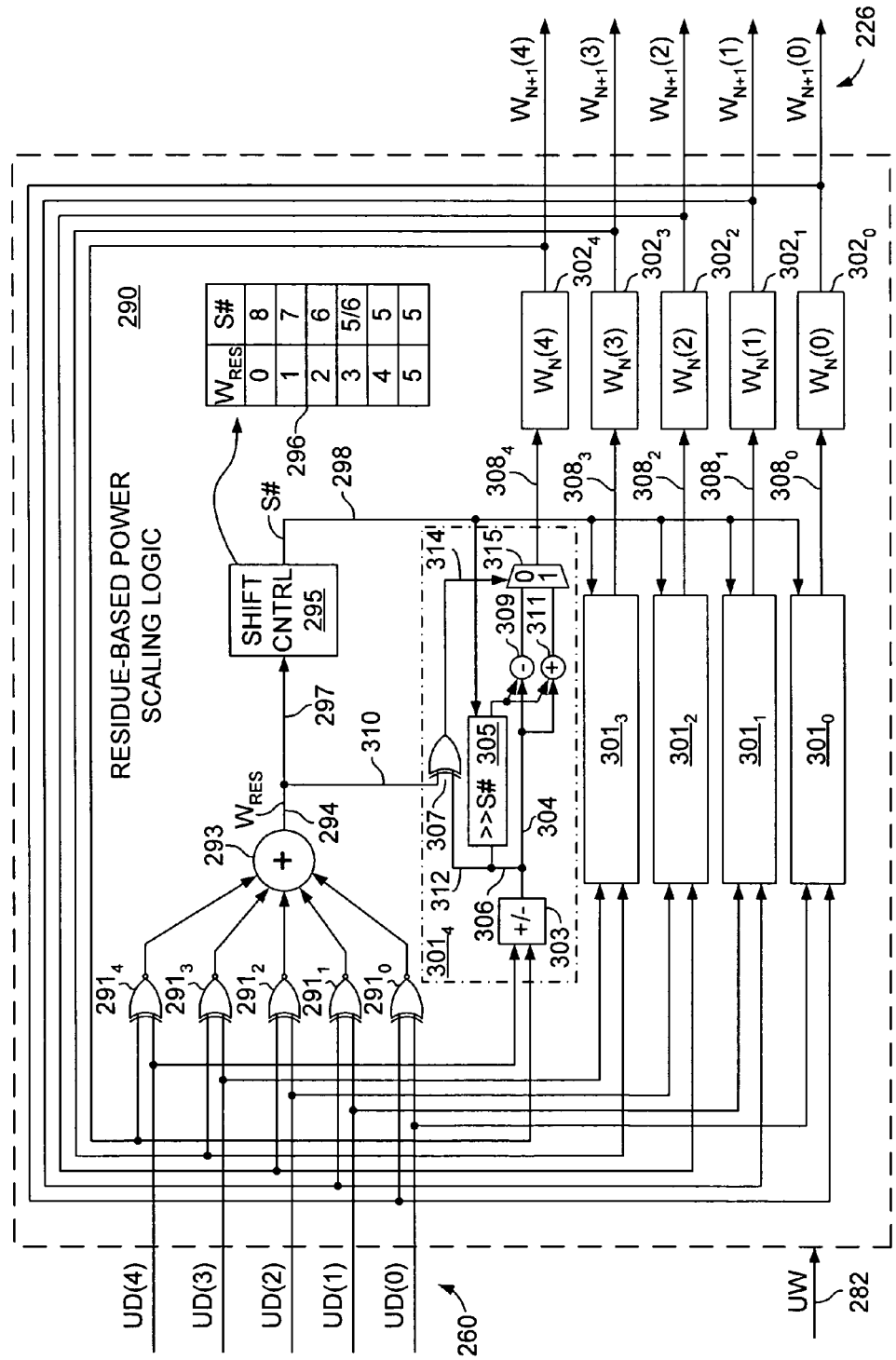
FIG. 8 illustrates a power scaling circuit according to an embodiment of the invention.

FIG. 8 illustrates a residue-based power scaling circuit 290 that outputs scaled, updated tap weights in accordance with the approximation set forth in expression (8). The power scaling circuit 290 includes a bank of exclusive-NOR gates $291_0$-$291_4$ that multiply the signs of the existing tap weights ($\underline{W}_N$) stored in registers $302_0$-$302_4$ with the signs of the update values 260 (i.e., UD(0)-UD(4)). A summation circuit 293 receives the outputs of the exclusive-NOR gates 291 and generates a sum that corresponds to the residual power (WRES). That is, the summation circuit treats each logic '1' input as a +1 value and each logic '0' value as a −1 value, thereby generating a residual power value 294 that indicates the aggregate change in tap weights. In the embodiment of FIG. 8, the residual power value 294 is a sign-magnitude value having a sign component 310 (i.e., sign bit) that indicates whether the aggregate change in tap weights is positive or negative, and a magnitude component 297 that represents the absolute value of the aggregate change in tap weights. The magnitude component 297 of the residual power value 294 is input to a shift control circuit 295 that, in turn, generates a shift value 298 (S#), which corresponds to the number of bits by which an updated tap weight is to be right shifted to carry out a multiplication by $|W_{RES}|/W_{MAX}$. That is, the shift value 298 corresponds to $\log_2(W_{MAX}/|W_{RES}|)$. In the embodiment of FIG. 8, the maximum power is assumed to be 128 so that, as shown in logic table 296, the shift control circuit 295 generates a shift value 298 of eight when the residual power value 294 is zero; a shift value of seven when the residual power value is one; a shift value of six when the residual power is two; alternating shift values of five and six when the residual power value is three; and a shift value of five when the residual power value is greater than three.

The update values 260 and existing tap weights in registers 302 are also supplied to respective scaling circuits $301_0$-$301_4$ along with the shift value 298, and the sign component 310 of the residual power value 294. Referring to the detailed view of scaling circuit $301_4$, the update value, UD(4), and tap weight $W_N(4)$ are input to an increment/decrement circuit 303 which generates an updated tap weight value 304 having an incremented magnitude if the tap weight and update have the same sign (i.e., both positive or both negative) and a decremented magnitude if the tap weight and update have different signs. In the embodiment of FIG. 8, the updated tap weight value 304 includes a sign component 312 which is supplied to the first input of an exclusive-OR gate 307, and a magnitude component 306 which is supplied to a shifting circuit 305 (e.g., a barrel shifter). The second input of the exclusive-OR gate 307 is coupled to receive the sign component 310 of the residual power value 294 so that the exclusive-OR gate outputs a logic '1' select signal 314 to the select input of multiplexer 315 if the sign of the updated tap weight value and the sign component of the residual power are different, and a logic '0' select signal 314 if the sign components of the updated tap weight value and residual power are the same. The complete updated tap weight value 304 (i.e., sign and magnitude) is provided to difference circuit 309 and summing circuit 311. The shifting circuit 305 right shifts the magnitude component 306 of the updated tap weight 304 according to the shift value 298 to effectuate a multiply by $W_{RES}/W_{MAX}$ (or an approximation of $W_{RES}/W_{MAX}$) and outputs the resulting product to the summing circuit 311 and difference circuit 309. The summing circuit 311 adds the product generated by the shifting circuit 305 to the updated tap weight value 304 and, the difference circuit 309 subtracts the product generated by the shifting circuit 305 from the updated tap weight 304 to generate scaled-up and scaled-down updated tap weight values, respectively, which are provided, in turn, to first and second input ports of the multiplexer 315. By this arrangement, if the sign components 312 and 310 of the updated tap weight value 304 and residual power value 294, respectively, are the same, then the scaled-down updated tap weight value generated by the difference circuit 309 is selected by multiplexer 315 to be output as the updated tap weight $308_4$ (i.e., ultimately to become updated tap weight $W_{N+1}(4)$). If the sign components 312 and 310 of the updated tap weight value 304 and residual power value 294, respectively, are different, then the scaled-up updated tap weight value generated by the summing circuit 311 is selected by multiplexer 315 to be output as the updated tap weight $308_4$. Thus, in the case of a positive residual power value 294, a positive tap weight value is scaled down and a negative tap weight value is scaled up (i.e., made less negative) to reduce the power applied within the corresponding output driver. Conversely, in the case of a negative residual power value 294, a negative tap weight value is scaled down (i.e., made more negative) and a positive tap weight value is scaled up to increase the power applied within the corresponding output driver. Thus, each of updated tap weights $W_{N+1}(0)$-$W_{N+1}(4)$ is generated within a respective one of scaling circuits $301_0$-$301_4$ by adjusting the prior tap weight ($W_N$), multiplying the adjusted tap weight by the $W_{RES}/W_{MAX}$ approximation to generate a fractional component (i.e., the output of shifting circuit 305), then subtracting the fractional component from the updated tap weight (note that an addition occurs when a negative $W_{RES}$ is subtracted from the updated tap weight). That is, $\underline{W}_{N+1}$ is assigned the value: $(\underline{W}_N+\underline{Update}_N)-[(\underline{W}_N+\underline{Update}_N)*W_{RES}/W_{MAX}]$, the Taylor-series approximation set forth above in expression (8). In one embodiment, the updated tap weights $308_0$-$308_4$ are stored within the registers $302_0$-$302_4$ in response to assertion of the update-weight signal 282 (UW). Alternatively, the update-weight signal 282 is used to initiate operation of a finite state machine (or other logic circuit) which controls and times the increment, shift and subtract operations within the scaling circuits 301 and other logic circuits within the power scaling logic 290, culminating in storage of the updated tap weights 308 in registers 302. In either case, once stored, the updated tap weight values 308 become the existing tap weight values 226 that are supplied to the exclusive-NOR gates 291 and scaling circuits 301 to generate the next set of updated tap weights 308.

Reflecting on the power scaling logic of FIG. 8, it should be noted that numerous changes may be made thereto without departing from the spirit and scope of the present invention. For example, the exclusive NOR gates $291_0$-$201_4$ may each be replaced by a logic circuit that additionally receives an indication of whether the corresponding tap weight register 302 contains a zero-valued tap weight, the logic circuit outputting a power-change indicator to the summation circuit 293 in accordance with the following table ('X' indicating a "don't care" state):

TABLE 0

| Zero Indicator Zero-valued tap weight: 1 Non-zero tap weight: 0 | Update Increment: 1 Decrement: 0 | Tap Weight Sign Positive tap weight: 1 Negative tap weight: 0 | Power Change Increase tap power: 1 Decrease tap power: 0 |
|---|---|---|---|
| 0 | 0 | 0 | 1 |
| 0 | 0 | 1 | 0 |
| 0 | 1 | 0 | 0 |
| 0 | 1 | 1 | 1 |
| 1 | X | X | 1 |

As another example, circuitry to detect and store rounding error values (e.g., rounding errors produced by the shift control circuit 295 or elsewhere within the power scaling logic 290) may be provided to prevent rounding-error accumulation and, more generally, to ensure that the aggregate magnitude of the tap weight values stored in registers 302 does not drift away from the desired $W_{MAX}$ value. In yet other embodiments, the multiplier bank used to calculate the residual power value 294 (i.e., the exclusive-NOR gates $291_0$-$291_4$ and summation circuit 293) may be replaced by a circuit that sums the magnitudes of the tap weights stored in registers 302 and subtracts the $W_{MAX}$ value from the resulting sum, the residual power being a positive value if the sum of magnitudes is greater than $W_{MAX}$ and a negative value if the sum of magnitudes is less than $W_{MAX}$.

Figure 9:
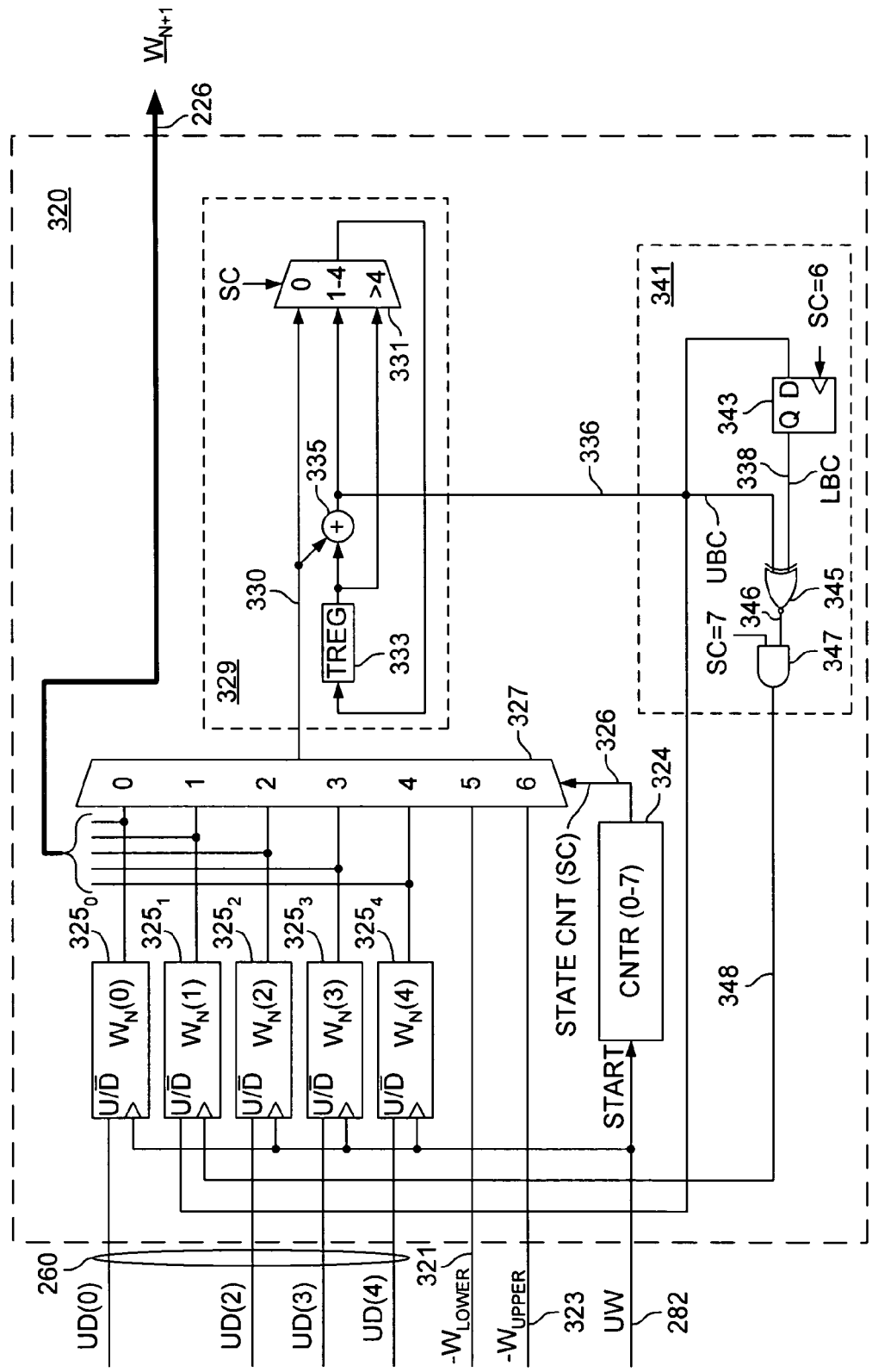
FIG. 9 illustrates a power scaling circuit according to another embodiment of the invention.

FIG. 9 illustrates an alternative embodiment of a power scaling logic circuit 320 referred to herein as a power bounding embodiment. In the power bounding embodiment, tap weight updates 260 are applied to adjust the pre-emphasis tap weights first (i.e., the tap weights applied to the pre- and post-tap drivers), then the magnitudes of the adjusted pre-emphasis tap weights and the primary driver tap weight are summed to generate an aggregate magnitude. The magnitude of the primary driver tap weight (i.e., the primary tap weight) is then decreased or increased if the aggregate magnitude exceeds the power constraint or falls below a predetermined lower bound, respectively. By this operation the total power applied to the transmit circuit output drivers is maintained between an upper and lower bound.

The power scaling logic 320 includes a set of tap weight counters $325_0$-$325_4$, state counter 324, operand multiplexer 327, accumulator 329, and primary update logic 341. Tap weight updates 260 for the pre- and post-tap driver tap weights are supplied to the power scaling logic 320 along with negative versions of upper and lower power bound values, 323 and 321, respectively, and the update-weight signal 282. At the start of an update event, the update-weight signal 282 is asserted to enable the tap weight counters for the pre- and post-tap weights (i.e., $325_0$ and $325_2$-$325_4$) to be incremented or decremented according to the state of the corresponding update signal 260. Assertion of the update weight signal also triggers the state counter 324 to roll over from a final state count of seven, to an initial state count of zero and enables the state counter 324 to auto increment from zero to seven. The state count 326 is supplied to the operand multiplexer 327 so that, as the state count 326 progresses from zero to six, the operand multiplexer 327 outputs, in turn, the magnitudes of the updated tap weights stored in counters $325_0$, $325_2$, $325_3$ and $325_4$, and the negative lower and upper power bounds, 321 and 323, to the accumulator 329.

The accumulator 329 includes a temporary register 333 (TREG), summing circuit 335 and multiplexer 331. The multiplexer 331 has a control input coupled to receive the state count 326 and three input ports coupled respectively to the outputs of the operand multiplexer 327, summing circuit 335 and temporary register 333. When the state count 326 is zero, the multiplexer 331 outputs the operand 330 selected by the operand multiplexer 327 (i.e., the magnitude of updated pre-tap weight, $|W_{N+1}(0)|$, maintained within tap weight counter $325_0$); when the state count 326 is one, two, three or four, the multiplexer 331 outputs the sum generated by the summing circuit, and when the state count 326 is five and above, the multiplexer 331 outputs the content of the temporary register. The summing circuit 335 has first and second inputs coupled respectively to the outputs of the operand multiplexer 327 and the temporary register 333. The temporary register 333 is coupled to receive the output of the multiplexer 331 and is re-loaded in response to each transition of the state count 326. By this arrangement, when the state count 326 is zero, the magnitude of the updated pre-tap weight, $|W_{N+1}(0)|$ is applied to the input of the temporary register 333. When the state count 326 transitions from zero to one, the temporary register 333 is loaded with the magnitude of the pre-tap weight, and the magnitude of the primary tap weight, $|W_N(1)|$ is output by the operand multiplexer 327 and summed with the magnitude of the pre-tap weight (i.e., the content of the temporary register 333) in summing circuit 335. The sum of tap weight magnitudes $W_{N+1}(0)$ and $W_N(1)$ is selected by the multiplexer 331 (i.e., in response to state count=1) and supplied to the input of the temporary register. Accordingly, when the state count 326 transitions from one to two, the sum of tap weight magnitudes $|W_{N+1}(0)|$ and $|W_N(1)|$ is loaded into the temporary register 333 and supplied to the summing circuit 335 for summation with the magnitude of the updated post-tap weight, $|W_{N+1}(2)|$ (i.e., the tap weight magnitude selected by the operand multiplexer 327 in response to state count=2). By this operation, as the state count 326 is incremented from zero to four, a sum of the tap weight magnitudes is accumulated in the temporary register 333, culminating in storage of the sum of the magnitudes of all the tap weights (i.e., $|W_{N+1}(0)|+|W_N(1)|+|W_{N+1}(2)|+|W_{N+1}(3)|+|W_{N+1}(4)|$) within the temporary register 333 when the state count 326 transitions from four to five. The sum of magnitudes of all the tap weights represents the power in the updated tap weights, prior to updating the primary tap weight and is referred to herein as a proposed power value. When the state count 326 is five and above, the multiplexer 331 selects the output of the temporary register to be re-loaded into the temporary register, effectively placing the temporary register 333 in a hold state to maintain the proposed power value therein. In an alternative embodiment, the temporary register 333 is not re-loaded after the count value reaches 5, thereby maintaining the proposed power value in the temporary register 333.

Still referring to FIG. 9, when the state count 326 reaches five, the operand multiplexer 327 outputs the negative lower power bound 321 to the accumulator 329 which, by operation of summing circuit 335, subtracts the lower power bound value 321 from the proposed power value. The sign of the difference between the proposed power value and lower power bound value 321 constitutes a lower-bound comparison result (LBC) that indicates whether the proposed power value is greater than (or equal to) the lower power bound value (i.e., LBC=0) or less than the lower power bound (LBC=1) and is supplied to the primary update logic 341. The primary update logic includes a storage element 343 (e.g., a D flip-flop as shown in FIG. 9, a latch or other storage circuit), exclusive-NOR gate 345 and logic AND gate 347. As the state count 326 transitions from five to six, the lower-bound comparison result 338 is stored in the storage element 343 and is output therefrom as a stored lower bound compare result 338 until the next five-to-six state count transition. Also, the operand multiplexer 327 selects the negative upper power bound value 323 to be summed with the proposed power value in summing circuit 335, effectively subtracting the upper power bound value 323 from the proposed power value. The sign of the difference between the proposed power value and the upper power bound value 323 constitutes an upper-bound comparison result 336 (UBC) that indicates whether the upper power bound is greater than the proposed power value (i.e., sign=1) or less than or equal to the proposed power value (i.e., sign=0). Thus, as the state count transitions from six to seven, the upper- and lower-bound compare results 336 and 338 indicate equalities (and inequalities) adjustments to the primary tap weight, as shown in the following table (PP=Proposed Power, UB=Upper Bound, LB=Lower Bound, PTW=Primary Tap Weight):

TABLE 1

| UBC | LBC | Equality Indication | Update PTW? | PTW Adjustment |
|---|---|---|---|---|
| 0 | 0 | PP ≧ UB | 1 (Yes) | Decrement PTW |
| 0 | 1 | Invalid (PP ≧ UB & PP < LB) | 0 (No) | — |
| 1 | 0 | UB > PP ≧ LB | 0 | No Adjustment |
| 1 | 1 | PP < LB | 1 | Increment PTW |

Still referring to FIG. 9, the upper-bound compare result 336 and stored lower-bound bound compare result 338 are supplied to respective inputs of the exclusive-NOR gate 345 to generate a primary tap weight update signal 346 in accordance with Table 1. The AND gate 347 receives the primary tap weight update signal 346 at a first input and an indication that the state count has reached seven at a second input. By this arrangement, as the state count transitions from six to seven, the AND gate 347 asserts an update enable signal 348 if the lower- and upper-bound compare results have the same state (i.e., either both '1's or both '0's). The update enable signal 348 is supplied to a count enable input (i.e., strobe input) of the primary tap weight counter $325_1$, and the upper-bound compare result 336 is supplied to an up/down input of the counter $325_1$. Consequently, if the update enable signal is asserted, the primary tap weight is incremented in response to a logic '1' upper-bound compare result 336 (i.e., indicating that both UBC and LBC are high and therefore that the proposed power is below the lower bound) and decremented in response to a logic '0' upper-bound compare result 336 (i.e., indicating that both UBC and LBC are low and therefore that the proposed power is above or equal to the upper power bound 323). Note that the upper power bound value 323 input to the power scaling logic 320 may be one greater than the actual upper power bound so that the upper-bound compare result 336, when low, indicates that the proposed power is above the upper power bound value 323 and, when high, indicates that the proposed power is below or equal to the upper bound power bound value 323.

Reflecting on the operation of the power scaling logic 320, it can be seen that the proposed power may, in some instances, be greater than the upper power bound or less than the lower power bound by more than one (e.g., if the power in the initial tap weights matches the upper power bound and the magnitude of more than one tap weight is increased). In one embodiment, this circumstance is tolerated, as iterative adjustment of the primary tap weight will ultimately bring the applied power within the power constraint. In an alternative embodiment, the primary tap weight may be adjusted in each tap weight update cycle according to difference between the proposed power and upper power bound (or lower bound), thereby ensuring that the power constraint will be met in each update. In either embodiment, after the primary tap weight is adjusted, the complete set of updated tap weights may be provided to the transmit circuit, for example, via the back channel 225 shown in FIG. 3. Alternatively, as with the residue-based power scaling logic of FIG. 8, the power scaling logic 320 may be implemented in the transmit-side IC device, with the update values (or error sign values and data sign values) being provided via the back channel 225 or other signaling path.

Differential Samplers

Figure 10:
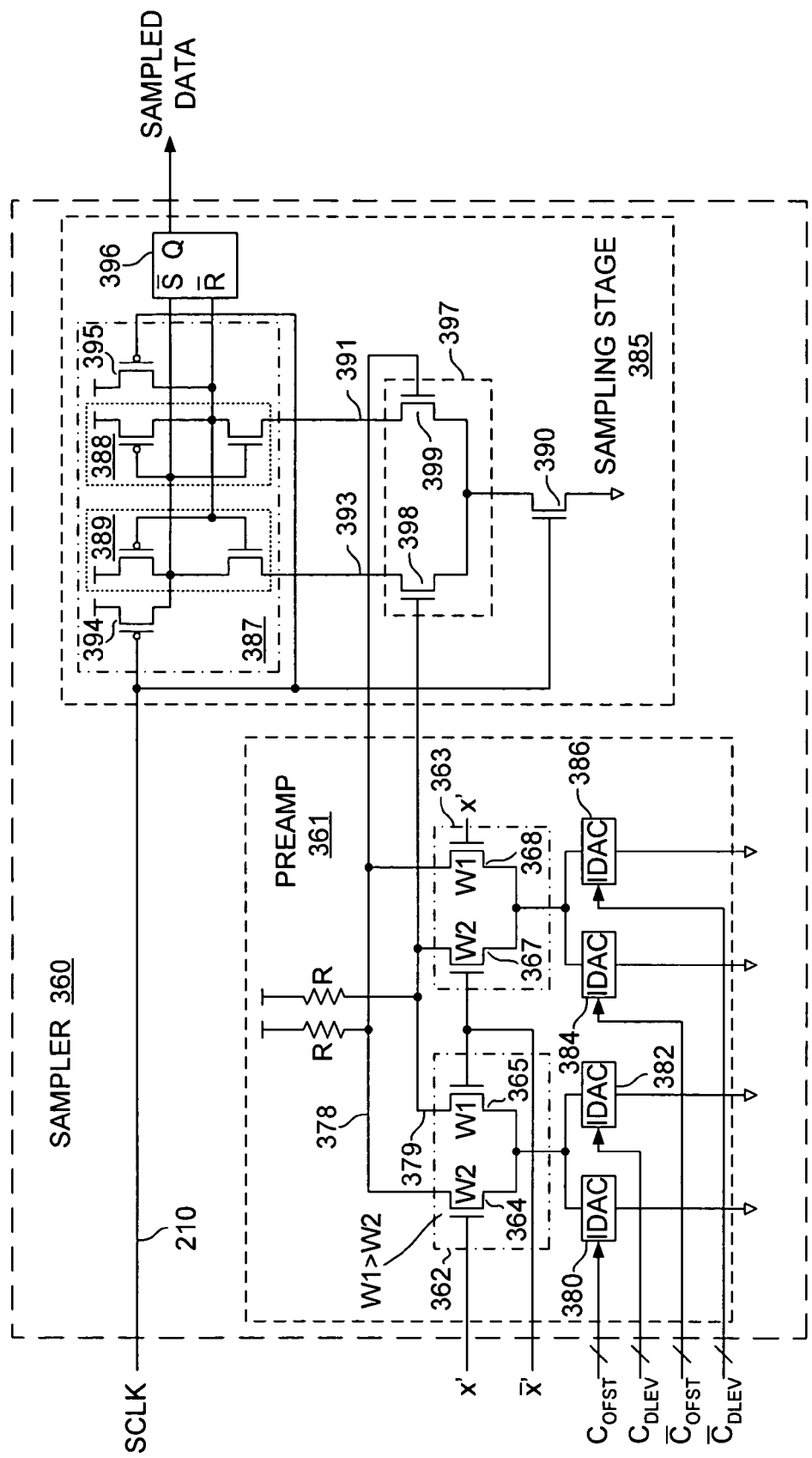
FIG. 10 illustrates an embodiment of a differential sampler that may be used to implement the data sampler and adaptive sampler shown in FIG. 3.

FIG. 10 illustrates an embodiment of a differential sampler 360 that may be used to implement the data sampler 211 and adaptive sampler 213 of FIG. 3. The sampler 360 includes a preamplifier stage 361 and sampling stage 385. The preamplifier stage 361 includes a pair of differential amplifiers 362 and 363 each biased by a respective pair of current DACs (IDACs) 380/382 and 384/386, and each having first and second output nodes 378 and 379 coupled to a supply voltage via a respective resistive element, R. The resistive elements may be implemented, for example, using diode-configured transistors, biased transistors, resistors, or any other active or passive circuitry for establishing a resistance. Transistors 365 and 364 within differential amplifier 362 have widths W1 and W2, respectively, with W1 being greater than W2. Transistors 368 and 367 within differential amplifier 363 also have respective widths W1 and W2. A differential input signal composed of signal component signals x' and /x' is provided to each of the differential amplifiers 362, 363 with x' being provided to gate terminals of transistors 364 and 368 and /x' being provided to gate terminals of transistors 365 and 367. By this arrangement, when control values $C_{OFST}$ and $C_{DLEV}$ (e.g., generated by an adaptive module as described in reference to FIG. 7) are substantially equal to complement control values $/C_{OFST}$ and $/C_{DLEV}$, respectively (e.g., in an 8-bit control word, $C_{DLEV} = C_{OFST} = 128$ and $/C_{DLEV} = /C_{OFST} = 127$), the differential amplifiers 362 and 363 are substantially balanced, operating in effect as a single differential amplifier having component transistors of width W1+W2. Thus, if x' is greater than /x', transistors 364 and 368 will collectively sink more current than transistors 365 and 367, thereby causing the voltage on output node 378 to be pulled down (i.e., via the resistive element, R, coupled to the output node 378) more than the voltage on output node 379.

When the preamplifier stage 361 is balanced (i.e., control values substantially equal to complement control values), the voltages on the preamplifier output nodes 378 and 379 are substantially equal when input signals x' and /x' are at the common mode potential (i.e., as when x' and /x' cross one another in transition). Thus, in the absence of systematic DC offset, the effective threshold of the preamplifier stage 361, and therefore the sampler 360 as a whole, occurs at the common mode of x' and /x'. By contrast, when the preamplifier is imbalanced, for example, by increasing $C_{DLEV}$ relative to $/C_{DLEV}$, equal values of x' and /x' result in output node 379 being pulled lower than output node 378 due to the fact that transistor 365 is wider than transistor 364 (and therefore has a greater gain), and that the compensating (balancing) effect of differential amplifier 363 is diminished by the reduced control value $/C_{DLEV}$. Thus, increasing $C_{DLEV}$ relative to $/C_{DLEV}$ increases the effective threshold of the preamplifier above the common mode. By increasing $C_{DLEV}$ to the point at which the threshold between '0' and '1' signal levels is set to the target data level, DLEV, a sampler having a threshold level at DLEV is achieved. By reversing the connections of the $C_{DLEV}$ and $/C_{DLEV}$ values to the current DACs of a counterpart sampler (not shown), a sampler having a threshold level at −DLEV is achieved. Such a technique is applied in a multi-level signaling embodiment described below.

Still referring to the preamplifier stage 361, it should be noted that in the case of a binary data sampler, such as element 211 of FIG. 3, the desired threshold occurs at the common mode of the incoming data signals (i.e., the "zero" threshold). Accordingly, in a sampler dedicated to binary data sampling, the current DACs 382 and 386 may be omitted or replaced with fixed-bias, or self-biased current sources.

The sampling stage 385 includes a differential amplifier 397 formed by transistors 398 and 399, a sense amplifier 387 formed by back-to-back coupled inverters 388 and 389, and a storage circuit 396 formed by a set-reset flip-flop. The differential amplifier 397 includes control inputs coupled to the output nodes 378 and 379, respectively, of the preamplifier stage 361, and output nodes 391 and 393 coupled to source terminals of the inverters 388 and 389, respectively. A biasing transistor 390, switchably controlled by the sampling clock signal 210 (or other sample control signal), is coupled between the differential amplifier 397 and a ground reference (or other low voltage reference). The sampling clock signal 210 is additionally coupled to control inputs of positively-doped MOS (PMOS) transistors 394 and 395 which are coupled between a supply voltage (e.g., $V_{DD}$) and output nodes of the inverters 388 and 389. By this arrangement, when the sampling clock signal 210 is low, transistor 390 is switched off, and transistors 394 and 435 are switched on to pre-charge the output nodes of the inverters 388 and 389 to the supply voltage. The output nodes of the inverters 388 and 389 are coupled to active-low set and reset inputs, respectively, of the storage circuit 396, so that the content of the storage circuit 396 is maintained through the low half-cycle of the sampling clock signal 210. When the sampling clock signal 210 goes high, biasing transistor 390 is switched on and draws current through the two transistors 399 and 398 of the differential amplifier 397 in proportion to the voltages developed on the output nodes 378 and 379 of the preamplifier stage 361. Thus, if the voltage developed on node 379 is higher than the voltage on node 378, the current drawn by biasing transistor 390 will flow primarily through transistor 398. Conversely, if the voltage developed on node 378 is higher than the voltage on 379, the current drawn by biasing transistor 390 will flow primarily through transistor 398. Transistors 394 and 395 are switched off in response to the high-going sampling clock signal 210 so that the pre-charged outputs of the inverters 388 and 389 are discharged by currents flowing through transistors 398 and 399. By this operation, if the incoming differential signal (x') exceeds the common mode voltage, (i.e., (x'+/x')÷2), by more than the target data level threshold (i.e., the incoming differential signal exceeds the target threshold level, DLEV), the current drawn by biasing transistor 390 will flow primarily through transistor 398. Consequently, the output node of inverter 389 will be discharged more rapidly than the output node of inverter 388, driving the output of inverter 389 low and driving the output of inverter 388 high (i.e., the PMOS transistor within inverter 388 is switched on and the NMOS transistor within inverter 388 is switched off). The low output of inverter 389 is applied to the active-low set input of the storage circuit 396, causing the storage circuit 396 to store a logic '1' sampled data value. By contrast, if the incoming signal level does not exceed the target data level threshold, the current drawn by biasing transistor 390 will flow primarily through transistor 399, thereby driving inverter 388 low (and driving inverter 389 high) to store a logic '0' sampled data value within storage circuit 396.

Still referring to FIG. 10, during a DC offset calibration operation, null-valued differential signals are applied to the differential inputs of the preamplifier stage 361 either by transmission of null valued data over the signaling path (i.e., x=/x), or by locally coupling the differential inputs to one another such that x'=/x' (e.g., by activation of one or more pass-gate-configured transistors in response to a calibration signal). In the case of transmission of null valued data, if a DC offset in the differential signals is induced by the signaling path, or if the preamplifier stage 361 or sampler stage 385 have systematic DC offsets (e.g., due to threshold voltage ($V_T$) mismatches in the differential transistor pairs 364/365, 367/368 and/or 398/399), then the effective threshold of the sampler 360 will not occur at the common mode of x and /x (i.e., the transmit-side common mode). Similarly, in the case of local, switched coupling of differential inputs (i.e., to force a common mode input to transistor pairs 364/365 and 367/368), the effective threshold of the sampler 360 will not occur at the common mode if the preamplifier stage or sampler stage exhibit systematic DC offsets. In either case, the non-common-mode threshold may be detected in an offset calibration operation by the repeated positive or negative sign of the sampled data, and the $C_{OFST}$ value may be incremented or decremented (and /$C_{OFST}$ correspondingly decremented or incremented) as discussed above to bias the sampler to a calibrated state.

Figure 11:
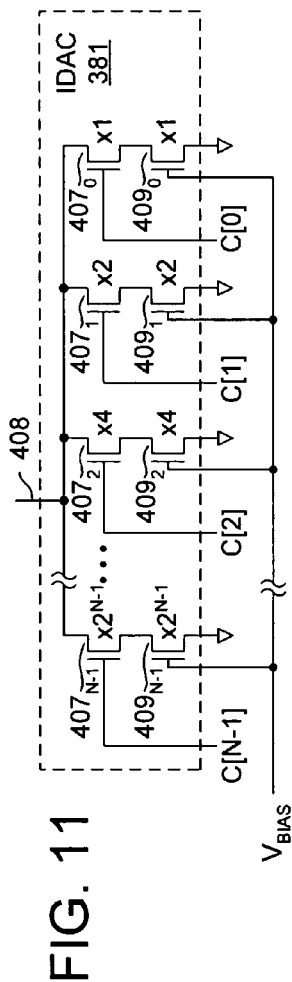
FIG. 11 illustrates an embodiment of a current DAC that may be used to implement the current DACs within the sampler of FIG. 10.

FIG. 11 illustrates an embodiment of a current DAC 381 that may be used to implement the current DACs 380, 382, 384 and/or 386 within the sampler 360 of FIG. 10, and/or the current DAC 237 within the output driver of FIG. 5. The current DAC 381 includes control transistors $407_0$-$407_{N-1}$ and biasing transistors $409_0$-$409_{N-1}$. Each of the control transistors $407_0$-$407_{N-1}$ is coupled in series (e.g., source to drain) with a corresponding one of the biasing transistors $409_0$-$409_{N-1}$ to form a transistor pair that is coupled between a reference voltage (ground in this example) and an output node 408 (i.e., the node to be connected to the source terminals of the transistors which form the differential amplifier 362 of FIG. 10). Gate terminals of the control transistors $407_0$-$407_{N-1}$ are coupled to receive respective component signals, C[0]-C[N−1], of a multi-bit control value, such as a data level threshold, DC offset setting, tap weight, or other control value. Each of the control transistors $407_0$-$407_{N-1}$ has a binary weighted gain such that a current of $I_{REF} \times 2^i$ (where i represents the $i^{th}$ transistor in the positions 0, 1, 2, . . . , N−1) flows through control transistor $407_i$ when the corresponding control signal component is high. Thus, if all the constituent bits of the control value C[N−1:0] are high, then $I_{REF}$ flows through control transistor $407_0$, $I_{REF} \times 2$ flows through transistor $407_1$, $I_{REF} \times 4$ flows through control transistor $407_2$, and so forth to control transistor $407_{N-1}$ which conducts $I_{REF} \times 2^{N-1}$. Accordingly, control transistors $407_0$-$407_{N-1}$ are designated x1, x2 . . . , x$2^{N-1}$ transistors, respectively. By this arrangement, the control value C[N−1:0] may be set to any of $2^N$ values to select bias currents that range from 0 to $I_{REF} \times 2^{N-1}$ in increments of $I_{REF}$. The biasing transistors $409_0$-$409_{N-1}$ have gate terminals coupled to receive a bias voltage, $V_{BIAS}$, that is adjusted as necessary (e.g., by a biasing circuit) to establish or maintain a desired $I_{REF}$.

In one embodiment, the relative gains (i.e., transconductance values) of the various transistors used to implement the current DAC 381 are established by adjusting the width-length ratio (i.e., W/L) of individual control transistors 407 and/or biasing transistors 409. For example, the width-length ratio of the x2 control transistor $407_1$ is twice the width-length ratio of the x1 control transistor $407_0$, the width-length ratio of the x4 control transistor $407_2$ is twice the width-length ratio of the x2 control transistor $407_1$, and so forth. The biasing transistors 409 may have similar gain ratios relative to one another (e.g., x1, x2, x4, $x2^{N-1}$ as shown in FIG. 11). Other techniques for adjusting the relative gains of the control transistors 407 and biasing transistors 409 may be used in alternative embodiments. Also, weightings other than binary weightings may be used. For example, in one embodiment, each of the control transistors 407 has an equal gain to each of the other control transistors 407 such that the current drawn by the current DAC 381 is proportional to the number of logic '1' bits in the control value, C[N−1:0].

Figure 12:
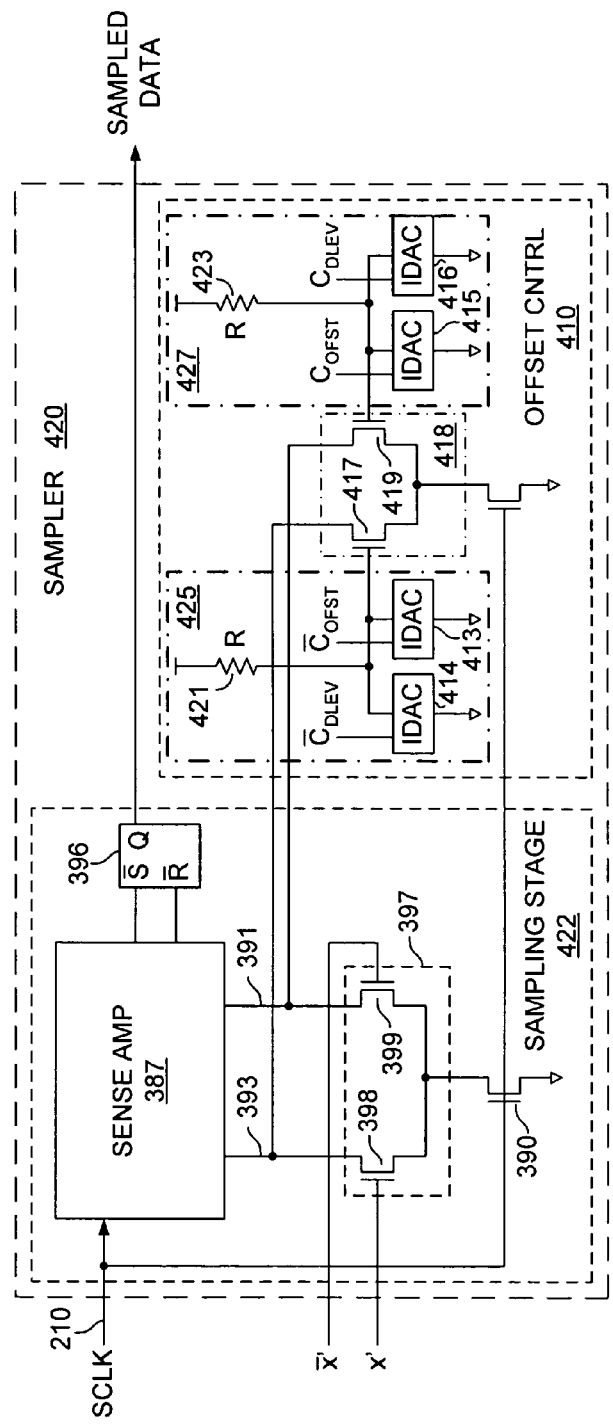
FIG. 12 illustrates an alternative embodiment of a sampler that may be used to implement the data sampler and adaptive sampler shown in FIG. 3.

FIG. 12 illustrates an alternative embodiment of a sampler 420 that may be used to implement the data sampler 211 and adaptive sampler 213 of FIG. 3. The sampler 420 includes a sampling stage 422 and an offset control circuit 410. The sampling stage 422 is implemented in generally the same manner as the sampling stage 385 of FIG. 10 (and includes differential amplifier 397, sense amplifier 387, biasing transistor 390, and storage circuit 396), except that the input signal lines carrying x' and /x' are coupled directly to the control terminals of transistors 398 and 399, respectively. The offset control circuit 410 includes a differential amplifier 418 having output nodes coupled to nodes 391 and 393 of the sampling stage 422. Control terminals of transistors 417 and 419 of the differential amplifier 418 are biased by respective voltage DACs 425 and 427. Voltage DAC 427 includes current DACs 415 and 416 coupled to a resistive pull-up element 423 and controlled by control values $C_{DLEV}$ and $C_{OFST}$, respectively. Voltage DAC 425 similarly includes current DACs 413 and 414 coupled to a resistive pull-up element 421 and controlled by complement control values $/C_{DLEV}$ and $/C_{OFST}$. By this arrangement, when the sampling clock signal 210 goes high, the current through output node 393 of the sampling stage 422 is a sum of the currents drawn by transistor 398 of the sampling stage 422 and transistor 417 of the offset control circuit 410. Similarly, the current through node 391 of the sampling stage 422 is a sum of the currents drawn by transistor 399 of the sampling stage 422 and transistor 419 of the offset control circuit 410. As discussed above in reference to FIG. 17, when the current through node 391 exceeds the current through node 393, a logic '1' is stored within storage circuit 396 and, conversely, when the current through node 393 exceeds the current through node 391, a logic '0' is stored within storage circuit 396.

When the complementary DAC control values $C_{DLEV}$ and $/C_{DLEV}$, and $C_{OFST}$ and $/C_{OFST}$ are substantially the same, and in the absence of DC offset, the sampler 420 is balanced and the effective threshold occurs at the common mode of the incoming x' and /x' signal levels. That is, if x' exceeds the common mode voltage, $V_{CM}=(x'+/x')+2$, the current through node 393 exceeds the current through node 391, causing a logic '1' to be captured as the sampled data value. As $C_{DLEV}$ is increased and $/C_{DLEV}$ correspondingly decreased, the effective threshold of the differential amplifier is increased such that x' must be higher than /x' by an amount necessary to overcome the additional current drawn by transistor 419 of the offset control circuit 410. Thus, by increasing $C_{DLEV}$ and decreasing $/C_{DLEV}$, the effective threshold of the sampling circuit 420 may be set to the target data level threshold. That is, a logic '1' is output as the sampled data value if the difference between x' and /x' exceeds the target data level threshold, and a logic '0' is output otherwise. By reversing the connections of the $C_{DLEV}$ and $/C_{DLEV}$ values to the current DACs 416 and 414, a sampler having a threshold level at −DLEV is achieved. Such a technique is applied in a multi-level signaling embodiment described below.

As with the sampler 360 of FIG. 10, during an offset calibration operation within the sampler 420, null-valued differential signals are applied to the differential inputs of the sampling stage 422 either by transmission of null valued data over the signaling path (i.e., x=/x), or by locally coupling the differential inputs to one another such that x'=/x' (e.g., by activation of one or more pass-gate-configured transistors in response to a calibration signal to switchably couple the gates of transistors 398 and 399). In either case, the non-common-mode threshold may be detected in an offset calibration operation by the repeated positive or negative sign of the sampled data, and the $C_{OFST}$ value may be incremented or decremented (and $/C_{OFST}$ correspondingly decremented or incremented, respectively) to bias the sampler 420 to a calibrated state.

Still referring to FIG. 12, in the case of a binary data sampler such as sampler 211 of FIG. 3, the desired threshold occurs at the common mode of the incoming data signals (i.e., the "zero" threshold). Accordingly, in a sampler dedicated to binary data sampling, the current DACs 414 and 416 may be omitted or replaced with fixed-bias, or self-biased current sources.

Updating Tap Weights in Response to Data Level Error

Figure 13:
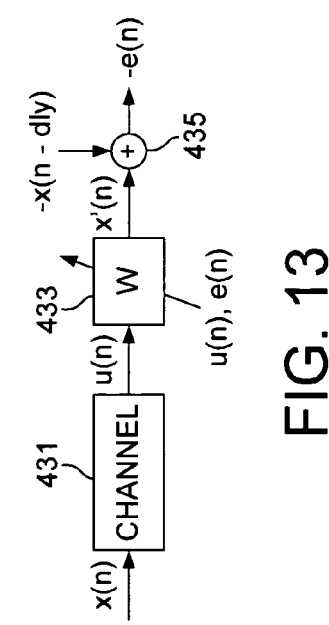
FIG. 13 is a canonical diagram of a channel and receive-side equalizer that may be used to adaptively determine a set of equalizer tap weights.

FIG. 13 is a canonical diagram of a channel 431 and receive-side equalizer 433 that may be used to adaptively determine a set of equalizer tap weights. An input signal, x(n), is transformed as it propagates through the channel, yielding a channel response, u(n) which, in turn, is operated upon by the receive-side equalizer 433 to produce a system response, x'(n). The system response is input to a sampler 435 (or comparator) which subtracts a delayed version of the originally transmitted signal (−x(n−dly)) from the system response to produce a negative error signal, −e(n). Thus, the error signal e(n) represents the difference between the originally transmitted signal, x(n) and system response x'(n) and is negative when system response exceeds the originally transmitted signal and positive when the originally transmitted signal exceeds the system response. Together, the channel response and the error signal may be used to update the equalizer tap weights, for example, through application in a least mean square error determination.

Figure 14A:
FIGS. 14A and 14B are canonical diagrams that illustrate adaptive determination of transmit pre-emphasis tap weights using a two-phase update operation.
Figure 14B:
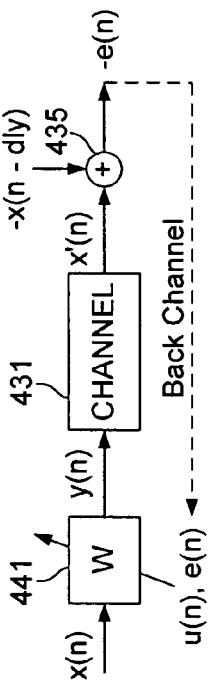

Assuming a linear channel response, the linear filtering effect of the equalizer is commutative and therefore may be applied to the input signal, x(n), before the signal is transmitted on the channel 431. That is, instead of receive-side equalization, transmit-side pre-emphasis may be used to establish a pre-emphasized input signal, y(n), which, after propagating through the channel 431, yields a system response x'(n) that corresponds to the system response x'(n) realized in the receive-side equalization system of FIG. 13. Unlike the receive-side equalizing system of FIG. 13, however, the channel response is generally unavailable to the transmit side of the signaling system, complicating tap weight update operations. In one embodiment of the invention, depicted in the canonical diagrams of FIGS. 14A and 14B, a two phase approach is used to update the tap weights. In the first phase, transmit pre-emphasis taps within a transmit circuit (i.e., post-taps and pre-taps) are disabled so that the input signal, x(n) is unmodified by the transmit pre-emphasis circuitry 441, and propagates through the channel 431 to produce a channel response u(n). By this operation, the channel response, u(n), is effectively pre-computed by the channel 431 itself. In the embodiment of FIG. 14A, the channel response, u(n), is returned to the transmit-side device (e.g., through a back channel or other communication path), where it is stored for later application in a tap weight update operation. Alternatively, the channel response, u(n), is stored by the receive-side device. After the channel response has been obtained, the second phase of the tap weight operation is begun by enabling the pre-emphasis circuitry 441, and then re-transmitting the initial signal, x(n). In the second phase, the pre-emphasis circuitry 441 modifies the initial signal, x(n), to generate a pre-emphasized signal, y(n), which, in turn, propagates through the channel 431 to generate the system response, x'(n). The system response, x'(n), is compared with the delayed version of the initial signal (the delay corresponding, for example, to channel propagation time) to generate an error signal, −e(n). In the embodiment of FIG. 14B, the error signal is provided to the transmit-side device where it is applied, along with the previously stored channel response, u(n), in a tap weight update operation. Alternatively, if the channel response is stored in the receive-side device, the error signal and channel response may be applied by the receive side device to generate a set of tap weight update values, or a set of updated tap weights. The update values (or tap weights) are then returned to the transmit side device and used to update the existing tap weights applied within the pre-emphasis circuitry 441 (or, in the case of updated tap weights, substituted for the existing tap weights).

In one embodiment, the tap weight update operation is a sign-sign LMS operation in which the sign of the channel response and sign of the error signal are used to update the tap weights as follows:

$$\underline{W}_{N+1} = \underline{W}_N + \text{stepsize} * \text{sign}(e_n) * \text{sign}(\underline{u}_n) \quad (9).$$

Thus, only the signs of the channel response and error signal need be returned to the transmit-side device (or stored in the receive side device) in the first and second phases of a tap weight update operation. After the transmit pre-emphasis tap weights have been updated, two-phase tap weight update operations are repeated as necessary for the pre-emphasis tap weights to converge to a setting that corresponds to a minimum (or near-minimum) mean square error, and thereafter to compensate for system drift (e.g., due to changes in voltage and temperature). Note that by updating the tap weights in this way, the receiver response is included in the channel response.

Figure 15:
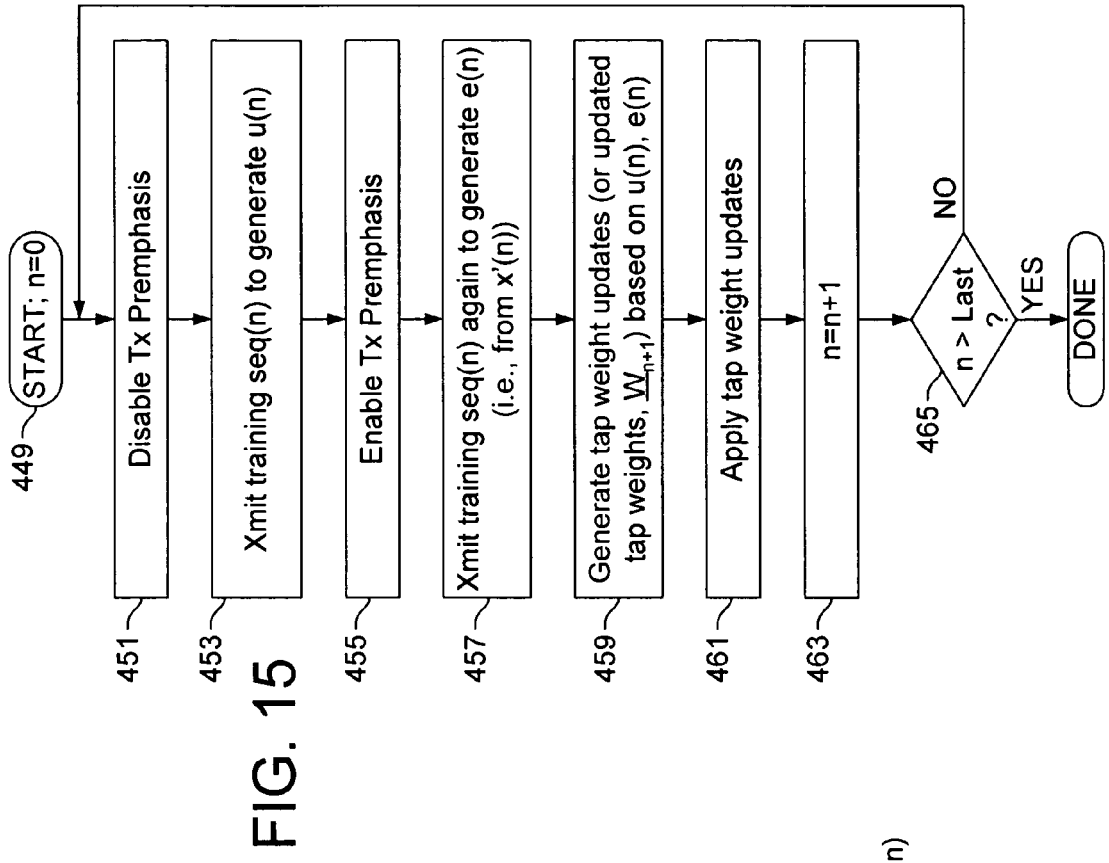
FIG. 15 is a flow diagram of the two-phase tap weight update operation described in reference to FIGS. 14A and 14B.

FIG. 15 is a flow diagram of the two-phase tap weight update operation described in reference to FIGS. 14A and 14B. Initially, at start block 449, an index, n, that indicates the number of completed tap weight updates is initialized to zero. At block 451, the transmit pre-emphasis circuitry is disabled. At block 453, a first sequence of data values, referred to herein as training sequence(n), is transmitted over the channel (e.g., a differential or single-ended signal path) to generate the channel response u(n). At block 455, the transmit pre-emphasis circuitry is enabled so that an initial setting of tap weights (i.e., in the first iteration) are applied to generate the pre-emphasized signal y(n) illustrated in FIG. 14B. In one embodiment, the initial setting of tap weights includes zero-valued pre- and post-tap weights, and a maximum-valued primary tap weight. In alternative embodiments, the initial setting of tap weights may be determined according to system characteristics or empirical determination of a desired tap weight setting. At block 457, training sequence(n) is re-transmitted to generate a system response, x'(n) and corresponding error signal, e(n). At block 459, tap weight updates (i.e., stepsize*sign($u_n$)*sign($e_n$)), or updated tap weights themselves (i.e., $\underline{W}_{n+1}$) are generated based on the channel response and error signal. At block 461, the tap weight updates generated in block 459 are applied to update the existing tap weights (or the updated tap weights generated in block 459 are substituted for the existing tap weights), and, at block 463, the index variable, n, is incremented to indicate that a first tap weight update has been completed.

In the embodiment of FIG. 15, an overall tap weight adaptation operation involves iteratively performing the operations of blocks 451-463 a predetermined number of times. In such an embodiment, the index variable, n, is evaluated at decision block 465 to determine if n has been incremented past a predetermined value. If so, the tap weight update operation is deemed to be complete. In an alternative embodiment, the operations of blocks 451-463 are repeated until tap weight updates result in negligible reduction in the error signal. In another alternative embodiment, the operations of blocks 451-463 are repeated until all or a subset of the tap weights are determined to be dithering by one or more steps.

Reflecting on the adaptive generation of pre-emphasis tap weights achieved by iteratively performing the two-phase tap weight updates described in reference to FIGS. 14A, 14B and 15, it can be seen that the repeated determination of the channel response, u(n), enables a statistical approximation of random noise. That is, in the absence of random noise, like channel responses will be obtained in block 453 for like training sequence transmissions. Thus, by iteratively performing the two-phase tap weight updates described in reference to FIGS. 14A, 14B and 15, the pre-emphasis tap weights effectively converge to solution that represents a minimum (or near minimum) mean squared error.

Figure 16:
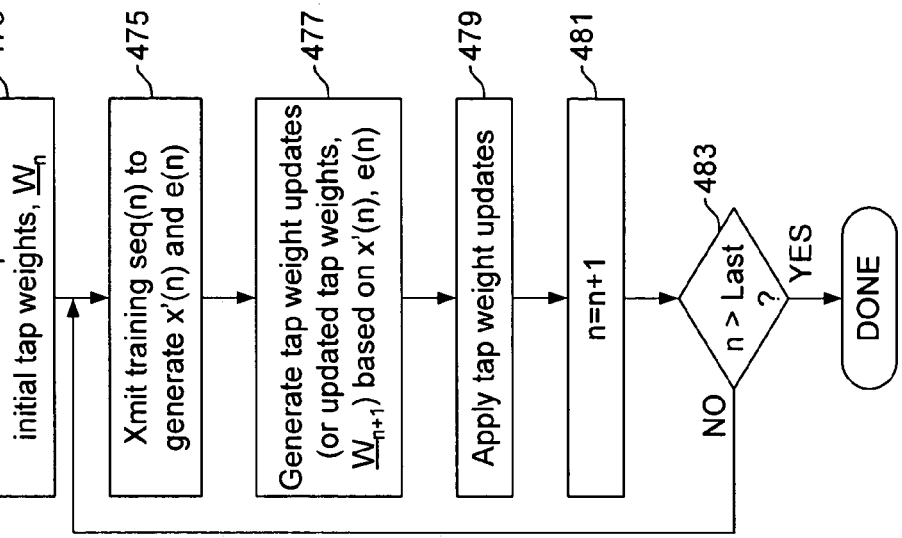
FIG. 16 is a canonical diagram that illustrates adaptive determination of transmit pre-emphasis tap weights using a single-phase update operation.

FIG. 16 illustrates a single-phase tap weight adaptation approach that neglects the effects of noise, and therefore constitutes a zero-forcing solution. Rather than disabling the pre-emphasis circuitry 441 as in the first phase of the two-phase operation of FIGS. 14A and 14B, the pre-emphasis circuitry 441 is left enabled to generate a pre-emphasized input signal, y(n) which, after propagating through the channel 431, yields a system response x'(n) that corresponds to the system response realized in the receive-side equalization system of FIG. 13. The system response is compared with a delayed version of the input signal (i.e., −x(n−dly)) to generate an error signal, −e(n). The system response and error signal are then supplied to the transmit side device and applied in a tap weight update operation. As in the two-phase approach, the tap weight update operation may alternatively be performed in the receive-side device and tap weight updates, or updated tap weights themselves communicated to the transmit-side device (e.g., via a back channel). In one embodiment, the signs of the system response and error signal are applied in the tap weight update operation in accordance with expression (3) above (i.e., a sign-sign LMS update operation). By this operation the pre-emphasis tap weights are iteratively adjusted to achieve a zero-forcing solution.

Figure 17:
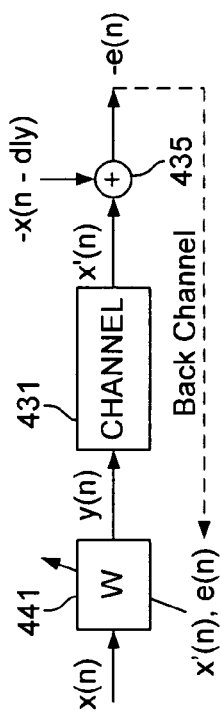
FIG. 17 is a flow diagram of the single-phase tap weight update operation described in reference to FIG. 16.

FIG. 17 is a flow diagram of the single-phase, zero-forcing tap weight update operation described in reference to FIG. 16. Initially, at start block 471, an index, n, that indicates the number of completed tap weight updates is initialized to zero. At block 473, the transmit pre-emphasis circuitry 441 of FIG. 16 is enabled, for example, by establishing an initial set of tap weights. In one embodiment, the initial setting of tap weights includes zero-valued pre- and post-tap weights, and a maximum-valued primary tap weight. In alternative embodiments, the initial setting of tap weights may be determined according to system characteristics or empirical determination of a desired tap weight setting. After the transmit pre-emphasis circuitry is enabled, a first training sequence(n), is input to the transmit pre-emphasis circuit at block 475 to establish a pre-emphasized input signal, y(n), which, after propagating through the channel, yields a system response x'(n) and, upon comparison of x'(n) with x(n−dly), an error signal e(n). At block 477, tap weight updates (i.e., stepsize*sign(x'$_n$)*sign ($e_n$)), or updated tap weights themselves (i.e., $\underline{W}_{n+1}$) are generated based on the system response and error signal. At block 479, the tap weight updates generated in block 477 are applied to update the existing tap weights (or the updated tap weights generated in block 477 are substituted for the existing tap weights), and, at block 481, the index variable, n, is incremented to indicate that a first tap weight update has been completed.

In one embodiment, the operations of blocks 475-481 are repeated until, at decision block, 483, the index variable, n, is determined to have reached a final value. When the final value is reached, the tap weight adaptation operation is deemed completed. In an alternative embodiment, the operations of blocks 475-481 are repeated until tap weight updates result in negligible reduction in the error signal. In another alternative embodiment, the operations of blocks 475-481 are repeated until all or a subset of the tap weights are determined to be dithering by one or more steps.

Referring again to FIG. 16, by using an adapted, target threshold level to generate error signals, rather than x(n−dly), live data rather than pre-selected training sequences, may be used to adapt the tap weights. In one embodiment, for example, the adaptive sampler 213 of FIG. 3 is used to generate the error signal used to update the tap weights, with the error signal being filtered according to whether the corresponding data sign value (i.e., sign of $x'_n$) indicates a system response having a state that should match the data level. As another example, the error signal may be filtered according to desired partial-response data sequences (e.g., searching for bit sequences '11', '00', '111', '000', or longer sequences depending on the number of ISI components in the partial response).

Adaptive Sampler as Proxy Data Sampler

Figure 18:
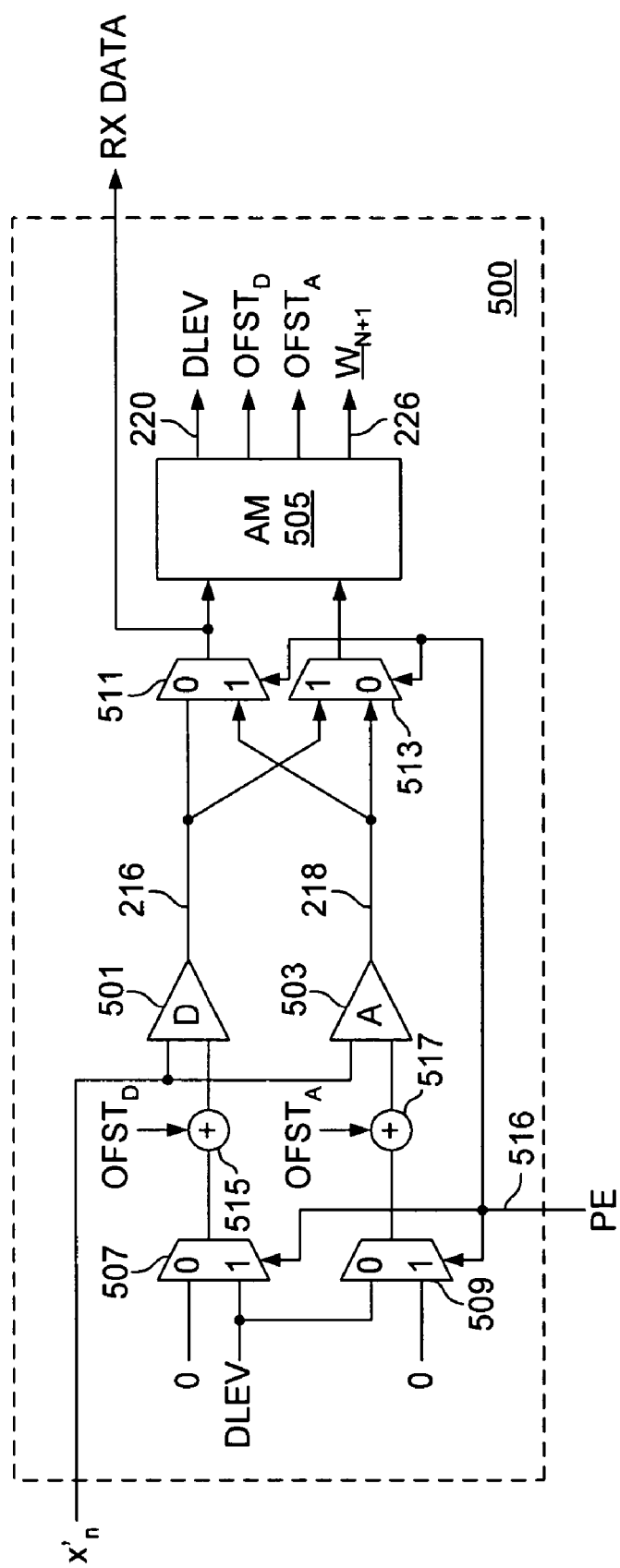
FIG. 18 illustrates a multi-sample receiver according to an embodiment of the invention.

FIG. 18 illustrates a multi-sample receiver 500 according to an embodiment of the invention. The receiver 500 includes a data sampler 501, adaptive sampler 503 and adaptive module 505 that are implemented in substantially the same manner as the samplers 211, 213 and adaptive module 215 of FIG. 3, except that the adaptive module 505 includes circuitry for generating offset cancellation values, $OFST_D$ and $OFST_A$, for the data sampler 501 and adaptive sampler 503, respectively (e.g., as described in reference to FIG. 7). The receiver 500 additionally includes a pair of threshold multiplexers 507 and 509, and a pair of output path multiplexers 511 and 513. The threshold multiplexers 507 and 509 enable the threshold values supplied to the data sampler and adaptive sampler to be swapped such that the data sampler receives the data level threshold, DLEV, generated by the adaptive module 505, and the adaptive sampler receives a zero threshold. Similarly, the output path multiplexers 511 and 513 enable the adaptive module inputs driven by the data sampler 501 and adaptive sampler 503 to be swapped such that the adaptive sampler 503 provides a sample value to the data sign input of the adaptive module (and therefore drives the receive data path), and the data sampler 501 provides a sample value to the error sign input of the adaptive module. By this arrangement, the functions of the adaptive sampler 503 and data sampler 501 may be swapped. In particular, the adaptive sampler 503 may act as a proxy for the data sampler 501, enabling continued reception of data, while the data sampler 501 is taken out of service for testing, calibration or any other activity that would ordinarily interrupt data reception.

In the embodiment of FIG. 18, a mode select signal, referred to herein as a proxy-enable signal 516 (PE), is used to select between normal and proxy modes of operation within the receiver 500 and is coupled to the control inputs (i.e., select inputs) of the threshold multiplexers 507 and 509, and the output path multiplexers 511 and 513. Each of the multiplexers 507, 509, 511 and 513 has first and second input ports (i.e., designated '0' and '1', respectively, in FIG. 18), with the signal present at the first input port being selected and output from the multiplexer in response to a logic low proxy-enable signal 516 and the signal present at the second input port being selected and output from the multiplexer in response to a logic high proxy-enable signal 516. A zero threshold is supplied to the first input port of threshold multiplexer 507 and to the second input port of threshold multiplexer 509, and the target data level threshold, DLEV, generated by the adaptive module 505 is supplied to the second input of threshold multiplexer 507 and to the first input port of threshold multiplexer 509. By this arrangement, when the proxy-enable signal 516 is low, enabling the normal operating mode of the receiver 500, the zero threshold is output from threshold multiplexer 507 and the data level threshold is output from threshold multiplexer 509. Conversely, when the proxy-enable signal 516 is high, enabling the proxy mode of operation within receiver 500, the zero threshold is output from threshold multiplexer 509 and the data level threshold is output from threshold multiplexer 507. In one embodiment, the thresholds output from the threshold multiplexers 507 and 509 are summed with the offset cancellation values $OFST_A$ and $OFST_D$ in summing circuits 515 and 517, respectively (e.g., digitally summed, or current sum) to generate the thresholds supplied to the data and adaptive samplers 501 and 503. Thus, in the normal mode, the data sampler generates a data sign value 216, $sgn(x'_n)$ that indicates whether the incoming signal, $x'_n$, is greater or less than the zero threshold (e.g., offset-calibrated common mode), and the adaptive sampler 503 generates an error sign value 218, $sgn(e_n)$, that indicates whether the incoming signal, $x'_n$ is greater or less than the target data level threshold, DLEV. That is, in the normal mode, the data and adaptive samplers 501 and 503 generate data sign and error sign values in the manner described in reference to FIG. 3. By contrast, in the proxy mode, the roles of the data and adaptive samplers 501 and 503 are reversed, with the adaptive sampler 503 operating as a proxy for the data sampler 501 to generate a data sign value and vice-versa.

The output path multiplexers 511 and 513 each have first and second input ports coupled to receive the outputs of the data sampler 501 and adaptive sampler 503. More specifically, the first input port of output path multiplexer 511 and the second input port of output path multiplexer 513 are coupled to the output of the data sampler 501, and the second input port of output path multiplexer 511 and the first input port of output multiplexer 513 are coupled to the output of the adaptive sampler 503. By this arrangement, when the receiver 500 is in the normal mode, the data sign values 216 generated by the data sampler 501 are provided to the data sign input of the adaptive module 505, and the error sign values 218 generated by the adaptive sampler 503 are provided to the error sign input of the adaptive module 505. Conversely, in the proxy mode, the data sign values generated by the adaptive sampler 503 are provided to the data sign input of the adaptive module 505 and the error sign values generated by the data sampler 501 are provided to the error sign input of the adaptive module 505.

In many applications, once the data level threshold, DLEV, has converged to the target level, the data level threshold changes relatively slowly, for example, in response to voltage and temperature drift. Consequently, the stream of error sign values delivered to the adaptive module 505 may be temporarily interrupted without significant adverse impact on the receiver 500 or the signaling system as a whole. By contrast, if the stream of data sign values is interrupted, the communication link (e.g., over signaling path 202) is lost for the duration of the interruption. By placing the receiver 500 in proxy mode, and thereby swapping the roles of the data and adaptive samplers 501 and 503, the data sampler 501 may be temporarily removed from service without interrupting data reception. In one embodiment, for example, an offset calibration operation is performed by switching the receiver 500 to proxy mode (i.e., asserting the proxy enable signal 516); temporarily zeroing the data level threshold, DLEV; switchably coupling the differential inputs of the data sampler 501 to one another (and switchably isolating the inputs from the signal path 202 so as not to short the component signal lines of the signal path to one another); then adjusting the $OFST_D$ value until the sample value generated by the data sampler 501 begins to dither between '1' and '0' states. The dithering sample value indicates that the null signal input to the data sampler 501 is being detected and therefore that the offset calibration is complete. After completing the offset calibration for the data sampler 501, the control setting for the data level threshold is restored, and the proxy-enable signal 516 is lowered to re-establish the normal operating mode of the receiver 500. At this point, the data sampler 501 has been removed from service for calibration purposes, then restored to service without interruption in data reception.

Still referring to FIG. 18, the proxy mode of the receiver 500 may also be used to more permanently swap the roles of the data and adaptive samplers 501 and 503, in effect establishing the adaptive sampler 503 as the full time data sampler, and the data sampler 501 as the full-time adaptive sampler. This may be desirable, for example, if it is determined that the adaptive sampler exhibits a lower bit error rate, less jittery output, lower DC offset, or other characteristic improvement relative to the data sampler 501.

A number of changes may be made to the embodiment of FIG. 18 without departing from the scope of the present invention. For example, if the proxy mode is to be used only to enable the adaptive sampler 503 to stand-in for the data sampler 501, then the threshold multiplexer 507 may be omitted. Offset calibration is simplified in such an architecture, as the data level threshold is not supplied to the data sampler 501 in proxy mode and therefore need not be zeroed. In an alternative embodiment, the threshold multiplexers 507 and 509 may be controlled by separate signals so that, if an offset calibration is to be performed in the data sampler 501, only the threshold input to the adaptive sampler 503 is switched (i.e., by selecting the zero threshold to be supplied to the adaptive sampler 503), so that the data sampler 501 continues to receive the zero threshold, obviating the temporary zeroing of the data level threshold. Such an embodiment has the additional benefit of enabling both the data sampler 501 and the adaptive sampler 503 to generate sign data values simultaneously, for example, for confirmation of accurate data reception (a third sampler may be provided for voting purposes). Separate control signals may also be provided to the output path multiplexers 511 and 513 so that the data and adaptive samplers 501 and 503 can be enabled to simultaneously generate data sign values for a given time period before switching the output path multiplexer 511 to select the adaptive sampler 503 to provide data sign values to the adaptive module 505. In this manner, a make-before-break operation is enabled within the receive circuit 500, instead of abruptly transitioning between the adaptive and data samplers 501 and 503 as the source of data sign values.

Tap Weight and Data Level Adaptation in a Multi-Level Signaling System

Figure 19:
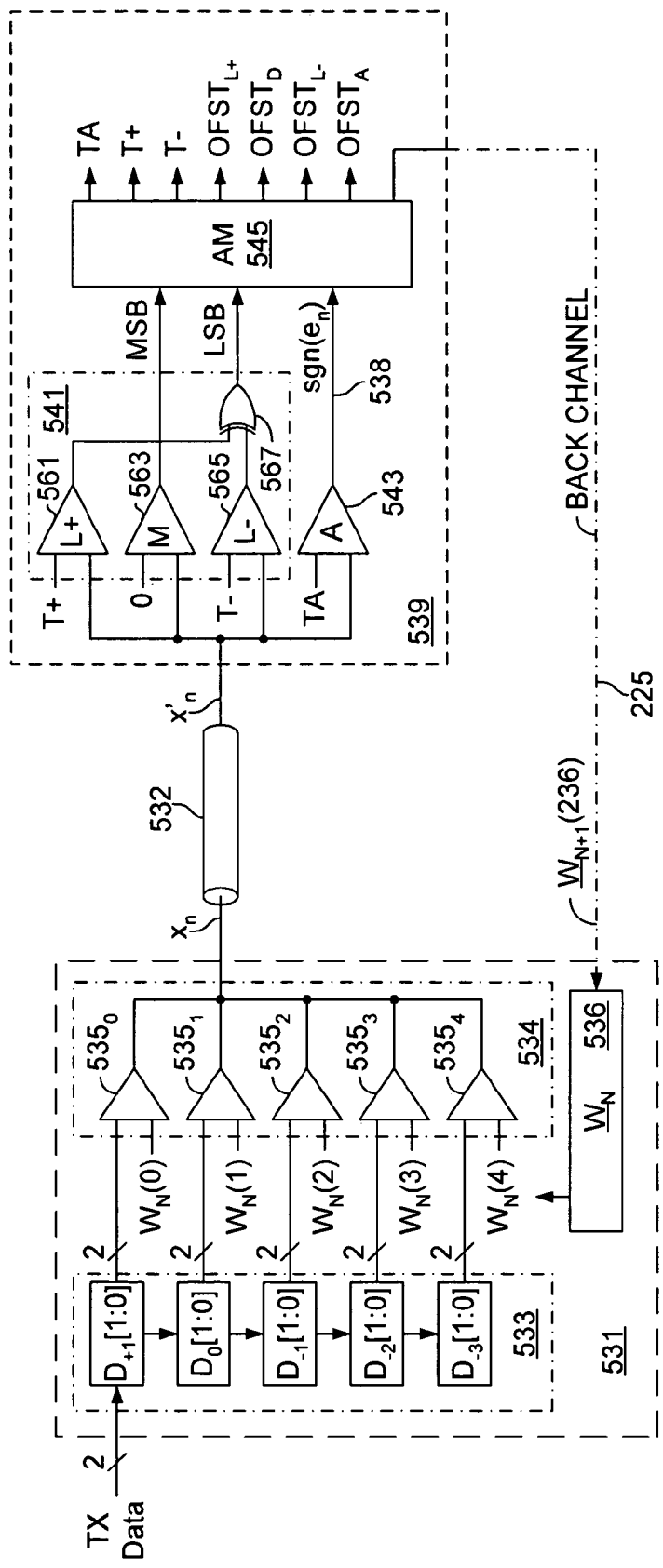
FIG. 19 illustrates a multi-level signaling system according to an embodiment of the invention.

FIG. 19 illustrates a multi-level signaling system 530 according to an embodiment of the invention. The multi-level signaling system 530 includes a multi-level, multi-tap transmitter 531, and a multi-level, multi-sample receiver 539, coupled to one another via high-speed signaling path 532. As in the signaling system of FIG. 3, the signal path 532 may be a differential signaling path having a pair of component signal lines to conduct differential multi-level signals generated by the transmitter 531, or a single-ended signaling path for transmission of single-ended multi-level signals generated by the transmitter 531. Also, the signal path 532 may be formed in multiple segments disposed on different layers of a circuit board and/or multiple circuit boards (e.g., extending between backplane-mounted daughterboards, between motherboard and daughterboard, etc.). In one embodiment, the transmitter 531 and receiver 539 are implemented in respective integrated circuit (IC) devices that are mounted on a common circuit board or different circuit boards (e.g., as in the case of backplane-mounted daughterboards). In alternative embodiments, IC dice (i.e., chips) containing the transmitter 531 and receiver 539 may be packaged within a single, multi-chip module with the chip-to-chip signaling path formed by bond wires or other signal conducting structures. Also, the transmitter 531 and receiver 539 may be formed on the same IC die (e.g., system on chip) and the signaling path 532 implemented by a metal layer or other conducting structure of the die.

In the embodiment of FIG. 19, the transmitter 531 includes a transmit shift register 533, output driver bank 534 and tap weight register 536, and generates output signals having one of four pulse amplitude modulation levels (i.e., 4-PAM) according to the state of a two-bit transmit data value (received, for example, by a two-line input designated "TX DATA"). In the particular embodiment shown, the transmit shift register 533 is five elements deep and used to store a pre-tap data value $D_{+1}$, primary data value $D_0$, and three post-tap data values $D_{-1}$, $D_{-2}$ and $D_{-3}$, with each of the pre-tap, post-tap and primary-data values having two constituent bits. As in the transmit circuit 201 of FIG. 3, the primary data value is the data value to be transmitted (i.e., communicated) to the receiver 539 during a given transmission interval, and the pre- and post-tap data values are the next-to-be transmitted and previously transmitted data values, respectively (i.e., the subscript indicating the number of transmission intervals to transpire before the data value will be transmitted). Each of the shift register storage elements is coupled to a respective one of multi-level output drivers $535_0$-$535_4$ within the output driver bank 534, with output driver $535_1$ forming the primary driver, output driver $535_0$ forming the pre-tap driver and output drivers $535_2$-$535_4$ forming the post-tap drivers. Different numbers of pre- and post-tap drivers may be used in alternative embodiments.

As in the transmit circuit of FIG. 3, the tap weight register 536 is used to store the tap weights $W_N(0)$-$W_N(4)$ supplied to the output drivers $535_0$-$535_4$, respectively, with updated tap weights $W_{N+1}$ 236 being supplied by the multi-level receiver 539, for example, via a back channel 225. In one embodiment, the signal path 532 is pulled up to a predetermined voltage level (e.g., at or near supply voltage) by single-ended or double-ended termination elements, and the output drivers $535_0$-$535_4$ generate multi-level signals (i.e., symbols) on the signal path 532 by drawing a pull-down current, $I_{PD}$ (i.e., discharge current), in accordance with the corresponding tap weight and data value. More specifically, in one embodiment, the pull-down current generated by the output driver corresponds to the most- and least-significant bits (MSB and LSB) of a two-bit data value, $D_0$, as follows ($I_{NOM}$ being a nominal full-scale current):

TABLE 2

| $D_0[1]$ (MSB) | $D_0[0]$ (LSB) | $I_{PD}$ | Normalized Signal Level |
|---|---|---|---|
| 0 | 0 | 0 | +1 |
| 0 | 1 | $I_{NOM}/3$ | +⅓ |
| 1 | 1 | $2I_{NOM}/3$ | −⅓ |
| 1 | 0 | $I_{NOM}$ | −1 |

TABLE 4

| MSB | LSB | A | B | C | $I_{PD}$ |
|---|---|---|---|---|---|
| 0 | 0 | 0 | 0 | 0 | 0 |
| 0 | 1 | 1 | 0 | 0 | $I_{NOM}/3$ |
| 1 | 1 | 1 | 1 | 0 | $2I_{NOM}/3$ |
| 1 | 0 | 1 | 1 | 1 | $I_{NOM}$ |

As in the embodiment of FIG. 3, the primary driver 535₁ is used to transmit, D₀, the two-bit data value to be transmitted during a given symbol time, and the pre-tap and post-tap drivers are used to provide transmit pre-emphasis as necessary to reduce dispersion-type ISI and other low-latency distortion effects.

Figure 20:
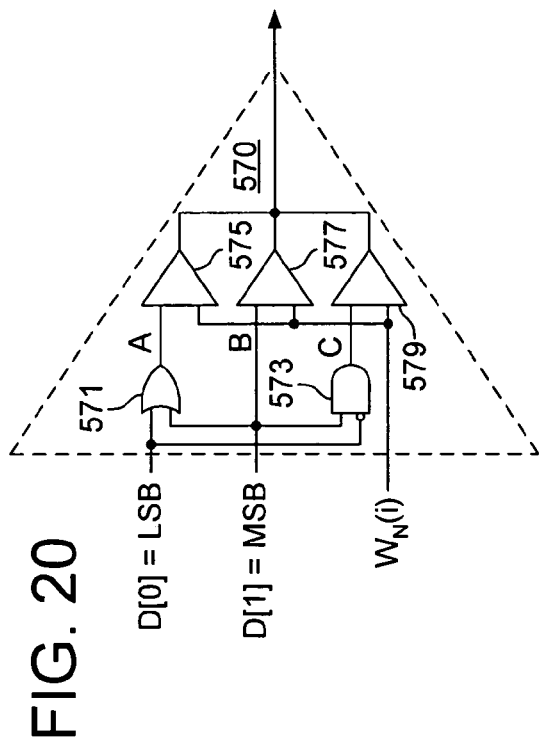
FIG. 20 illustrates an embodiment of a multi-level output driver that may be used to implement each of the multi-level output drivers shown in FIG. 19.

FIG. 20 illustrates an embodiment of a multi-level output driver 570 that operates in accordance with Table 2, and which may be used to implement each of the multi-level output drivers 535₀-535₄ of FIG. 19. The output driver 570 includes a pair of logic gates 571 and 573 and three component drivers 575, 577 and 579, and receives the MSB and LSB of a two-bit data value, D[1:0], and tap weight, $W_N(i)$, as inputs. The logic gates 571 and 573 convert the MSB and LSB inputs into component driver input signals, A, B and C according to the following logic table:

TABLE 3

| MSB | LSB | A | B | C |
|---|---|---|---|---|
| 0 | 0 | 0 | 0 | 0 |
| 0 | 1 | 1 | 0 | 0 |
| 1 | 1 | 1 | 1 | 0 |
| 1 | 0 | 1 | 1 | 1 |

That is, A is asserted (i.e., to a logic '1') if either the MSB or LSB is a logic '1' (i.e., A=MSB+LSB, the '+' symbol indicating a logical OR), B is asserted if the MSB is a logic '1' (i.e., B=MSB), and C is asserted if the MSB is a logic '1' and the LSB is a logic '0' (i.e., C=MSB·/LSB). The component driver input signals, A, B and C, are input to the component drivers 575, 577 and 579, respectively, and the tap weight, $W_N(i)$, is input to each of the component output drivers.

In one embodiment, each of the component output drivers 575, 577 and 579 is implemented by the circuit illustrated in FIG. 5 (other output driver circuits may be used in alternative embodiments). A single pair of resistive elements may be provided and shared between the component output drivers 575, 577 and 579 (i.e., instead of three sets of the resistive elements designated 'R' in FIG. 5), or, as discussed in reference to FIG. 5, the resistive elements may be implemented by termination elements coupled to the component lines of the differential signaling path. Each of the component output drivers 575, 577 and 579 may additionally be biased (e.g., by a biasing circuit not shown) to draw substantially the same current, $I_{NOM}/3$, from the signaling path. By this arrangement, the currents drawn by the component output drivers 575, 577 and 579 are cumulative so that the four different current levels illustrated in table 2 are generated for the corresponding states of the MSB and LSB. That is, the four possible states of a two-bit transmit value are signaled on the signaling path by drawing $I_{NOM}/3$ in none, one, two or three of the component drivers 575, 577 and 579, as illustrated in the following table:

Referring again to FIG. 19, the multi-level, multi-sample receive circuit 539 includes a multi-level sampler 541, and an adaptive sampler 543. The multi-level sampler 541 itself includes component samplers 561, 563 and 565, that operate in generally the same manner as the data and adaptive samplers described above (e.g., in reference to FIGS. 3 and 10-12) to output a sample value having a sign according to whether the input signal, $x'_n$ is greater or less than a threshold level. Two of the component samplers 561 and 565 are used to resolve the LSB of the incoming 4-PAM signal, and have thresholds set at counterpart threshold levels, T+ and T−, above and below a zero threshold. Component samplers 561 and 565 are referred to herein as the positive LSB sampler (L+) and negative LSB sampler (L−), respectively. The remaining component sampler 563, referred to herein as the MSB sampler, receives (or is set to) the zero threshold and is used to resolve the MSB of the incoming 4-PAM signal.

Figure 21:
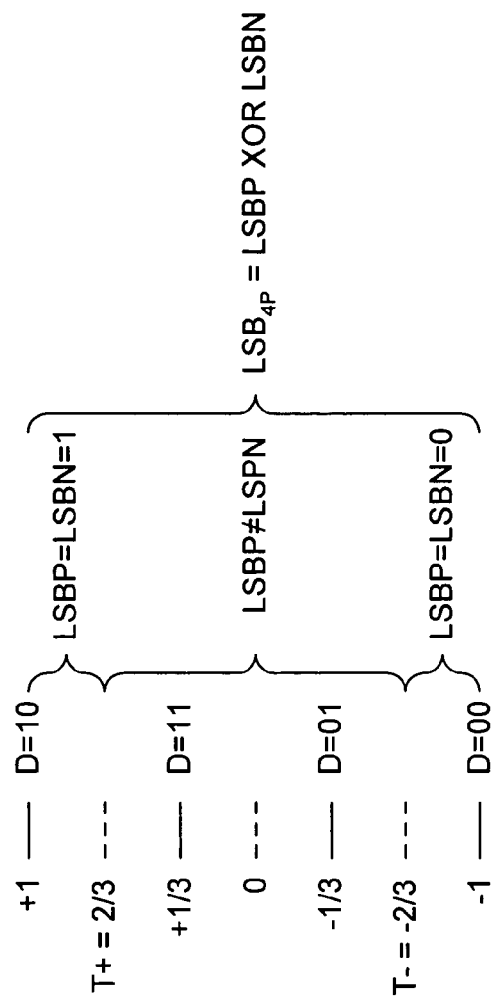
FIG. 21 illustrates an exemplary signal encoding protocol used within the multi-level signaling system of FIG. 19.

Referring to FIG. 21, the zero threshold is nominally set midway between the normalized +/−1 signal levels that correspond to data states '00' and '10', and midway between the corresponding +⅓ and −⅓ signal levels that correspond to data states '01' and '11'. Thus, if the output of the MSB sampler is high, the MSB of the recovered data value is high. The threshold supplied to the positive LSB sampler 561 (i.e., T+) is set midway between the normalized +1 and +⅓ signal levels (i.e., at the normalized +⅔ level), and the threshold supplied to the negative LSB sampler 565 (i.e., T−) is set midway between the normalized −1 and ⅓ signal levels (i.e., at the normalized −⅔ level). Consequently, if the LSB of a transmitted data value is a '0' (i.e., a '10' or a '00' is transmitted), then the sample values generated by positive and negative LSB samplers 561 and 565 will have the same state, either high or low, as the incoming signal level will either exceed both the T+ and T− thresholds (D='10') or fall below both the T+ and T− thresholds (D='00'). By contrast, if the LSB of the transmitted data value is a '1', then the sample values generated by positive and negative LSB samplers 561 and 565 will have different states, as the incoming signal will exceed the T− threshold, but not the T+ threshold. Thus, the LSB of the recovered data value may be generated by exclusive-ORing the L+ and L− outputs.

Returning to FIG. 19, exclusive-OR gate 567 is coupled to receive the outputs of the positive and negative LSB samplers 561 and 565 and generates the LSB sample for that incoming data signal. Thus, during each signal reception interval, the multi-level sampler 541 generates an MSB/LSB sample pair which is provided to the adaptive module 545. The adaptive module 545 generates an error sign value 538 that indicates whether the incoming signal $x'_n$ exceeds a threshold value, TA. In one embodiment, the threshold value corresponds to the normalized +⅓ signal level, thereby enabling generation of a DAC control value which may be left shifted by one bit (i.e., multiplied by two) to generate the T+ threshold (i.e., +⅔), and then complemented to generated the T− threshold (i.e., −⅔). In an alternative embodiment, discussed below, the T+ threshold may be generated by determining and then averaging the normalized +1 and +⅓ signal levels. In another embodiment, discussed below, the T+ threshold may be determined directly, by sampling the incoming signal at the midpoint of transitions between +1 and +⅓ levels. In yet other embodiments, the normalized received signal levels may be different than ±⅓ and ±1, such that the desired threshold levels (T+, T−) may be different than ±⅔ (e.g., being set at the midpoint between adjacent signal levels or at other points that improve signaling margins, bit error rate or other system performance metric). In this regard, the references to normalized signal levels herein are but examples. Other signal levels and threshold levels may be used. In all such embodiments, the counterpart threshold, T−, may be generated by complementing (or inverting) the T+ threshold. Alternatively, the T− threshold may be independently generated by determining and left-shifting the −⅓ threshold, by determining and averaging the −⅓ and −1 thresholds, or by sampling the incoming signal at the midpoint of transitions between −1 and −⅓ levels.

Still referring to FIG. 19, the adaptive module 545 generates the thresholds, T+ and T−, provided to the multi-level sampler 541, the threshold, TA, provided to the adaptive sampler 543, and respective offset cancellation values, $OFST_A$, $OFST_{L+}$, $OFST_M$ and $OFST_{L-}$, for the adaptive sampler 543 and each of the component samplers 561, 563 and 565 of the multi-level sampler 541. In alternative embodiments, all or a portion of the offset cancellation circuitry within the adaptive module 545 may be omitted so that offset cancellation values are not generated for the adaptive sampler 543 and/or component samplers 561, 563 and 565. Also, one or more of the offset cancellation values, $OFST_A$, $OFST_{L+}$, $OFST_M$ and $OFST_{L-}$, may be shared between any two or more of the samplers 543, 561, 563 and 565.

Figure 22:
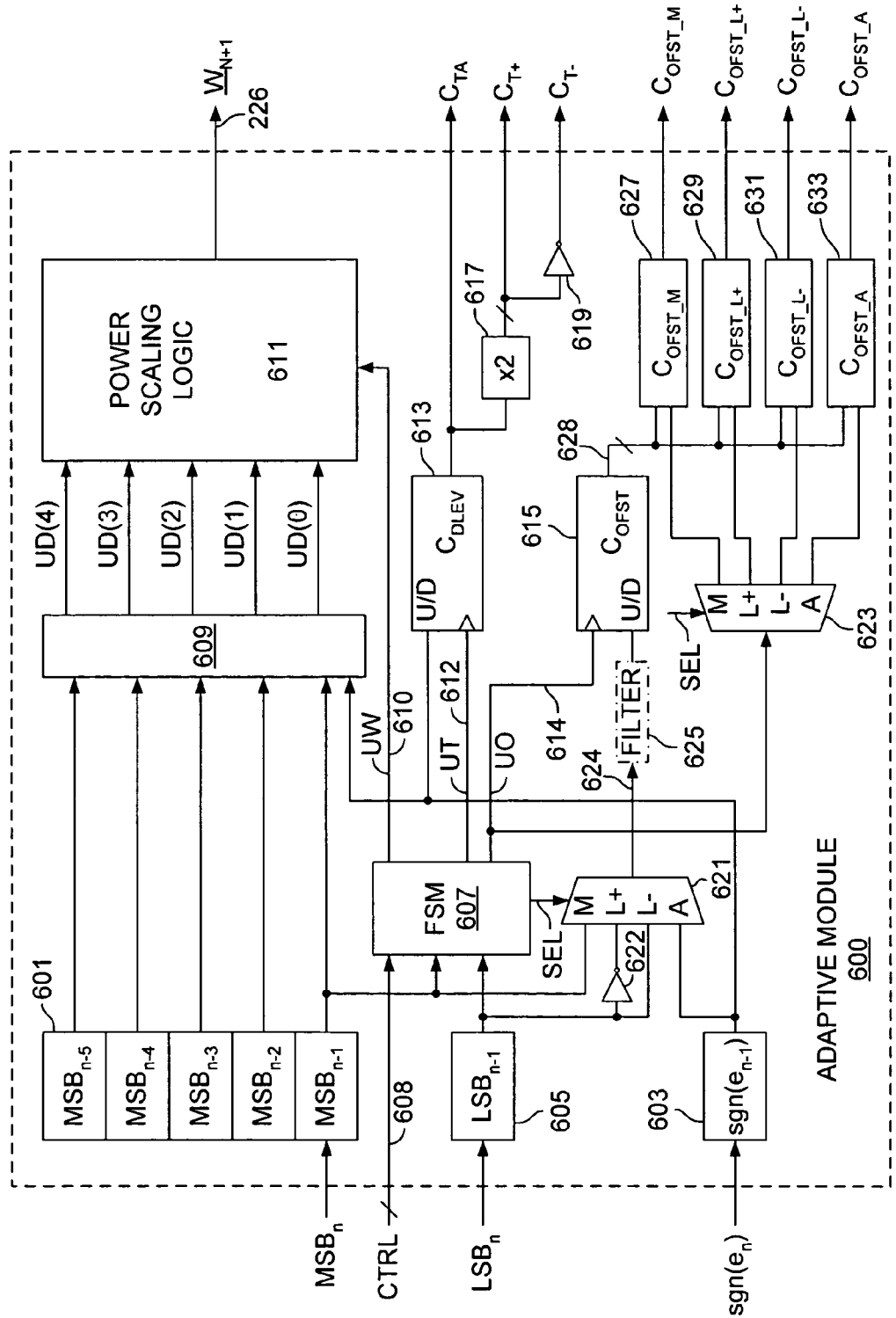
FIG. 22 illustrates an adaptive module according to another embodiment of the invention.

FIG. 22 illustrates an embodiment of an adaptive module 600 that may be used to implement the adaptive module 545 shown in FIG. 19. The adaptive module 600 includes an MSB register 601, LSB register 605, error sign register 603, sign multiplier 609, finite state machine 607, power scaling logic 611, filter 625, threshold counter 613, threshold multiplier 617, threshold inverter 619, offset counter 615, offset registers 627, 629, 631 and 633, error signal multiplexer 621 and demultiplexer 623. The adaptive module 600 operates similarly to the adaptive module 250 of FIG. 7, with data sign values, $MSB_n$, and error sign values, $sgn(e_n)$, being loaded into the MSB register 601 and error sign register 603, respectively, in response to a sampling clock signal or other control signal. LSB values, $LSB_n$, are similarly loaded into the LSB register 605. In the embodiment of FIG. 22, the MSB register 601 is a five-deep shift register to store the most recently generated data sign values, $MSB_{n-1}$-$MSB_{n-5}$, (other depths may be used in alternative embodiments) and outputs the data sign values to the sign multiplier 609. The sign multiplier 609 receives the data sign values from the MSB register 601 and the error sign value from the error sign register 603 and generates a set of update values, UD(0)-UD(4) that indicate the sign of the product of the error sign value and the data sign value. The update values are provided to the power scaling logic 611 which operates similarly to the embodiments described above in reference to FIGS. 7-9 to generate an updated, power-scaled set of pre-emphasis tap weights 226.

As discussed in reference to FIG. 19, the threshold values for the positive and negative LSB samplers (i.e., T+ and T−) may be set to normalized +/−⅔ signal levels, respectively, which are binary multiples of the normalized +⅓ threshold level. Accordingly, in the embodiment of FIG. 22, the adaptive module 600 generates an adaptive threshold control value, $C_{TA}$, that corresponds to the normalized +⅓ signal level, and generates control values, $C_{T+}$ and $C_{T-}$ for the positive and negative LSB samplers, by multiplying $C_{TA}$ by 2 and −2, respectively (i.e., $C_{T+}=2C_{TA}$ and $C_{T-}=-2C_{TA}$). More specifically, the finite state machine 607 receives the most recently stored sample value (i.e., $MSB_{n-1}$/$LSB_{n-1}$) from the MSB and LSB registers 601 and 603, and asserts an update threshold signal 612 (UT) if the sample value corresponds to the +⅓ signal level (i.e., sample value='11'). The update threshold signal 612 is provided to a count enable input (i.e., strobe input) of the threshold counter 613, and the error sign value stored in register 603 is coupled to the up/down input of the threshold counter 613. By this arrangement, when the update threshold signal 612 is asserted (indicating that the sample value is a '11'), the threshold control value, $C_{TA}$, maintained within threshold counter 613 is incremented in response to a positive error sign value (i.e., the positive error sign value indicating that the input signal that yielded the n−1 sample value is above the +⅓ level) and decremented in response to a negative error sign value. In one embodiment, the threshold control value, $C_{TA}$, is supplied to a current DAC within an adaptive sampler as described above in reference to FIGS. 10-12. Alternatively, a DAC may be provided within the adaptive module 600 to generate an analog threshold, TA. The multiplier circuit 617 multiplies $C_{TA}$ by 2 (e.g., by actively or passively shifting the $C_{TA}$ value left by one bit) to generate a control value for the T+ threshold, $C_{T+}$. The threshold inverter 619 is provided to flip the sign of $C_{T+}$ to generate $C_{T-}$, the control value for the T− threshold. Thus, the adaptive module 600 may be used to adaptively generate the control values applied to establish sampling thresholds within the positive and negative LSB samplers and the adaptive sampler of a multi-level, multi-sample receiver.

As in the embodiment of FIG. 7, the finite state machine 607 asserts an update weight signal 610 (UW) to prompt the power scaling logic 611 to generate an updated set of tap weights 226. In an embodiment in which the error sign value corresponds to a logic '11' sample value, the finite state machine 607 asserts the update weight signal after the MSB register 601 has been fully loaded (or re-loaded) and the most recently stored sample value ($MSB_{n-1}$/$LSB_{n-1}$) is a logic '11'.

In the embodiment of FIG. 22, one or more bits of a multi-bit control signal 608 are asserted to initiate an offset calibration operation within the adaptive module 600, with the bit (or combination of bits) indicating the sampler to be calibrated (e.g., positive or negative LSB samplers, MSB sampler or adaptive sampler). The error signal multiplexer 621 has a control port coupled to receive a select signal (SEL) from the finite state machine 607, and four input ports coupled to receive $MSB_{n-1}$, /$LSB_{n-1}$ (the complement LSB value generated by inverter 622), $LSB_{n-1}$ and error sign value, $sgn(e_{n-1})$, respectively. If the MSB sampler is to be calibrated, a null signal is generated at the MSB sampler input (e.g., by configuring the transmit circuit to transmit a null differential signal, or by switchably coupling the inputs of the MSB sampler to one another) and the most recently stored MSB is selected by the error signal multiplexer (i.e., in response to the select signal, SEL, from the finite state machine 607) as the offset error signal 624 supplied to the up/down input of the offset counter 615. (Also, as shown in FIG. 22, a filter 625 may optionally be provided to filter transient states in the offset error signal 624). By this operation, if the MSB sampler generates a stream of positive sample values (e.g., MSB=1) in response to the null signal input, then the MSB sampler has a negative DC offset which may be canceled by a positive offset cancellation value. In one embodiment, the finite state machine 607 asserts an update offset signal 614 after a predetermined number of samples have been received (e.g., enough samples to establish a stable, filtered signal at the up/down input of the offset counter 615), thereby incrementing the offset count within the offset counter 615 if the filtered MSB (i.e., output of filter 625) is positive, and decrementing the offset count if the filtered MSB is negative. The output of the offset counter 615 may be provided to the finite state machine 607, as described in reference to FIG. 7, to enable detection of a dithering condition within the offset counter 615 (i.e., indicating convergence to the desired MSB offset count).

In the embodiment of FIG. 22, the update offset signal 614 is supplied to the input of the demultiplexer 623 which, in turn, passes the update offset signal 614 to the load-enable input of a selected one of offset registers 627, 629, 631 and 633 according to the state of the select signal, SEL, generated by the finite state machine 607. Parallel load ports of the offset registers 627, 629, 631 and 633 are coupled to receive the offset count 628 output from the offset counter 615. Thus, during an offset calibration operation on the MSB sampler, each assertion of the update enable signal 614 results in the offset count 628 being loaded (i.e., strobed) into the MSB offset register 627. By this operation, when the offset count begins to dither, the update offset signal 614 may be asserted a final time to load the desired MSB offset count into the MSB offset register 627. In one embodiment, the MSB offset register is coupled to provide the MSB offset value to a current DAC within the MSB sampler (e.g., as shown in FIGS. 10 and 12. Alternatively, the MSB offset value may be converted to an analog signal that is provided to the MSB sampler.

In one embodiment, offset cancellation operations are performed for the remaining samplers (i.e., the positive and negative LSB samplers and the adaptive sampler) in generally the same manner as the MSB sampler, except that the threshold control values provided to the sampler being calibrated are temporarily zeroed to enable detection of the DC offset, if any, then restored when the offset calibration operation is complete. Also, in the case of the positive LSB sampler, a logic '1' LSB indicates a negative L+sample, and a logic '0' LSB indicates a positive L+sample; a correlation that is the complement of the MSB case (i.e., in which a logic '1' MSB corresponds to a positive MSB sample). Inverter 622 is provided to account for this complement condition, causing the offset counter 615 to be incremented in response to a logic '0' L+ sample during calibration of the positive LSB sampler.

Clock Recovery

Figure 23:
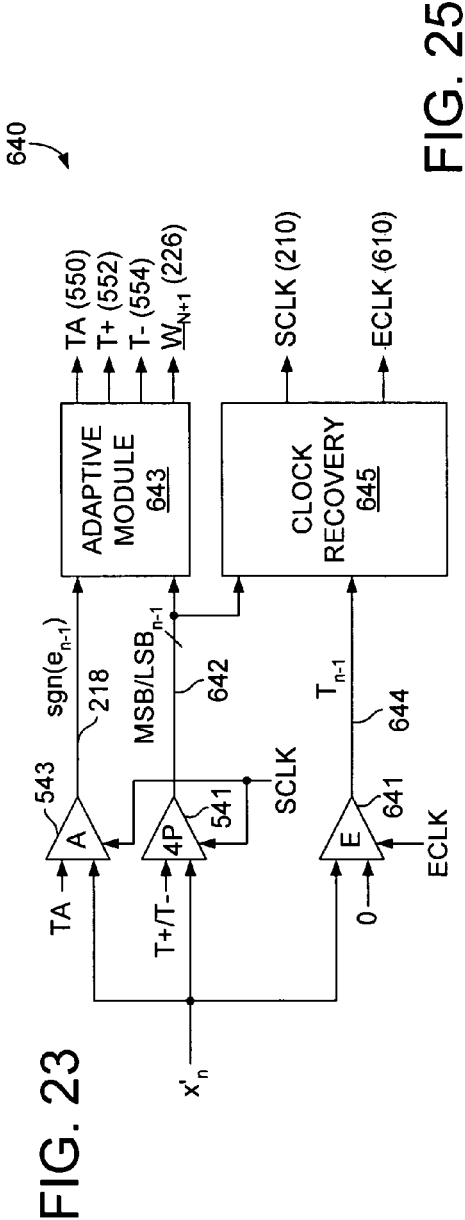
FIG. 23 illustrates an embodiment of a multi-sample, multi-level receiver that recovers both data and clocking information from an incoming multi-level signal.

FIG. 23 illustrates an embodiment of a multi-sample, 4-PAM receiver 640 that recovers both data and clocking information from the incoming multi-level signal, $x'_n$. The receiver 640 includes a multi-level sampler 541 (a 4-PAM sampler in this example), adaptive sampler 543, edge sampler 641, adaptive module 643 and clock recovery circuit 645. The multi-level sampler 541, adaptive sampler 543 and adaptive module 643 operate generally as described in reference to FIG. 19 to generate data samples 642 (i.e., MSB and LSB) and error samples 218, and to adaptively update the transmit pre-emphasis tap weights, (226) and the sampler thresholds 550, 552 and 554 (TA, T+ and T−, respectively).

The clock recovery circuit 645 generates a sampling clock signal 210 (SCLK) and edge clock signal 610 (ECLK) in response to transition samples 644 ($T_{n-1}$), generated by the edge sampler 641, and the data samples 642 generated by the multi-level sampler 541. In one embodiment, the sampling clock signal 210 is provided to the multi-level sampler 541 and adaptive sampler 543 to control the sampling instant therein (as shown, for example, in FIGS. 10 and 12) and thereby define each successive data reception interval. In one embodiment, transitions in the sampling clock signal 210 are phase aligned with midpoints in the incoming data eyes (i.e., midpoint of data valid intervals in the incoming data signal, $x'_n$), for example, as shown in FIG. 4. In an alternative embodiment, the sampling clock signal 210 may be offset from the midpoints in the incoming data eyes, for example, to accommodate asymmetric setup and hold time requirements in the multi-level sampler 541 and/or adaptive sampler 543. While only a single sampling clock signal 210 is shown in FIG. 23, multiple sampling clock signals may be generated by the clock recovery circuit 645 to enable receipt of multi-data rate signals. For example, in a double data rate system, the clock recovery circuit 645 may generate SCLK and /SCLK to enable capture of data and error samples in both odd and even phases of the sampling clock signal 210.

The clock recovery circuit 645 adjusts the phase of the edge clock signal 610 to maintain phase alignment between the edge clock signal 610 and transition points between incoming data eyes. That is, the edge clock signal 610 is adjusted for edge alignment with data valid intervals in the incoming data signal, $x'_n$. The edge clock signal 610 is supplied to the edge sampler 641 where it is used to time the sampling of transitions in the incoming data signal. One or more storage circuits (not specifically shown in FIG. 23) may be provided within the edge sampler 641 to latency-align the transition sample, $T_{n-1}$, with the data sample, MSB/LSB$_{n-1}$ so that, for each pair of successive data samples 642 supplied to the clock recovery circuit 645 by the multi-level sampler 541, the edge sampler 641 supplies a transition sample 644 that corresponds to the intervening transition in the incoming signal, $x'_n$, if any.

Figure 24:
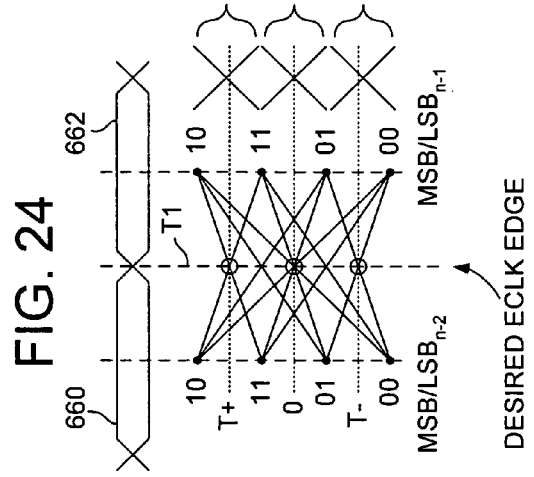
FIG. 24 illustrates possible signal transitions between successive 4-PAM data transmissions received by the multi-level receiver of FIG. 23.

FIG. 24 illustrates possible signal transitions between successive 4-PAM data transmissions 660 and 662. As shown, from each of four possible signal levels, the incoming data signal may transition to any of three other signal levels. For example, a signal level above T+(corresponding to data value '10') may transition to (1) a signal level between the T+ and zero thresholds ('10'→'11'); (2) a signal level between the zero and T− thresholds ('10'→'01'); and a signal level below T−('10'→'00'). Examining the different possible transitions, it can be seen that any transitions that cross all three threshold levels will cross the zero threshold level at the timing center, T1, between the desired data sampling instants; the desired edge clock transition time. Similarly, transitions that cross a single threshold level will cross either the zero threshold level, the T+ threshold level or the T− threshold level at T1. By contrast, any transitions that cross two threshold levels, but not three, do not cross the zero, T+ or T− threshold levels at T1. Enumerating the different transitions that cross the zero, T+ and T− threshold levels at T1 as transition types (1), (2) and (3), respectively, it can be seen that type-1 transitions are those in which the LSB remains unchanged at either '1' or '0', while the MSB changes state (i.e., (MSB$_N$ xor MSB$_{N-1}$) & (LSB$_N$ xnor LSB$_{N-1}$), '&' indicating an AND logic operation and 'xor' indicating an exclusive OR logic operation); type-2 transitions are those in which the MSB remains high while the LSB changes state (i.e., MSB$_N$ & MSB$_{N-1}$ & (LSB$_N$ xor LSB$_{N-1}$)); and type-3 transitions are those in which the MSB remains low, while the LSB changes state (i.e., /MSB$_N$ & /MSB$_{N-1}$ & (LSB$_N$ xor LSB$_{N-1}$)).

In the embodiment of FIG. 23, the clock recovery circuit 645 evaluates successive MSB/LSB values to determine when a type-1 signal transition has occurred, and adjusts the phase of the edge clock signal 610 and sampling clock signal 210 according to the state of the corresponding transition sample 644. In the case of a rising edge transition in the incoming signal, $x'_n$ (i.e., '00'→'10', or '01'→'11'), a logic '1' transition sample 644 indicates that the edge clock transition occurred after the incoming signal transition (i.e., edge clock lags the signal transition) and therefore that the phase of the edge clock signal 610 is to be advanced. Conversely, a logic '0' transition sample 644 indicates that the edge clock transition occurred prior to the incoming signal transition (i.e., edge clock leads the signal transition) and therefore that the phase of the edge clock signal 610 should be delayed. The clock recovery circuit 645 receives the transition samples 644 from edge sampler 641 and data samples from the 4-PAM clock signal transition is early relative to the incoming signal transition. The following table illustrates exemplary combinations of incoming signal samples (and corresponding transition type) and transition samples; the resulting transition detect and early/late signals generated by the transition logic circuit 671; and the resulting adjustments to the early/late count and phase of the edge clock sampling clock signals:

TABLE 5

| MSB/LSB$_{n-2}$ | MSB/LSB$_{n-1}$ | T$_{n-1}$ | Trans. Type | TDET | Early (/Late) | E/L Cnt Adj. | ECLK/SCLK Phase Adjust |
|---|---|---|---|---|---|---|---|
| 00 | 10 | 0 | 1 | 1 | 1 | +1 | Delay |
| 00 | 10 | 1 | 1 | 0 | 0 | −1 | Advance |
| 01 | 11 | 0 | 1 | 1 | 1 | +1 | Delay |
| 01 | 11 | 1 | 1 | 0 | 0 | −1 | Advance |
| 11 | 01 | 0 | 1 | 0 | 0 | −1 | Advance |
| 11 | 01 | 1 | 1 | 1 | 1 | +1 | Delay |
| 10 | 00 | 0 | 1 | 1 | 0 | −1 | Advance |
| 10 | 00 | 1 | 1 | 1 | 1 | +1 | Delay |
| 11 | 10 | X | 2 | 0 | X | 0 | No change |
| 10 | 11 | X | 2 | 0 | X | 0 | No change |
| 00 | 01 | X | 3 | 0 | X | 0 | No change |
| 01 | 00 | X | 3 | 0 | X | 0 | No change |
| 00 | 11 | X | — | 0 | X | 0 | No change |
| 01 | 10 | X | — | 0 | X | 0 | No change |
| 11 | 00 | X | — | 0 | X | 0 | No change |
| 10 | 01 | X | — | 0 | X | 0 | No change | sampler 642 and adjusts the phase of the edge clock signal 610 as necessary to maintain alignment between the edge clock signal 610 and transitions in the incoming signal, x'$_n$. In one embodiment, the sampling clock signal 210 is maintained at a substantially constant phase offset from the edge clock signal 610 such that phase alignment between the edge clock signal 610 and data signal transitions yields a desired phase alignment between the sampling clock signal 210 and midpoints in the incoming data eyes.

Figure 25:
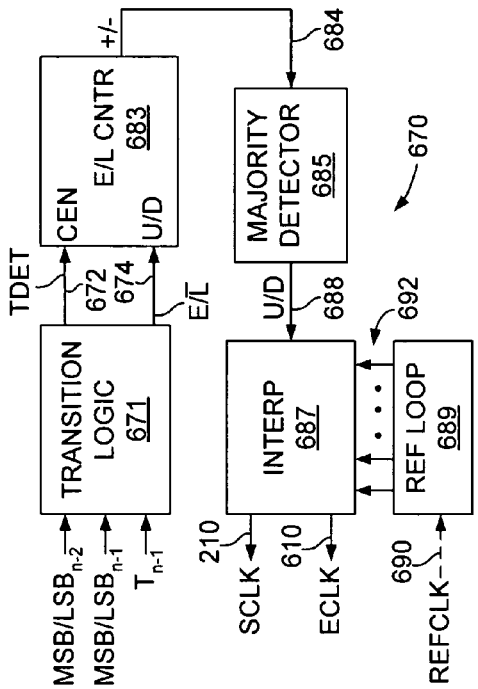
FIG. 25 illustrates an embodiment of a clock recovery circuit that may be used to implement the clock recovery circuit shown in FIG. 23.

FIG. 25 illustrates an embodiment of a clock recovery circuit 670 that adjusts the phase of edge clock signal 610 and sampling clock signal 210 based on selected transitions detected in the incoming signal, x'$_n$, and that may be used to implement the clock recovery circuit 645 of FIG. 23. The clock recovery circuit 670 includes a transition logic circuit 671, early/late counter 683, majority detector 685, interpolator 687 and reference loop 689. In the embodiment of FIG. 25, the transition logic 671 asserts a transition detect signal 672 (TDET) upon detecting a type-1 transition in a successive pair of data samples, MSB/LSB$_{n-2}$ and MSB/LSB$_{n-1}$, and asserts an early/late signal 674 according to the direction of the incoming signal transition (rising or falling edge) and the state of the corresponding transition sample, T$_{n-1}$. The transition detect signal 672 is applied to a count enable input (CEN) of the early/late counter 683 to enable an early/late count value to be incremented or decremented according to the state of the early/late signal 674. In one embodiment, the transition logic 671 outputs a logic high early/late signal 674 if the transition sample, T$_{n-1}$, does not match the MSB of the trailing data sample, MSB$_{n-1}$, and a logic low early/late signal 674 if the transition sample matches the MSB of the trailing data sample. That is, if the transition sample, T$_{n-1}$, is captured after the transition from MSB/LSB$_{n-2}$ to MSB/LSB$_{n-1}$, the transition sample will match the MSB$_{n-1}$ sample and thereby indicate that the edge clock signal transition is late relative to the incoming signal transition. Conversely, if the transition sample is captured before the transition from MSB/LSB$_{n-2}$ to MSB/LSB$_{n-1}$, the transition sample will not match the MSB$_{n-1}$ sample, thereby indicating that the edge In one embodiment, the early/late counter 683 is initialized to zero and, as illustrated in Table 5, is incremented in response to an early indication (i.e., a logic high early/late signal 674) and decremented in response to a late indication (i.e., a logic low early/late signal 674). By this operation, the sign bit (e.g., the MSB) of the early/late count maintained within the early/late counter 683 indicates whether more early than late indications, or more late than early indications have been received from the transition logic 671 (i.e., the count value will underflow to a negative value if more late indications than early indications are detected). Accordingly, after a predetermined number of transition detect assertions (or after a predetermined time), the majority detector 685 evaluates the sign of the early/late count (i.e., signal 684) and outputs an up/down signal 688 to the interpolator 687 accordingly. The early/late count value may then be reset to zero in preparation for counting a subsequent set of early/late indications.

In one embodiment, the interpolator 687 maintains an interpolation control word that is incremented in response to a logic high up/down signal 688 and decremented in response to a logic low up/down signal 688. The most significant bits of the interpolation control word are used to select a pair of phase vectors from the set of N phase vectors 692 generated by the reference loop 689, and the least significant bits of the interpolation control word are used to interpolate between the selected pair of phase vectors. As the control word is incremented, the interpolation is incrementally shifted from a leading one of the phase vectors to a lagging one of the phase vectors, thereby incrementally delaying (i.e., retarding) the phase of the edge and sampling clock signals 610, 210. Conversely, as the control word is decremented, the interpolation is incrementally shifted toward the leading one of the selected phase vectors, thereby incrementally advancing the phase of the edge and sampling clock signals 610, 210.

In one embodiment, the reference loop 689 is formed by a delay locked loop (DLL) that receives a reference clock signal 690 and, in response, generates a plurality of phase vectors 692 that are phase distributed within a cycle time of the reference clock signal 690. Alternatively, the reference loop 689 may be a phase locked loop (PLL) that multiplies the reference clock frequency to generate a plurality of phase vectors 692 having a higher frequency than the reference clock frequency. In another alternative embodiment, the reference loop 689 may include an internal timing reference generator (e.g., a ring oscillator or other clock generating circuit) so that no reference clock signal 690 is required. Also, as discussed above, the interpolator 687 may generate any number of sampling clock and edge clock signals. For example, in a double data rate system, the interpolator 687 generates an edge clock signal and complement edge clock signal, and a sampling clock signal and complement sampling clock signal, the sampling clock signal being offset from the edge clock signal by a quarter cycle (90 degrees) of the edge clock signal. The quarter cycle offset may be achieved, for example, by a second interpolator that maintains a control word having a 90 degree digital offset from the control word used to generate the edge clock signal. Other techniques may be used to generate the edge clock-to-sampling clock offset in alternative embodiments. In a quad data rate system, the interpolator 687 (or multiple interpolators) generates four edge clock signals and four sampling clock signals, the combined set of eight clock signals being evenly offset in phase over a cycle time of the edge clock signal (i.e., 45 degree increments between successive clock edges). This approach may be extended to support virtually any data rate.

It should be noted that numerous changes may be made to the clock recovery circuit 670 of FIG. 25 without departing from the scope of the present invention. For example, in one alternative embodiment, the up/down signal 688 is a two-bit signal in which the '00' state signals a hold condition. The interpolator 687 responds to the hold condition by maintaining the interpolation control word at its present value. In such an embodiment, the majority detector 685 may receive the entire early/late count from the early/late counter, and output the up/down signal in the '00' state if the count value indicates a balanced reception of early and late detections (e.g., the early/late count is zero). Alternatively, the majority detector 685 may be omitted altogether and the sign of the early/late count value output directly to the interpolator 687 to control the phase adjustment of the edge and sampling clock signals 610 and 210.

Returning to FIG. 24, it can be seen that the type-2 and type-3 transitions cross the T+ and T− thresholds, respectfully, in synchronism with the desired transition time of the edge clock signal 610 (i.e., T1). Consequently, the type-2 and type-3 transitions may be detected and used along with, or instead of, the type-1 transitions to recover the edge and sampling clock signals 610 and 210. In one embodiment, additional edge samplers 641 are provided to generate transition samples at the T+ and/or T− thresholds. Additional circuitry is also provided within the clock recovery circuit 670 of FIG. 25 to detect the 11-to-01 and/or 00-to-10 transitions and, in response, to update the early/late counter 683 according to the corresponding transition samples. By this arrangement, the overall number of incoming signal transitions used for clock recovery is increased, thereby relaxing the transition density required in the incoming signal for clock recovery purposes.

Returning to FIG. 23, threshold multiplexers and output path multiplexers similar to multiplexers 507, 509, 511 and 513 of FIG. 18 may be provided to enable the adaptive sampler 543 to proxy for any of the component samplers of the multi-level sampler 541. By this operation, component samplers of the multi-level sampler 541 may be taken out of service one at a time and calibrated (e.g., offset cancellation calibration), tested or used for other purposes. Also, if the adaptive sampler 543 exhibits improved performance relative to one of the component samplers of the 4-PAM receiver, the adaptive sampler 543 may be substituted for the component sampler during normal operation.

In the embodiment of FIG. 23, the adaptive sampler 543 is clocked by the sampling clock signal 210 and therefore captures samples at the same time as the component samplers of the multi-level sampler 541. In an alternative embodiment, the adaptive sampler 543 may be clocked by a selectable-phase clock signal having an independently selectable phase offset. By alternately switching the phase of the selectable-phase clock signal to match the phase of the sampling clock signal 210 and the edge clock signal 610, the adaptive sampler 543 may be used as a proxy sampler for the component samplers of the multi-level sampler 541 as well as the edge sampler 641. Also, if one of the edge samplers may be taken out of service (e.g., in a mesochronous or plesiochronous system having a frequency offset estimation (via a second order feedback loop, for example), the edge sampler may be used as a proxy for an adaptive sampler (if provided), data sampler or other sampler within the receiver. Further, while a 4-PAM system is described in reference to FIG. 23, edge samplers may be used for clock recovery purposes in binary signaling systems (or multi-level signaling systems having more than four signal amplitude levels). In such systems, the edge samplers may be used as proxy samplers for adaptive and/or data samplers.

Transmit equalization can cause multi-modal distributions in edge crossings. This in turn causes the conventional clock-data-recovery loop to produce less accurate estimates on the phase of the incoming data stream. In one embodiment, error signals at both data and edge samples are combined to form the update of the equalizer taps, thereby reducing loss of timing accuracy in effect by trading off between timing accuracy and voltage accuracy due to equalizer compensation. The use of data and edge error signals to update equalizer taps are illustrated, for example and without limitation, by the update expression:

$$\underline{W}_{N+1} = \underline{W}_N + \text{stepsize}_{wd} * \text{sign}(e_{dn}) * \text{sign}(\underline{u}_{dn}) + \text{step}_{we} * \text{sign}(e_{en}) * \text{sign}(\underline{u}_{en}), \text{ where}$$

stepsize$_{wd}$ is a data-weighted update factor and stepsize$_{we}$ is an edge-weighted update factor. The subscript "dn" refers to the n$^{th}$ data sample and the subscript "en" refers to the n$^{th}$ edge sample. Value "$e_{en}$" is an edge sample that has been filtered, for example, by the condition $x_n + x_{n-1} = 0$ (i.e., a data state transition). Value "$\underline{u}_{en}$" is a vector of edge samples which need not be filtered. As discussed above in reference to FIG. 16, in a single phase tap weight update operation, $x'_n$ may be used in place of $\underline{u}_{dn}$. Alternatively, if one of the edge samplers may be taken out of service (e.g., in a mesochronous or plesiochronous system having a frequency offset estimation (e.g., via a second order feedback loop), the edge sampler may be used as a proxy for an adaptive sampler (if provided), data sampler or other sampler within the receiver.

The term including the error from the data samples guides the equalizer updates toward the negative gradient direction of the mean-square-error on data samples, while the term including the error from edge samples guides the equalizer updates toward the negative gradient direction of the mean-square-error on edge samples. Said differently, the term including error in data samples affects the equalizer such that it makes that error smaller, while the term including error in edge samples affects the equalizer such that it makes the error at the edges smaller. In case when there are competing effects between these two errors, the equalizer is able to achieve the balance. This tradeoff may be achieved with different relative magnitude of step sizes (weighting) for data and edge errors.

A convenient aspect of the embodiments of FIGS. 23 (and 26 described below) is that the clock recovery loop already generates the edge error signals and conveniently filters them (i.e. generates them) only on valid transitions (i.e., by detecting early-late signals as discussed above). Hence, little or no additional circuitry in the receiver is needed to generate the edge error signals.

Figure 26:
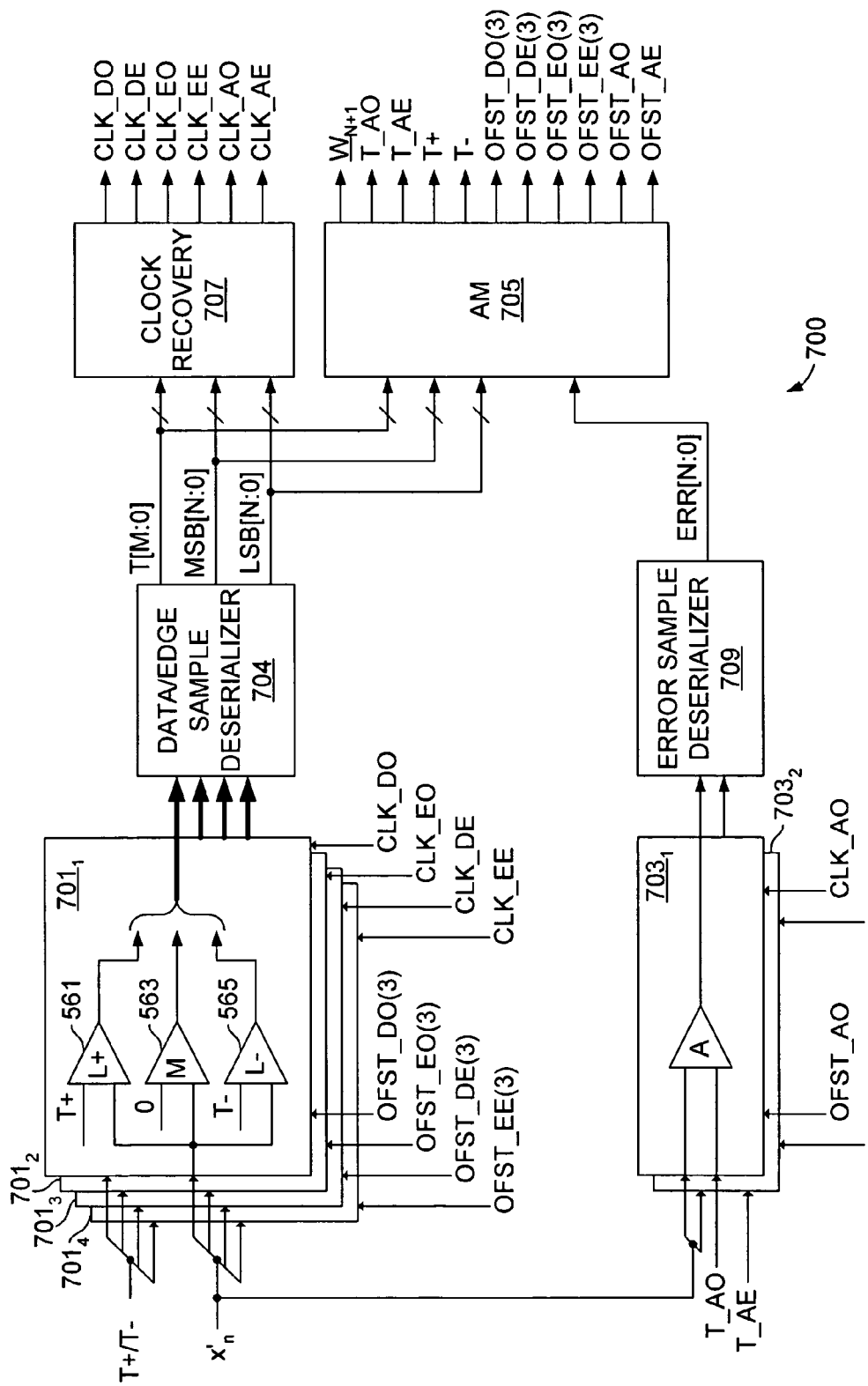
FIG. 26 illustrates a double-data-rate, multi-sample receiver according to an embodiment of the invention.

FIG. 26 illustrates a double-data-rate, multi-sample receiver 700 according to an embodiment of the invention. The receiver 700 includes 4-PAM samplers 7011-7014, data/edge sample deserializer 704, adaptive samplers, 703₁ and 703₂, error sample deserializer 709, an adaptive module 705 and clock recovery circuit 707. Each of the 4-PAM samplers 701₁-701₄ operates in generally the same manner as the multi-level sampler 541 of FIG. 19, and includes an MSB sampler 563 to compare an incoming signal, x'$_n$, with a zero threshold, and positive and negative LSB samplers 561 and 565 to compare the incoming signal with adaptively generated thresholds, T+ and T− (e.g., adapted to the normalized +⅔ signal levels). Two of the 4-PAM samplers 701₁ and 701₃ are used to generate two-bit data samples (i.e., each sample having and MSB and LSB) in response to odd and even sampling clock signals, CLK_DO and CLK_DE, respectively. The remaining two 4-PAM samplers, 701₂ and 701₄, are used to generate transition samples in response to odd and even edge clock signals (CLK_EO and CLK_EE), with the MSB sampler being used to detect type-1 data signal transitions, and the positive and negative LSB samplers being used to detect type-2 and type-3 data signal transitions. The data and edge sample values generated by the 4-PAM samplers 701₁-701₄ are supplied to the data/edge sample deserializer 704, which shifts the incoming serial stream of MSB and LSB samples (after performing LSB+xor LSB−) and transition samples into respective shift registers. The contents of the shift registers within the data/edge deserializer 704 constitute parallel words of MSBs, LSBs and transition samples (i.e., MSB[N:0], LSB[N:0] and T[M:0], respectively, where M≦N due to the fact that not all transitions are type-1, type-2 or type-3 transitions) that are supplied to the clock recovery circuit 707 and adaptive module 705. The clock recovery circuit 707 operates generally in the manner described in reference to FIGS. 23-25 to generate even and odd edge and data clock signals, CLK_EE, CLK_EO, CLK_DE and CLK_DO (e.g., the even and odd clock signals being complements of one another, and the edge and data clock signals being quadrature-offset from one another). The adaptive module 705 applies the incoming data samples in tap weight update operations to generate power-scaled, updated tap weights $W_{N+1}$ and, when instructed, to perform offset cancellation operations as described in reference to FIG. 22 for the component samplers within each of the 4-PAM samplers 701₁-701₄. For example, the adaptive module 705 generates three offset cancellation values, OFST_DO(3), for the odd-data 4-PAM sampler 701₁ in the manner described in reference to FIG. 22, and similarly generates offset cancellation values OFST_DE(3), OFST_EO and OFST_EE, for the even-data 4-PAM sampler 701₃, odd-edge 4-PAM sampler 701₂ and even-edge 4-PAM sampler 701₄.

In the embodiment of FIG. 26, the adaptive samplers 703₁ and 703₂ are clocked by respective odd and even adaptive-sampler clock signals, CLK_AO and CLK_AE, and generate error samples by comparing the incoming signal, x'$_n$, with adaptive sampler thresholds T_AO and T_AE, respectively. In one embodiment, the adaptive module 705 iteratively adjusts each of the adaptive sampler thresholds (i.e., in response to the incoming error samples, ERR[N:0], or a subset thereof) to the normalized +⅓ signal level and uses the adaptive-sampler threshold as discussed above in reference to FIG. 22 to generate the T+ and T− thresholds supplied to the 4-PAM samplers (e.g., doubling the adaptive sampler threshold to generate T+, then complementing T+ to generate T−). The error samples generated by the adaptive samplers 703₁ and 7032 are provided to the error sample deserializer 709 which shifts the odd- and even-phase error samples (i.e., the error samples alternately generated by adaptive samplers 703₁ and 703₂) into a shift register for parallel delivery to the adaptive module (i.e., ERR[N:0]).

In one embodiment, the odd and even adaptive-sampler clock signals are generated by respective interpolators within the clock recovery circuit 707, and therefore have independently selectable phase offsets. By this arrangement, clock signal CLK_AO may be selectively phase aligned with either of the odd-phase data and edge clock signals, CLK_DO and CLK_EO, so that adaptive sampler 703₁ may proxy for any of the component samplers within the odd-phase 4-PAM data sampler 703₁, and any of the component samplers within the odd-phase 4-PAM edge sampler 7032. Similarly, clock signal CLK_AE may be selectively phase aligned with either of the even-phase data and edge clock signals, CLK_DE and CLK_EE, so that adaptive sampler 703₂ may proxy for any of the component samplers within the even-phase 4-PAM data sampler 703₃, and any of the component samplers within the even-phase 4-PAM edge sampler 703₄. In alternative embodiments, each of the adaptive samplers may proxy for any component sampler within any of the 4-PAM samplers. By this arrangement, one of the adaptive samplers 703 may continue to generate the error samples needed to adaptively update the pre-emphasis tap weights, $\underline{W}_{N+1}$, and the thresholds T_AO and T_AE (and, by extension, the T+ and T− thresholds), while the other of the adaptive samplers 703 is used as a proxy sampler for a component sampler of one of the 4-PAM samplers 701. The adaptive module 705 additionally generates an offset cancellation value for each of the adaptive samplers 703 (i.e., OFST_AO and OFST_AE), for example, by nulling the input to the adaptive sampler, zeroing the threshold of the adaptive sampler, and adjusting the offset cancellation value for the adaptive sampler until the error samples generated by the adaptive sampler begin to dither.

Figure 27:
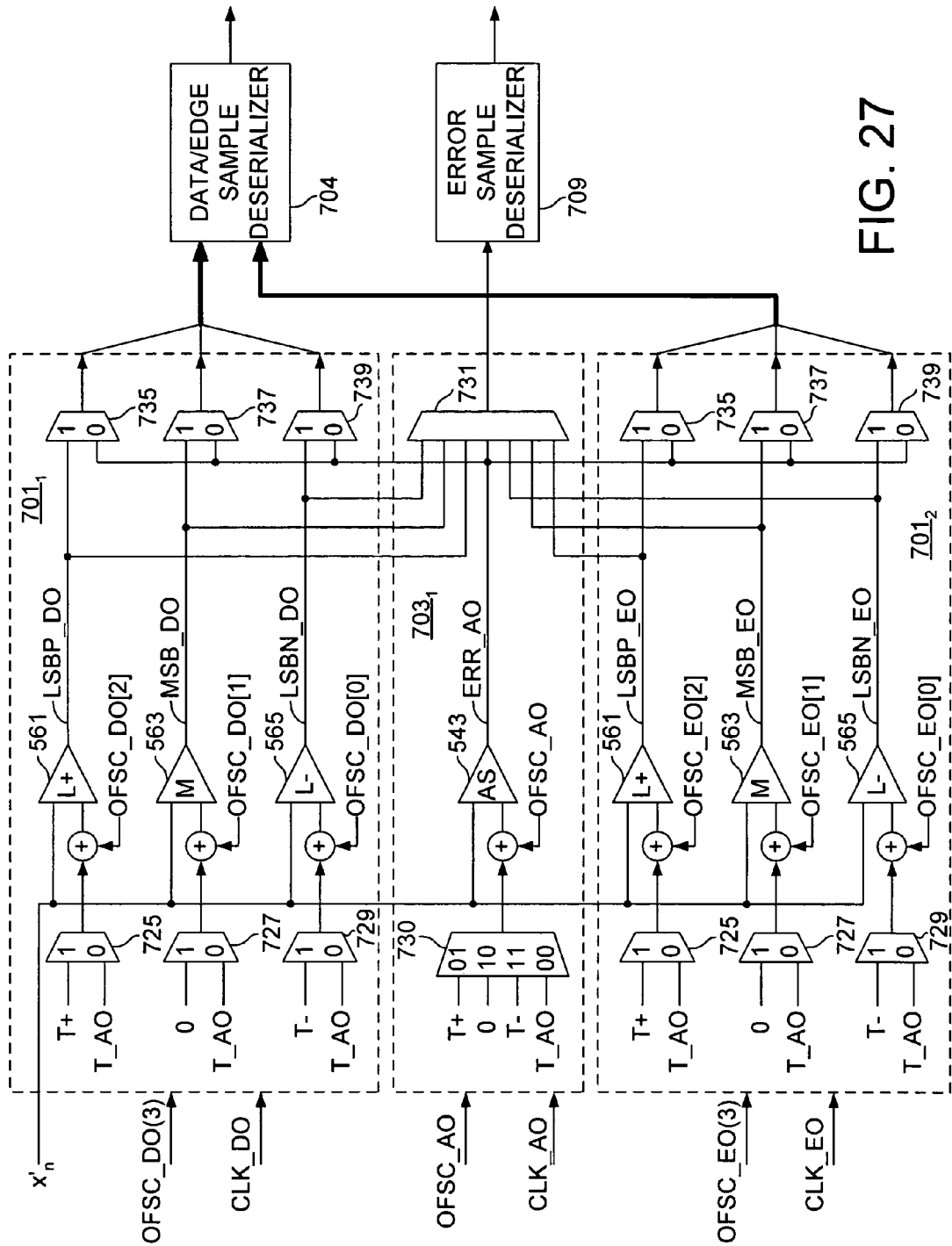
FIG. 27 illustrates a portion of the receiver of FIG. 26 in greater detail.

FIG. 27 illustrates a portion of the receiver 700 of FIG. 26 in greater detail, showing the threshold multiplexers and output path multiplexers that may be used to enable the odd-phase adaptive sampler 703₁ to be a proxy sampler for any of the component samplers 561, 563 and/or 565 within the 4-PAM data sampler 701₁ or 4-PAM edge sampler 701₂. A similar set of threshold multiplexers and output path multiplexers may be coupled to the even-phase adaptive sampler 703₂ and 4-PAM data and edge samplers 701₃ and 701₄.

Referring to 4-PAM sampler 701₁, threshold multiplexer 725 is provided to select either the T+ threshold or the adaptive sampler threshold, T_AO, to be summed with the offset cancellation OFSC_DO[2] and provided to the positive LSB sampler 561. Similarly, threshold multiplexer 729 is provided to select either the T− threshold or the adaptive sampler threshold, T_AO, to be summed with offset cancellation OFSC_DO[0] and provided to the negative LSB sampler 565, and threshold multiplexer 727 is provided to select either the zero threshold or the adaptive sampler threshold T_AO, to be summed with offset cancellation OFSC_DO[1] and provided to the MSB sampler 563. Output multiplexers 735, 737 and 739 are provided in the 4-PAM sampler 701₁ to select either the output of the odd-phase adaptive sampler 703₁ or the output of the component samplers 561, 563 and 565, respectively, to be provided to the data/edge sample deserializer 704. Threshold multiplexers 725, 727 and 729, and output multiplexers 735, 737 and 739 are provided within the odd-phase edge sampler 701$_2$ and coupled to the component samplers thereof in the same way that like-numbered multiplexers are coupled to the component samplers of the odd-phase data sampler 701$_1$.

Threshold multiplexer 730 is provided to enable any of the T+, 0, T− and T_AO threshold levels to be summed with offset cancellation OFSC_AO and provided to the adaptive sampler 543 (i.e., sampler 543 being the sampling circuit within the overall sampler 703$_1$). Output path multiplexer 731 is provided to select the output of any one of the component samplers of 4-PAM samplers 701$_1$ and 701$_2$ or the adaptive sampler 543 to be provided to the error sample deserializer 709. By this arrangement, the adaptive sampler 543 may operate as a proxy sampler for any of the component samplers of the odd-phase data and edge samplers 701$_1$ and 701$_2$, and vice-versa, thereby enabling calibration operations or other out-of-service operations to be performed on the odd-phase data and edge samplers without interrupting the recovered stream of data and edge samples. As discussed in reference to FIG. 18, the threshold and output path multiplexers may be independently controlled to enable a make-before-break transition between a component sampler (i.e., 561, 563 or 565) and the adaptive sampler 543, establishing the alternate source of sample values before taking the component sampler out of service. The even-phase data, edge and adaptive samplers (i.e., 701$_3$, 701$_4$ and 703$_2$, respectively) may include threshold multiplexers and output path multiplexers coupled in the same manner as the threshold multiplexers and output path multiplexers shown for odd samplers in FIG. 27.

Still referring to FIG. 27, the odd-phase adaptive sampler 703$_1$ receives the phase-selectable clock signal, CLK_AO, and therefore may generate sample values in phase with either the odd-phase data clock signal, CLK_DO, or the odd-phase edge clock signal, CLK_EO. The even-phase adaptive sampler similarly receives the phase-selectable clock signal, CLK_AE, and therefore may generate sample values in phase with either the even-phase data clock signal, CLK_EO, or the even-phase edge clock signal, CLK_EE.

As discussed in reference to FIG. 19, the T+ and T− threshold values supplied to the LSB samplers 561 and 565 within each of the 4-PAM samplers 701 may be generated by determining and then averaging +1 and +⅓ signal levels. Referring to FIG. 22, for example, in one embodiment, the +1 and +⅓ signal levels are determined one after another using the adaptive sampler 543 (or, in the embodiment of FIG. 26, either of the adaptive samplers 703$_1$ or 703$_2$). That is, the threshold TA is adaptively updated to meet the +1 signal level, for example, by updating the TA threshold according to the error sign value 538 (or filtered version thereof) generated by the adaptive sampler 543 when the corresponding data sample is '10' (i.e., MSB=1, LSB=0). More specifically, when the error sign value is positive, indicating that the corresponding input signal is above the TA threshold, the control value for the TA threshold, $C_{TA}$, is incremented. When the error sign value is negative, the control value is decremented. Referring to FIG. 22, the control value, $C_{TA}$, may be provided to the finite state machine 607 to enable detection of a convergence condition. Once the TA threshold has converged to the +1 signal level, the corresponding threshold control value (CTA) may be recorded (e.g., within the finite state machine 607 or other register) and the threshold control value thereafter adjusted to meet the +⅓ threshold. That is, the threshold TA is adaptively updated to meet the +⅓ signal level, for example, by updating $C_{TA}$ according to the error sign value (or filtered version thereof) generated by the adaptive sampler when the corresponding data sample is a '11'. After threshold control values that correspond to both the +1 and +⅓ signal levels have been determined, the threshold control values may be averaged by an averaging circuit (e.g., summing circuit to generate a sum of the +1 and +⅓ $C_{TA}$ values, and a right shift circuit to effect a division by 2) to provide a T+ threshold. The T− threshold may be generated by complementing the threshold control value for the T+ threshold, or may be independently generated by determining and averaging threshold control values that correspond to the −1 and −⅓ signal levels. Note that the averaging circuit used to average the threshold control values that correspond to the +1 and +⅓ signal levels (and, optionally, to average the threshold control values that correspond to the −1 and −⅓ signal levels) may be provided in the adaptive module 600 of FIG. 22 in place of the multiplier circuit 617 and may be coupled to receive one of the $C_{TA}$ values (whichever is generated last) from threshold counter 613 and another of the $C_{TA}$ values (whichever was generated first) from the finite state machine 607 or from a holding register. In alternative embodiments, the threshold control values that correspond to the +1 and +⅓ signal levels may be determined in the opposite order (i.e., $C_{TA}$ for the +⅓ signal level determined first, followed by $C_{TA}$ for the +1 signal level). Also, another sampler (e.g., an additional adaptive sampler) may be used to enable simultaneous adaptive determination of threshold control values that correspond to the +1 and +⅓ signal levels. In yet other embodiments, the LSB generated by exclusive-ORing the outputs of the positive and negative LSB samplers 561 and 565 may be used to determine threshold control values that correspond to the +1 and +⅓ (and/or −1 and −⅓) signal levels. In such an embodiment, the transmit side device (or, alternatively, a transmitter in the receive-side device coupled in a loop-back configuration) may be set, during a first interval, to transmit a signal that alternates between −1 and +1 signal levels (i.e., large-swing 2-PAM signal) and the MSB sampler used to determine whether the incoming signal is a +1 or −1 signal. If the incoming signal is a +1 (i.e., MSB=1), then the T+ threshold may be updated according to the state of the corresponding LSB (e.g., incremented if the LSB is a '0' and decremented if the LSB is a '1'). By this operation, the T+threshold is adaptively updated to meet (and therefore determine) the +1 signal level. The T− threshold may similarly be updated based on the LSB if the MSB is a '0' (e.g., decremented if the LSB is a '0' and incremented if the LSB is a '1'), thereby enabling a determination of the −1 signal level. After the +1 and/or −1 signal levels have been adaptively determined, the transmit side device (or loop-back configured transmitter in the receive-side device) may be set to transmit a signal that alternates between +⅓ and −⅓ signal levels (i.e., small-swing 2-PAM signal) and the MSB sampler 563 and LSB samplers 561 and 565 used to determine the +⅓and/or −⅓ signal levels (e.g., using the MSB sampler to determine whether the incoming signal is at the +⅓ or −⅓ signal level, and using the LSB sample value to adaptively update the T+ and/or T− thresholds to meet the +⅓ and −⅓ signal levels). After both the +1 and +⅓ signal levels have been determined, the corresponding control values may be averaged to determine the corresponding +⅔ threshold, and the T+ threshold control value set accordingly. The T−threshold may be generated by complementing the T+ threshold or, if the −1 and −⅓ signal levels have been determined, by averaging the threshold control values that correspond to the −1 and −⅓ signal levels.

Figure 28:
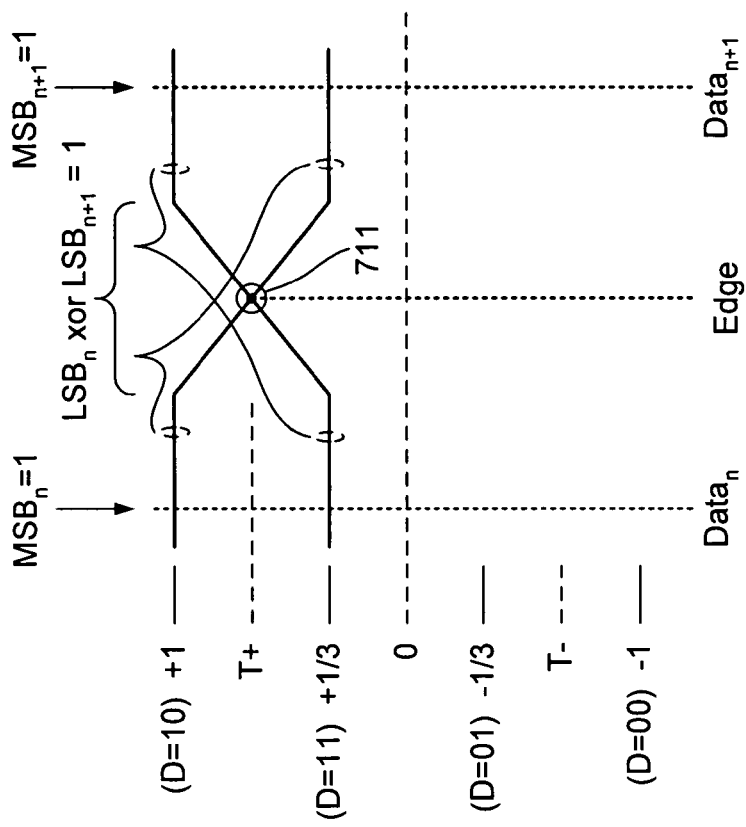
FIG. 28 illustrates an exemplary technique for determining selected signal levels in a multi-sample receiver.

In another alternative embodiment, the +1 and +⅓ signal levels (and/or −1 and ⅓ signal levels) may be determined using the LSB edge samplers (or MSB edge sampler), then averaged to determine the T+ threshold. Referring to FIG. 28, for example, the transmit side device (or, alternatively, a loop-back configured transmitter in the receive-side device) may be set to transmit a large-swing 2-PAM signal that remains at the +1 signal level for at least two successive samples, $Data_n$ and $Data_{n+1}$. In this mode, when two successive data samples include logic '1' MSB values, the intervening edge sample (i.e., the edge sample 710 captured between $Data_n$ and $Data_{n+1}$ samples) is at the +1 signal level. Accordingly, the T+ threshold applied to the positive LSB edge sampler may be adaptively updated to meet the +1 signal level, thereby enabling a determination of the corresponding threshold control value. Thereafter, the transmit side device (or loop-back configured transmitter in the receive-side device) may be set to transmit a small-swing 2-PAM signal that remains at the +⅓ signal level for at least two successive samples so that the positive LSB edge sampler may be used to determine the corresponding threshold control value. It should be noted that the LSB of the edge sample (i.e., the LSB generated by exclusive-ORing the outputs of the positive and negative LSB edge samplers) may be used in combination with the MSB of the edge sample to determine or infer the output of the positive LSB edge sampler. Accordingly, the LSB and MSB of a given edge sample may be used to determine the threshold control value instead of using the raw output of the positive LSB edge sampler. In either case, after the threshold control values have been determined for the +1 and +⅓ signal levels, the threshold control values may be averaged to generate the threshold control value for the T+ threshold. The control value for the T– threshold control value may be generated by complementing the T+ threshold control value, or by averaging threshold control values determined for the –1 and –⅓ signal levels.

Figure 29:
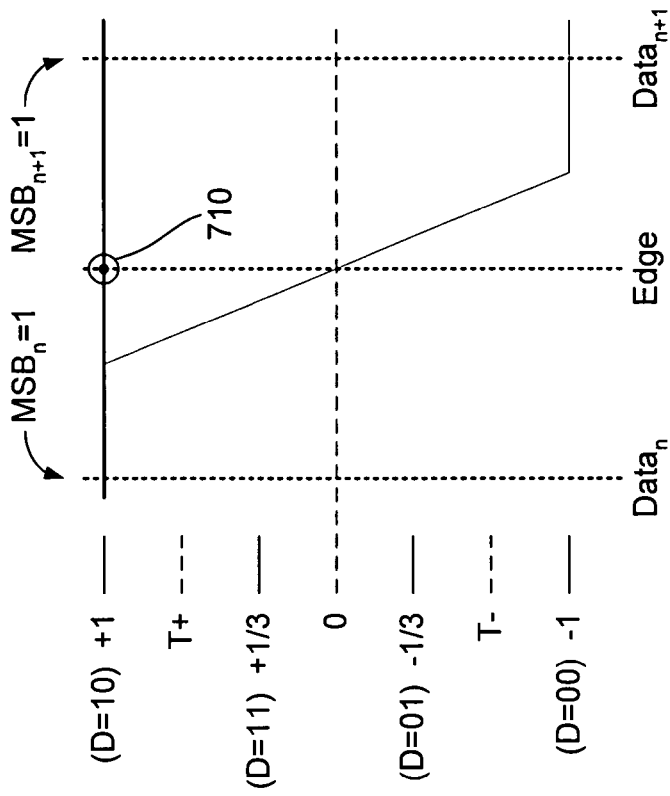
FIG. 29 illustrates an alternative technique for determining selected signal levels in a multi-sample receiver.

As discussed above, the T+ and T– thresholds may also be adaptively determined based on transitions (i.e., edge samples) between +1 and +⅓ signal levels. Referring to FIG. 29, for example, the threshold control value for the T+ threshold may be updated based on the LSB of the edge sample generated between '10' and '11' data samples (e.g., an edge sample 711 bounded by data samples in which $MSB_n=MSB_{n+1}=1$, and $LSB_n$ xor $LSB_{n+1}=1$), the threshold control value being incremented if the LSB of the edge sample is a '0' and decremented if the LSB of the edge sample is a '1', thereby adaptively driving the T+ threshold to meet the signal level at the midpoint of the transition. The T– threshold may be determined indirectly by complementing the threshold control value for the T+ threshold or directly by adaptively updating the threshold control value for the T– threshold based on transitions between –1 and –⅓ signal levels indicated, for example, by $MSB_n=MSB_{n+1}=0$, and $LSB_n$ xor $LSB_{n+1}=1$ (e.g., incrementing the threshold control value used to generate the T– threshold if the LSB edge sample is a '1' and decrementing the threshold control value if the LSB edge sample is a '0').

In one embodiment of the multi-sample receiver 700 of FIG. 26, the MSB and LSB samplers 563, 561 and 565 within the 4-PAM samplers $701_1$-$701_4$ are differential signal samplers (e.g., as described in reference to FIG. 10) coupled to receive the same T+ and T–thresholds (or corresponding digital control values generated within the adaptive module 705). In such an embodiment, the threshold determination techniques described above (e.g., determining and doubling a threshold control value that corresponds to the +⅓ signal level, averaging threshold control values that correspond to +1 and +⅓ signal levels, determining a threshold control value for the midpoint in transitions between +1 and +⅓ signal levels, etc.) may be used to provide a coarse determination of the thresholds provided to all the positive and negative LSB samplers in the 4-PAM samplers $701_1$-$701_4$, and offset cancellation operations may be used to provide fine tuned T+ and T– thresholds on a sampler by sampler basis. This approach advantageously allows a single full-scale DAC to be shared among the various LSB samplers (i.e., for T+ and T– threshold generation) and smaller offset cancellation DACs (i.e., capable of offsetting the thresholds applied to each sampler by a limited amount, less than the full-scale DAC range) to be used for fine tuning, thus reducing the overall amount of hardware required to provide fine-tuned thresholds to each of the samplers. In an alternative embodiment, separate full-scale DACs may be provided to generate the thresholds for each of the component samplers within multi-level samplers $701_1$-$701_4$ of the multi-sample receiver 700.

Figure 31:
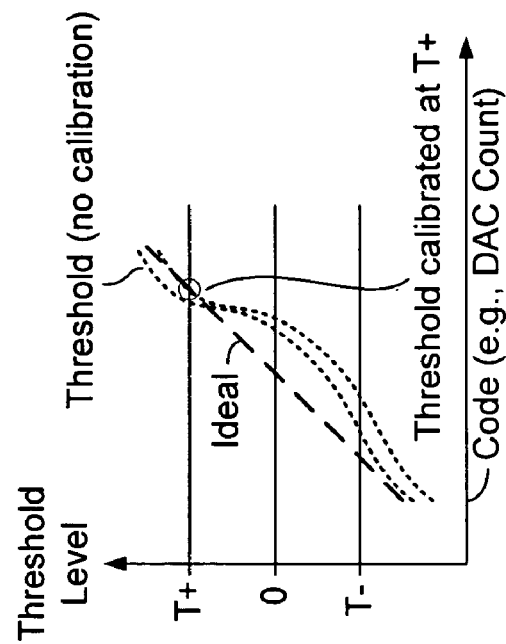
FIG. 31 illustrates a reduced sampler calibration error that may result through application of at-threshold offset calibration operations according to various embodiments.
Figure 30:
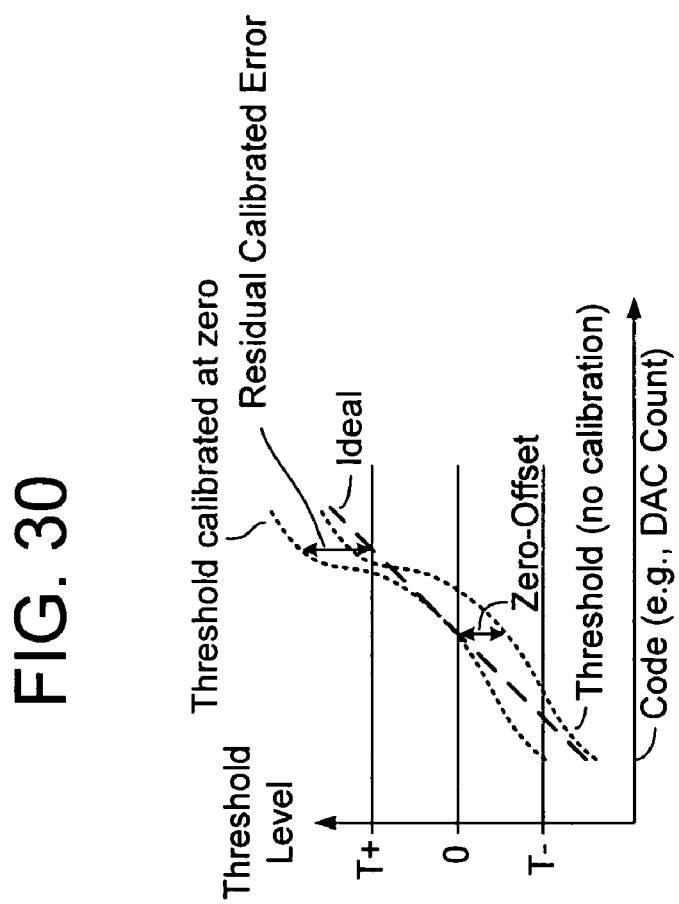
FIG. 30 illustrates a sampler calibration error that may occur due to sampler nonlinearity.

As discussed above in reference to FIG. 26, offset cancellation values may be generated for each of the individual LSB and MSB samplers within 4-PAM samplers $701_1$-$701_4$ in the manner described in reference to FIG. 22, nulling the input to the sampler to be calibrated, then adjusting the offset cancellation value until a convergence around the zero threshold is reached. As shown in FIG. 30, however, canceling the offset at null (i.e., differential potential in input signal=0) may yield a significant residual calibration error in the T+ and T– threshold levels due to sampler nonlinearity. That is, an offset cancellation value that cancels a steady state offset at the zero threshold, may not cancel the steady-state offset at the T+ or T– thresholds. Accordingly, in alternative embodiments, offset cancellation for the positive and negative LSB samplers 561, 565 is achieved using techniques that zero (or more nearly zero) the offset at the T+ and T– thresholds, respectively, instead of at null. As shown in FIG. 31, such "at-threshold" offset cancellation enables generation of T+ and T– thresholds having a substantially reduced offset error (e.g., zero or near zero offset error).

Figure 32:
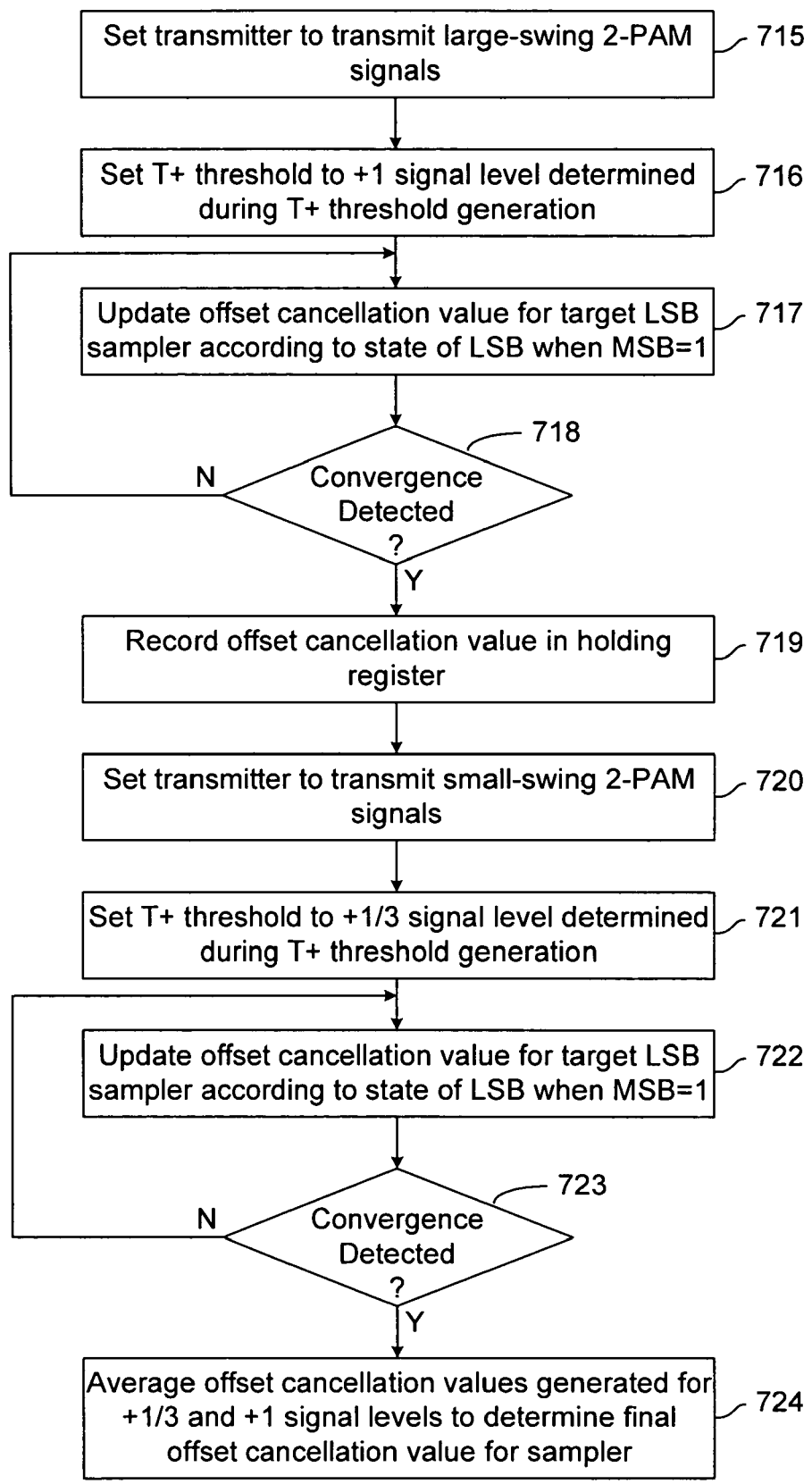
FIG. 32 illustrates an at-threshold offset cancellation operation according to one embodiment.

FIG. 32 illustrates an at-threshold offset cancellation operation according to one embodiment. Initially, at block 715, the transmit-side device (or transmitter in the receive-side device coupled in a loop-back configuration) is set to transmit large-swing 2-PAM signals (e.g., transitioning between the '00' and '10' signal levels shown in FIG. 21). At block 716, the T+ threshold is set to the +1 signal level determined, for example, during the T+ threshold generation described above. At block 717, the offset cancellation value for the target LSB data sampler is updated based on the state of the LSB if the corresponding MSB indicates that a '10' data sample has been received (i.e., a data sample that corresponds to the +1 signal level). More specifically, when MSB=1, then the LSB indicates whether the signal level is above T+threshold (LSB=0), in which case the offset cancellation value for the LSB sampler is incremented, or below the T+ threshold (LSB=1), in which case the offset cancellation value for the T+ threshold is decremented. When a convergence condition is detected at block 718 (e.g., dithering in the offset cancellation value), the offset cancellation value is recorded in a temporary holding register at block 719. Thereafter, at block 720, the transmitter is set to transmit small-swing 2-PAM signals (i.e., transitioning between +⅓ and –⅓ signal levels) and at block 721, the T+ threshold is set to the +⅓ signal level. At block 722, the offset cancellation value for the target LSB sampler is updated based on the state of the LSB when the MSB indicates that a '11' data sample (i.e., +⅓ signal level) has been received. Upon detecting a convergence condition at block 723, offset cancellation values for the target LSB sampler have been determined at the +1 and +⅓ signal levels.

Accordingly, at block 724 the offset cancellation value determined for the +1 signal level (i.e., recorded in the holding register at block 719) is averaged with the offset cancellation value determined for the +⅓ signal level, and the average applied as the T+ offset cancellation value for the target LSB sampler. Thereafter, the at-threshold offset cancellation operation of FIG. 32 is repeated for the next target LSB sampler.

In one embodiment, the at-threshold offset cancellation operation of FIG. 32 is applied to determine the offset cancellation values for each of the positive LSB data samplers 561 within the multi-sample receiver 700 of FIG. 26, and a similar set of operations are applied to determine the offset cancellation values for each of the negative LSB data samplers 565, except that offset cancellation values are determined and averaged for the −1 and −⅓ signal levels instead of the +1 and +⅓ signal levels.

The operations illustrated in FIG. 32 may be modified slightly to determine offset cancellation values for the positive and negative LSB edge samplers. More specifically, at blocks 715 and 720, the transmitter is set to transmit 2-PAM signals that remain at the same state for at least two successive data sampling intervals so that the positive and negative LSB and LSB edge samplers capture samples at the ±1 and ±⅓ signal levels (e.g., as shown in FIG. 28 which illustrates capture of an edge sample 710 at the +1 signal level). By this operation, offset cancellation values that correspond to the +1, +⅓ and −1, −⅓ signal levels may be determined and averaged to generate at-threshold offset cancellation values for the positive and negative LSB edge samplers.

In an alternative embodiment at-threshold offset cancellation is performed in each positive LSB edge sampler by detecting +1 to +⅓ signal level transitions (i.e., $MSB_n=MSB_{n+1}=1$ and $LSB_n$ xor $LSB_{n+1}=1$ as shown in FIG. 29) and adjusting the corresponding offset cancellation value according to the state of the LSB of the edge sample (i.e., the exclusive-OR combination of the outputs of the positive and negative LSB samplers). That is, assuming that the CDR has locked the edge sampling instant at the transition midpoint, then a zero-valued LSB in the edge sample indicates that the signal level at the transition midpoint exceeds the T+ threshold for the target LSB edge sampler (i.e., an offset error exists), the offset cancellation value for the sampler being incremented to compensate for the offset. Conversely, a one-valued LSB in the edge sample indicates that the signal level at the transition midpoint is below the T+ threshold for the target LSB edge sampler, and the offset cancellation value for the LSB edge sampler is decremented. When a convergence condition is detected in the offset cancellation value (e.g., offset cancellation value dithering), further update to the offset cancellation value is halted until another offset calibration operation is initiated for the target LSB edge sampler. The positive LSB edge samplers may be calibrated in this manner one after another or in concurrent offset calibration operations. Also, similar transition-based offset cancellation operations may be performed for the negative LSB edge samplers by detecting transitions between −1 and −⅓ signal levels (i.e., $MSB_n=MSB_{n+1}=0$ and $LSB_n$ xor $LSB_{n+1}=1$) and adjusting the offset cancellation values for the target LSB edge samplers according to the state of the LSB of the edge sample.

Dual Mode, Multi-PAM Receiver

In one embodiment, the 4-PAM sampler illustrated in FIG. 19 may be selectively operated in either a 2-PAM mode (i.e., binary signaling) or a 4-PAM mode, according to application needs and/or signaling system characteristics. For example, the 2-PAM mode may be selected upon determining that signaling margins in a given system are insufficient for 4-PAM signal resolution. Also, a signaling system may be dynamically switched between 4-PAM and 2-PAM modes as signaling characteristics dictate, or to allow one or more of the component samplers of the 4-PAM sampler to be taken out of service (e.g., for calibration purposes) or to allocate one or more of the component samplers to a different function.

Figure 33:
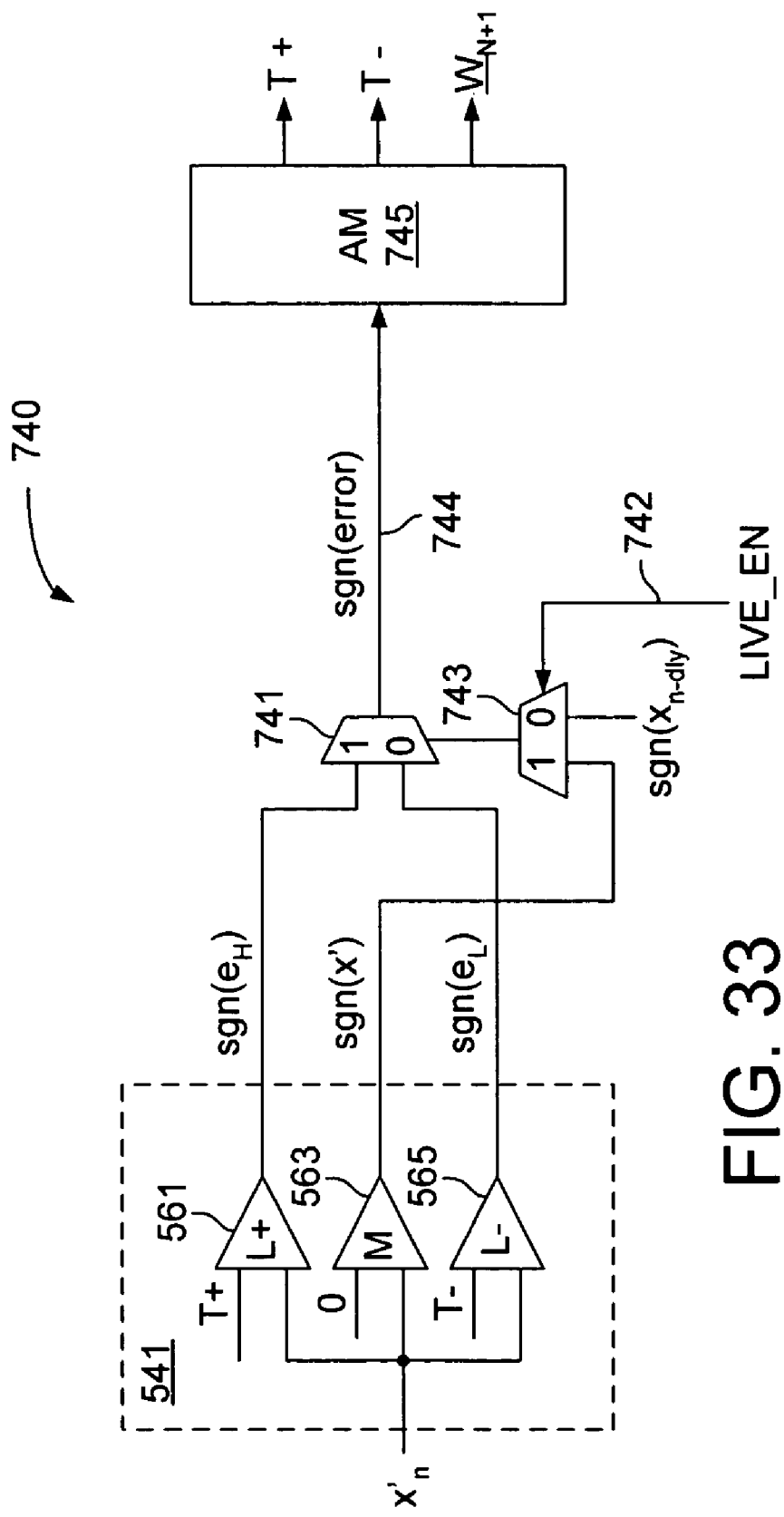
FIG. 33 illustrates a multi-sample, multi-level receiver according to an embodiment of the invention.

FIG. 33 illustrates an embodiment of a multi-sample, multi-level receiver 740 in which the positive and negative LSB samplers 561 and 565 of a multi-level sampler 541 are used as adaptive samplers when the multi-level sampler 541 is operated in a 2-PAM mode. As in the embodiment of FIG. 19, the incoming signal, $x'_n$ is supplied to all three component samplers of the multi-level sampler 541. The positive LSB sampler 561 compares the incoming signal with the T+ threshold and generates a corresponding error sign value, $sgn(e_H)$, that indicates whether the incoming 2-PAM signal exceeds the T+ threshold. The negative LSB sampler 565 similarly compares the incoming signal with the T− threshold and generates a corresponding error sign value, $sgn(e_L)$, that indicates whether the incoming signal exceeds the T− threshold. When a live enable signal 742 is in a logic '1' state, a live adaptation mode is selected within the receiver 740. In the live adaptation mode, pre-emphasis tap weights and receiver threshold levels are iteratively updated using error signals generated from live rather than predetermined data sequences). More specifically, the live enable signal 742 is provided to a control input of multiplexer 743 so that, when the live adaptation mode is selected, the multiplexer 743 outputs the MSB sample generated by MSB sampler 563 (i.e., the sign of the incoming 2-PAM signal) to the control input of multiplexer 741. Multiplexer 741, in response, selects either the positive or negative LSB sampler (i.e., 561 or 565) to provide an error sample 744 to an adaptive module 745. Thus, when the incoming 2-PAM signal is positive, the error sign value generated by the positive LSB sampler 561 is selected for use in a tap weight update operation (and T+ threshold update), and when the incoming 2-PAM signal is negative, the error sign value generated by the negative LSB sampler 565 is selected for use in a tap weight update operation (and T− threshold update). Thus, the sign of the 2-PAM sample value generated by the MSB sampler 563 is used to select the appropriate error source in each reception interval, thereby enabling the T+ and T− thresholds to be adapted to the corresponding high and low levels of the 2-PAM signal, and enabling more rapid gathering of error information for use in tap weight updates.

When the live enable signal 742 is deasserted, a batch update mode is selected, and the sign of the originally transmitted data value, $x_n$, is used to select either the positive LSB sampler 561 or negative LSB sampler 565 to provide the error sample 744 to the adaptive module. As discussed above, in batch mode, the sign of the transmitted data value may be known at the receive-side IC device, for example, by sending the data transmission sequence in advance of the batch update operation, or by storing the transmit data pattern in both the transmit- and receive-side devices. In either case, the error sign values generated by the positive and negative LSB samplers 561 and 565 may be applied in the same manner as in the live adaptation mode to adapt the T+ and T− thresholds to the upper and lower binary signal levels, and to update the pre-emphasis tap weights.

Alternative Indicator Functions

In the signaling system embodiments described above, error samples generated by an adaptive sampler within a multi-sample receiver are applied to update transmit pre-emphasis tap weights in repeated sign-sign LMS update operations. Because the adaptive sampler generates errors with respect to an expected data level, logical filtering of data is used to ensure that the incoming signal in fact corresponds to the expected data level. For example, in a binary signaling embodiment in which the adaptive sampler receives a target data level threshold that corresponds to a logic '1' data transmission, the error sample generated by the adaptive sampler is applied in a tap weight update if the corresponding data sample is a logic '1'. Similarly, in a multi-PAM signaling embodiment, the error sample is applied in a tap weight update operation if the corresponding data sample corresponds to the adaptive sampler threshold level (e.g., +⅓ the normalized signal level in the embodiment of FIG. 19). In effect, the logical filtering of incoming data samples constitutes an indicator function that may be expressed as part of the sign-sign LMS operation. For example, indicator functions for the 2-PAM (i.e., binary) and 4-PAM signaling systems described in reference to FIGS. 3 and 19 may be expressed as follows:

$I_{LMS} = (x'_n \geq 0)$, (2-PAM; DLEV adapted to logic '1' signal level);

$I_{LMS} = (T+ > x'_n \geq 0)$ (4-PAM; TA adapted to logic '11' signal level).

These indicator functions may be combined with the update expression (3) above, as follows:

$$\underline{W}_{N+1} = \underline{W}_N + I_{LMS} \cdot (\text{stepsize} * \text{sign}(e_n) * \text{sign}(\underline{x}')) \quad (9).$$

In alternative embodiments, other indicator functions may be used, and the indicator function may be omitted altogether, for example, by providing one or more additional adaptive samplers having thresholds set at all (or a subset) of the expected incoming data levels.

Figure 35:
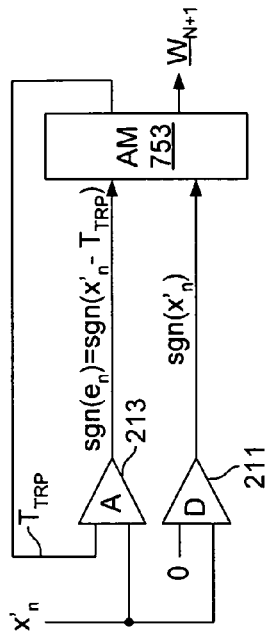
FIG. 35 illustrates a multi-sample receiver that generates a trap threshold according to an embodiment of the invention.
Figure 34:
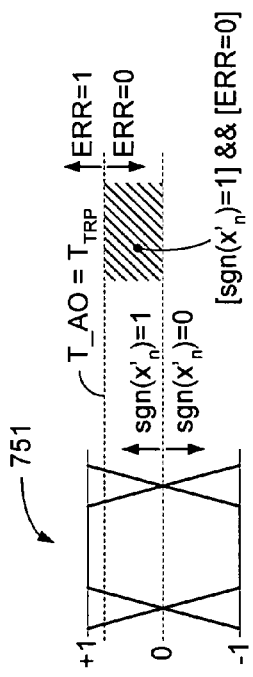
FIG. 34 illustrates an error trap zone and its relationship with an exemplary 2-PAM data waveform.

In another alternative embodiment, a trap indicator function is used to filter errors applied in tap weight update operations (i.e., update-triggering errors) according to the error magnitude and direction. Referring to the normalized 2-PAM data eye 751 illustrated in FIG. 34, update-triggering errors are limited to those errors for which the corresponding sample value is positive (i.e., $sgn(x'_n)=1$), but falls below the normalized, +1 signal level by more than a threshold amount. That is, the incoming signal level falls within a trap zone defined by the zero threshold and a trap threshold, $T_{TRP}$, and therefore corresponds to a relatively closed data eye. In one embodiment, illustrated in FIG. 35, the trap threshold, $T_{TRP}$, is adaptively generated by an adaptive module 753 according to the rate of errors falling within the trap zone, and is supplied to the adaptive sampler 213 as shown in FIG. 35. Overall, the trap indicator function may be expressed as follows:

$$(sgn(x'_n)=1) \&\& (sgn(e_n)=0) \quad (10),$$

where '&&' denotes a logical AND operation. The error sign value, $sgn(e_n)$ may be expressed as the sign of the incoming signal less the trap threshold, so that expression 10 becomes:

$$(sgn(x'_n)=1) \&\& (sgn(x'_n - T_{TRP})=0) \quad (11),$$

which corresponds to $$T_{TRP} > x'_n \geq 0 \quad (12).$$

In one embodiment, the adaptive module 753 adaptively adjusts the trap threshold to obtain a target count of update-triggering errors per unit time, referred to herein as the target error count. The target error count may be a predetermined value that is programmed within the receive-side IC device (or transmit-side IC device) during run-time configuration or during a production-time programming operation (e.g., fuse blowing operation, or storage in a nonvolatile memory), or hardwired within the receive-side IC device (or transmit-side IC device). In one embodiment, the target error count is initially set to a relatively high number so that the adaptive module 753 drives the trap threshold higher (thereby increasing the number of incoming signals that fall within the trap zone) and the trap threshold quickly converges to a stable level. After the trap threshold has converged, the target error count is lowered (e.g., one time or iteratively) so that fewer errors, having more substantial offset from the normalized +1 signal level, are counted as errors. The error samples (i.e., $sgn(x'_n - T_{TRP})$) are applied within the adaptive module 753 along with data sign values generated by the data sampler 211 in tap weight update operations.

Figure 36:
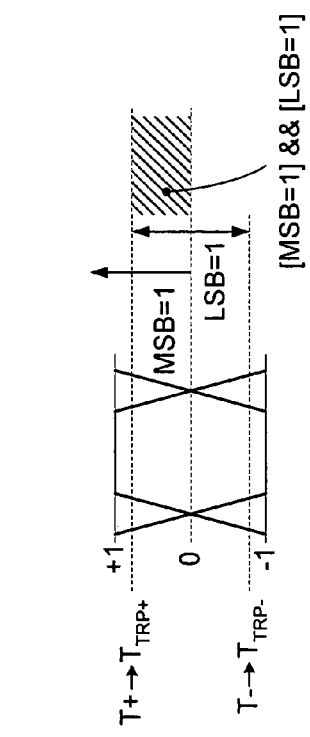
FIG. 36 illustrates an error trap zone and its relationship with an exemplary 4-PAM data waveform.

FIGS. 31 and 32 illustrate implementation of a trap zone in a dual mode 2-PAM/4-PAM signaling system. As discussed above, when operated in 2-PAM mode, the positive and negative LSB samplers 561 and 565 of a multi-level sampler 541 may be idled or used for other purposes. In the embodiment of FIG. 36, the T+ threshold is adjusted to a trap level, $T_{TRP+}$, that is offset from the normalized +1 signal level, thereby establishing a trap zone between the 0 and adjusted T+ threshold levels. Referring briefly to FIG. 21, it can be seen that signals falling between the 0 and $T_{TRP+}$ thresholds have a logic '11' sample state so the trap indicator function may be expressed as:

$$(MSB=1) \&\& (LSB=1) \quad (13).$$

Figure 37:
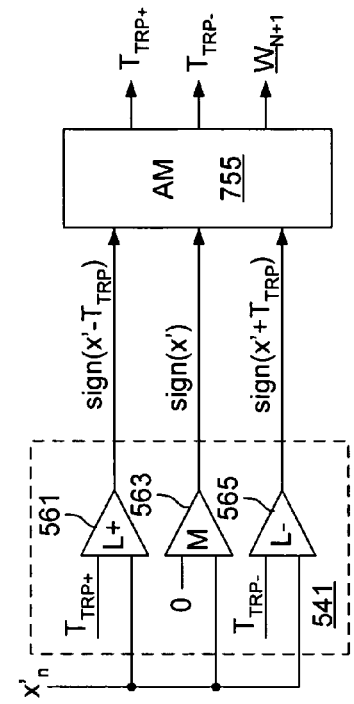
FIG. 37 illustrates a multi-sample, multi-level receiver that generates a trap threshold according to an embodiment of the invention.

In one embodiment, illustrated in FIG. 37, the $T_{TRP}+$ threshold is iteratively adjusted by an adaptive module 755 according to the rate of errors falling within the trap zone, and is supplied to the positive LSB sampler 561. In an embodiment, where the T− threshold is generated by complementing the sign of the T+ threshold, the T− threshold becomes $T_{TRP-}$, a threshold offset from the normalized −1 signal level in the same manner that $T_{TRP+}$ is offset from the normalized +1 signal level. Thus, when the multi-level sampler 541 is operated in 2-PAM mode, the otherwise unused positive and negative LSB samplers 561 and 563 may be used to detect signals falling within a trap zone, thereby enabling the transmit pre-emphasis tap weights to be updated based on errors that exceed a predetermined, or adaptively generated threshold.

System with Adaptive Transmit Pre-Emphasis and Selectable-Tap DFE

While the multi-tap transmitter 201 of FIG. 3 is effective for reducing relatively low-latency distortions such as dispersion-type ISI, other types of systematic distortions, such as signal reflections (also referred to as reflection-type ISI) may occur at latencies on the order of tens or even hundreds of signal transmission intervals. Consequently, the shift register 203 would need to be substantially deeper in order to store the tap values needed to mitigate the resulting distortions. Moreover, the precise time at which reflections and other high-latency distortions arrive at the receiver 209 are dependent upon system configuration, meaning that a one-tap-per-symbol-time equalizer, whether implemented on the transmit or receive side of the signaling system 200, would need a relatively large number of equalizing taps to be able to compensate for a reflection occurring at any time between the signal transmit time and a worst case latency. Unfortunately, each additional equalizer tap increases the parasitic capacitance of the transmit or receive circuit, degrading the frequency response of the system and potentially increasing the impedance discontinuity (and therefore the magnitude of reflected signal) at the circuit input/output. This additional capacitance further reduces the bandwidth of the existing parasitic low pass filter and may therefore increase dispersion-type ISI.

Figure 38:
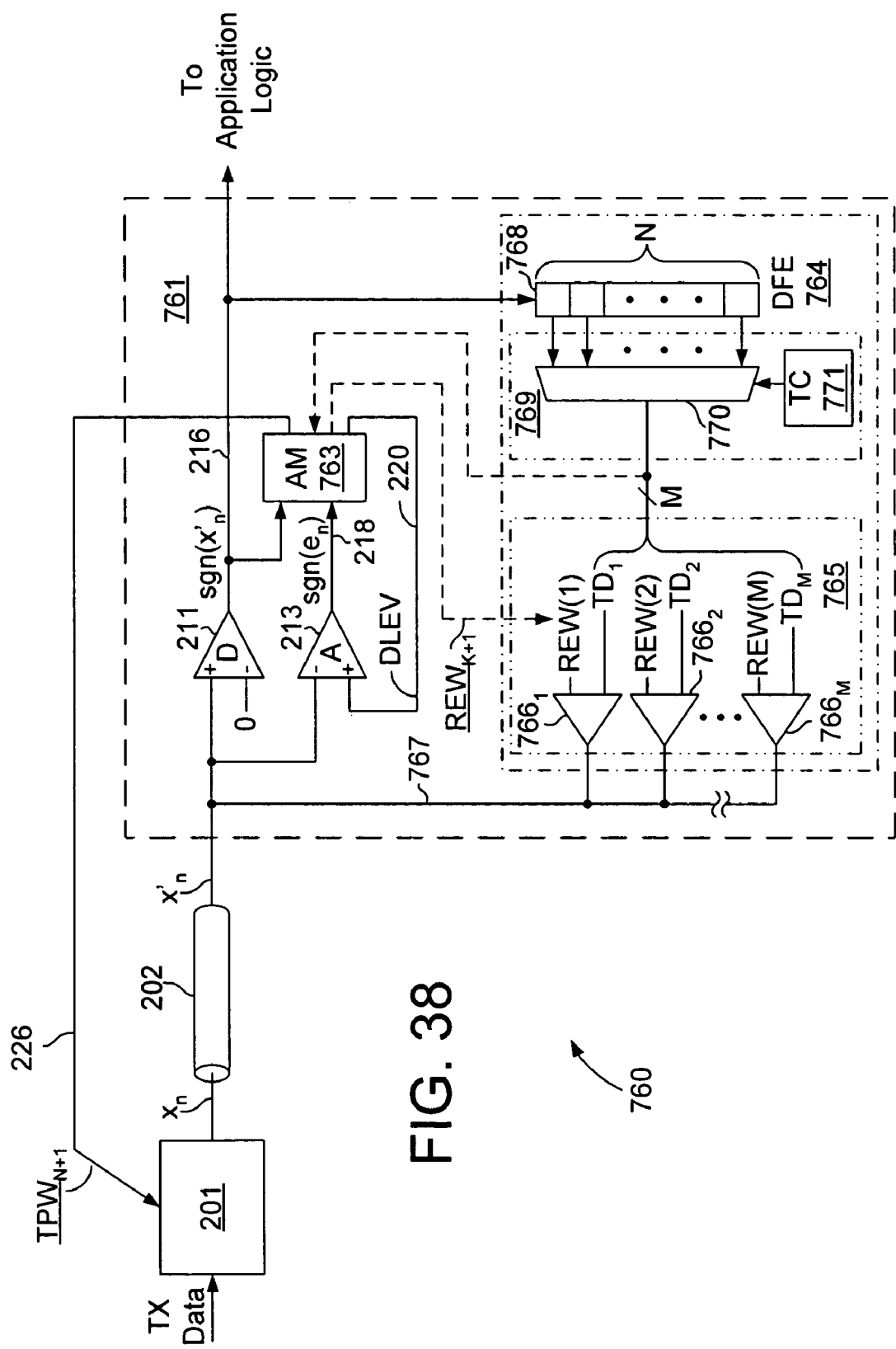
FIG. 38 illustrates an embodiment of a signaling system that includes a selectable-tap, equalizing receiver.

FIG. 38 illustrates an embodiment of a signaling system 760 that includes the multi-tap transmitter 201 and signal path 202 described in reference to FIG. 3 together with a selectable-tap, equalizing receiver 761 that enables compensation of relatively long-latency distortions with a limited number of equalizer taps. The equalizing receiver 761 includes a data sampler 211, error sampler 213 (also referred to herein as an adaptive sampler) and adaptive module 763 that operate generally as described in reference to FIG. 3 to generate a sequence of data and error samples and to iteratively update (i.e., adapt) a set of transmit pre-emphasis tap weights (TPW) 226 applied to output drivers of the multi-tap transmitter 201.

The equalizing receiver 761 additionally includes a selectable-tap decision-feedback equalizer 764 (DFE) that generates an equalizing signal 767 based on selected prior decisions of the data sampler and a set of tap weight values. In the embodiment of FIG. 38, the equalizing signal 767 is applied to the input of the data and error samplers 211 and 213 (i.e., the receiver side of signal path 202) to cancel reflections and other systematic distortions present in the incoming signal, $x'_n$. In alternative embodiments, discussed below, the equalizing signal 767 may be applied in other ways to mitigate signal distortion including, without limitation, modulating decision thresholds within the data and error samplers 211 and 213 (i.e., the thresholds used to resolve the state of the data and error samples), and level shifting a preamplified instance of the incoming signal, $x'_n$.

In the embodiment of FIG. 38, the decision feedback equalizer 764 includes a shift register 768, tap selector 769 and equalizing driver bank 765. Data samples 216 generated by the data sampler 211 are shifted into the shift register 768 to provide a storage of N data samples that reflect the historical state of the signal level on signal path 202. Each individual storage element within the shift resister 768 is referred to herein as having a sample latency that reflects the number of reception intervals that have transpired since the sample stored within the storage element was received. Thus, the N storage elements of the shift register 768 have sample latencies ranging from K to K+(N−1), with K being the sample latency of the most recently stored data sample, and K+(N−1) being the sample latency of the least recently stored data sample. In an embodiment in which the data sampler samples the incoming signal $x'_n$ and generates the corresponding data sample all in a single reception interval, the N storage elements have latencies ranging from 1 to N symbol times (i.e., K=1). Such an arrangement is assumed for ease of description in a number of embodiments described below. In all such embodiments, K may generally be any value.

The tap selector 769 includes a tap control circuit 771 and a select circuit 770 that cooperate to select a subset, M, of the N storage elements within the shift register to source data samples to the equalizing driver bank. The selected storage elements are referred to herein as tap data sources and the values stored therein as tap data values. The equalizing driver bank 765 generates the equalizing signal 767 in accordance with the tap data values delivered by the tap selector and a corresponding set of tap weights referred to herein as receive equalization tap weights (REW(1)-REW(M)). By identifying the shift register storage elements having sample latencies that correspond to the propagation latencies of reflections and other distortions, then selecting only the identified shift register storage elements as tap data sources, a relatively small number of tap data sources may be selected to form receive-side equalization taps (i.e., contributors to the equalizing signal 767). That is, even though a relatively large range of sample latencies are represented by the contents of the shift register 768, only those shift register storage elements containing data samples whose corresponding signal transmission produced the reflections arriving at the receiver input in the present reception interval need be selected to source tap data values. By selecting a relatively small number of tap data sources relative to the overall number of selectable tap data sources, high latency distortions may be reduced using only a relatively small number of equalizer taps and therefore without unduly increasing the parasitic capacitance of the equalizing receiver 761.

In the embodiment of FIG. 38, the equalizing driver bank 765 includes a set of M equalizing drivers $766_1$-$766_M$ to generate the equalizing signal 767 in accordance with the tap data values selected by the tap selector 769 and corresponding receive equalization tap weights. More specifically, each equalizing driver receives one of the tap data values, $TD_1$-$TD_M$, and a corresponding one of receive equalization tap weights, REW(1)-REW(M), and generates a component equalization signal having an amplitude according to the magnitude of the receive equalization tap weight and a polarity according to the sign of the receive equalization tap weight and the tap data value. In one embodiment, the outputs of the equalizing drivers $766_1$-$766_M$ are coupled in common to enable generation of the equalizing signal by wire summation of the component equalization signals. In alternative embodiments, active or passive summation circuitry may be provided to sum the component equalization signals. Also, rather than providing multiple equalizing drivers each to generate a component equalization signal according to a respective tap data value and receive equalization tap weight, the set of tap data values and receive equalization tap weights may be combined in the digital domain to generate a control value that is applied to a single equalizing driver 766.

Still referring to FIG. 38, the equalizing signal 767, however generated, may be applied in a number of different ways to equalize an incoming signal. In one embodiment, for example, each of the equalizing drivers $766_1$-$766_M$ within the equalizing driver bank 765 is implemented and interconnected in substantially the same manner as output driver circuit 205 of FIG. 3 or differential output driver 230 of FIG. 5. That is, the equalizing driver bank 765 outputs an equalizing signal onto the signal path 202 coincidentally with the reception interval for an incoming signal, $x'_n$, thereby affecting the level of the incoming signal as necessary to cancel reflections and other distortions present in the signal. In another embodiment, the equalizing drivers $766_1$-$766_M$ are a level shifting circuit coupled to output nodes of respective preamplifiers within the data and error samplers and operates to adjust the level of the preamplified signal prior to comparison of the preamplified signal level with a decision threshold for resolution of the corresponding sample as a logic '1' or logic '0' value. In yet another embodiment, the equalizing drivers $766_1$-$766_M$ affects the decision threshold rather than the incoming signal or preamplified instance of the incoming signal.

Distribution of Equalization Functions; Dead Range Assignment

In one embodiment, the functions of mitigating low-latency and high-latency distortions are distributed between the equalizing transmitter 201 and equalizing receiver 761, with transmit pre-emphasis being applied within the transmitter 201 to reduce low-latency distortions (e.g., dispersion-type ISI) and decision-feedback equalization being applied within the receiver 761 to reduce high-latency distortions (e.g., reflection-type ISI). The distribution of low- and high-latency equalization functions between the transmitter 201 and receiver 761 is achieved, in part, through definition of a dead range within the shift register 768. That is, storage elements within the shift register 768 that have sample latencies lower than a predetermined number of symbol times, U, are excluded from the range of selectable tap data sources, effectively establishing the sample latency of the lowest-latency selectable tap data source at U+1. In one embodiment, U is set according to the number of post-tap drivers, V, within the equalizing transmitter to prevent interference between transmit-side and receive-side equalization. That is, transmit pre-emphasis is applied within the equalizing transmitter 201 to reduce distortions resulting from symbol transmissions up to U symbol times prior to transmission of the primary output signal, and decision-feedback equalization is applied within the equalizing receiver 761 to reduce distortions resulting from symbol transmissions more than U symbol times prior to transmission of the primary output signal. For example, if four post-tap drivers are provided in the equalizing driver 201 such that U=V=4, then the lowest latency value within the selectable range, N, of stored data values is U+1=5 symbol times, and the equalizing receiver 761 is said to have a dead range of four symbol times. In the embodiment of FIG. 38, the shift register 768 may be considered to have a dead range component formed by the first U storage elements and a selectable-range component formed by the final N storage elements, with the tap selector 769 being coupled to the selectable-range component of the shift register 768 to enable selection the subset of M tap data sources therefrom. In alternative embodiments, the dead range component of the shift register 768 may include fewer than U storage elements or even zero storage elements, depending on the time required to generate a data sample within data sampler 211 and load the data sample into the shift register 768. Also, the tap selector 769 may be coupled to one or more storage elements within the dead range component of the shift register 768 to enable the size of the dead range to be programmed according to the configuration of the equalizing transmitter 201. Further, the selectable range of storage elements within the shift register 768 may overlap with the transmit pre-emphasis range (i.e., U is zero or at least less than V) so that both transmit-side and receive-side equalization is applied in the overlapping latency range.

Figure 39:
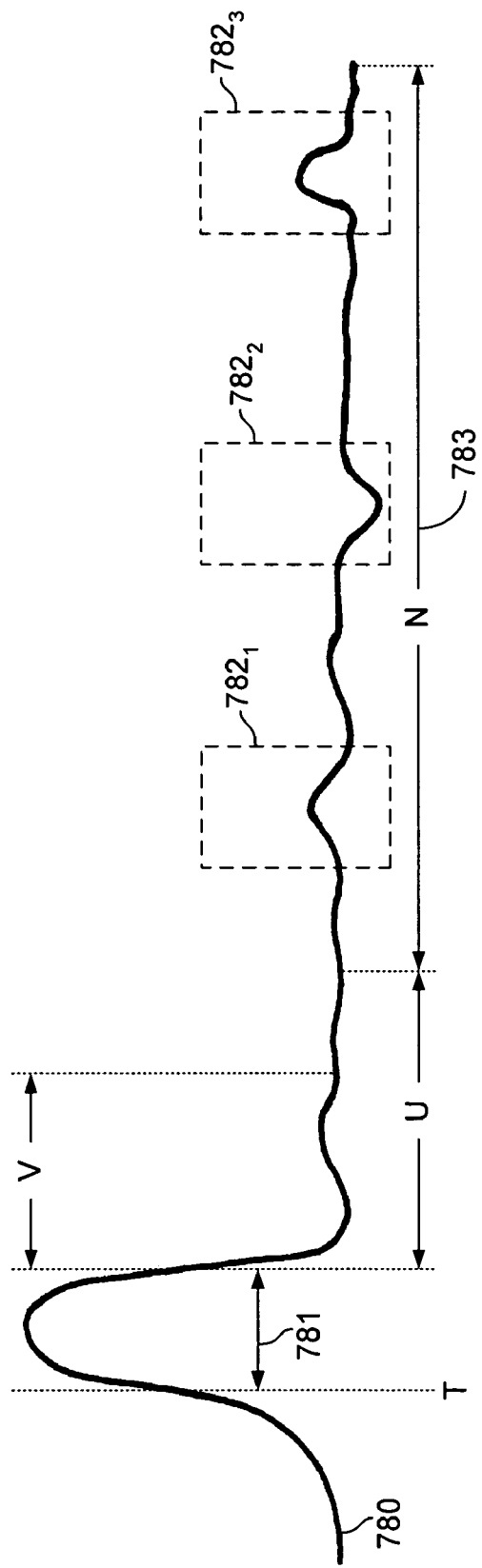
FIG. 39 illustrates the manner in which transmit pre-emphasis and selectable-tap decision-feedback equalization may be employed to reduce low-latency and high-latency distortions in the signaling system of FIG. 38.

FIG. 39 illustrates the manner in which transmit pre-emphasis in the equalizing transmitter 201 and selectable-tap decision-feedback equalization within the equalizing receiver 761 may be used to reduce low-latency and high-latency distortions in the signaling system of FIG. 38. Waveform 780 depicts the state of the signal path 202 during and after non-equalized transmission of a primary output signal to illustrate the low- and high-latency distortions that may result. The primary output signal is transmitted during a transmit interval 781 (i.e., a symbol time) that starts at time T, and the corresponding primary value is used to generate a transmit-side equalization signal (i.e., pre-emphasis signal) over a window of V symbol times following the transmit interval 781. In one embodiment, the transmit-side equalization signal is used to reduce low-latency distortions that may result from any number of sources including, without limitation, dispersion-type ISI, inductive and capacitive coupling (which may be compensated, for example, by sourcing a transmit pre-emphasis output driver with a value being transmitted on a neighboring signal path), and low-latency reflections (e.g., reflections that do not travel significantly further than the unreflected primary output signal and therefore arrive at the receiver shortly after the primary output signal). The primary output signal is sampled by the equalizing receiver 761 during a reception interval (i.e., data valid window) that corresponds to the transmit interval 781, the reception interval being shifted relative to the transmit interval according to the signal flight time between transmitter 201 and receiver 761. The selectable-tap decision-feedback equalizer 764 within the equalizing receiver 761 has or is configured with a dead range of U symbol times and a selectable range of N symbol times. Accordingly, the sampled primary value (i.e., the data sample generated during the reception interval for the primary output signal) is selectable to source an equalizer tap within the equalizing receiver 761 when the sample latency of the sampled primary value is greater than U symbol times and less or equal to U+N symbol times. Thus, during a given reception interval, previously generated data samples having sample latencies ranging from U+1 to U+N may be selected by the tap selector 769 of FIG. 38 and used to reduce high-latency distortions. Intervals $782_1$, $782_2$, and $782_3$ within interval 783 illustrate equalization windows achieved by tap data source selections within the tap control circuit. For example, interval $782_1$ corresponds to one or more tap data source selections used to equalize a distortion occurring shortly after the dead range, while interval $782_3$ corresponds to one or more tap source selections used to reduce a distortion caused by a signal transmitted dozens or even hundreds of symbol times prior to the current reception interval. As discussed above, in alternative embodiments, the sample latencies of selectable tap data sources within the equalizing receiver may overlap partially or fully with post-tap latencies so that both transmit pre-emphasis and decision-feedback equalization are applied for one or more post-tap data values and corresponding receive-side data samples.

The ability to control tap data source latencies with the tap selector 769 of FIG. 38 enables the equalization windows 782 to be shifted within the selectable range, N, as necessary to reduce high-latency distortions, thereby permitting generalized application of signaling system 760 in environments having a variety of different distortion characteristics. In one embodiment, control logic included within either or both of the integrated circuit devices that contain the equalizing transmitter 201 and equalizing receiver 761 (and/or within a separate device) may be used to configure one or more of the values of V, U and N, (i.e., the number of transmit-side post-tap equalizers, the receive-side dead range and the receive-side selectable range) according to system needs. In one embodiment, a non-volatile memory is provided to store empirically or analytically determined values of U, V and N. Alternatively, the signaling system 760 may include a separate storage (e.g., flash memory, or other non-volatile media) to store values of U, V and N (or values that may be used to determine U, V and N) that is accessible by the aforementioned control logic. In either case, when the signaling system 760 is initialized, the control logic communicates the post-tap equalizer count, V, to the equalizing transmitter 201 and the dead range and selectable range values, U and N, to the equalizing receiver 761. Alternatively, the values of U, V and N may be determined at production time (e.g., through system testing) or design time, and pre-programmed into configuration circuitry within the equalizing transmitter 201 and/or equalizing receiver 761, or fixed by design of the transmitter 201 and/or receiver 761. In such embodiments, the control logic may be omitted altogether.

Tap Data Source Selection and Tap Weight Determination

Still referring to FIG. 38, the complete configuration of the equalizing receiver 761 involves two primary operations: tap data source selection and receive equalization tap weight determination. In one embodiment, information obtained during production-time testing of the signaling system 760 is used to select the tap data sources and to determine the receive equalization tap weights. In such an embodiment, the transmit pre-emphasis tap weights may also be set based on information obtained in production-time testing or adaptively determined as discussed above in reference to FIG. 3). In another embodiment, a run-time technique referred to herein as embedded scoping is used to trace the response of the signaling system to a predetermined test waveform (e.g., pulse, step, etc.), with the response trace being used to identify the latency, polarity and amplitude of signal reflections and other systematic distortions. The tap selector 769 may then be programmed or otherwise configured to select tap data sources having sample latencies that correspond to the latencies of the identified distortions, and the receive equalization tap weights set according to the polarity and amplitude of the identified distortions. In one embodiment, tap data source selection values and receive equalization tap weight values are set in an initial calibration operation (e.g., using embedded-scoping) and not further adjusted thereafter. In alternative embodiments, calibration operations may be occasionally repeated to refine the initial receive equalization tap weight settings and/or tap data source selections. For example, such calibration operations may be carried out periodically or in response to detection of selected events such as detection of a threshold number of errors or detection of a quiet interval on the signaling path 202 or in response to an explicit signal or command to perform a calibration operation.

In another embodiment, run-time embedded scoping or production-time testing is used to determine tap data source selection and, optionally, an initial setting of receive equalization tap weights and/or transmit pre-emphasis weights), with transmit-side and receive-side equalization tap weights being adaptively updated thereafter. In yet other embodiments, receive-side tap data sources are selected in a tap search operation that does not require transmission of test waveforms or otherwise interrupt transmission of live data (i.e., live data transmission may continue during the tap search operation). An initial set of receive equalization tap weights may be determined during the tap search operation, then adaptively updated after the tap search operation is completed.

Tap Data Source Selection and Tap Weight Determination—Embedded Scoping

As discussed above, embedded scoping may be used to trace the system response to a test waveform and thereby enable determination of the latency, amplitude and polarity of various signal path distortions. The latency of a given distortion, once determined, may be used to select one or more tap data sources having corresponding sample latencies, and the amplitude and polarity of the distortion used to determine the tap weight (i.e., sign and magnitude of the tap weight) to be applied to the corresponding tap data value for generation of an equalizing signal contribution. Also, the latency of a given distortion may be used to determine whether to counteract the distortion through transmit pre-emphasis or receive-side equalization (or both), and the overall range of latencies for detected distortions may be used to determine an appropriate dead range for the receive-side equalizer.

Embedded scoping involves repeated transmission of a sequence of data values, generation of a corresponding sequence of receive-side data samples for each repeated transmission (i.e., by capturing the transmitted sequence at the receiver), and comparison of each data sample sequence with a known-valid copy of the transmitted sequence of data values to confirm error-free sample generation. With each receive-and-confirm iteration, the decision threshold (e.g., a voltage level or difference between voltage levels) used to resolve the data sample state is offset from a nominal or calibrated level by a progressively larger amount until a symbol in the sequence no longer matches the expected value. The offset in the decision threshold at which the failure occurs is referred to herein as a pass/fail offset and represents a measure of the signal level at the sampling instant at which the failure occurred. Thus, by sweeping the decision threshold through a range of thresholds until the pass/fail offsets for each symbol in the symbol sequence have been detected, a sample plot for the incoming signal may be developed. Further, by sweeping the sampling clock signal through an incremental sequence of phase offsets, and determining the pass/fail offset at each phase offset, a complete trace of the incoming signal may be generated. Also, the granularity and start stop points of the phase offsets and/or threshold steps (e.g., steps in voltage or current) may be controlled (e.g., by configuring a programmable circuit or register) to enable the waveform trace to be constrained to selected points of interest in the incoming signal (e.g., $\pm N°$ from an intended sampling instant, N representing a sweep angle).

Figure 40:
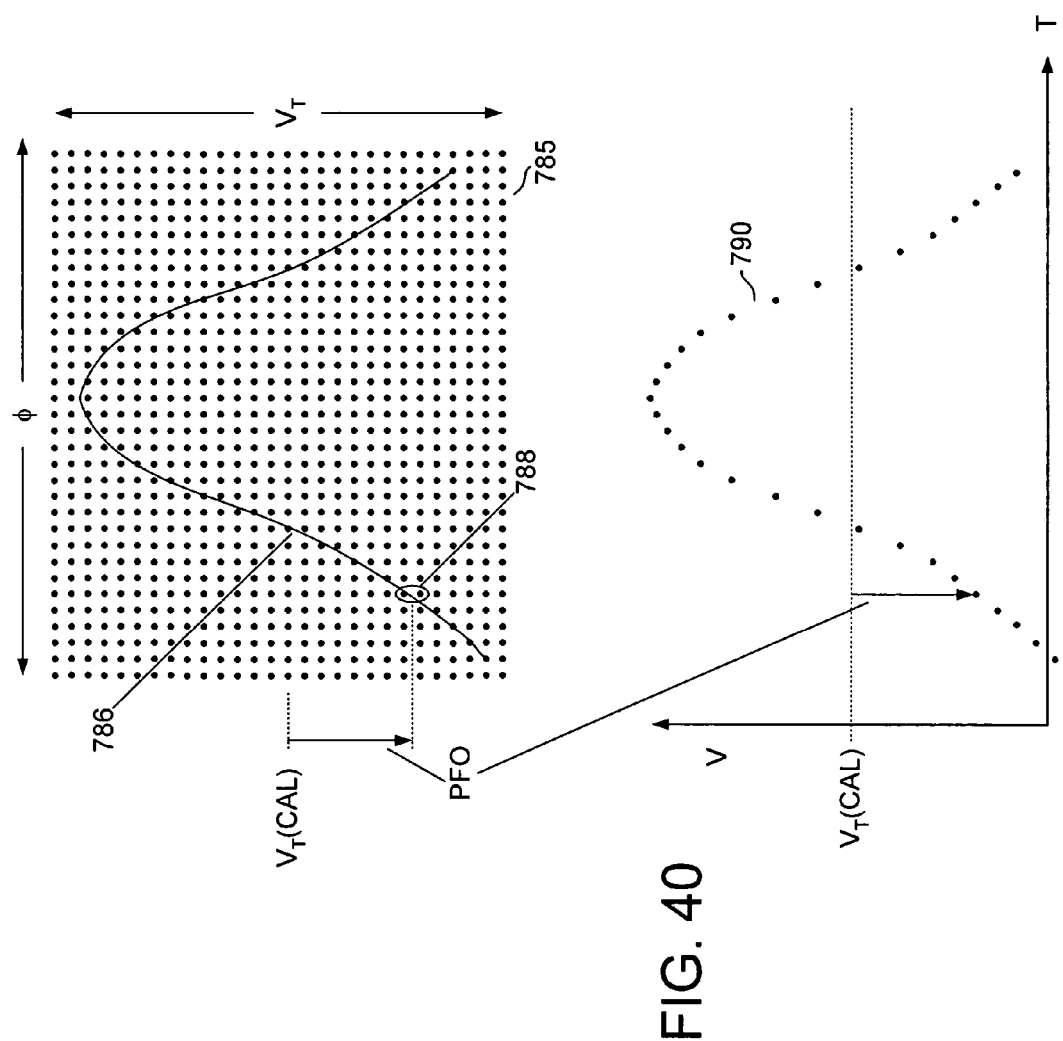
FIG. 40 illustrates the use of embedded scoping to generate a time-based trace of an incoming data signal.

FIG. 40 illustrates the use of embedded scoping to generate a time-based trace 790 of an incoming data signal 786. The range of decision thresholds applied to sample the incoming signal 786 is indicated by $V_T$, and the range of phase offsets at which the signal is sampled is indicated by $\phi$. Each sample point within the sweep is indicated by a respective dot within a grid of sample points 785. Note that the sweep may be obtained by stepping the decision threshold through the range of $V_T$ values for each value of $\phi$, or, alternatively, by stepping the clock phase through the range of $\phi$ values for each value of $V_T$. Also, both the decision threshold and the clock phase may be incremented in each receive-and-confirm iteration.

Still referring to FIG. 40, reference numeral 788 indicates a pair of sample values for which a pass/fail condition is detected. A corresponding pass/fail offset (PFO) is determined according to the difference between the calibrated decision threshold level ($V_T(CAL)$) and the average of the decision threshold offsets that yielded the passing and failing data samples, and recorded as a measure of the incoming signal. That is, the pass/fail offset may be used to establish a data point within the trace 790 as shown. After sweeping through all the sample points within the grid 785 (which sweep may be repeated numerous times to obtain an average and to discard statistical outliers), a measure of the incoming signal is obtained as illustrated graphically by the trace 790.

Embedded scoping has a number of benefits over traditional signal measurement techniques. First, because the technique is non-invasive (i.e., no probe contact), the electrical characteristics of the system under test are unaltered, thereby yielding potentially more accurate measurement results. Also, the trace is generated from the perspective of the receive circuit itself, meaning that any non-ideal characteristics of the receive circuit are accounted for in the resulting signal trace information. Finally, because all components needed for embedded scoping may be included within a finished signaling system, embedded scoping may be used to perform numerous run-time analyses, including determining the latency and amplitude of reflections and other distortions within the signaling system.

Figure 41:
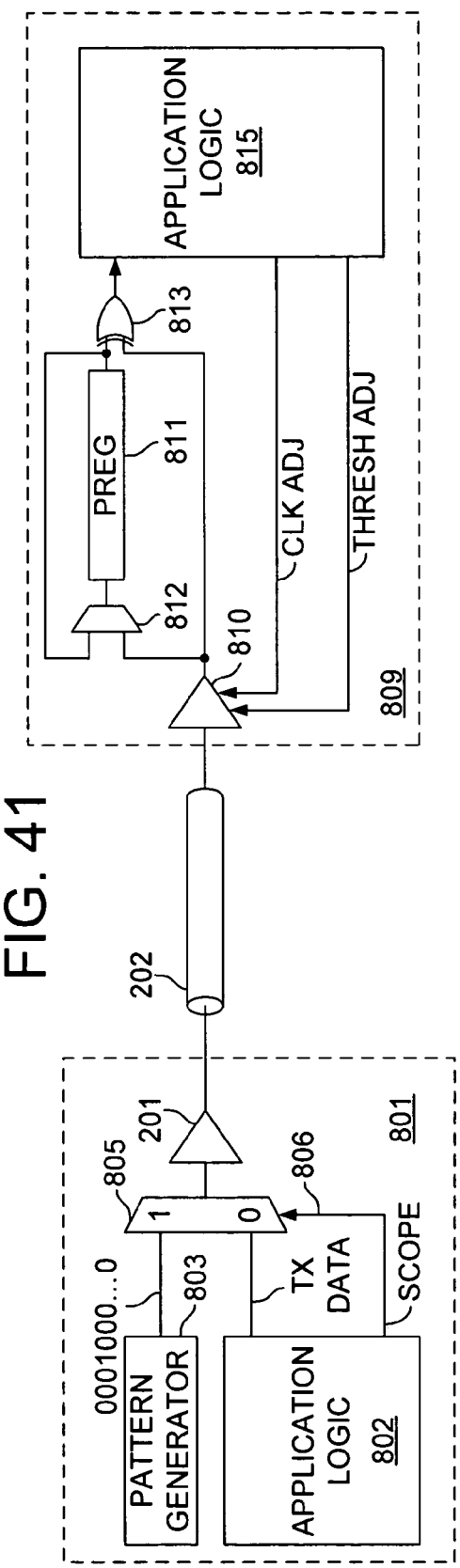
FIG. 41 illustrates a signaling system having embedded scoping circuitry that may be used to determine equalizer tap selections and tap weights.

FIG. 41 illustrates an embodiment of a signaling system 800 in which a transmit device 801 and receive device 809 include embedded scoping circuitry that may be used to determine equalizer tap selections and tap weights. The transmit device 801 includes a pattern generator 803, data selector 805, equalizing transmitter 201 and application logic 802. The application logic 802 performs the core function of the transmitting device (e.g., signal processing, instruction processing, routing control, or any other function) and provides transmit data (TX DATA) to a first input of the data selector

805. During normal operation, the application logic 802 outputs a logic low scope signal 806 (SCOPE) to the data selector 805 to select the transmit data to be passed to the equalizing transmitter 201 for transmission to the receive device 809 via signal path 202 (which may be include or be connected to numerous sources of discontinuity such as connectors, vias, stubs, etc.). During a scoping mode of operation, the application logic 802 drives the scope signal 806 high to enable a scoping mode of operation within the transmit device 801. In the scoping mode, the data selector 805 selects a repeating sequence of data values (e.g., a repeating pulse data pattern such as: 00100 . . . 00100 . . . 00100 . . . , though other patterns may be used) generated by the pattern generator 803 to be transmitted to the receive device 809. Transmit pre-emphasis may be disabled within the equalizing transmitter 201 while in scoping mode and/or updates to the transmit pre-emphasis tap weights may be disabled.

The receive device 809 includes an equalizing receiver 810 to sample the incoming data signal, a pattern register 811 to store a local version of the data samples captured in response to the incoming data signal, a multiplexer 812 to enable the pattern register 811 to be switched between load and barrel-shifting modes, a XOR gate 813 to compare the stored data sample sequence with subsequently generated data sample sequences, and application logic 815 (or other logic) to generate a clock adjust signal (CLK ADJ) and decision threshold adjust signal (THRESH ADJ) to sweep the sampling clock signal and decision thresholds used within the equalizing receiver 810 through their scoping ranges. The application logic 815 additionally builds a trace record (i.e., data indicative of the waveform produced on the signaling path 202 in response to transmission of the test data pattern) based on the output of XOR gate 813.

When the receive device 809 is in a scoping mode of operation, the multiplexer 812 is initially set to load the pattern register 811 with the output of the equalizing receiver 810. After a desired sequence of data samples (e.g., a pulse data pattern such as 0001000000000000) is shifted into the pattern register 811, the multiplexer 812 is set to enable the barrel-shifting mode of the pattern register 811. That is, the multiplexer 812 selects the output of the pattern register 811 to be fed back to the input of the pattern register 811 so that the contents of the pattern register 811 are continuously rotated through the pattern register 811 (i.e., a barrel shifting operation). By this arrangement, the sequence of data samples loaded into the pattern register 811 is repeatedly output, bit by bit, to a first input of the XOR gate 813. The data sample sequence received by the equalizing receiver 810 is input to a second input of the XOR gate 813 so that the received sample sequence is compared, bit by bit, with the sample sequence stored within the pattern register 811. By selecting the length of the repeatedly transmitted sequence of data values to match the storage size of the pattern register 811, the pattern register contents are repeatedly compared with a newly received version of the same data sample sequence (i.e., putatively the same sequence of data samples) to establish iterative receive-and-confirm operation. Any sampling error will result in a mismatch between the sampled data value and the corresponding value within the pattern register and therefore, when compared by XOR gate 813, will result in an error signal being output from the XOR gate 813 to the application logic 815. The application logic 815 may then record the threshold offset and clock phase offset at which the error occurred to a signal level for a timing offset within a waveform trace.

Figure 42:
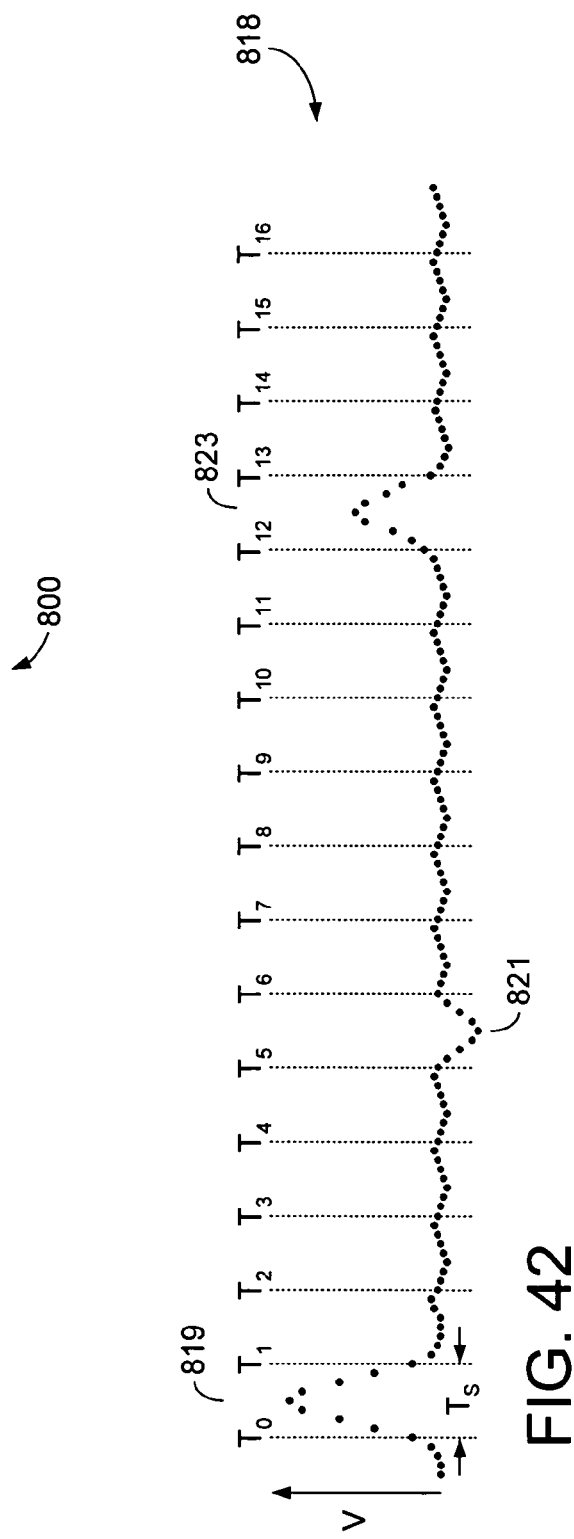
FIG. 42 illustrates an exemplary waveform trace of a pulse data sequence captured by an embedded scope within the signaling system of FIG. 41.

FIG. 42 illustrates an exemplary waveform trace 818 of a pulse data sequence captured by an embedded scope within the signaling system of FIG. 41. As shown, a primary pulse 819 arrives at the receiver at symbol time, $T_0$; a negative reflection 821 of the primary pulse appears at symbol time $T_5$ and a positive reflection 823 appears at symbol time $T_{12}$. Thus, referring to FIG. 41, the application logic 815 within receive device 809 may store configuration information within the equalizing receiver 810 (e.g., within the tap control circuit) to select tap data sources having sample latencies of five and twelve symbol times. Alternatively, the application logic 815 may directly output tap select signals to select the desired tap data sources. The application logic 815 may also generate receive-side tap weights according to the amplitude and polarity of the distortions 821 and 823, and output the tap weights to the equalizing receiver 810.

Figure 43:
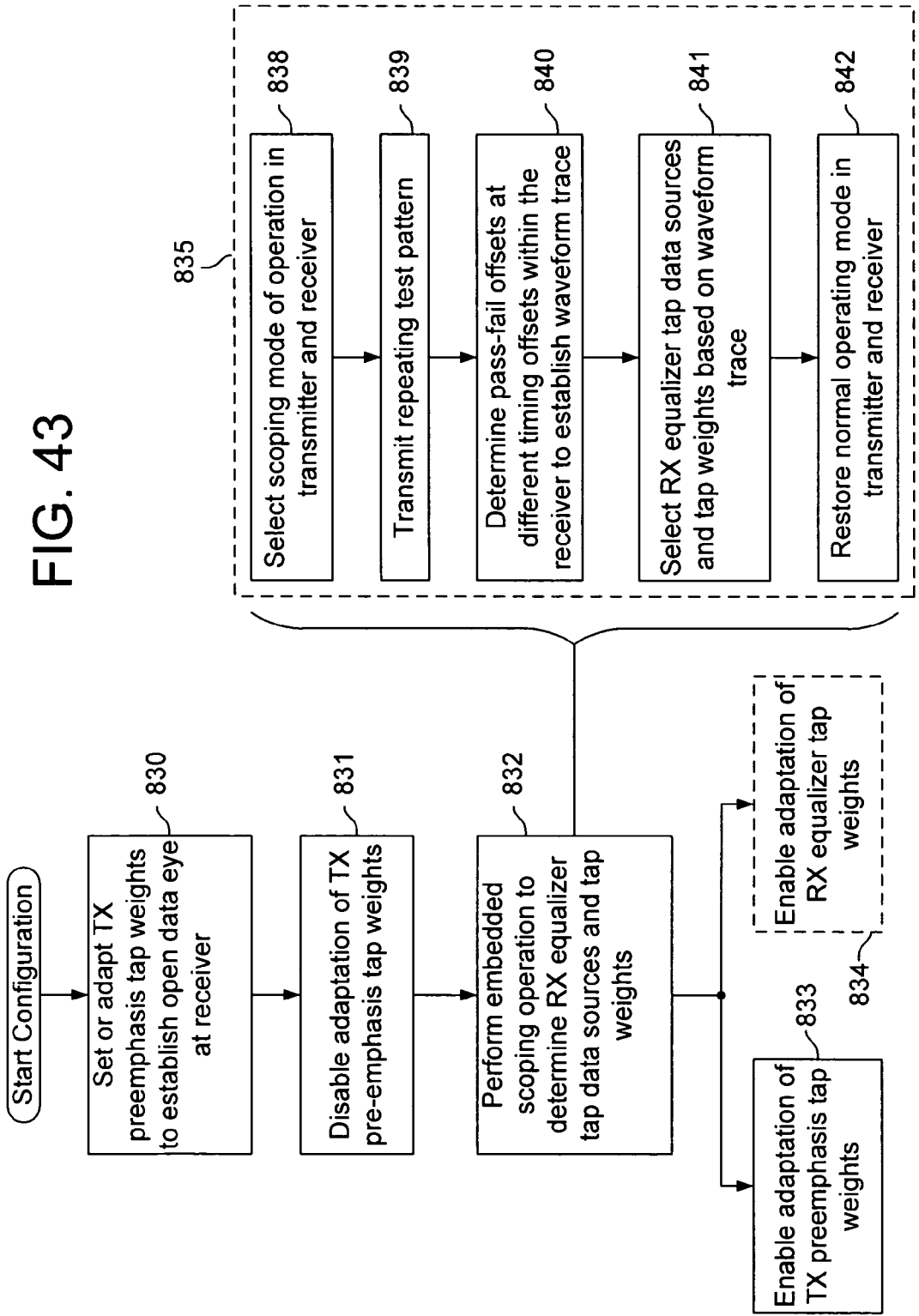
FIG. 43 is a flow diagram for establishing pre-emphasis tap weights, receiver tap data source selections and receive equalization tap weights within the signaling system of FIG. 41.

FIG. 43 is a flow diagram for establishing pre-emphasis tap weights, receiver tap data source selections and receive equalization tap weights within the signaling system 800 of FIG. 41. At block 830, transmit pre-emphasis tap weights are set to an initial value and/or adaptively updated to establish an open data eye at the equalizing receiver 810 using the techniques described above. At block 831, adaptation of transmit pre-emphasis tap weights is disabled. Adaptation of the data level threshold used, for example, for error sample generation within the equalizing receiver 810 may also be disabled. At block 832, embedded scoping is enabled within the equalizing transmitter 201 and equalizing receiver 810 to enable selection of tap data sources and determination of tap weights within the decision feedback equalizer. As shown in detail 835, the embedded scoping operation is initiated by selecting the scoping mode of operation within the transmitter and receiver (838), transmitting and receiving a repeating test pattern at different threshold voltage offsets (839), determining the pass-fail offsets at different timing offsets within the receiver to obtain a waveform trace (840), then selecting the receive equalizer tap data sources and assigning receive equalizer tap weights based on distortions indicated within the waveform trace (841). After the tap data sources are selected and receive equalizer tap weights are assigned at 841, normal operating mode is restored in the receiver and transmitter (842) to complete the embedded scoping operation. After the embedded scoping operation of block 832 is completed, adaptation of transmit pre-emphasis tap weights is re-enabled at block 833. Adaptation of the data level threshold (i.e., the decision threshold for the error sampler) may also be re-enabled at block 833.

In one embodiment, the tap data source selection and receive equalizer tap weight values determined in the embedded-scoping operation are not further adjusted, or are adapted occasionally in offline calibration operations. In an alternative embodiment, indicated in FIG. 43 by dashed block 834, receive equalizer tap weights are adaptively updated. More specifically, as shown in FIG. 38, the adaptive module receives tap data values from the selected tap data sources (as shown by the dashed line designated $\underline{REW}_{K+1}$) and iteratively generates updated receive equalization tap weights (REW). In one embodiment, a sign-sign LMS update is applied to the receive equalization tap weights as follows:

$$\underline{REW}_{K+1} = \underline{REW}_K + \text{stepsize} * \text{sign}(e_n) * \text{sign}(\underline{x}'_{L(tap)}) \qquad (14),$$

where subscript "L(tap)" denotes the sample latency of the tap data sources that contain data samples sign(x'). Thus, expression (14) corresponds to the following scalar expressions:

$$REW_{K+1}(1) = REW_K(1) + \text{stepsize} * \text{sign}(e_n) * \text{sign}(x'_{L(Tap\ 1)})$$

$$REW_{K+1}(2)=REW_K(2)+ \text{stepsize}*\text{sign}(e_n)*\text{sign}(x'_{L(Tap\,2)})$$

...

$$REW_{K+1}(M)=REW_K(M)+ \text{stepsize}*\text{sign}(e_n)*\text{sign}(x'_{L(Tap\,M)})$$

Other update expressions may be implemented and used to update the receive equalization weights in alternative embodiments.

Figure 44:
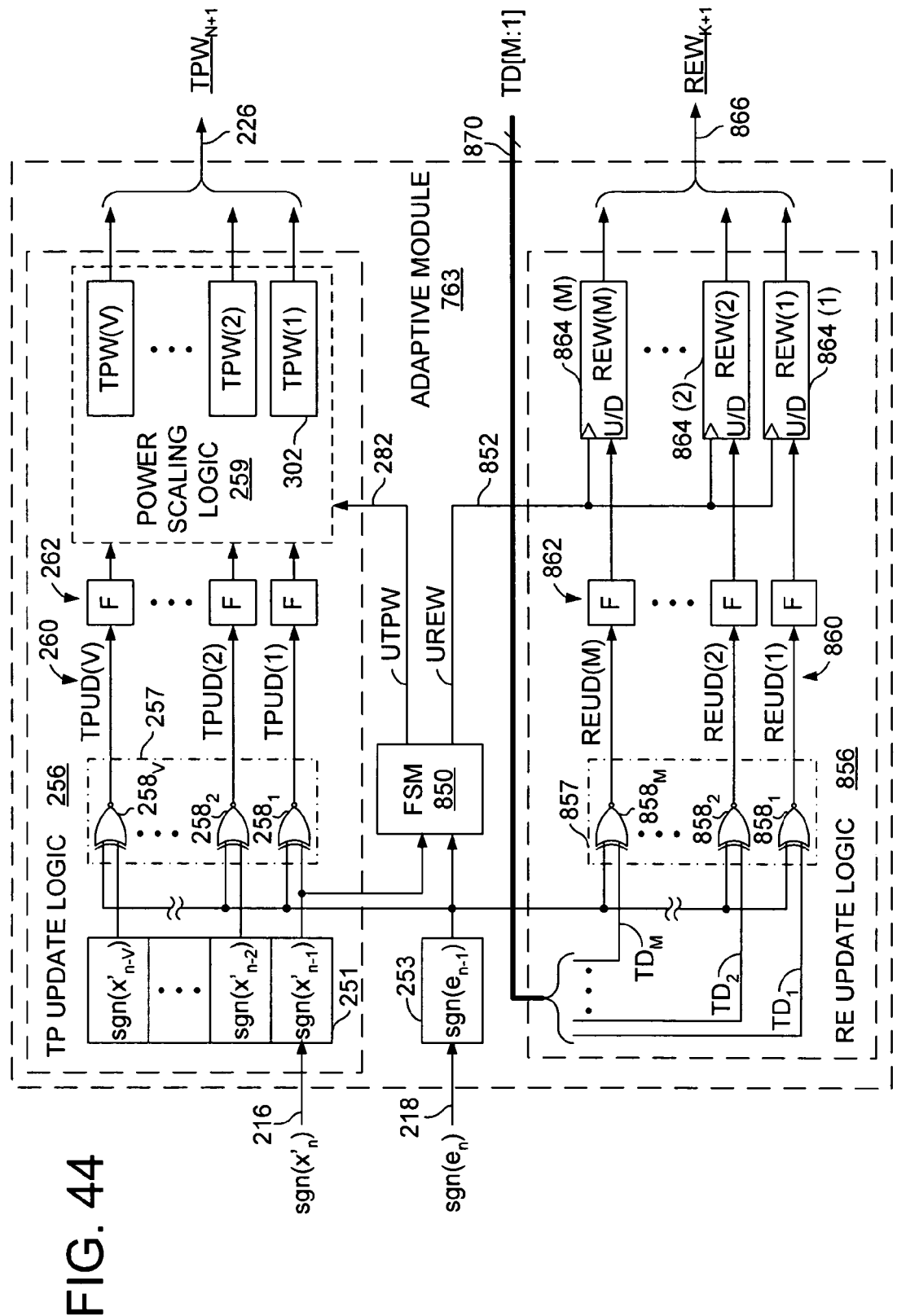
FIG. 44 illustrates an embodiment of adaptive module that may be used in the equalizing receiver of FIG. 38 to generate updated transmit pre-emphasis tap weights and receive equalization tap weights.

FIG. 44 illustrates an embodiment of adaptive module 763 that may be used in the equalizing receiver 761 of FIG. 38 to generate updated transmit pre-emphasis tap weights 266 ($\underline{TPW_{N+1}}$) and receive equalization tap weights 866 ($\underline{REW_{K+1}}$). The adaptive module 763 includes an error sign register 253 to store an error sample (i.e., error sign value $e_{n-1}$), finite state machine 850, transmit pre-emphasis update logic 256 and receive equalization update logic 856. Though not specifically shown, the adaptive module 763 may additionally include circuitry as shown in FIG. 7 for adaptive generation of one or more data level thresholds and to control offset cancellation within the data and error samplers 211 and 213 and any other samplers included within the embodiment of FIG. 38 (e.g., one or more edge samplers used for clock data recovery). Also, the adaptive module may include additional circuitry for generation of transmit pre-emphasis tap weights and receive equalization tap weights for multi-level input signals as in adaptive module 600 of FIG. 22.

The transmit pre-emphasis update logic 256 includes a data sign register 251 and sign multiplier 257 (the sign multiplier itself including exclusive NOR gates $258_1$-$258_V$) which operate generally as described above in reference to FIG. 7 to generate a set of transmit pre-emphasis update values 260 (i.e., TPUD(1)-TPUD(V)). In one embodiment, the transmit pre-emphasis update values are filtered in filter 261 before being supplied to power scaling logic 259. As discussed above in reference to FIGS. 7-9, the power scaling logic 259 adjusts the transmit pre-emphasis tap weights 302 (i.e., TPW(1)-TPW(V)) in response to an update signal 282 asserted by the finite state machine 850 (i.e., update transmit pre-emphasis weight, UTPW) and in accordance with the transmit pre-emphasis update values 260, scaling the individual transmit pre-emphasis tap weights 302 to avoid exceeding the power constraint of the equalizing transmitter 201. As discussed in reference to FIG. 7, the finite state machine 850 may assert the update signal 282 upon determining that the data sign register 251 is fully loaded (or fully reloaded) with a set of data samples, and that the most recently stored data sample, $x'_{n-1}$, has a state that corresponds to the data level threshold generated by the adaptive module. In the embodiment of FIG. 44, the transmit pre-emphasis tap weights 302 are maintained within the adaptive module 763 and supplied to the equalizing transmitter through a back channel (e.g., a dedicated signaling path or out-of-band signaling over signal path 202). In an alternative embodiment, the transmit pre-emphasis tap weights 302 are maintained within the equalizing transmitter 201 itself, with the filtered, scaled transmit pre-emphasis update values 260 being provided to the transmit circuit. Power scaling may also be performed within the equalizing transmitter 201 rather than the adaptive module 763.

The receive equalizer update logic 856 includes a sign multiplier 857, filter 862 and receive equalization tap weight counters $864_1$-$864_M$. The sign multiplier 857 includes a bank of M exclusive NOR gates, $858_1$-$858_M$, each coupled to receive the error sample stored within register 253 and a respective one of the M tap data values 870 (i.e., $TD_1$-$TD_M$) selected by the tap selector 769 of FIG. 38. Each of the exclusive NOR gates $858_1$-$858_M$ effectively multiplies the sign of the error sample, $e_{n-1}$, with the sign of a corresponding one of tap data values $TD_1$-$TD_M$ to generate a respective one of receive equalizer update values 860 (REUD(1)-REUD(M)). That is, each exclusive NOR gate 858 outputs a logic '1' update if the error and tap data values have the same state (i.e., same sign) and a logic '0' output if the error and tap data values have a different state. In one same-state case, the tap data value and error sample are both '1', indicating that the contribution of the logic '1' tap data value to the equalization signal should be increased to raise the incoming signal level nearer to the data level threshold (i.e., the logic '1' error sample indicate that the incoming signal is lower than the data level threshold used to generate the error sample). Similarly, in the other same state-case, the tap data value and error sample are both '0', indicating that the contribution of the logic '0' tap data value to the equalization signal should be increased to lower the incoming signal nearer to the data level threshold. Conversely, both of the different-state cases indicate that the contribution of the tap data value to the equalization signal should be reduced. Accordingly, the receive equalization update values 860 are filtered in filtering elements 862 (which may be omitted in alternative embodiments), then supplied to up/down inputs of the tap weight counters $864_1$-$864_5$ to signal respective count-up and count-down adjustments.

As in the adaptive module of FIG. 7, the most recently stored data sample and error sample, $\text{sgn}(x'_{n-1})$ and $\text{sgn}(e_{n-1})$, are provided to the finite state machine 850 which, in turn, asserts an update receive equalization weight signal (UREW) 852 (and may also assert the update transmit pre-emphasis weight signal at the same or different times) to enable the tap weight counters $864_1$-$864_M$ to increment or decrement the receive equalization tap weights in accordance with the filtered versions of receive equalization update signals 860. In the embodiment of FIG. 44, the finite state machine 850 asserts the UREW signal 852 upon determining that the data sign register 251 is fully loaded (or fully reloaded) with a set of data samples, and that the most recently stored data sample, $x'_{n-1}$ has a state that corresponds to the data level threshold generated by the adaptive module. That is, if the data level threshold 220 is adapted to the level of logic '1' data, then the error sample, $e_{n-1}$, has meaning with respect to $x'_{n-1}$ if $x'_{n-1}$ is positive (i.e., the data sample is a logic '1') and is ignored if $x'_{n-1}$ is negative (i.e., logic '0'). Conversely, if the data level threshold 220 is adapted to the level of logic '0' data, then the error sample, $e_{n-1}$, has meaning with respect to $x'_{n-1}$ if $x'_{n-1}$ is negative and is ignored if $x'_{n-1}$ is positive. Further, two error samplers may be provided to enable adaptive generation of positive and negative data level thresholds. Also, in a multi-level signaling embodiment, an error sampler may be provided to generate error information for each different data level.

Still referring to FIG. 44, in an embodiment in which the tap weight counters 864 are to be selectively updated (e.g., in a tap search in which one or more tap weights are adapted while others are held constant), multiple update signals 852 may be output from the finite state machine to respective tap weight counters 864, thereby enabling some receive equalization tap weights to be adjusted while others are held constant. The receive equalization tap weights maintained within the tap weight counters 864 are supplied to respective equalizing drivers within a decision-feedback equalization circuit, for example, as shown in FIG. 38. In an alternative embodiment, described in reference to FIG. 47, the tap weight counters are maintained within the tap selector (e.g., element 769 of FIG. 38) with the receive equalization signals 860 (i.e., REUD[M:1] or filtered instances of such signals) and update signal 852 being output from the adaptive module 763 to control receive equalization tap weight updates. Also, though not specifically shown in FIG. 44, one or more clock signals (e.g., a sampling clock signal) may be provided to the adaptive module 763 to provide a timing reference for state transitions within the finite state machine 850 and other timing operations.

Tap Search Operations

Figure 45:
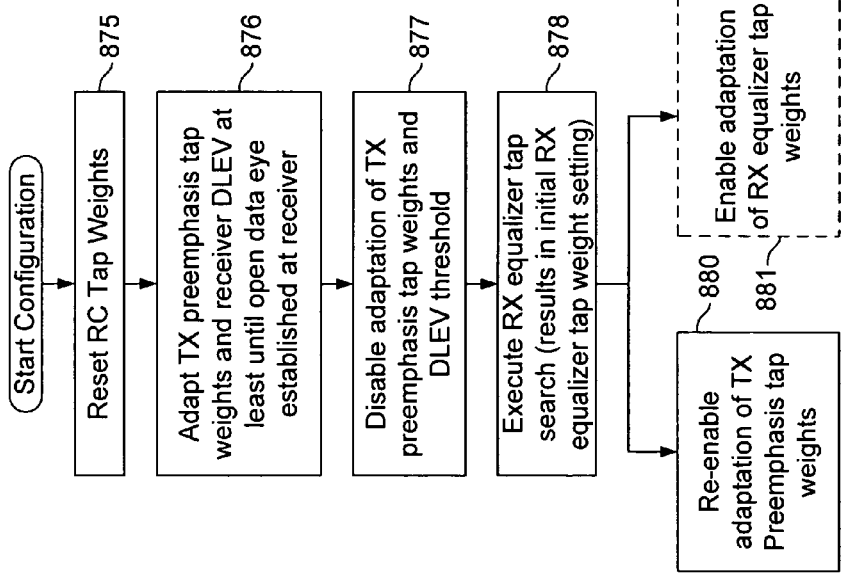
FIG. 45 illustrates an exemplary configuration operation that may be executed during transmission of live data to establish transmit pre-emphasis tap weights and receive equalization tap data source selections and tap weights.

FIG. 45 illustrates an exemplary configuration operation that may be executed during transmission of live data to establish transmit pre-emphasis tap weights and receive equalization tap data source selections and tap weights. At block 875, reflection cancellation tap weights are reset (e.g., zeroed), effectively disabling receive-side equalization. At block 876, the transmit pre-emphasis tap weights and data level threshold (i.e., receive side decision threshold) are adapted (e.g., as described in reference to FIG. 7) at least until an open data eye is established at the receiver and, optionally, until the transmit pre-emphasis tap weights and/or data level threshold converge to stable values. At block 877, adaptation of the transmit pre-emphasis tap weights is disabled (e.g., by asserting or deasserting a control signal provided to the finite state machine 850 of FIG. 44) and, at block 878, a receive equalizer tap search is executed. Execution of the tap search results in selection of M tap data sources (M being an integer greater than zero) to source data samples to the equalizing driver bank and, optionally, the adaptive module. Execution of the tap search at block 878 may also yield receive equalizer tap weight settings that correspond to the selected tap data sources. In that case, the nonzero receive equalizer tap weight settings tends to change the signaling level perceived by the equalizing receiver. In one embodiment, the receive equalization tap weights generated during the tap search at block 878 that are not further adjusted (or that are only adjusted during occasional calibration operations). In such an embodiment, adaptation of the transmit pre-emphasis tap weights is re-enabled at block 880, while the receive equalization tap weights are held steady or adjusted in occasional calibration operations. In another embodiment, the receive equalization tap weights generated during the tap constitute initial values that are adaptively adjusted thereafter. In that case, in addition to re-enabling adaptation of the transmit pre-emphasis tap weights at block 880, adaptation of receive equalization tap weights is enabled at block 881. In yet another embodiment, the receive equalization tap weights are reset after the receive equalizer tap search at block 878, and thereafter are adapted at block 881.

Figure 46:
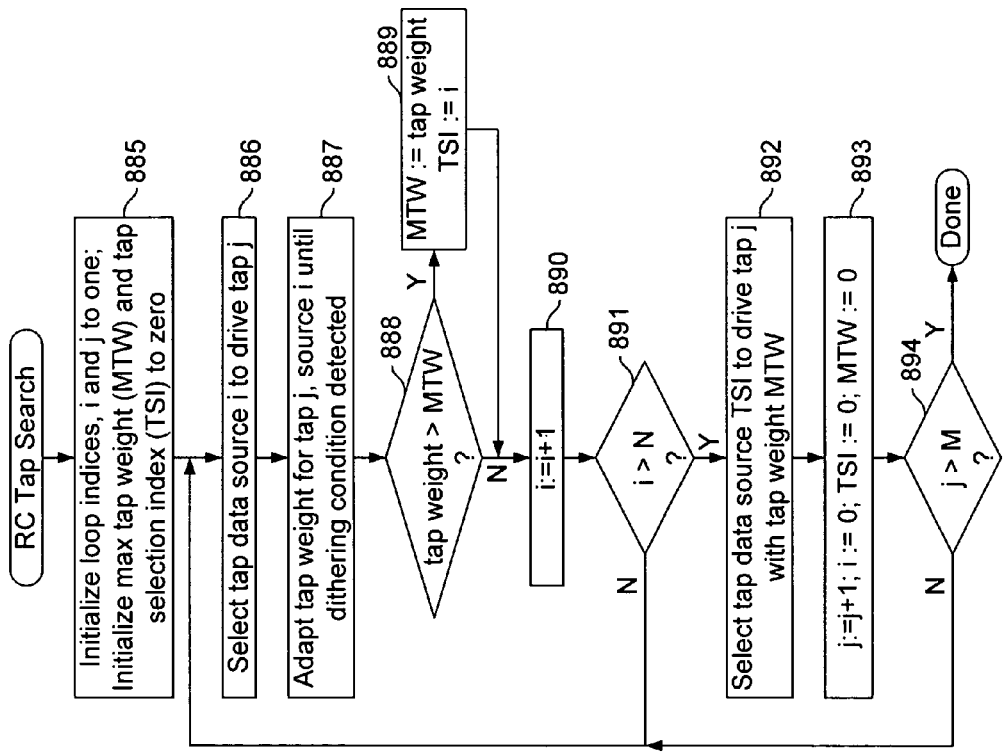
FIG. 46 illustrates an exemplary receive equalizer tap search.

FIG. 46 illustrates an exemplary receive equalizer tap search. At block 885, tap data source index 'i', equalizer tap index 'j' are initialized to one (1), and maximum tap weight (MTW) and tap selection index (TSI) values are initialized to zero. At block 886, tap data source i is selected to drive equalizer tap j which, in the initial iteration, results in equalizer tap one (i.e., equalizing driver 766$_1$ in FIG. 38) being sourced by the data sample stored in the least latent tap data source. At block 887, the tap weight for equalizer tap j is adapted until a convergence condition is reached (herein, reaching a convergence condition refers to, for example, detecting a tap weight dithering condition, adjusting a tap weight a predetermined number of times or other indication that the tap weight search should be halted) while the tap weights for the remaining equalizer taps are held constant. At decision block 888, the tap weight for equalizer tap j is compared with the maximum tap weight value (MTW). If the tap weight is greater than MTW, the tap weight is recorded as the new MTW value (i.e., MTW:=tap weight, where ':=' indicates assignment), and the tap data source index, i, is recorded as the tap source index (TSI) that corresponds to the new maximum tap weight. At block 890, the tap data source index, i, is incremented to select the next tap data source. If, at decision block 891, the incremented tap data source index is determined not exceed the number of tap data sources, N, the operations at blocks 886, 887, 888, 890 and, if necessary, 889 are repeated for the new tap data source index. By this operation, each of the N tap data sources is selected one after another to source equalizer tap j, thereby enabling an adaptive tap weight for each of the N tap data sources. After the all the tap data sources have been selected and used to generate corresponding tap weights, the MTW value represents the maximum tap weight generated during iteration of blocks 886-890, and the TSI value indicates the tap data source that yielded the maximum tap weight. Because a tap data source having a sample latency that corresponds to the latency of a large distortion should yield a larger tap weight than a tap data source having a sample latency that corresponds to the latency of a small distortion, it may be reasoned that the tap data source that yielded the maximum tap weight (i.e., the tap data source indicated by the TSI value) has a sample latency that corresponds to the latency of the largest distortion within the selectable range of tap latencies. Accordingly, at block 892, the tap data source indicated by the TSI value is selected to drive equalizer tap j and the MTW value is loaded into the corresponding tap weight register (e.g., one of tap weight counters 864 of FIG. 44) to establish an initial tap weight setting. By this operation, after each progression through all the tap data sources, i, one of the j equalizer taps is assigned the tap data source that yielded a maximum tap weight in the preceding search, and initialized with the maximum tap weight. Assuming that the tap data source and maximum tap weight assignment cancels (or at least significantly attenuates) the corresponding signal distortion, then a subsequent tap search (i.e., for a different equalizer tap) at that same tap data source index should yield a sufficiently low tap weight value to prevent multiple equalizer taps from being assigned the same tap data source. If not (e.g., as in the case of a severe distortion at a given sample latency), then two or more equalizer taps may be assigned the same tap data source. In alternative embodiments, duplicate assignment of the same tap data source may be avoided by skipping the index of each already-assigned tap data source during subsequent tap searches. For example, if tap data source twelve (i=12) is selected as the data source for the first equalizer tap (j=1), the assignment of tap data source twelve may be recorded or otherwise made available to the tap search controller (e.g., a state machine, microsequencer or other control circuitry or device) so that, in tap searches for the remaining equalizer taps, tap data source twelve is skipped (e.g., i incremented from 11 to 13). Also, in such an embodiment, the assignment of tap data sources and initial tap weights to the different equalizer taps may be carried out all at once after all such tap data sources and initial tap weight settings have been determined. That is, the operations at block 892 may be deferred until after a tap data source index and corresponding maximum tap weight have been determined for each equalizer tap. At block 893, the equalizer tap index, j, is incremented to select the next equalizer tap, and the tap data source index, i, TSI value and MTW register 935 are reset in preparation for the tap search operation for the next equalizer tap. At decision block 894, the equalizer tap index, j, is compared with the total number of equalizer taps, M, to determine if tap search operations have been completed for all equalizer taps. If so, the overall tap search operation is completed. Otherwise, a tap search operation for the equalizer tap indicated by index j is executed starting at block 886.

Figure 47:
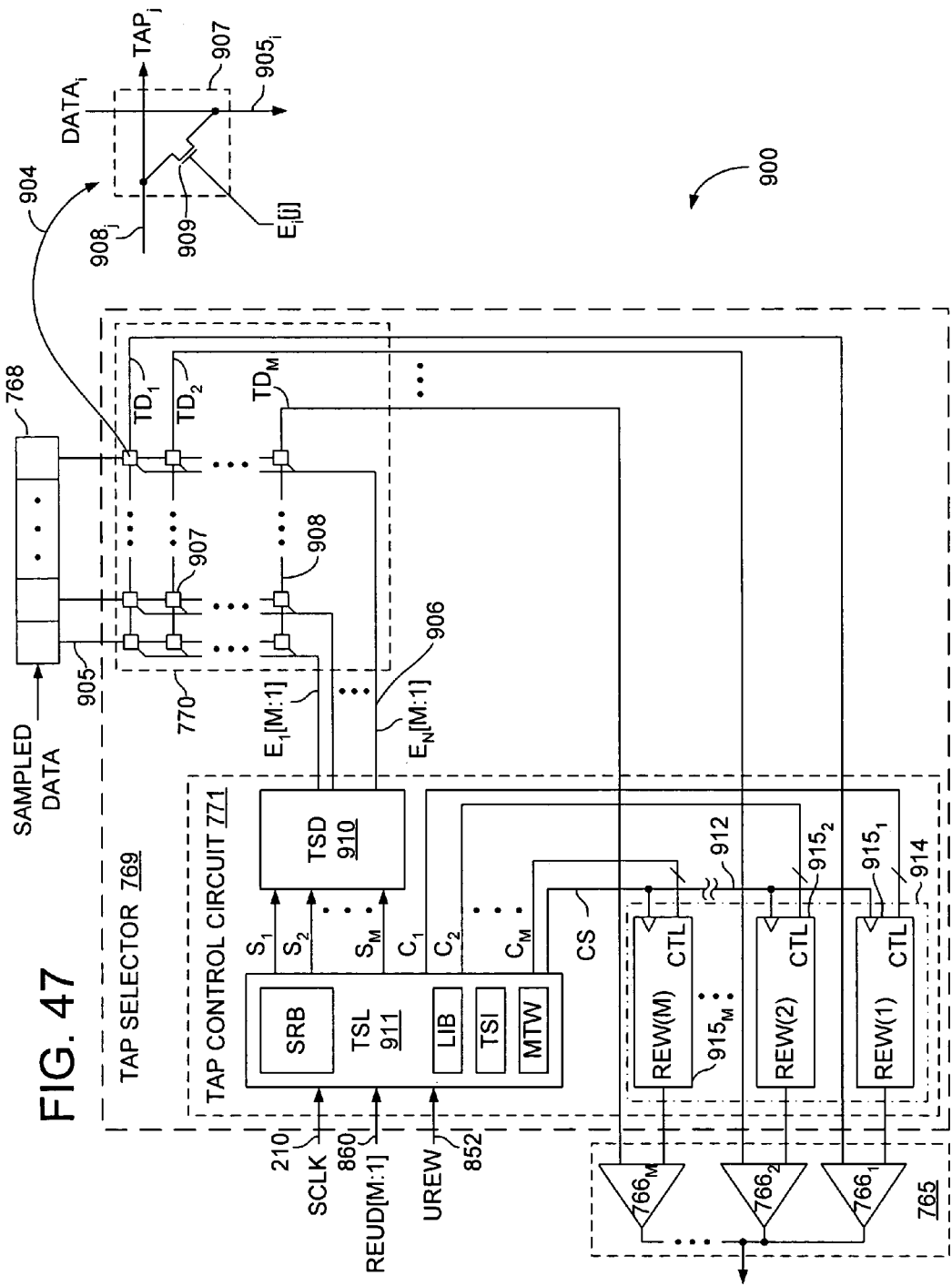
FIG. 47 illustrates an embodiment of a decision-feedback equalizer that may be used to execute the tap search operations described in reference to FIG. 46.

FIG. 47 illustrates an embodiment of a decision-feedback equalizer 900 that may be used to execute the tap search operations described in reference to FIG. 46. The decision feedback equalizer 900 includes a shift register 768, tap selector 769 and equalizing driver bank 765. Sampled data values are loaded into the shift register 768 as described in reference to FIG. 38 with individual storage elements of the shift register 768 being selected as tap data sources $TD_1$-$TD_M$ by the tap selector 769 and used to source tap data values to equalizing drivers $766_1$-$766_M$, respectively, within the equalizing driver bank 765.

The tap selector 769 includes a select circuit 770 and tap control circuit 771. In one embodiment, the select circuit 770 includes a switch matrix formed by column lines 905 and row lines 908, the row lines being referred to herein as tap data lines. Each storage element within the shift register 768 (i.e., each tap data source) is coupled to a respective one of column lines 905, and each of the tap data lines 908 is coupled to provide a corresponding one of tap data values $TD_1$-$TD_M$ to the tap data input of a respective one of the equalizing drivers $766_1$-$766_M$. As discussed above, the tap data lines 908 may additionally be coupled to the adaptive module of FIG. 33 or 39 to enable receive equalization tap weights to be adaptively updated. A switch element 907 is provided at each row-column intersection within the select circuit 770 to enable the tap data source for the column to be selectively coupled to the tap data line 908. The tap control circuit 771 outputs a respective one of multi-bit enable signals $E_1$-$E_N$ (906) to each column of switch elements 907. In the embodiment of FIG. 47, each enable signal 906 includes M component signals coupled respectively to the M switch elements 907 within a corresponding column. Thus, if the column 1 data value is selected to be the data source for tap M, then the component signals of enable signal $E_1[M:1]$ are set to '100 ..00'. More generally, $E_i[j]$ is set to '1' to switchably couple column line i, to tap data line, j. By this arrangement, the M tap data outputs may be selected from among the complete range of tap data sources within the shift register 768. Logic low enable signals 906 may be used to activate switch elements 907 in alternative embodiments.

In one embodiment, switch element 907 is formed by a transistor 909 having source and drain terminals coupled between tap data line $908_j$ and column line $905_i$ as shown at 904. The gate terminal of transistor 909 is coupled, accordingly, to receive the $j^{th}$ component signal of enable signal $906_i$ (i.e., $E_i[j]$) so that when the $E_i[j]$ is high (i.e., indicating that $j^{th}$ tap data output is to be sourced by the data value at the $i^{th}$ position within the shift register 768), transistor 909 is switched on to couple the selected tap data source to the tap data output. Other types of switching elements may be used in place of transistor 909 in alternative embodiments.

Still referring to FIG. 47, the tap control circuit 771 includes tap search logic 911 (TSL), tap select decoder 910 (TSD) and register bank 914. In one embodiment, the tap search logic 911 includes a finite state machine that receives the receive equalization update signals 860 and update strobe signal 852 (i.e., update receive equalization weight, UREW) from an adaptive module and outputs a set of select signals $S_1$-$S_M$ to the tap select decoder 910 and register control signals $C_1$-$C_M$ and command strobe signal 912 (CS) to the register bank. A sampling clock signal 210 or other timing signal may additionally be provided to the tap search logic 911 to time state transitions and control signal generation therein. The tap search logic 911 outputs the register control signals, $C_1$-$C_M$, in various states to initiate increment/decrement, clear and load operations in tap weight registers $915_1$-$915_M$, respectively, within the register bank 914. Similarly, the tap search logic 911 outputs each of the select signals $S_1$-$S_M$ in a state that specifies one of N tap data sources, the select signal being decoded into a corresponding one of the enable signals $E_1$-$E_M$ by the tap select decoder 910. In an alternative embodiment, discussed below, fewer than M select signals may be provided to the tap select decoder 910 to select tap data sources in one or more groups. Also, the tap search logic 911 may alternatively be implemented by stateless logic (e.g., controlled by a finite state machine within the adaptive module), control sequencer or other type of control circuitry.

In the embodiment of FIG. 47, the tap search logic 911 includes a tap search index (TSI) register, maximum tap weight (MTW) register and loop index buffer (LIB) to store, respectively, the tap search index, maximum tap weight and loop indices 'i' and 'j' described in reference to FIG. 46. The tap search logic 911 also includes (and may initially clear) a search result buffer (SRB) to store tap data source indices determined during iteratively performed tap search operations. Following the approach set forth in FIG. 46, the tap search logic 911 clears the TSI register, MTW register 935 and initializes the loop indices i, and j (i.e., state variables used to represent the currently selected tap data source and equalizer tap, respectively) at the beginning of a search operation, then issues a select signal $S_j$ (i.e., $S_1$ initially) in a state to select the least latent tap data source. In one embodiment, the tap search logic 911 also outputs control signals $C_1$-$C_M$ to clear each of the tap weight registers $915_1$-$915_M$. Alternatively, the tap weight registers $915_1$-$915_M$ may be automatically cleared during device power up or may be left unchanged at the start of the search operation.

After initializing the various registers (i.e., TSI register, MTW register 935 and tap weight registers $915_1$-$915_M$) and loop indices, the tap search logic 911 outputs an adjust signal (i.e., a component signal of control signal $C_j$) in either a count-up or count-down state to tap weight register $915_j$ according to the state of the corresponding receive equalization update signal, REUD[j], and asserts the command strobe signal 912 in response to the UREW signal 852. By this tap weight register $915_j$ is adaptively updated, while the remaining tap weight registers 915 are held constant. The tap search logic 911 monitors the control signal used to increment and decrement the tap weight in register $915_j$ to determine when the tap weight has converged to a stable level (e.g., tap weight begins to dither within a predetermined number of increment/decrement steps), then compares the tap weight with the value of the MTW register 935. If the tap weight is greater than the value stored within the max tap weight register, the tap weight is transferred from tap weight register $915_j$ to the MTW register 935 to establish an updated maximum tap weight. In one embodiment, rather than provide tap weight transfer paths from the tap weight registers $915_1$-$915_M$ to the MTW register 935, a temporary weight register within the tap search logic 911 is used to track the value generated within the selected tap weight register $915_j$, thus simplifying determination of whether the content of the tap weight value in register $915_j$ is greater than the value in the MTW register 935 (i.e., the temporary register content and MTW register 935 content may be compared) and, if necessary, transfer of a new maximum tap weight into the MTW register 935. In an alternative embodiment, a multiplexer may be used to select a tap weight from one of registers $915_1$-$915_M$ (i.e., from tap weight register $915_j$) to be provided to the tap search logic 911 for comparison with (and to overwrite, if necessary) the content of the MTW register 935. In either case, if the MTW register 935 is loaded with a new maximum tap weight value, the TSI register is loaded with the corresponding tap data source index, i. By this operation, after tap data source index i has been stepped through the range of tap data sources for a given equalizer tap j, the TSI register contains an index to the tap data source that yielded the maximum tap weight. Consequently, the content of the TSI register is loaded into the search result buffer at the conclusion of the tap search for the $j^{th}$ equalizer tap and thereafter used to generate select signal Sj. Also, the maximum tap weight value in the MTW register 935 may be loaded into the tap weight register $915_j$ to establish an initial tap weight setting for the $j^{th}$ equalizer tap. Thereafter, the equalizer tap index j is incremented to select the next equalizer tap, and the MTW register 935, TSI register and tap data source index, i, are reset in preparation for another tap search operation. After tap data sources have been selected for all the equalizer taps, the tap search operation is completed, and the tap search logic 911 begins updating all the tap weight registers $915_1$-$915_M$ in response to the UREW signal 852 and according to respective receive equalization update values 860.

In one embodiment, the tap search logic 911 executes the above-described tap search during system initialization, for example, in response to assertion of a reset signal, or in response to an initial assertion of the receive UREW signal 852. Also, the tap search logic 911 may output a search-complete signal to the adaptive module upon completion of the search operation, thereby enabling the adaptive module to resume adaptation of the transmit pre-emphasis tap weights and data level threshold. Alternatively, application logic within the device containing the equalizing receiver may issue control signals to the adaptive module and the tap search logic 911 to time the sequence of configuration events, including enabling and disabling adaptation of the transmit pre-emphasis tap weights and data level threshold, enabling and detecting completion of the tap search operation, and re-enabling adaptation of the transmit pre-emphasis tap weights and data level threshold when the tap search operation is complete.

Figure 48:
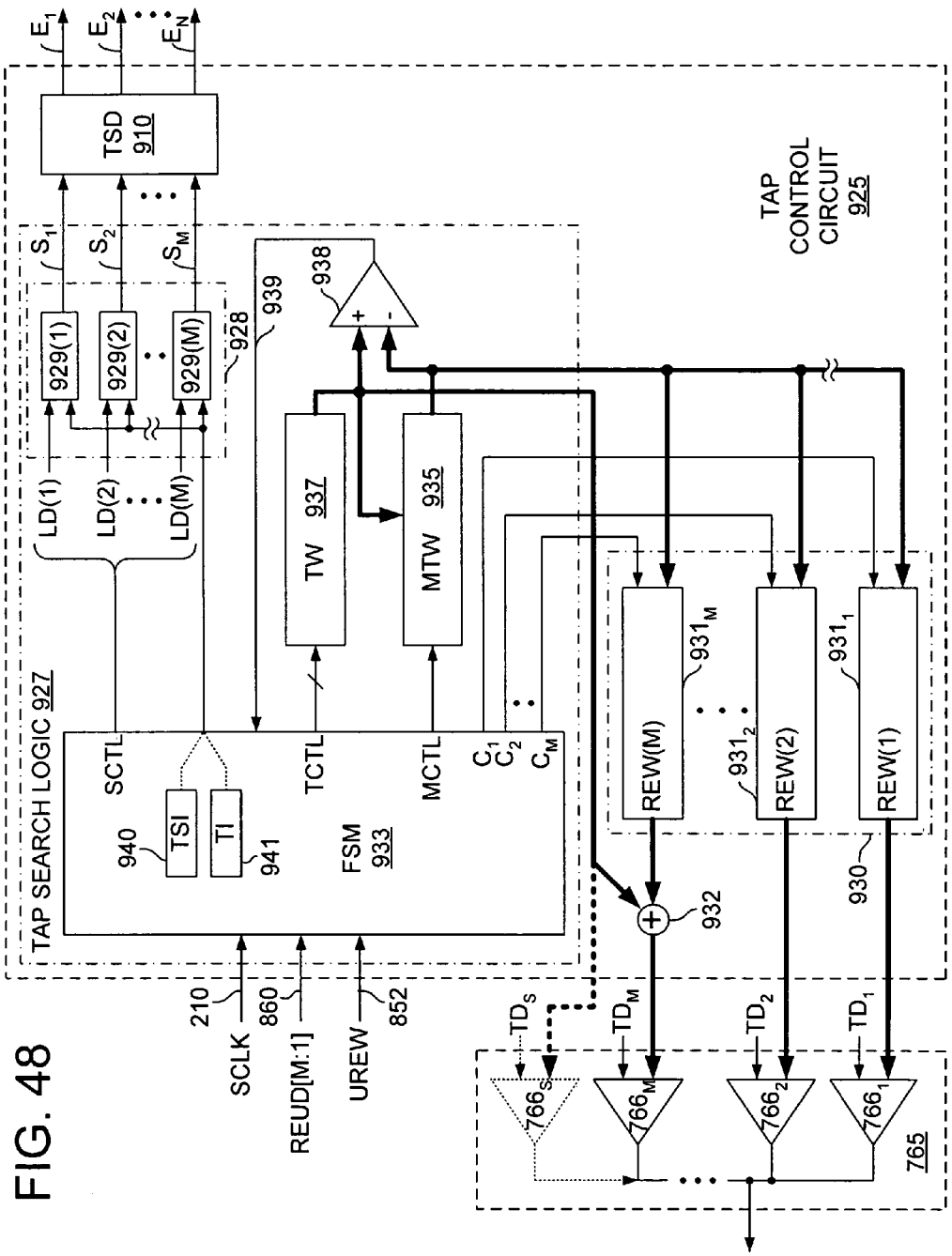
FIG. 48 illustrates a tap control circuit according to an alternative embodiment and its interconnection to an equalizing driver bank.

FIG. 48 illustrates a tap control circuit 925 according to an alternative embodiment and its interconnection to an equalizing driver bank 765. The tap control circuit 925 includes a register bank 930, tap select decoder 910, summing circuit 932 and tap search logic 927. As in the embodiment of FIG. 47, the tap select decoder 910 decodes select signals $S_1$-$S_M$ to generate a set of enable signals $E_1$-$E_N$ (i.e., the enable signals to select a subset, M, of N tap data sources to source tap data values $TD_1$-$TD_M$), and the register bank 930 includes a set of tap weight registers $931_1$-$931_M$ to store tap weights for corresponding equalizing signal drivers $766_1$-$766_M$ within the equalizing driver bank 765. The tap search logic 927 includes a finite state machine 933 (FSM), search result buffer 928, temporary weight (TW) register 937, maximum tap weight (MTW) register 935 and comparator 938.

During a tap search operation, the tap weight registers $931_1$-$931_M$ within register bank 930 are initially cleared, effectively disabling the equalizing drivers $766_1$-$766_M$ from generating equalizing signal contributions. In one embodiment, the contents of the TW register 937 and tap weight register $931_M$ are summed in summing circuit 932 to provide a summed tap weight value to equalizing driver $766_M$. By this arrangement, and by leaving tap weight register $931_M$ at zero until the final stage of the overall tap search operation, the TW register 937 is enabled to control the tap weight provided to equalizing driver $766_M$ during tap search operations (In an alternative embodiment, a multiplexer or other select circuit may be used to select either the TW register 937 or the tap weight register $766_M$ to drive the equalizing driver $766_M$)

Thus, following the approach set forth in FIG. 46, the FSM 933 initially issues register control signals (e.g., TCTL and MCTL) to zero the contents of the TW register 937 and MTW register 935, and also clears internal state variables used to hold a tap search index (TSI) 940, temporary index (TI) 941, tap source selection index, i, and equalizer tap index, j. The FSM 933 then asserts a load control signal, LD(M) (a component of search control signal (SCTL)), to load the current tap search index 940 into result register $929_M$ within the search result buffer 928, thereby selecting the lowest latency tap data source to provide a tap data value to equalizing driver $766_M$. Thereafter, the FSM 933 adaptively updates the TW register 937 (i.e., by assertion of a count-up or count-down indication in the TCTL signal) in response to assertion of the UREW signal and according to the state of REUD[j]. As discussed, the tap weight within the TW register is supplied to the equalizing driver $766_M$ via summing circuit 932, so that the adaptive tap weight updates are effectively fed back to affect data and error sign decisions. The values stored in the TW register 937 and MTW register 935 are supplied to respective inputs of the comparator 938 which, in response, generates a compare result signal 939 that indicates whether the magnitude of the tap weight within the TW register 937 exceeds the magnitude of the tap weight magnitude in the MTW register 935. The compare result signal 939 is supplied to the FSM 933 which, upon determining that the tap weight within the TW register 937 has stabilized (i.e., dithering by a threshold number of counts), evaluates the state compare result signal 929. If the compare result signal indicates that the magnitude of the tap weight stored in the TW register 937 exceeds the tap weight magnitude in the MTW register 935, the FSM 933 asserts the MCTL signal to transfer the tap weight from the TW register 937 into the MTW register 935 and also copies the tap search index 940 into the temporary index 941. By this operation, after the tap source selection index, i, has been stepped through the full range of tap data sources, the MTW register 935 will contain the maximum-magnitude tap weight generated during the tap search operation for equalizer tap j and the temporary index 941 indicates the corresponding tap data source. Consequently, at the completion of each tap search for a given value of the equalizer tap index, j, the FSM 933 asserts the appropriate control signals (SCTL and $C_j$) to load the temporary index into register $929_j$ within the search result buffer 928 and to load the maximum tap weight value into the tap weight register $931_j$. The equalizer tap index, j, is then incremented to perform a tap search for the next equalizer tap. After the tap search for the final equalizer tap (i.e., j=M) is completed, the content of the TW register 937 is cleared to avoid affecting the tap weight generated by the summing circuit 932.

In one embodiment, after tap data sources have been selected for all the equalizing drivers $766_1$-$766_M$, no further tap search operations are carried out. In an alternative embodiment, tap search operations may be repeated periodically or in response to detecting selected events (e.g., change in system configuration, operating conditions, threshold error rate). Also, because tap search operations may be performed during live data transmission (i.e., transmission of training sequences or other test data patterns, while possible, is unnecessary for carrying out tap search operations), an extra receive equalizer tap may be provided to enable substantially continuous background tap searching. Referring to FIG. 48, for example, instead of using equalizing driver $766_M$ for tap search operations, a dedicated equalizing driver $766_S$ may be used to drive a component equalization signal. That is, after tap searches have been completed for each of the equalizing drivers $766_1$-$766_M$, the lowest valued equalizer tap weight generated during the search may be loaded into the MTW register 935 (or the content of the MTW register 935 generated in the tap search for equalizer tap M may be assumed to be the lowest equalizer tap weight) and compared on an ongoing basis with the tap weight adapted for equalizing driver 766S and stored in the TW register 937. If the content of the TW register 937 is determined to exceed the lowest-valued equalizer tap weight, then a more optimal tap data source has been found. In that circumstance, the content of the TW register 937 may be used to overwrite the content of the appropriate tap weight register (i.e., the tap weight register containing the lowest-valued equalizer tap weight) and the temporary index transferred to the corresponding search result register 929 to select the more optimal tap data source. Background tap searching may be carried out in this manner on a continual basis, periodically or in response to selected events. Note that, if an additional equalizing driver is provided for tap searching purposes, the summing circuit 932 may be omitted, and the additional tap data value supplied to the equalizing driver $766_S$ (i.e., $TD_S$) may also be supplied to the adaptive module to enable generation of a corresponding receive equalization update signal, REUD[S].

Grouped Tap Data Source Selections

Figures 49, 50:
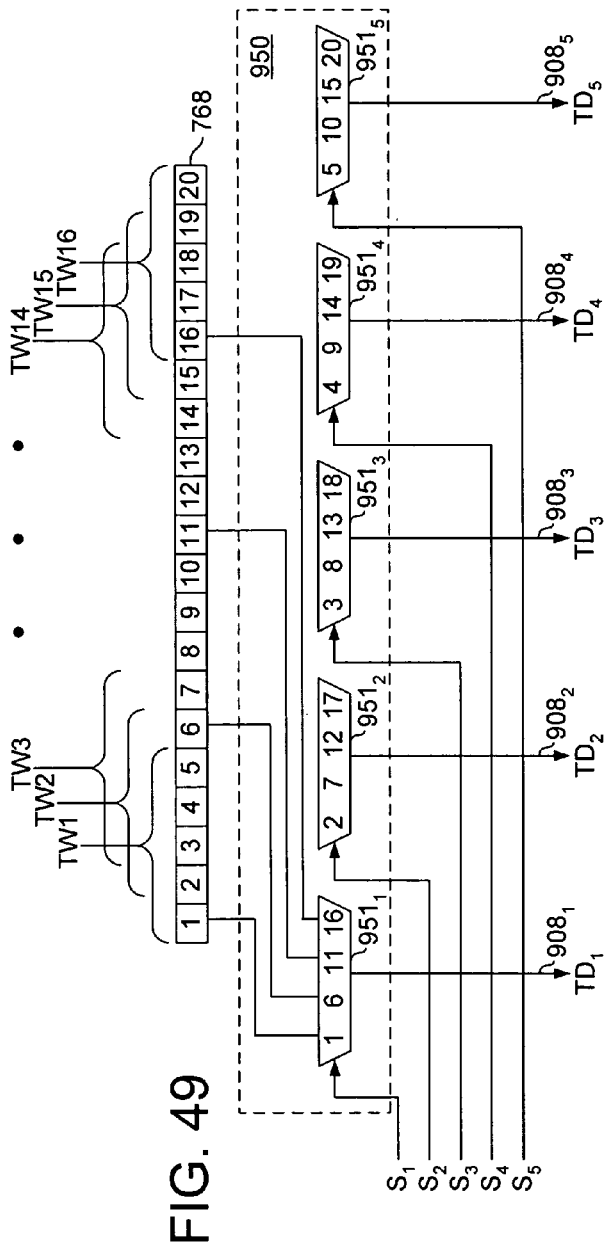
FIG. 49 illustrates an embodiment of a select circuit embodiment having constituent multiplexers coupled to a respective subsets of storage elements within a shift register.
FIG. 50 illustrates an exemplary logic table for decoding a tap window index into a corresponding set of five select signals $S_1$-$S_5$.

Referring again to FIG. 47, it can be seen that each of the tap data lines 908 is switchably coupled to each of the N possible tap data sources within the shift register 768. While such an arrangement enables each equalizer tap to be driven by any of the N tap data sources, the relatively large number of switched interconnections between a given tap data line 908 and the shift register 768 increases the capacitance of the tap data line 908, potentially limiting the lowest latency tap data source that may be used (i.e., due to the time required to deliver the tap data value to the equalizing driver bank 765). In one embodiment, each tap data line 908 is switchably coupled to a respective subset (i.e., group) of the total set of tap data sources to reduce the number of switched interconnections between tap data lines 908 and tap data sources. FIG. 49, for example, illustrates an embodiment of a select circuit 950 in which multiplexers, $951_1$-$951_5$, are each coupled to a respective subset of four storage elements within a 20-element shift register in a round-robin fashion. More specifically, multiplexer $951_1$ has four inputs coupled, respectively, to every fifth storage element within the shift register, starting at element 1 (i.e., 1, 6, 11, 16). The inputs of multiplexer $951_2$ are similarly coupled to every fifth storage element within the shift register starting at element 2 (i.e., 2, 7, 12, 17) and so forth to multiplexer $951_5$ which has inputs coupled to every fifth storage element within the shift register starting with element 5 (i.e., 5, 10, 15, 20) (note that the tap data source connections to multiplexers $951_2$-$951_5$ are not specifically shown in FIG. 49 to avoid obscuring the interconnection pattern). By this arrangement, any of the tap data sources may be selected, yet each tap data line 908 is switchably coupled to only four tap data sources instead of twenty. The distribution of tap data sources to multiplexers may be different in alternative embodiments. Rather than round-robin distribution, for example, the first four tap data sources may be coupled to multiplexer $951_1$, the second four to multiplexer $951_2$, and so forth. Also, the ratio of multiplexers to tap data sources may be higher or lower in alternative embodiments.

In high-speed signaling systems symbol times are relatively short (often well under a nanosecond) so that reflections tend to disperse over multiple adjacent symbol times. Consequently, in many such systems, there may be one or two dominant reflections (or other distortions) that appear in multiple adjacent symbol times, the adjacent symbol times being referred to herein as a reflection window. Considering the embodiment of FIG. 49, it can be seen that the round-robin distribution of tap data sources enables adjacent storage elements within shift register 768 to be selected as tap data sources, thereby allowing selection of a tap window that corresponds to a reflection window. For example, if a reflection is centered at symbol time 7 (i.e., symbol time whose sample latency is 7) and spreads into symbol times 5, 6, 8 and 9, then each of the multiplexers $951_1$-$951_5$ may be signaled, by issuance of appropriate selects signals, $S_1$-$S_5$, to select a tap window that spans symbol times 5-9.

Tap Window Searching

In one embodiment, rather than selecting M individual tap data sources to provide tap data values to the equalizing driver bank, a tap window (or multiple tap windows) formed by a set of M adjacent tap data sources is selected to source tap data values to the equalizing driver bank. In such an embodiment, a single tap window index (TWI) may be generated by the tap search logic and supplied to a tap select decoder to generate a corresponding set of select signals, $S_1$-$S_M$. FIG. 50, for example, illustrates a logic table 955 for decoding a tap window index into a corresponding set of five select signals $S_1$-$S_5$. In an embodiment having twenty tap data sources (i.e., N=20), the tap window index ranges from 1 to 16 to enable selection of each possible tap window; each incrementally higher tap window index selecting an incrementally shifted tap window as shown by the designations TW1, TW2, TW3, . . . , TW14, TW15, TW16 above shift register 768 in FIG. 49. Thus, when TWI=1, select signals $S_1$-$S_5$ are set to select tap data sources 1-5 (i.e., $S_1=S_2=S_3=S_4=S_5=1$, thereby selecting the first input position in each of multiplexers $951_1$-$951_5$ in FIG. 49). When TWI=2, the select signals are set to select tap data sources 2-6 (i.e., $S_1$32 2 to select the second input position in multiplexer $951_1$ and $S_2=S_3=S_4=S_5=1$ to select the first input position of each of multiplexers $951_2$-$951_5$), and so forth. In FIG. 50, the tap source selected by a given select signal is shown in parenthesis adjacent the corresponding select signal. In alternative embodiments, multiple tap window indices may be decoded into multiple sets of select signals.

Figure 51:
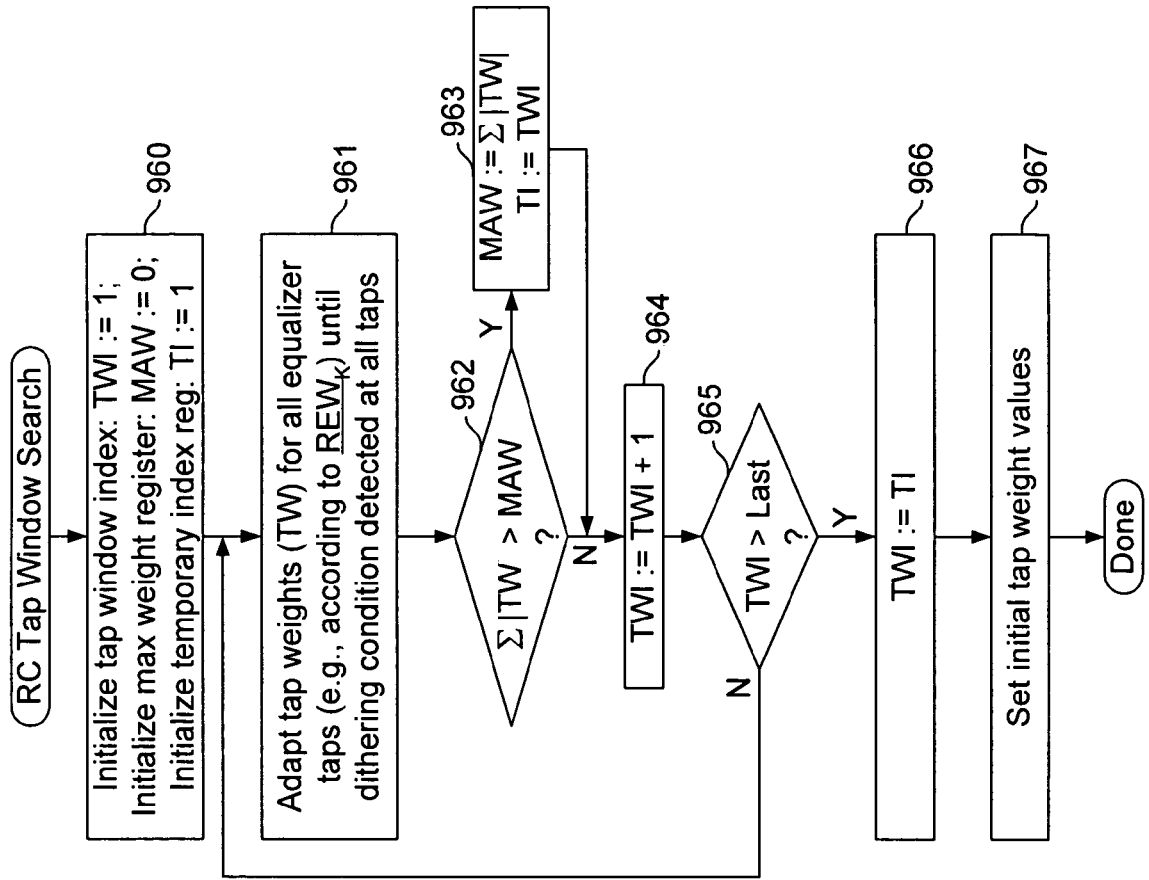
FIG. 51 illustrates an exemplary tap window search operation.

FIG. 51 illustrates an exemplary tap window search operation. At block 960, a tap window index (TWI) and temporary index (TI) are initialized to 1, and a maximum aggregate weight (MAW) value is initialized to zero. The tap window index is used to select a set of M adjacent tap data sources (e.g., as shown in FIG. 50) to source tap data values to an equalizer bank (e.g., equalizer bank 765 of FIG. 38). Thus, by initializing the tap window index to 1, an initial, lowest-latency, tap window is selected. At block 961, the tap weights for the equalizer taps sourced by the selected tap window (i.e., according to the tap window index) are adapted in response to the UREW signal and according to the receive equalizer update (REUD) signals generated by the adaptive module until a convergence condition is detected at all equalizer taps. At decision block 962, an aggregate weight formed by a sum of the magnitudes for each of the equalizer tap weights (i.e., Σ|TW|) is compared with the maximum aggregate weight. If the aggregate weight for the current tap window index (i.e., the current aggregate weight) is greater than the maximum aggregate weight, then at block 963, the current aggregate weight is made the new maximum aggregate weight and the tap weight index is recorded in the temporary index. At block 964, the tap window index is incremented to select the next tap window and, if the tap window index has not been incremented past the last valid tap window index, the operations at blocks 961, 962, 964 and, when appropriate, 963 are repeated. After the last valid tap window index has been used for adaptive tap weight generation (determined at decision block 965), the temporary index contains the tap window index that yielded the maximum aggregate tap weight. Accordingly, at block 966, the tap window index is assigned the value of the temporary index to complete the tap window search.

Still referring to FIG. 51, in one embodiment, whenever a new maximum aggregate weight is recorded in block 963, the values of the individual tap weights are also recorded. By this operation, after the tap window search is completed and the desired tap window has been selected, the tap weights generated for the desired tap window may be reloaded into the tap weight registers to establish an initial condition, as indicated at block 967. In an alternative embodiment, the tap weight registers may be cleared at block 967 to allow the tap weights for the desired tap window index to be adaptively regenerated.

Figure 52:
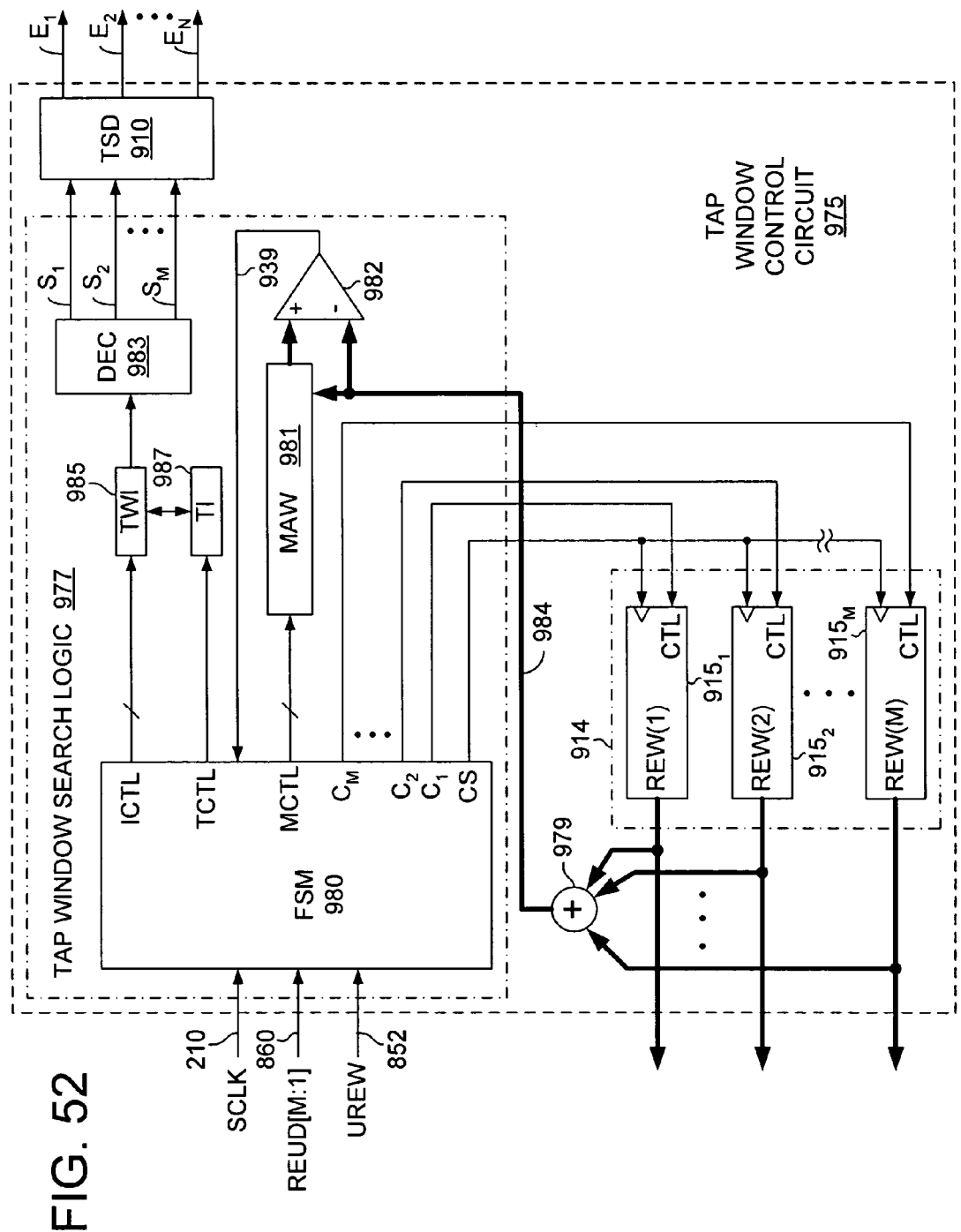
FIG. 52 illustrates an embodiment of a tap window control circuit.

FIG. 52 illustrates an embodiment of a tap window control circuit 975 having tap window search logic 977, tap select decoder 910, register bank 914 and magnitude summing circuit 979. The tap window search logic 977 includes a finite state machine 980, index decoder 983, maximum aggregate weight (MAW) register 981, tap window index (TWI) register 985, temporary index (TI) register 987 and comparator 982. During a tap window search operation, the finite state machine 980 initially issues control signals to the MAW register 981 and TWI register 985 (i.e., MCTL and ICTL, respectively) to set those registers to initial values (e.g., zero the MAW register and set the TWI register to an initial tap window index). The FSM 980 also issues control signals $C_1$-$C_M$ to tap weight registers $915_1$-$915_M$ within the register bank 914 to zero the contents of those registers. In one embodiment, the TWI register is initialized with a tap window index that selects the lowest-latency tap window (e.g., the first set of M tap data sources within the shift register 768 as shown in FIGS. 44 and 45) to source tap data values to the equalizing driver bank. Thereafter, the FSM 980 issues increment/decrement signals (i.e., via control signals $C_1$-$C_M$) to the tap weight registers in response to UREW signal 852 from the adaptive module and in accordance with receive equalization update signals 860 (REUD[M:1]). By this operation, the tap weight values within registers $915_1$-$915_M$ are each iteratively and adaptively adjusted up or down, eventually reaching convergence conditions (e.g., dithering up and down by a predetermined number of steps as discussed above). The tap weights within registers $915_1$-$915_M$ are supplied to the equalizing driver bank as shown, for example, in FIG. 47, and the magnitude components of the tap weights are supplied to the magnitude summing circuit. The magnitude summing circuit sums the tap weight magnitudes received from the tap weight registers $915_1$-$915_M$ and outputs the resulting aggregate weight value 984 to a first input of the comparator 982. The maximum aggregate weight stored within of the MAW register 981 is supplied to the second input of the comparator which, in turn, generates a compare result signal 939 that indicates whether the aggregate weight 984 exceeds the maximum aggregate weight stored within the MAW register 981. Thus, upon detecting that a tap weight convergence condition has been reached for a given tap window index, the FSM 980 evaluates the compare result signal 939 and, if the aggregate weight 984 is indicated to exceed the maximum aggregate weight, issues control signals MCTL and TCTL to load the aggregate weight 984 into the MAW register 981 as the new maximum aggregate weight and to load the corresponding tap window index from the TWI register 985 into the TI register 987. Thereafter, the FSM 980 increments the tap window index in the TWI register (e.g., by issuing an appropriate index control signal or signals (ICTL)) to enable adaptation of tap weights for the next tap window. The FSM 980 may clear the contents of the tap weight registers $915_1$-$915_M$ after each increment in the tap window index or, alternatively, allow the tap weight registers to begin converging from the values generated for the previous tap window index. In either case, after tap weights have been adaptively generated for each tap window index (with the MAW register 981 and TI 987 register being updated when a new maximum aggregate weight is generated), the TI register 987 contains the index of the tap window that yielded the overall maximum aggregate weight. Accordingly, at the conclusion of the tap window search operation, the content of the TI register 987 is loaded into the TWI register 985, thereby selecting the tap window that yielded the maximum aggregate weight to source tap data values to the equalizing driver bank. As discussed in reference to FIG. 51, the contents of the tap weight registers $915_1$-$915_M$ may be cleared at the conclusion of the tap window search operation or may retain the values held at the conclusion of the tap window search operation. Alternatively, in an embodiment in which the tap weight values used to generate the maximum aggregate tap weight are stored in temporary registers, the tap weight registers $915_1$-$915_M$ may be loaded with tap weight values from the temporary registers. In an embodiment that supports multiple tap window selections, multiple tap window search operations may be carried out one after another to determine tap window indices.

Maximum Eye Opening as Criterion for Tap Window Selection

Although signal distortions at different symbol latencies are often independent of one another, distortions themselves may generate reflections. For example, a signal reflection may itself generate a signal reflection, referred to herein as a secondary reflection, that arrives at the receiver input some number of symbol times after the original, primary reflection. In the context of decision-feedback equalization, a tap data source selection and corresponding tap weight that cancels a primary reflection may also cancel the secondary reflection even though no equalizer tap is assigned a tap data source having a sample latency that corresponds to the secondary reflection. This phenomenon presents a challenge for tap window selection as an equalizer tap selected to cancel a primary reflection may incidentally cancel a secondary reflection, thus providing a distortion mitigating benefit that is not reflected by the equalizer tap weight alone. That is, the distortion-mitigating value of a given tap window selection may not be accurately represented by the corresponding maximum aggregate weight. More specifically, a first tap window selection that results in cancellation of a primary reflection of magnitude X as well as cancellation of a secondary reflection having magnitude Y, will yield an aggregate weight that corresponds to X only, not X+Y as is actually achieved. Thus, if a second tap window selection yields an aggregate weight that exceeds X, but is less than X+Y, the second tap window may be selected as the final tap window on the basis of the higher aggregate weight even though it provides less distortion mitigation than the first tap window. In alternative embodiments, discussed below, metrics other than aggregate tap weight are used to reduce the possibility for non-optimal tap window selection.

Maximum Eye Opening as Criterion for Tap Window Selection

In alternative tap window search operations, data and error samples generated by the samplers 211 and 213 of FIG. 38 (or other samplers described herein) are used to determine the relative magnitudes of data eye openings for different tap window settings. The tap window that yields the maximum eye opening may then be selected as the final tap window. In various embodiments, the tap window that yields the tallest, widest or largest-area eye opening is selected as the final tap window.

Figure 53:
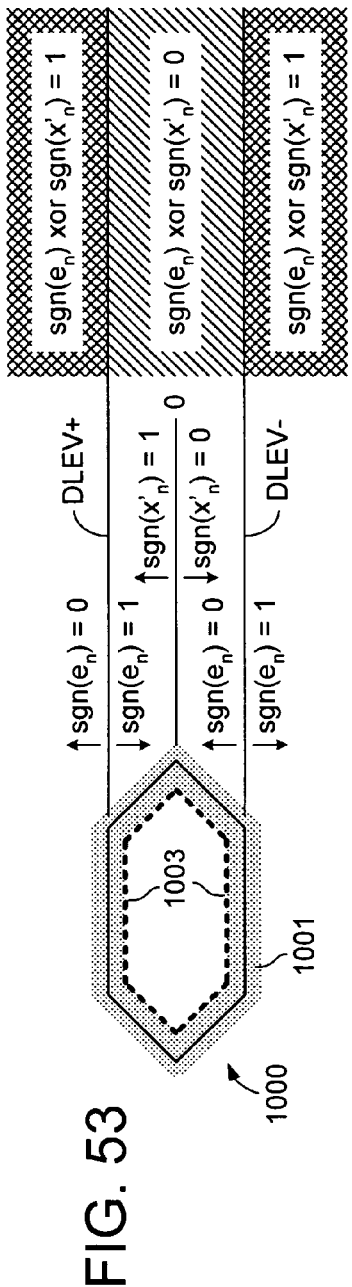
FIG. 53 illustrates a graph of a data eye graph generated by sampling a sequence of differential signal transmissions at different phase offsets and voltage offsets relative to a nominal sampling time and decision threshold voltage.

FIG. 53 illustrates a graph of a data eye 1000 generated by sampling a sequence of differential signal transmissions at different phase offsets relative to the nominal sampling time and/or different voltage offsets relative to a nominal decision threshold. Such a graph is sometimes referred to as a schmoo plot. As indicated by shaded region 1001, the dimension of the data eye has a statistical height and width uncertainty that reflect various signal distortions due to the present and historical state of the signaling line and, potentially, due to the state of one or more neighboring signal lines (i.e., crosstalk). Assuming a Gaussian distribution of signal levels within the uncertainty region, data level thresholds, DLEV+ and DLEV− are adaptively driven to the respective means of the upper and lower uncertainty regions and, using the clock alignment techniques described above, the sampling clock transition may be aligned between the means of the right and left uncertainty regions. While the offset between the data level thresholds indicate an average eye height, the average does not express the widths of the upper and lower (or left and right) uncertainty regions and therefore does not indicate the extent of the eye opening. By contrast, the inner boundary 1003 of the uncertainty region, referred to herein as an error boundary, reflects the extent of the data eye opening and, if determined, may be used to assess the comparative effectiveness of different tap window selections.

In one embodiment, error samples are resolved to either a logic '1' or logic '0' state according to whether the data level threshold compared with the incoming signal exceeds or is less than the incoming signal, respectively. Thus, as shown in FIG. 53, a positive incoming signal (i.e., sgn($x'_n$)='1') yields a logic '0' error sample if it exceeds an upper data level threshold (DLEV+) and a logic '1' error sample otherwise. Conversely, a negative incoming signal (sgn($x'_n$)='0') yields a logic '1' error sample if it falls below a lower data level threshold (DLEV−) and a logic '0' error sample otherwise. From this observation, it follows that an input signal falling between the upper and lower data level thresholds yields same-state data and error samples, and an input signal falling outside the data level thresholds (i.e., having a level above the upper data level threshold or below the lower data level threshold) yields different-state data and error samples. Thus, an exclusive-OR combination of a data sample (D) and corresponding error sample (E) indicates whether the corresponding signal level falls between (D xor E=0) or outside (D xor E=1) the data level thresholds.

In one embodiment, the foregoing characteristics of the error and data sample generation are used to search for the upper and lower error boundaries and thereby obtain a measure of the data eye height for a given tap window selection. More specifically, by stepping the data level threshold from a value known to be inside the error boundary toward an incrementally more positive value, a relative value of the error boundary itself may be determined by inspecting an exclusive-OR combination of data and error samples at each step and identifying the data level threshold at which the incoming signal yields a sample lower than the data level threshold (i.e., exclusive-OR result is zero).

Figure 54:
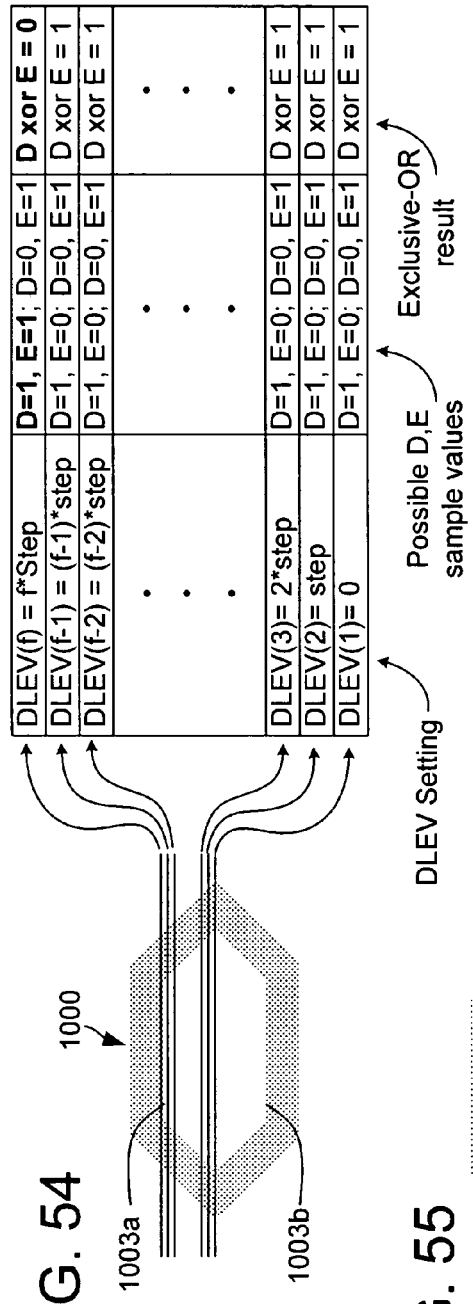
FIG. 54 illustrates an exemplary error-boundary search operation in a receiver having a single error sampler and corresponding data level threshold, DLEV.

FIG. 54 illustrates an exemplary error-boundary search operation in a receiver having a single error sampler and corresponding data level threshold, DLEV. The data level threshold is initially be set to a zero value (i.e., DLEV(1)=0) to ensure that the data level is between the upper and lower error boundaries 1003a and 1003b of data eye 1000 (other initial values may be used in alternative embodiments), and a predetermined number of data and error sample pairs are generated (e.g., enough samples to reflect the statistical uncertainty in the data eye). Assuming an open data eye, if an incoming signal yields a logic '1' data sample, then the corresponding error sample will be a logic 0 due to the setting of the data level threshold (i.e., DLEV minus signal level will be negative). Conversely, if the incoming signal yields a logic '0' data sample, then the error sample will be a logic 1. Thus, the exclusive-OR of the data and error sample will yield a logic '1' result. In one embodiment, the data level threshold is first incremented in a positive direction by a step size 'step'. So long as the data level threshold remains below the upper error boundary, the data and error samples will have different states and therefore yield a logic '1' exclusive-OR result. This result is indicated in FIG. 54 in the table of incrementally higher DLEV settings, possible data and error samples that may result at each DLEV setting and the corresponding exclusive-OR result. As shown, in a final step of the data level threshold (i.e., DLEV=f*step), the data level threshold crosses the error boundary. Consequently, an incoming signal that yields a logic '1' data sample, but has a level at the error boundary will produce a logic '0' exclusive-OR result, indicating that the upper error boundary has been reached. At this point, a symmetrical lower error boundary may be assumed, so that the value 2*f may be recorded as a measure of the eye height for the present tap window selection. Alternatively, the data level threshold may be reset to zero (or to −step) and thereafter stepped in negative increments to determine the value of the lower error boundary, the measure of the eye height being recorded as f+g, where g is the number of negative steps required to reach the lower boundary. Still referring to FIG. 54, it should be noted that the upper and lower boundaries may alternatively be located by stepping the data level threshold from an initial value outside the error boundary or within the uncertainty region (on both the positive and negative sides of the eye) to a final value that falls just inside the error boundary. However, determined, the measurement of the eye height may be compared for each possible tap window selection to determine the tap window that yields the maximum eye height.

Figure 55:
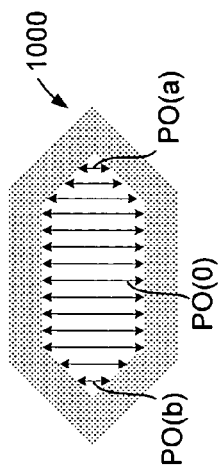
FIG. 55 illustrates an exemplary eye-area measurement obtained by performing multiple eye height measurements at respective clock phase offsets.

In an alternative embodiment, illustrated in FIG. 55, multiple eye height measurements are made, each at different clock phase offsets (PO) within data eye 1000, thereby providing a measure of the open eye area for a given tap window selection. That is, the eye height measurement described in reference to FIG. 54 is carried out at an initial phase offset, PO(0), then repeated at incrementally more positive phase offsets, with the eye height determined at each phase offset being accumulated into an eye area value. When a phase offset yields a zero eye height, the prior phase offset is deemed to be the final phase offset in the positive direction, and the process is repeated in the negative phase offset direction to complete the eye area measurement. In FIG. 55, for example, PO(a) is the final phase offset in the positive phase offset direction and PO(b) is the final phase offset in the negative phase offset direction. The eye areas determined for each possible tap window selection may be compared to determine the tap window that yields the maximum eye area.

In yet another embodiment, an eye height measurement is initiated at each phase offset, then aborted upon determining that the eye height is nonzero or greater than a predetermined value. The positive and negative phase offsets at which zero eye height (or eye heights less than the predetermined value) are detected are used as a measure of the eye width. For example in FIG. 55, the eye width may be recorded as a+b to indicate a relative measure of eye width. As with eye heights and eye areas, eye widths may be determined for each possible tap window selection and compared to determine the tap window that yields the maximum eye width.

Figure 56:
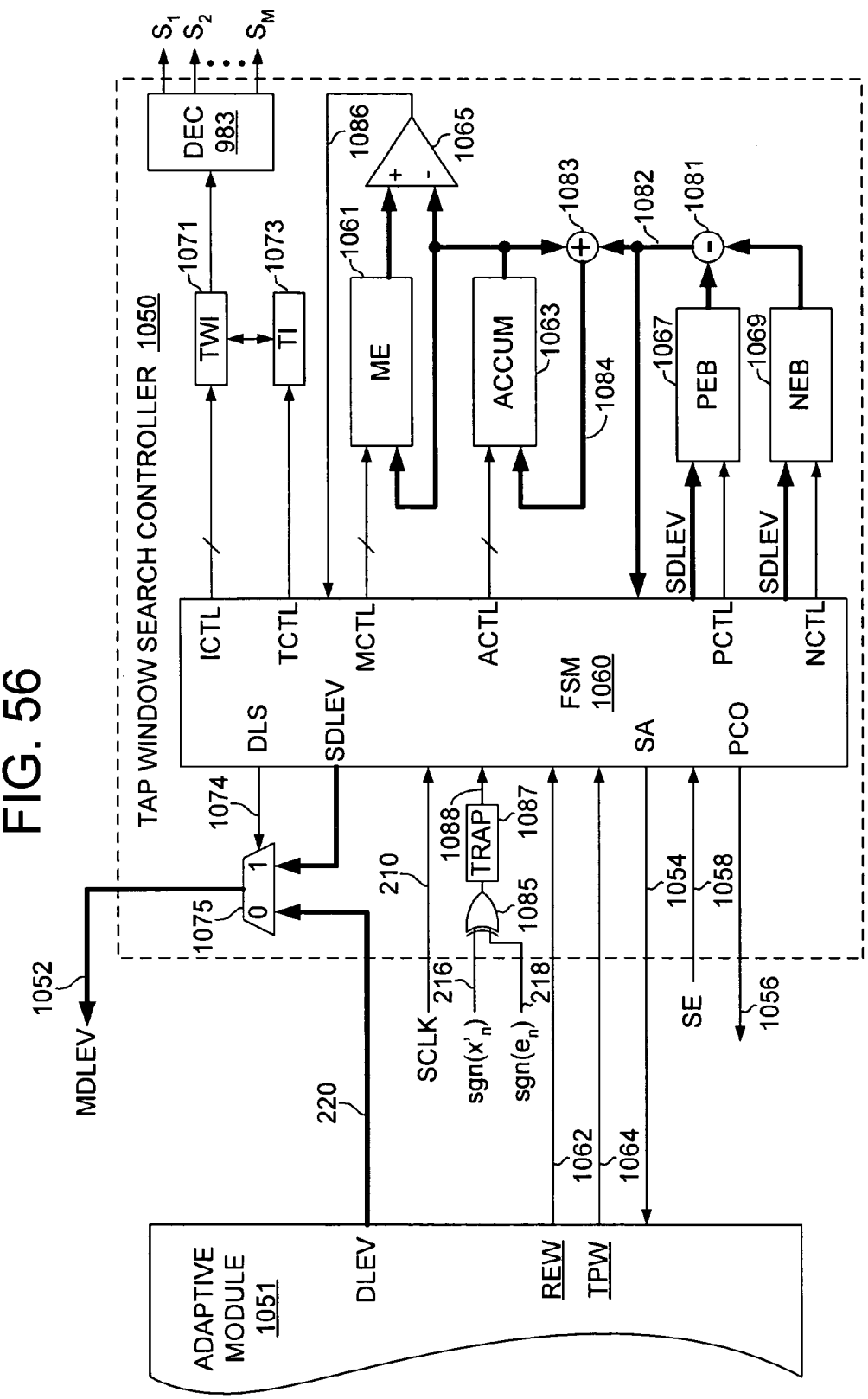
FIG. 56 illustrates an embodiment of a tap window search controller.

FIG. 56 illustrates an embodiment of a tap window search controller 1050 that searches for a tap window that provides a maximum eye opening (e.g., maximum eye height, width or area). The tap window search controller 1050 includes a finite state machine 1060, excusive OR gate 1085, trap circuit 1087, tap window index (TWI) register 1071, temporary index (TI) register 1073, maximum eye (ME) register 1061, accumulator 1063, positive error boundary (PEB) register 1067, negative error boundary (NEB) register 1069, summing circuit 1083, difference circuit 1081, comparator 1065, multiplexer 1075 and index decoder 983. The finite state machine 1060 receives a search enable signal 1058 (SE) from application logic or other control circuitry, a sampling clock signal 210 (or other clock signal) and equalization weights (REW) 1062 (or, alternatively filtered or unfiltered receive equalization update signals (REUD) 860 as in the embodiment of FIG. 47) from an adaptive module 1051. The FSM 1060 also receives adaptively updated and a data sample 216 (sgn($x'_n$)) and error sample 218 (sgn($e_n$)).

Referring to FIGS. 51 and 52, when the search enable signal 1058 is asserted, a search mode is initiated within the tap window search controller 1050. Initially, at block 1101 of FIG. 57, the tap window search controller 1060 sets the tap window index to select the lowest latency tap window (e.g., TWI register 1071 assigned a value of 1) and clears the maximum eye value and temporary index (ME register:=0, TI register:=0). At block 1103, the adaptive module 1051 is enabled to adapt the data level threshold 220, transmit pre-emphasis tap weights 1064 (TPW) and receive equalizer tap weights 1062 until convergence conditions are detected. In the embodiment of FIG. 56, the FSM 1060 receives both the receive equalization tap weights 1062, transmit pre-emphasis tap weights and adapted data level (ADLEV) from the adaptive module and is able to discern the convergence condition based on stabilization of those values. In an alternative embodiment, the receive equalization update values (REUD) and/or transmit pre-emphasis update values (TPUD) are provided to the FSM 1060 instead of the tap weights themselves. Also, the adaptive module 1051 itself may determine when a convergence condition has been reached and signal the FSM 1060 in response.

Figure 57:
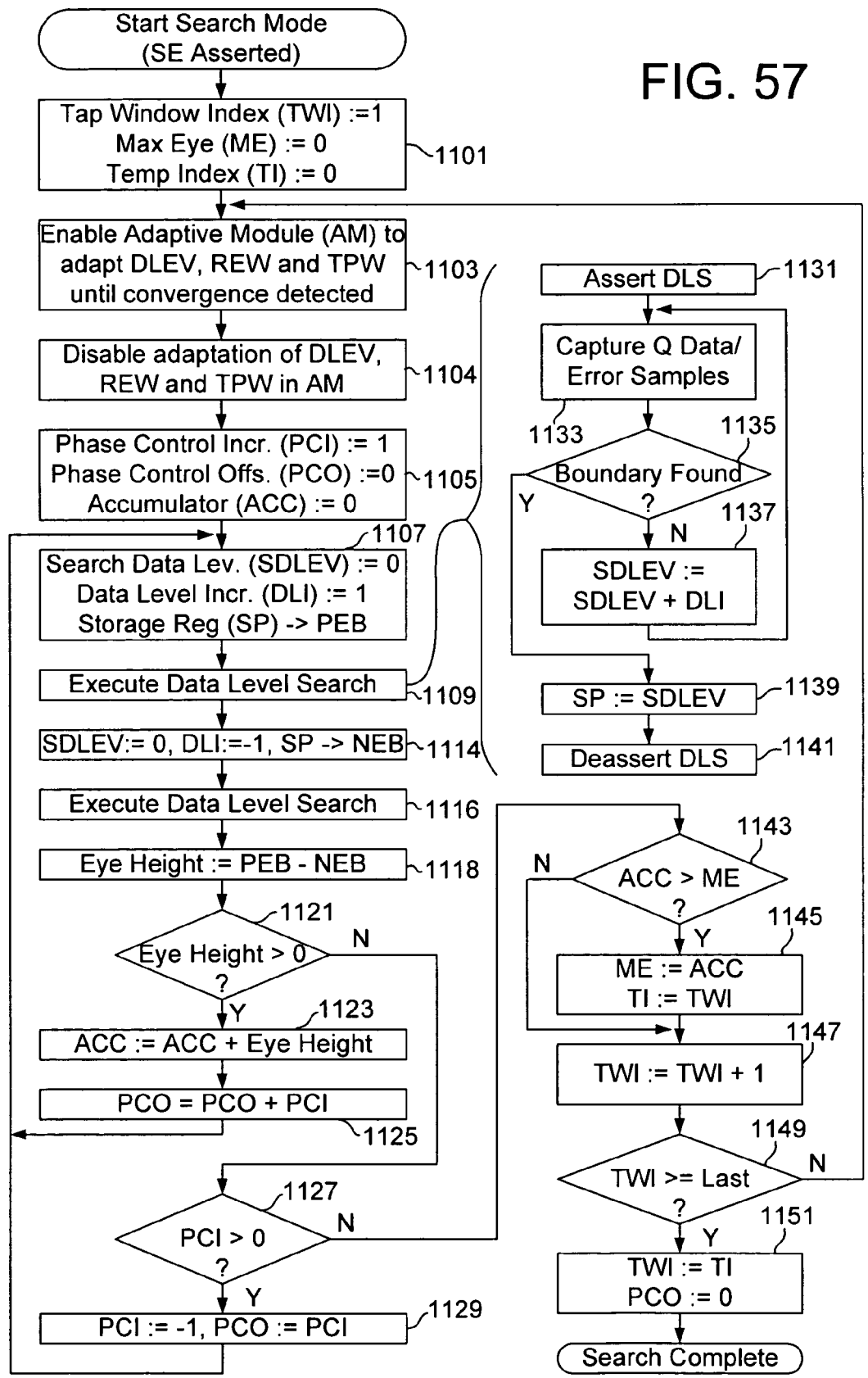
FIG. 57 illustrates an exemplary tap window search operation based on eye-area measurements.

At block 1104 of FIG. 57, after tap weight and data level convergence has been detected, the FSM 1060 issues a suspend-adaptation signal (SA) 1054 to the adaptive module 1051 to disable adaptation of the receive equalization tap weights 1062, transmit pre-emphasis tap weights 1064, and data level threshold 220. At block 1105, the FSM 1060 initializes state variables and the accumulator 1063 in preparation for an eye area search. More specifically, the FSM 1060 asserts the appropriate accumulator control signals (ACTL) to reset the accumulator 1063 to zero, and initializes a phase control increment (PCI) to +1 and a phase control offset (PCO) to zero. In an embodiment that includes a clock data recovery circuit or other controlled-phase timing source, the FSM 1060 outputs the PCO value to the timing source as shown at 1056 to establish the PCO-indicated phase offset in the sampling clock signal 210. For example, the PCO value may be summed with the interpolation control word within the interpolator 687 of FIG. 25 to generate a sampling clock signal 210 having the desired phase offset.

At block 1107 of FIG. 57, the FSM 1060 initializes additional state variables and the positive error boundary (PEB) register 1067 in preparation for an eye height search at the phase offset indicated established by the PCO value. In particular, the FSM 1060 clears a search data level (SDLEV) value to zero, sets a data level increment (DLI) to +1, and points a storage register pointer, SP at the positive error boundary register 1067. At block 1109, the FSM 1060 executes a data level search generally as described in reference to FIG. 54 and by carrying out the operations shown at blocks 1131-1141. Thus, in the embodiment of FIGS. 51 and 52, the FSM 1060 initializes the data level search by asserting a data level search signal 1074 (DLS) at block 1131. The data level search signal 1074 is supplied to the control input of multiplexer 1075 which receives the search data level (SDLEV) and data level threshold 220 (DLEV) as inputs and outputs either SDLEV or DLEV to the error sampler as a multiplexed data level threshold (MDLEV) 1052. More specifically, when the data level search signal 1074 is asserted, the multiplexer 1075 selects the search data level, SDLEV, to source the multiplexed data level threshold 1052 supplied to the error sampler. At block 1133, a predetermined number (Q) of pairs of data and error samples are captured, exclusive-ORed in gate 1085 and supplied to the trap circuit 1087. At block 1135, the state of the trap circuit 1087 is evaluated to determine whether a predetermined number same-state data and error samples have been generated (i.e., indicating that a positive data sample resulted from a signal level below the data level threshold, or that a negative data sample resulted from a signal level above the data level threshold). In one embodiment, the trap circuit 1087 asserts a boundary-found signal 1088 upon detecting a single instance of same-state data and error samples (e.g., by latching a low going output of the exclusive-OR gate 1085). In an alternative embodiment, the trap circuit 1087 includes a counter that is incremented in response each same-state data/error sample indication and asserts the boundary-found signal 1088 if a threshold number of same-state indications are detected. In either case, if the boundary-found signal 1088 is not asserted (determined in decision block 1135), the FSM 1060 increments the search data level by the data level increment as shown at block 1137, and the sample generation and trap circuit evaluation operations at blocks 1133 and 1135 are repeated. By this operation, the search data level is iteratively adjusted (i.e., upward when DLI is positive) until the boundary-found signal 1088 is asserted. When the boundary-found signal 1088 is asserted, an error boundary has been found and, as shown at block 1139, the FSM 1060 issues control signals to load the register pointed to by the register pointer (i.e., the PEB register 1067 in the initial data level search) with the value of the search data level (e.g., a digital value used to create the data level threshold). The data level search signal 1074 is then deasserted at block 1141.

After the upper error boundary has been bound in the data level search at block 1109, the FSM 1060 initializes internal state variables in preparation for a search for the lower error boundary. Thus, at block 1114 of FIG. 57, the search data level is reset to zero, the data level increment is set to a negative value (−1 in this example) and the register pointer is pointed at the negative error boundary (NEB) register 1069. Thereafter, a data level search is executed at block 1116 to find the lower error boundary (i.e., performing the operations at blocks 1131-1141 to decrement the search data level until a threshold number (or one) of same-state data/error samples are found) and load the corresponding search data level value into the NEB register 1069. The upper and lower error boundaries within the PEB and NEB registers 1067 and 1069 are supplied to difference circuit 1081 which subtracts the boundaries to generate an eye height value 1082. This operation is shown in FIG. 57 at block 1118. The eye height value 1082 is supplied to the FSM 1060 and to the summing circuit 1083. An accumulated eye area stored within the accumulator 1063 is also supplied to the summing circuit 1083 to enable the summing circuit 1083 to generate an updated accumulated eye area 1084 that includes the eye height value 1082 output from the difference circuit 1081. The summing circuit output is coupled to an input of the accumulator 1063 to enable the updated accumulated eye area 1084 to be loaded into the accumulator 1063. The FSM 1060 manages the eye area accumulation operation by determining whether the eye height value 1082 generated for a given phase control offset (PCO) is positive (i.e., indicating an open eye at that PCO) before enabling the eye height value 1082 to be added to the accumulated eye area. Thus, at decision block 1121 of FIG. 57, if the eye height value 1082 is positive, the sum of the eye height and the accumulated eye area are loaded into the accumulator 1063 in block 1123 to form an updated accumulated eye area. Thereafter, the phase control offset is adjusted by the phase control increment in block 1125 and another eye height determination is executed starting at block 1107.

Returning to decision block 1121, if the eye height is not positive, the FSM 1060 concludes that an edge of the data eye has been reached. If the phase control increment is positive (e.g., determined at decision block 1127), then only the rightmost portion of the data eye has been searched (i.e., the phase offset has been stepped to more latent offsets, ending at the rightmost edge of the data eye) and, at block 1129, the FSM 1060 changes the phase control increment to a negative value, sets the phase control offset to the value of the phase control increment (i.e., establishing an initial step into the leftmost portion of the data eye) then repeats the operations starting at block 1107 to generate and accumulate eye height measurements for the left most portion of the data eye. When decision block 1127 is reached with a negative phase control increment, the entire data eye has been measured so that the value within the accumulator 1063 reflects a complete measured eye area for the current tap window. Accordingly, at decision block 1143, the measured eye area is compared with the maximum eye area value within the ME register 1061 to determine whether a new maximum eye area has been found. In the embodiment of FIG. 56, comparator 1065 receives the outputs of the accumulator 1063 and ME register 1061 for this purpose, and issues a compare result signal 1086 to the FSM 1060 indicating whether the measured eye area within accumulator 1063 exceeds the value stored in the ME register 1061. If the measured eye area exceeds the value stored in the ME register 1061, the FSM 1060 loads the measured eye area into the ME register 1061 (i.e., by issuing appropriate control signals MCTL) to establish the new maximum eye area, then records the tap window index as the temporary index (i.e., loads the content of the TWI register 1071 into the TI register 1073). This operation is shown in FIG. 57 at block 1145. Thereafter, the FSM 1060 increments the tap window index within the TWI register 1071 as shown at block 1147 and, if not greater than the last valid tap window index (decision block 1149), the tap window index is used to generate a new measured eye area starting at block 1103. If the incremented tap window index exceeds the last valid tap window index, then eye area measurements have been made for each possible tap window. In that case, the temporary index within register 1073 indicates the tap window that yielded the maximum eye area and, as shown in block 1151, is transferred from the TI register 1073 into the TWI register 1071 to enable the indicated tap window to source tap data values to the equalizer bank. The phase control offset is also reset to zero. In one embodiment, the receive equalization tap weights are also cleared at the conclusion of the maximum eye area search, thereby avoiding use the tap weights generated during the last search iteration as an initial set of tap weights for the selected tap window. In an alternative embodiment, the receive equalizer tap weights that correspond to the maximum eye area are recorded in temporary weight registers and transferred to the tap weight registers upon conclusion of the maximum eye area search.

In alternative embodiments, rather than comparing eye areas, eye height measurements may be made for each tap window selection and compared to determine which tap window selection yielded the maximum eye height. Also, eye widths may be measured for each tap window selection and compared to determine which tap window selection yields the maximum eye width. In any case, the tap window selection yielding the maximum metric may be selected to source equalizer taps within the selectable-tap decision-feedback equalizer.

Equalizing Circuits

As discussed above in reference to FIG. 38, the tap data values selected by the tap selector 769 may be used in a number of different equalizing circuits to counteract distortion events. In one equalizing receiver embodiment, illustrated in FIG. 58, an equalizing output driver 1240 is coupled in parallel with a sampling circuit 1223 to drive an equalizing signal back onto the signal path 202 during each symbol reception interval (i.e., symbol time during which a valid symbol is present at the input of the receiver). By this arrangement, latent distortions arriving at the receiver during a symbol reception interval may be canceled (or at least reduced) by operation of the equalizing output driver 1240.

Figure 59:
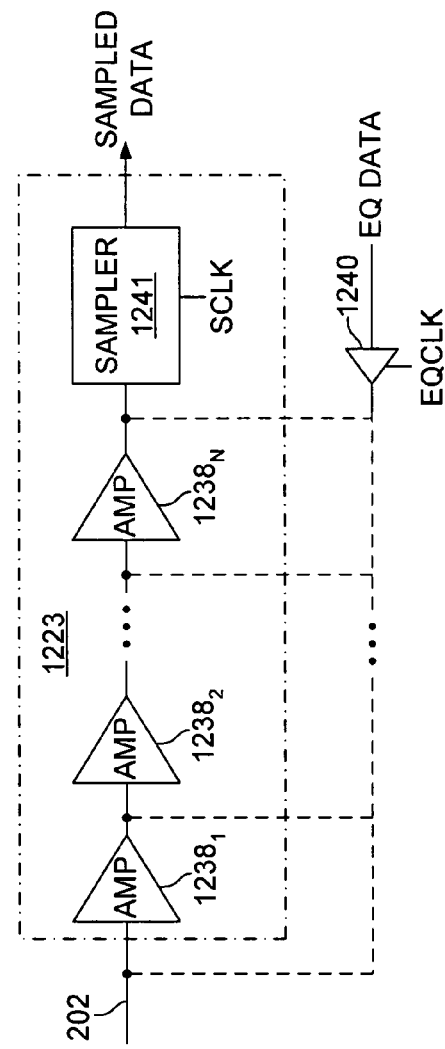
FIG. 59 illustrates the equalizing receiver of FIG. 58 in greater detail.
Figure 58:
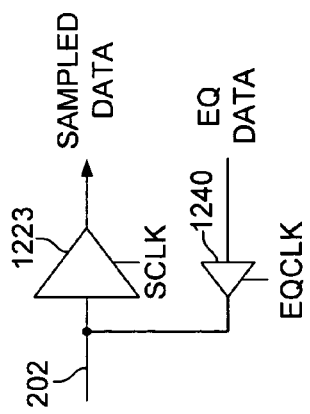
FIG. 58 illustrates an embodiment of an equalizing receiver.

FIG. 59 illustrates a more detailed embodiment of the equalizing receiver of FIG. 58. As shown, the sampling circuit 1223 may include any number of preamplifiers $1238_1$-$1238_N$ coupled in series with a sampler 1241. The sampler 1241 may be any type of circuit for detecting the level of an input signal, including but not limited to a latching circuit that latches the signal level in response to a rising or falling clock edge, or an integrating circuit that integrates the input signal over a finite period of time (e.g., a symbol time or portion of a symbol time). The equalizing output driver 1240 may be coupled to the signal path 202 (i.e., the input of the first preamplifier $1238_1$) or, alternatively, to the output of any of the preamplifiers 1238. Also, as discussed below, the output driver 1240 may be coupled to the sampler 1241 to affect the sampling operation.

Figure 60:
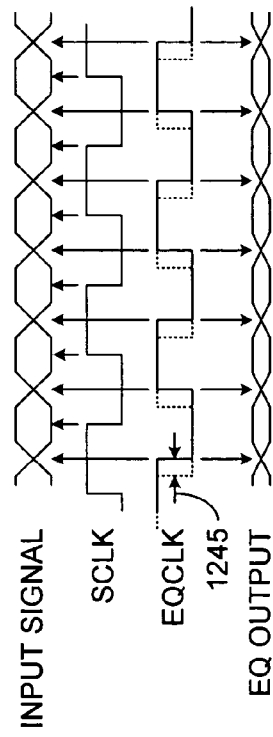
FIG. 60 illustrates an exemplary timing relationship between clock, data and equalization signals in the equalizing receiver of FIG. 58.

In one embodiment, the equalizing output driver 1240 of FIGS. 53 and 54 is clocked by an equalizer clock signal, EQCLK, that is offset from the clock signal used to time the sampling instant and therefore to define the symbol reception interval (i.e., sampling clock signal, SCLK), as necessary to align edges of the equalizing signal (i.e., state transitions) with edges of the incoming data signal. This timing relationship is illustrated by FIG. 60. As shown, the equalizer clock signal is aligned with edges of the incoming symbol stream so that equalization values are transmitted onto the signal path concurrently with corresponding symbol reception intervals. As discussed below, the equalizer clock signal may be further offset from the sampling clock signal as shown by arrow 1245 to account for the time required for the equalization data (i.e., selected tap values) to propagate through the equalizing output driver 1240 or other equalizing circuit.

FIG. 61 illustrates a current-sinking output driver 1250 that may be used to implement the equalizing output driver 1240 of FIG. 58. The output driver includes a plurality of sub-driver circuits $1251_1$-$1251_N$ each including a current source 1257, clocking transistor 1255 and tap data transistor 1253 coupled in series between an output node 1254 and a reference voltage (ground in this example). Control terminals (e.g., gate terminals) of the tap data transistors 1253 of the sub-driver circuits 1251 are coupled to receive respective tap data values (designated $EQD_1$-$EQD_N$ in FIG. 61) from a select circuit, control terminals of the current sources 1257 are coupled to respective tap weight values, $EQW_1$-$EQW_N$, and control terminals of the clocking transistors are coupled in common to receive the equalizer clock signal, EQCLK. By this arrangement, when the equalizer clock signal goes high, each of the sub-driver circuits 1251 will source a current according to its respective tap weight and tap data inputs. For example, referring to sub-driver circuit $1251_1$, if tap data value $EQD_1$ is low, no current (or negligible) current will be drawn via output node 1254. By contrast, if tap data value $EQD_1$ is high, then the sub-driver circuit $1251_1$ will draw a current from the output node 1254 (and therefore from the signal path 1222) according to the tap weight, $EQW_1$. As discussed below, the tap weights provided to the output driver 1250 or other equalizing circuits described herein may be predetermined values, or may be determined dynamically according to the level of the distortions to be reduced. Because the sub-driver circuits 1251 are coupled in parallel to the output node, the overall equalization signal generated by output driver 1250 during a given symbol time is the sum of contributions from the individual sub-driver circuits 1251. Note that the output driver 1250 outputs an equalization signal only when the equalizer clock signal is high (i.e., even phases of EQCLK). An additional instance of output driver 1250 may be provided to output an equalization signal when a complement equalizer clock signal (i.e., /EQLCK) is high. Also, a pair of circuits 1250 may be used to generate component signals of a differential signal pair. In a single-ended signaling system, the current sources 1257 may be designed to draw a nominal current in response to a zero-valued tap weight is received (i.e., $EQW_i$=0), thereby providing headroom for reduced current draw in response to negative tap weights.

FIG. 62 illustrates an embodiment of a push-pull type of sub-driver circuit 1260 that may be used within an equalizing output driver instead of the pull-down sub-driver circuits 1251 described in reference to FIG. 61. In the push-pull type of sub-driver circuit 1260, current is either sourced or sunk via the driver output according to the state of the tap data value, $EQD_i$. The sub-driver circuit 1260 includes switching transistors 1263 and 1265, and AND gate 1261. A first input of the AND gate 1261 is coupled to receive the tap data value, $EQD_i$, and a second input of the AND gate 1261 is coupled to a clock line to receive the equalizer clock signal, EQCLK. The output of the AND gate 1261 is coupled to the gate terminals of transistors 1263 and 1265 such that, during each high phase of the equalizer clock signal, the tap data value is passed to the gate terminals of transistors 1263 and 1265 to establish the output state of the sub-driver circuit 1260. That is, every other half cycle of the equalizer clock signal constitutes an output enable interval for the sub-driver circuit 1260. If the tap data value, $EQD_i$, is high during a given output enable interval, transistor 1265 is switched on, causing the sub-driver circuit 1260 to sink current via the output node ($OUT_i$). Conversely, if the tap data value is low during the output enable interval, transistor 1263 is switched on to source current via the output node. Also, though not shown in FIG. 62, a pull-down biasing circuit (e.g., current source) may be coupled between the pull-down tap data transistor 1265 and ground, and a pull-up biasing circuit may be coupled between the pull-up tap data transistor 1263 and the supply reference voltage (e.g., $V_{DD}$) to enable weighted control of the current sourcing and sinking strength of the push-pull sub-driver circuit 1260. Further, an additional instance of the sub-driver circuit 1260 may be provided with a complement equalizer clock signal (/EQCLK) and complement tap data value (/$EQD_i$) being input to AND gate 1261 to enable the sub-driver circuit 1260 to output an equalizing signal during the alternate half cycle of the equalizer clock signal.

FIG. 63 illustrates another embodiment of a sub-driver circuit 1275 that may be used within an equalizing output driver. The sub-driver circuit 1275 includes a differential transistor pair 1277 having control terminals coupled to outputs of AND gates $1261_1$ and $1261_2$, respectively. A tap data value ($EQD_i$) and an equalizer clock signal (EQCLK) are input to AND gate $1261_1$, and a complement of the tap data value (/$EQD_i$) and the equalizer clock signal are input to AND gate $1261_2$. By this arrangement, the tap data value and complement tap data value are applied to respective inputs of the differential pair 1277 during every other half cycle of the equalizer clock signal. Output nodes of the differential pair 1277 are pulled up through respective resistive loads 1283 (R), and source terminals of the differential pair are coupled to ground via a current source 1281. The resistive loads 1283 may be, for example, termination elements coupled to the signal path (not shown) rather than resistive elements included within the sub-driver circuit 1275. Accordingly, the sub-driver circuit 1275 is enabled, during every other half cycle of the equalizer clock signal, to output a differential equalizing signal on output nodes $OUT_i$ and /$OUT_i$ in accordance with the complementary tap data values, $EQD_i$ and /$EQD_i$. A counterpart instance of sub-driver circuit 1275 may be provided to generate a differential equalizing signal during the alternate half clock cycle of the equalizer clock signal. The current source 1281 is controlled by the tap weight value, $EQW_i$, in the manner described in reference to FIG. 61, though different weighting schemes may be used in alternative embodiments (e.g., using weight-biased pull-up elements in place of resistive elements 1283).

Figure 64:
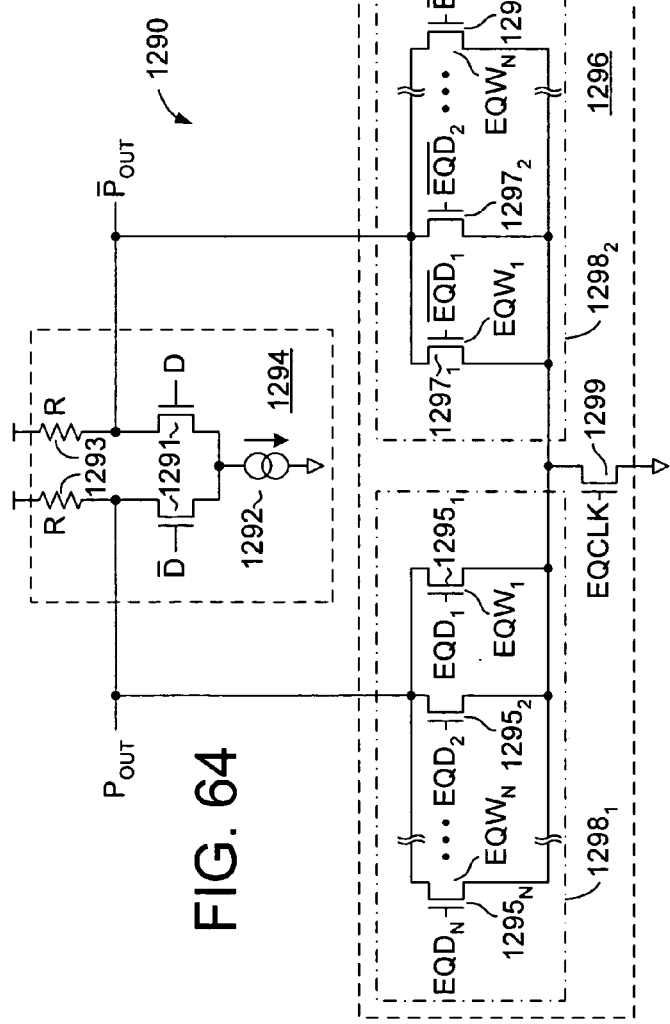
FIG. 64 illustrates an alternative type of equalizing circuit that may be used in embodiments of the invention.

FIG. 64 illustrates an alternative type of equalizing circuit 1290 that may be used in embodiments of the invention. Instead of driving an equalization signal onto the signal path to affect the signal level of an incoming signal, equalization is performed in conjunction with preamplification of the incoming signal, and therefore affects the level of preamplification applied to the incoming signal. That is, the equalizing circuit 1290 affects the preamplified signal level instead of the signal level present on the signaling path.

Equalizing circuit 1290 includes a differential amplifier 1294 formed by differential transistor pair 1291, biasing current source 1292 and resistive loads 1293. Differential input signals are supplied to gate terminals of transistor pair 1291 such that differentially amplified output signals are generated on output lines $P_{OUT}$ and /$P_{OUT}$. In one embodiment, output lines $P_{OUT}$ and /$P_{OUT}$ are coupled to input terminals of a differential amplifier within a sampling circuit so that amplifier 1294 effectively forms a first stage in a two-stage amplifier (i.e., amplifier 1294 is a preamplifier).

Equalizing circuit 1290 additionally includes a level shifting circuit 1296 coupled to the differential amplifier 1294 to provide preamplifier equalization. The level shifting circuit 1296 includes a pair of sub-circuits $1298_1$ and $1298_2$ each coupled between a respective one of the differential amplifier outputs ($P_{OUT}$ and /$P_{OUT}$) and a clocking transistor 1299. Each of the signal sub-circuits 1298 includes a respective plurality of tap data transistors ($1295_1$-$1295_N$ and $1297_1$-$1297_N$) coupled in parallel between the differential amplifier output and the clocking transistor 1299. The control terminals of the tap data transistors $1295_1$-$1295_N$ are coupled to receive the selected tap data values, $EQD_1$-$EQD_N$, respectively, and the control terminals of the tap data transistors $1297_1$-$1297_N$ are similarly coupled to receive complement versions of the selected tap data values, /$EQD_1$-/$EQD_N$. In one embodiment, each of the tap data transistors 1295 is sized (e.g., by width-length ratio) to achieve a respective tap weight $EQW_N$-$EQW_1$. By this arrangement, each tap data value may be coupled to the control terminal of a selected one of the tap data transistors 1295 according to the desired tap weight. The transistors 1297 are similarly weighted and therefore allow coupling of the complement tap data values according to desired tap weights. The weights of the individual tap data transistors 1295 (and 1297) may be incrementally related (i.e., $EQW_1=EQW_2+K=EQW_3+2K\ldots$, where K is a constant), exponentially related (i.e., $EQW_1=EQW_2*K=EQW_3*K^2\ldots$) or may have any other desired relationship (including having the same weight values or including subsets of weight values that are the same).

The clocking transistor 1299 is switched on during every other half cycle of the equalizer clock signal to enable the operation of the sub-circuits 1298. The sub-circuits 1298 operate to increase or decrease the difference between the preamplified output signals (or even change the polarity of the difference) by drawing more current from one of the preamplifier output lines ($P_{OUT}$ or $/P_{OUT}$) than the other in accordance with the selected tap data values. Thus, the sub-circuits 1298 act to differentially shift the level of the preamplified output signal generated by differential amplifier 1294. An additional instance of the equalizing circuit 1290 may be provided to enable preamplifier equalization during the alternate half cycle of the equalizer clock signal.

Figure 65:
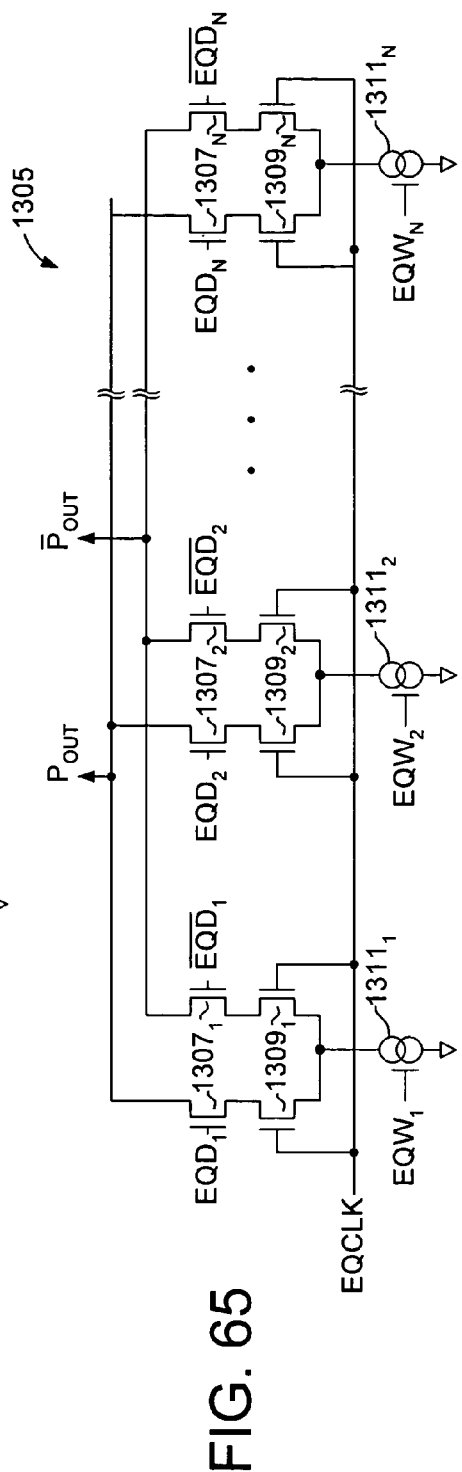
FIG. 65 illustrates an embodiment of a level shifting circuit that may be used within the equalizing circuit of FIG. 64.

FIG. 65 illustrates an alternative level shifting circuit 1305 that may be substituted for circuit 1296 of FIG. 64. In circuit 1305, differential pairs of tap data transistors 1307$_1$-1307$_N$ are coupled to output lines $P_{OUT}$ and $/P_{OUT}$ in the same manner as in circuit 1296, but instead of sizing the tap data transistors to achieve tap weighting, tap weighted current sources 1311$_1$-1311$_N$, are coupled in series with the differential pairs of tap data transistors 1307$_1$-1307$_N$, respectively. For example, current source 1311$_1$ is controlled by (i.e., draws a bias current according to) weight value $EQW_1$ and is coupled via clocking transistors 1309$_1$ to tap data transistors 1307$_1$. Similarly, current source 1311$_2$ is controlled by weight value $EQW_2$ and is coupled via clocking transistors 1309$_2$ to transistors 1307$_2$, and so forth. By this arrangement, the weight values $EQW_1$-$EQW_N$ may be configured (e.g., via run-time calibration or production time programming) as necessary to establish a desired equalizing signal contribution from each differential pair of tap data values 1307. An additional instance of the equalizing circuit 1290 may be provided to enable preamplifier equalization during the alternate half cycle of the equalizer clock signal (i.e., by driving clocking transistors 1309 with complement equalizing clock, /EQCLK).

FIG. 66 illustrates another type of equalizing circuit 1320 that may be used in embodiments of the invention. Instead of driving an equalization signal onto the signal path to affect the signal level of an incoming signal, or affecting the preamplified signal level, a level shifting circuit 1330 is coupled to low impedance inputs of a differential sampling circuit 1328, and is used to affect the level of the input signal before the sampled signal is captured. The sampling circuit includes differential transistor pair 1329 to precharge input nodes $S_{IN}$ and $/S_{IN}$ according to the state of a differential input (e.g., the output of a preamplifier 1294 of FIG. 64, or a differential data signal), during a first half cycle of the sampling clock (which enables clocking transistor 1331). During a second half cycle of the sampling clock signal, transistors 1321 and 1325 are switched on by the low-going sampling clock signal, thereby enabling a cross-coupled latch formed by transistors 1322, 1323, 1324 and 1326 to latch the state of the precharged signal levels on nodes $S_{IN}$ and $/S_{IN}$.

The level shifting circuit 1330 is similar to the circuit 1296 of FIG. 64 except that clocking transistor 1341 is enabled by the sampling clock signal (SCLK) instead of the equalizer clock signal, the equalizer clock signal being used to switch on switching transistors 1335$_1$-1335$_N$ and 1339$_1$-1339$_N$ during every other half cycle. Tap data transistors 1333$_1$-1333$_N$, which are controlled by respective tap data values $EQD_1$-$EQD_N$, are coupled in series with the switching transistors 1335$_1$-1335$_N$, respectively. Similarly, tap data transistors 1337$_1$-1337$_N$ are coupled in series with switching transistors 1339$_1$-1339$_N$ and are controlled by respective complement tap data values $/EQD_1$-$/EQD_N$. In one embodiment, the tap data transistors 1333, 1337 and switching transistors 1335, 1339 are sized to provide different current draws according to predetermined weights, $EQW_1$-$EQW_N$, thereby permitting different tap data values to make different level-shifting contributions. In one embodiment, for example, the switching transistors 1335 and 1339 are binary weighted such that, when switched on, the current draw through transistor pair 1333$_N$/1335$_N$ is $2^{N-1}$ times the current through transistor pair 1333$_1$/1335$_1$ (and the current draw through transistor pair 1337$_N$/1339$_N$ is $2^{N-1}$ times the current through transistor pair 1337$_1$/1339$_1$. Other weighting schemes may also be used including, without limitation, thermometer coding of high-gain transistor pairs, linear weighting schemes, or any combination of exponential (e.g., binary), linear and thermometer coded weightings.

In one embodiment, the equalizer clock is phase advanced relative to the sampling clock signal such that transistors 1337 and 1339 are switched on in advance of clocking transistor 1341. By this arrangement, transistors 1333 and 1337 are poised to shift the level of the sampling circuit input nodes, $S_{IN}$ and $/S_{IN}$, when the sampling clock signal goes high. Thus, when the sampling clock signal goes high, sampling circuit input nodes $S_{IN}$ and $/S_{IN}$ are differentially discharged according to the tap data values $EQD_1$-$EQD_N$, $/EQD_1$-$/EQD_N$ and the respective weights of transistors 1333 and 1337. Consequently, the signal levels at the input nodes, $S_{IN}$ and $/S_{IN}$, of sampling circuit 1328 are differentially shifted by the level shifting circuit 1330 to reduce static offsets in the incoming data signal (applied to control terminals of differential pair 1329) caused by reflections or other distortions.

FIG. 67 illustrates an alternative level shifting circuit 1342 that may be substituted for circuit 1330 of FIG. 66. The level shifting circuit 1342 includes tap data transistors 1333, 1337 and equalizer-clock-enabled switching transistors 1335, 1339 coupled as described in reference to FIG. 66. However, rather than being coupled to a clocking transistor 1335, the source terminals of transistors 1335$_1$-1335$_N$ are coupled to ground via capacitive elements 1334$_1$-1334$_N$, respectively, and the source terminals of transistors 1339$_1$-1339$_N$ are similarly coupled to ground via capacitive elements 1338$_1$-1338$_N$. By this arrangement, respective variable capacitances are coupled to the low impedance inputs, $S_{IN}$ and $/S_{IN}$, of the sampling circuit 1328 according to the states of the tap data values $EQD_1$-$EQD_N$ and complement tap data values $EQD_1$-$EQD_N$ applied to the inputs of tap data transistors 1333 and 1337. Thus, different levels of capacitance are added to the sampling circuit input nodes, $S_{IN}$ and $/S_{IN}$, according to the tap data values, effectively changing the discharge rates of the input nodes and therefore affecting the precharged signal level at the input nodes as desired to reduce signal distortions. In the embodiment of FIG. 67, the tap data transistors 1333, 1337 and switching transistors 1335, 1339 have uniform sizes (i.e., uniform weighting), and the capacitive elements 1334, 1338 have weighted capacitive values to permit a broad range of capacitances to be coupled to the input nodes of sampling circuit 1328. For example, in one embodiment, the capacitive elements 1334 are implemented by source-to-drain coupled transistors and are binary weighted (e.g., by adjusting transistor width-length ratios) such that capacitive element $1335_2$ has twice the capacitance of capacitive element $1335_1$, and capacitive element $1335_N$ has $2^{N-1}$ times the capacitance of capacitive element $1335_1$. Other weighting relationships (e.g., thermometer coding, linear, uniform, etc.) may also be used. Also, the tap data transistors 1333, 1337 and/or switching transistors 1335, 1339 may be weighted in alternative embodiments instead of (or in addition to) the capacitive elements 1334, 1338.

Adaptation in System with Occasional Non-Random Data

In the signaling environments described above, equalization settings, decision thresholds and other time-varying signaling controls may be continuously adapted by measuring the distribution of received signal levels over a relatively long period of time. Such operation effectively averages error data over an extended time interval to estimate the channel frequency response and to estimate the error due to ISI. Because such continual adaptation, in effect, assumes that the incoming signal carries all possible frequency content and ISI patterns, any periodic, repeated data patterns that lack a portion of the possible frequency content or ISI patterns may bias or distort equalization settings. For example, in some systems, a predetermined data pattern may be repeatedly transmitted during idle periods. If the predetermined data pattern lacks a portion of the possible frequency content or ISI patterns that may otherwise appear during random data transmission (a likely circumstance in the case of repeated transmission of the same N-bit data word), a continuous-adaptation signaling system may adapt non-optimal equalizer settings that correspond to the limited frequency content or ISI patterns of the predetermined data pattern, giving rise to the possibility of bit errors when the idle period ends and transmission of full-spectrum data begins.

Figure 68:
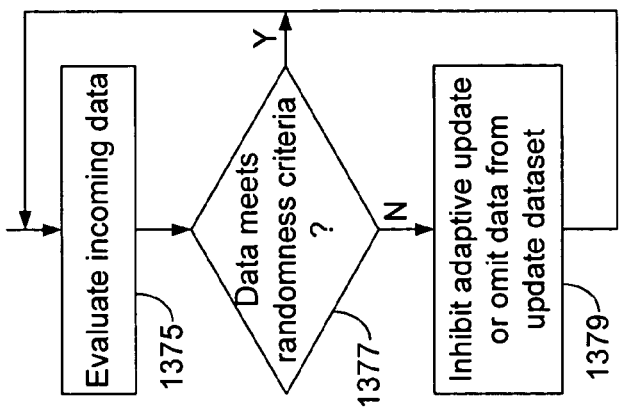
FIG. 68 illustrates a generalized technique that may be used to avoid adaptation to non-optimal settings during periods of repeated-pattern transmission.

FIG. 68 illustrates a generalized technique used in embodiments described below to avoid adaptation to non-optimal settings during periods of repeated-pattern transmission. Incoming data is evaluated at 1375 to determine whether the data meets a randomness criterion (which may include multiple criteria). If the data meets the randomness criteria (determined at decision block 1377), operation proceeds as described above by adaptively updating tap weights, thresholds, offsets and so forth based on the incoming data (not specifically shown in FIG. 68) or, in the case of a system that filters incoming data before performing such adaptive updates, by adding the incoming data to a data set (or combining the incoming data with an existing data history) that will eventually be used to update the equalizer tap weights and other adaptively generated controls.

If the data is determined not to meet the randomness criteria at decision block 1377, then adaptive update is inhibited at 1379 or, alternatively, the incoming data is omitted from the update data set. By this operation, adaptive update of tap weights, decision thresholds, offsets and so forth may be inhibited upon detection that incoming data does not meet a predetermined randomness criteria, thereby preventing such adaptively generated values from drifting toward non-ideal settings during idle periods or other periods of repeated data transmission. The determination of whether the data meets the randomness criteria may be performed in a number of ways including, without limitation, determining that the randomness criteria is not met if the incoming data matches one or more predetermined bit patterns (e.g., a predetermined control code or a predetermined data value such as stream of zero-valued symbols or a stream of one-valued symbols), or determining whether a statistical measure of auto-correlation (or any other measure of randomness or non-randomness) within the incoming data exceeds a predetermined threshold. Accordingly, the evaluation of the incoming data at block 1375 may include decoding one or more encoded data words formed by the incoming data to determine if the encoded data words correspond to predetermined control values or predetermined data values, or generating the statistical measure of auto-correlation (or any other measure of randomness or non-randomness).

Figure 69:
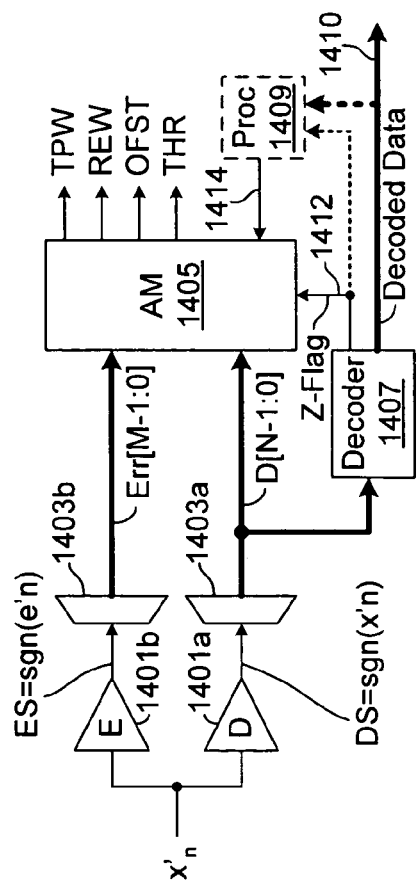
FIG. 69 illustrates an embodiment of a receiver that may be used within an adaptive signaling system to determine whether incoming data meets a predetermined randomness criteria.

FIG. 69 illustrates an embodiment of a receiver 1400 that may be used within an adaptive signaling system to determine whether incoming data meets a predetermined randomness criteria (including a programmed or dynamically generated measure of randomness) and, if not, to inhibit adaptive updates. The receiver includes a data sampler 1401a and error sampler 1401b to sample the incoming signal, $x'_n$, and thereby generate respective streams of data samples (DS) and error samples (ES). The error and data samplers 1401a, 1401b may each include multiple sampling circuits to capture multiple samples of the incoming signals per cycle of a sampling clock signal (not shown) as in the case of a double-data-rate, quad-data-rate or other multi-data-rate signaling system. Also, the error and data samplers 1401a, 1401b may be multi-level samplers as described above (e.g., generating multi-bit data samples error samples for each incoming symbol), binary samplers, or multi-mode samplers that may be statically or dynamically switched between multi-level and binary sampling modes. Further, while not shown in FIG. 69, the receiver 1400 may additionally include an edge sampler for capturing edge samples, and a clock-data recovery (CDR) circuit for recovering one or more sampling clock signals (including a multiphase sampling clock signal for multi-data-rate sampling) from the incoming data signal.

Deserializing circuits 1403a and 1403b, which may be implemented as described in reference to FIG. 26, are used to combine the streams of data samples and error samples into respective data and error words, D[N−1:0] and Err[M−1:0], that are provided to an adaptive module 1405. As in embodiments described above (e.g., in reference to FIG. 26), the data and error words may have the same or different numbers of constituent bits. The adaptive module 1405 receives the data and error words from the deserializing circuits 1403a, 1403b and applies the data and error words in adaptive update operations to generate updated tap weights (including, for example, transmit pre-emphasis tap weights (TPW) and receive-equalization tap weights (REW)), offset control values, and decision thresholds (THR) (including, for example, data-level thresholds and data resolution thresholds as discussed above) based on the data and error words. The adaptive module may be implemented in generally the same manner as any of the adaptive modules described above.

In the embodiment of FIG. 69, data transmissions are encoded, for example, to ensure sufficient transition density for clock-data recovery operations, provide DC load balancing and/or reduce prevent large-step transitions (e.g., in the case of multi-level signaling, preventing transition from a maximum level to a minimum level by re-coding such transitions). For example, in one embodiment, each Q-bit data word is encoded into an N-bit encoded data word by a transmit-side encoder, where N is selected to be larger than Q so that one or more code vectors within the $2^N$ encoded bit patterns having a desired transition density, load balance and/or transition step-size may be used to represent Q-bit data values that exhibit a limited number of data state transitions (e.g., an all-zero pattern), an imbalanced number of '1's and '0's or, in the case of multi-bit symbols, one or more large-step transitions. Each N-bit encoded data word recovered by the data sampler 1401*a* and deserializer 1403*a* of receiver 1400 is supplied to a decoder circuit 1407 that performs a decoding operation to regenerate the Q-bit data word 1410.

In one embodiment, unused code vectors within the $2^N$ code vector space are used to represent specialized values referred to herein as control values or control characters. Such control values may include, for example and without limitation, framing characters to establish data framing (e.g., indicating the boundary between successive N-bit encoded data words or groups of encoded data words), alignment characters to establish data synchronism between different signaling links (e.g., where multiple receivers 1400 are provided to capture related data), skip characters which may be inserted or removed from the data stream as necessary to provide plesiochronous rate matching, and idle characters to indicate periods of idle data transmission.

Figure 70:
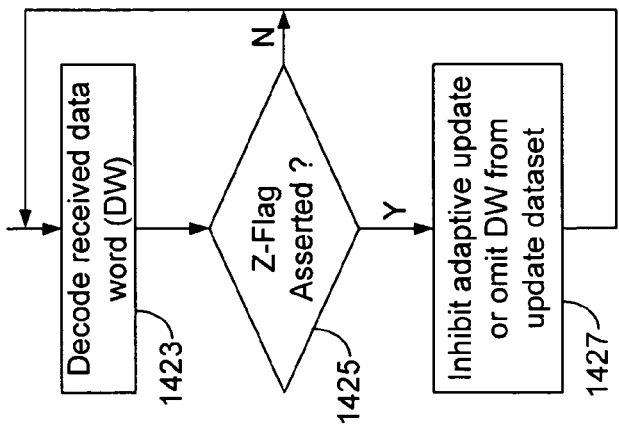
FIG. 70 illustrates the operation of the receiver of FIG. 69 according to one embodiment.

The decoder 1407 includes circuitry to determine whether a recovered encoded data word is a control value or data value and, if a control value, asserts a control flag referred to herein as a Z-flag 1412. In one embodiment, illustrated in FIG. 70, the Z-flag is used as a randomness indicator and, when asserted, indicates that the encoded data word is insufficiently random (i.e., because it may be one of only a relatively small number of possible control values) to be used in an adaptive update operation. That is, referring to both FIGS. 69 and 70, a received, encoded data word is decoded at 1423 and the Z-flag 1412 is provided to the adaptive module 1405. If the Z-flag 1412 is asserted (determined at decision block 1425), the adaptive module 1405 inhibits or otherwise prevents the encoded data word from being used in a tap weight update operation as shown at 1427. For example, in one embodiment, the encoded data word is omitted from a data set (i.e., multiple encoded data words) used in an adaptive update, for example, by preventing the encoded data word from being loaded into an averaging filter or other filtering circuit. In another embodiment, the adaptive update itself may be inhibited, thus preventing generation of a new set of tap weights (and/or other adaptively generated values) based on a data set that includes or is constituted by the insufficiently-random data word. If the Z-flag 1412 is determined not to be asserted at decision block 1425, the encoded data word may be used in an adaptive update as described above.

In alternative embodiments, rather than selectively inhibit tap weight update based on a per-data-word basis (i.e., inhibiting or not inhibiting according to the state of the Z-flag), multiple encoded data words may be evaluated to determine whether the incoming data meets a randomness criteria. For example, in one embodiment, a window counter is used to determine the control character density for a given interval (or within a given pool of encoded data words) with the incoming set of data words deemed insufficiently random if the control character density exceeds a predetermined threshold. In another embodiment, the Z-flag is monitored to determine whether a threshold number of control characters are received in succession and, if so, a data set including the control characters is deemed insufficiently random. In another embodiment, a statistical measure of the randomness of the data is generated and compared with a threshold.

Figure 71:
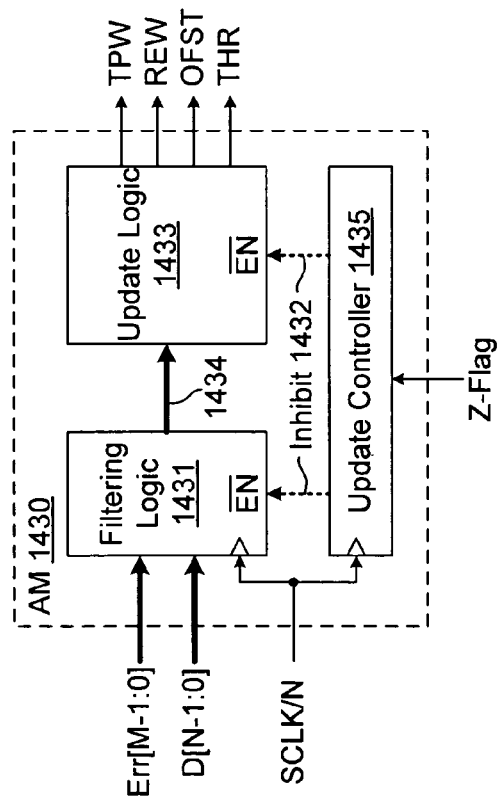
FIG. 71 illustrates an embodiment of an adaptive module that may be used to implement the adaptive module of FIG. 69.

FIG. 71 illustrates an embodiment of an adaptive module 1430 that may be used to implement the adaptive module 1405 of FIG. 69. As shown, the adaptive module 1430 includes filtering logic 1431, update logic 1433 and an update controller 1435. The filtering logic 1431 may include any or all of the filtering and/or multiplying circuitry (e.g., exclusive-OR gates) described above, for example, in reference to FIGS. 7, 19, 22, 26, 37, 38 and 44 or any other type of filtering circuitry. The update logic 1433 is used carry out adaptive updates and thus generates updated transmit pre-emphasis tap weights (TPW), receive equalization tap weights (REW), sampler offset control values (OFST) and/or decision thresholds (THR) and may include, for example and without limitation, the power scaling logic described in reference to FIGS. 7 and 22 (including the embodiments described in reference to FIGS. 8 and 9), the offset control circuitry and decision-threshold generation circuitry described in reference to FIGS. 7, 22 and 26, and/or the receive equalization update logic described in reference to FIG. 44. The update controller 1435 includes circuitry for controlling update operations within the update logic 1433 and may include, for example, one or more of the finite state machines described in reference to FIGS. 7, 22 and 44, as well as circuitry for selectively inhibiting adaptive updates upon determining that an incoming data word or set of data words does not meet a randomness criterion. In the particular embodiment shown, the filtering logic 1431 and update controller 1435 are both clocked by a frequency-divided version of the sampling clock signal, SCLK/N, so that, at every $N^{th}$ SCLK cycle, an N-bit data word and M-bit error value are selectively loaded into the filtering logic 1431 where they may be combined with previously loaded data and/or error values to generate a filtered output 1434. The filtered output 1434 is provided to update logic 1433 which may also be clocked by SCLK/N. Separate clock signals may be used to control the operation of the filtering logic 1431, update controller 1435 and/or update logic 1433 in alternative embodiments, including clock signals other than SCLK/N.

Still referring to FIG. 71, the update controller 1435 evaluates the Z-flag during each SCLK/N cycle to determine whether to inhibit (i.e., prevent) an adaptive update based on the current data and error words and, if so, asserts an inhibit signal 1432. In one embodiment, the inhibit signal 1432 is provided to an active-low enable input of the filtering logic 1431 so that, if the inhibit signal 1432 is asserted to a logic high state, the incoming data and error words are not loaded into the filtering logic 1431 and therefore are omitted from the data set used to generate the filtered output 1434. By this arrangement, a new adaptive update may still be generated, but the adaptive update is not based on the rejected data and error words. In effect, the data and error words are selectively filtered out of the update data set according to whether they meet a randomness criterion. In another embodiment, the inhibit signal 1432 is provided to an active-low enable input (/EN) of the update logic to prevent an updated set of tap weights, offset control values and/or decision-threshold values from be generated for a given update cycle. In another embodiment, the inhibit signal 1432 may be provided to the enable inputs of both the filtering logic 1431 and the update logic 1433.

Figure 72:
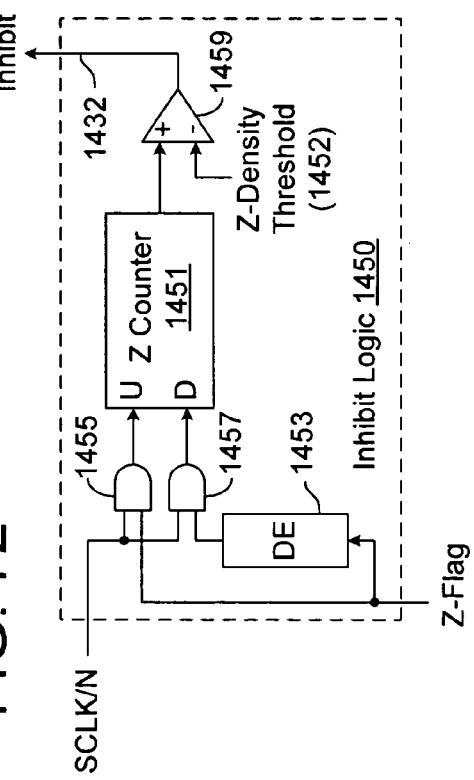
FIG. 72 illustrates an embodiment of an inhibit logic circuit that may be provided within the adaptive module of FIG. 71.

As discussed above, various different criteria may be applied to determine whether the incoming data meets a randomness criteria. In one embodiment, for example, the update controller 1435 asserts the inhibit signal 1432 each time the Z-flag is raised (e.g., the Z-flag may be used as the inhibit signal, obviating any further inhibit control logic). In another embodiment, the update controller 1435 includes the inhibit logic circuit 1450 shown by way of example in FIG. 72. The inhibit logic circuit 1450 includes a delay element 1453, logic AND gates 1455 and 1457, counter circuit 1451 and comparator 1459. The delay element 1453, AND gates 1455, 1457 and counter circuit 1451 form a window counter to count the number of Z-flag assertions within a window in time, with the duration of the window being set by the delay through delay element 1453. For example, in one embodiment, the delay element 1453 is formed by a chain of flip-flops (or like elements) each clocked by SCLK/N. By this arrangement, if the Z-flag is high at the start of a given SCLK/N cycle (i.e., at a rising edge of SCLK/N), the output of AND gate 1455 goes high to increment the count value within the counter 1451 (the output of AND gate 1455 drives the up input, U, of the counter 1451), and is also loaded into the first flip-flop of the delay element 1453. After a predetermined number of SCLK/N cycles (i.e., a predetermined delay interval determined by the number of series-coupled flip-flops in the delay chain), the Z-flag propagates to the output of the delay element 1453 and is applied, via AND gate 1457, to the down input of the counter 1451, thus decrementing the count value and canceling the count increment that occurred when the Z-flag was initially asserted. By this operation, the count value within the counter 1451 represents the number of Z-flag assertions over a moving time interval having a duration established by the delay interval (i.e., propagation delay of the delay element 1453). The count value may thus be viewed as a measure of control character density (or Z-density) as the count indicates the number of SCLK/N cycles during which the Z-flag was asserted relative to the total number of SCLK/N cycles in the delay interval. In the embodiment of FIG. 72, the count value is supplied to the comparator 1459 where it is compared with a Z-density threshold 1452. If the count value exceeds the Z-density threshold 1452, the incoming data stream is deemed not to meet a threshold level of randomness, and the inhibit signal 1432 is asserted to prevent an adaptive update during the current update cycle.

Still referring to FIG. 72, it should be noted that the delay interval and/or Z-density threshold 1452 may be production-time or run-time programmable values that are set according to application needs (e.g., programmed into a configuration register or similar circuit in response to host instruction or operation of production-floor programming equipment). For example, the delay interval may be established by programming a path select value that selects the number of flip-flop stages in the delay path through the delay element 1453, and the Z-density threshold 1452 may be programmed by programming the Z-density threshold itself (e.g., to a value of one or more), or by programming a select value that selects one of a number of predetermined Z-density thresholds.

Figure 73:
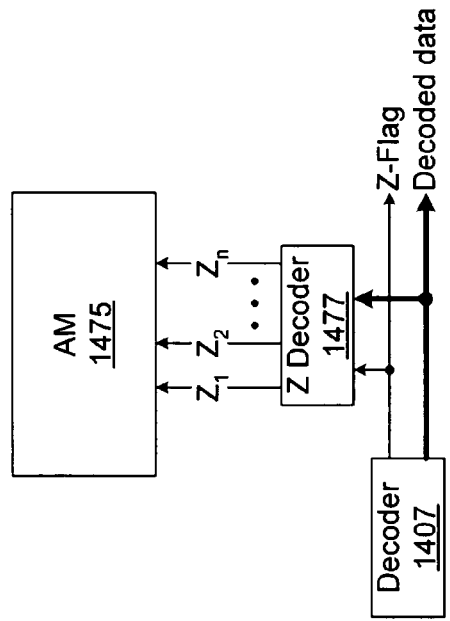
FIG. 73 illustrates an alternative decoder circuit arrangement that may be used to generate respective flag signals for particular control values or groups of control values within an incoming data stream.

Other types of inhibit logic circuits may be used to generate the inhibit signal 1432 in alternative embodiments. For example, instead of generating a measure of control character density, the inhibit logic circuit may assert the inhibit signal in response to determining that a threshold number of control characters have been received in succession (or that control characters are received continuously for a predetermined time interval), with the successive-receipt threshold being programmable, for example, to a value of one or more. Also, rather than maintaining a count of Z-flag assertions, separate density count values (or successive-receipt count values) may be maintained for selected control characters and/or data values that are deemed to correspond to idle times or other periods of non-random transmission. Referring to FIG. 73, for example, a Z-decoder 1477 may be coupled to receive the output of decoder 1407 and used to generate separate Z-flags ($Z_1, Z_2, \ldots, Z_n$) each representative of detection of a given control character or group of control characters. In such an embodiment, multiple instances of the inhibit logic circuit 1450 of FIG. 72 (or any of the alternative inhibit logic circuits described above) may be provided in the update controller of adaptive module 1475, each having its own programmable delay interval and programmable density threshold, or shared delay intervals and thresholds. Also, instead of generating flags only for instances of control characters, the decoder 1477 may generate flags that correspond to instances of any number of data values, including values associated with idle transmission periods (e.g., all-zeroes, all-ones or any other data values of interest).

Returning to FIG. 69, an optional processor 1409 may be provided to monitor the output of the decoder 1407 (or the incoming stream of data words D[N−1:0]) and to selectively issue an inhibit signal 1414 to the adaptive module 1405. The inhibit signal 1414 may be used, for example, to prevent the current data snapshot from being loaded into filtering circuitry within the adaptive module 1405 and/or to prevent an updated set of adaptive values (e.g., pre-emphasis tap weights, decision thresholds, receive-side equalizer tap weights, offset control values, and so forth) from being generated in the current update cycle. The processor 1409 may be formed on the same integrated circuit die as the receiver 1400 (i.e., an on-chip processor which may be viewed as part of or separate from receiver 1400) or may be formed on a separate integrated circuit die in the same or different integrated circuit package. Also, the processor 1409 may service multiple receivers 1400 within a given integrated circuit device or set of integrated circuit devices.

The processor 1409 may be virtually any type of processor including, without limitation, a general purpose processor or special purpose processor (e.g., a microcontroller, digital signal processor (DSP) or the like) and may include an internal program store to store program code that is executed by the processor 1409 to selectively inhibit one or more data snapshots from being used to generate updated tap weights. Alternatively, a separate on-chip or off-chip program store (e.g., a volatile or non-volatile memory, not shown) may be provided and coupled to the processor, for example, via a dedicated or shared bus. The program code stored within the program store may include instructions and/or data that, when executed by the processor 1409, causes the processor 1409 to evaluate the Z-flag 1412 and selectively issue the inhibit signal 1414 as described in reference to FIGS. 71 and 72 (i.e., programmed processor 1409 performing the inhibit operation of the update controller 1435) or to monitor multiple Z-flags and/or encoded or unencoded data to determine whether the incoming data meets a threshold level of randomness as described in reference to FIG. 73. Further, the processor 1409 may be programmed to determine a statistical measure of auto-correlation within the incoming data or any other measure of randomness and to assert the inhibit signal 1414 if the measure exceeds a programmed threshold. More generally, the processor 1409 may be programmed to perform a number of operations associated with the adaptive module 1405 or other circuit blocks within the receiver 1400 including, without limitation, the above-described tap weight update operations (e.g., performing power-scaling computations and controlling tap search operations and performing tap weight computations for the receive-side equalizer), threshold updates, offset cancellation operations and/or any filtering operations associated therewith. The processor 1409 may assert the inhibit 1414 signal directly or may write to an addressable storage element (e.g., a flip-flop or latch) to set and reset the inhibit signal 1414. Similarly, in the case of other operations performed by the processor 1409, the processor may read incoming data and error samples and other necessary information from buffers within the adaptive module 1405 (or directly from the deserializing circuits 1403), and may write updated information within storage buffers such as tap weight registers, offset registers, threshold control registers and so forth.

Data Precessing

Figure 74:
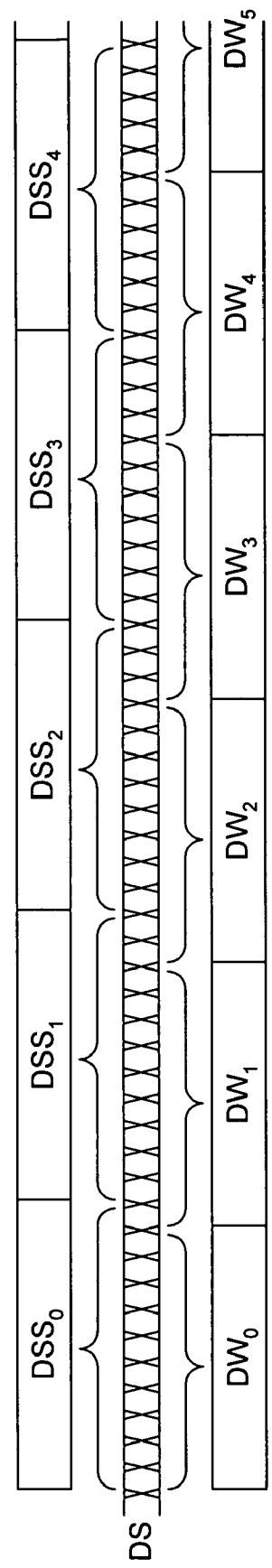
FIG. 74 is a waveform diagram that illustrates a precessing relationship between data words provided to a decoder (or other application logic) and data snapshots provided to an adaptive module.

Data precessing may be used, in addition to or instead of the update-inhibit techniques described in reference to FIGS. 68-73, to mitigate drift of adaptively generated tap weights, thresholds, offsets or other controls in the presence of repeating data patterns. In a data precessing embodiment, the grouping of data samples delivered to the adaptive module is different from the grouping of data samples used to form received data words. Referring to FIG. 74, for example, in one embodiment, data samples (DS) are grouped into 10-bit data words ($DW_0$, $DW_1$, $DW_2$, ...) that are supplied to a decoder circuit, while the same data samples are grouped into 1-bit data snapshots ($DSS_0$, $DSS_1$, $DSS_2$, ...) that are supplied to the adaptive module (different numbers of bits may be used to form the data word and/or data snapshot in other embodiments). By this arrangement, the offset between the frame boundary of the data words and data snapshots progresses by one-bit for each successive data word. That is, the data words precess relative to the data snapshots with the their respective framing boundaries realigning every N data words, N being the number of constituent bits of the data word. Consequently, even if the same data word is being transmitted repeatedly (i.e., $DW_0=DW_1=DW_2$ ...), the constituent bits of the corresponding data snapshots may vary from cycle to cycle, thereby avoiding use of a repeating data pattern to generate updated tap weights, thresholds, offsets and so forth. Accordingly, the drift away from desired adaptive settings may be considerably slowed by the precessing operation which acts to spread the detrimental effect of the repeating pattern among the various individual tap weights (or other controls) that are updated by the data snapshot. That is, rather than allowing the detrimental effect of the repeating pattern to be concentrated at a particular tap weight (e.g., as where the same bit position in a data word is repeated or lacks certain frequency content or ISI pattern), and to cause that tap weight to quickly diverge from the desired setting, the detrimental effect is spread over all the tap weights so that the divergence is substantially slowed. By this operation, longer periods of repeating data may be tolerated without undue divergence of tap weight settings or other control values.

Figure 75:
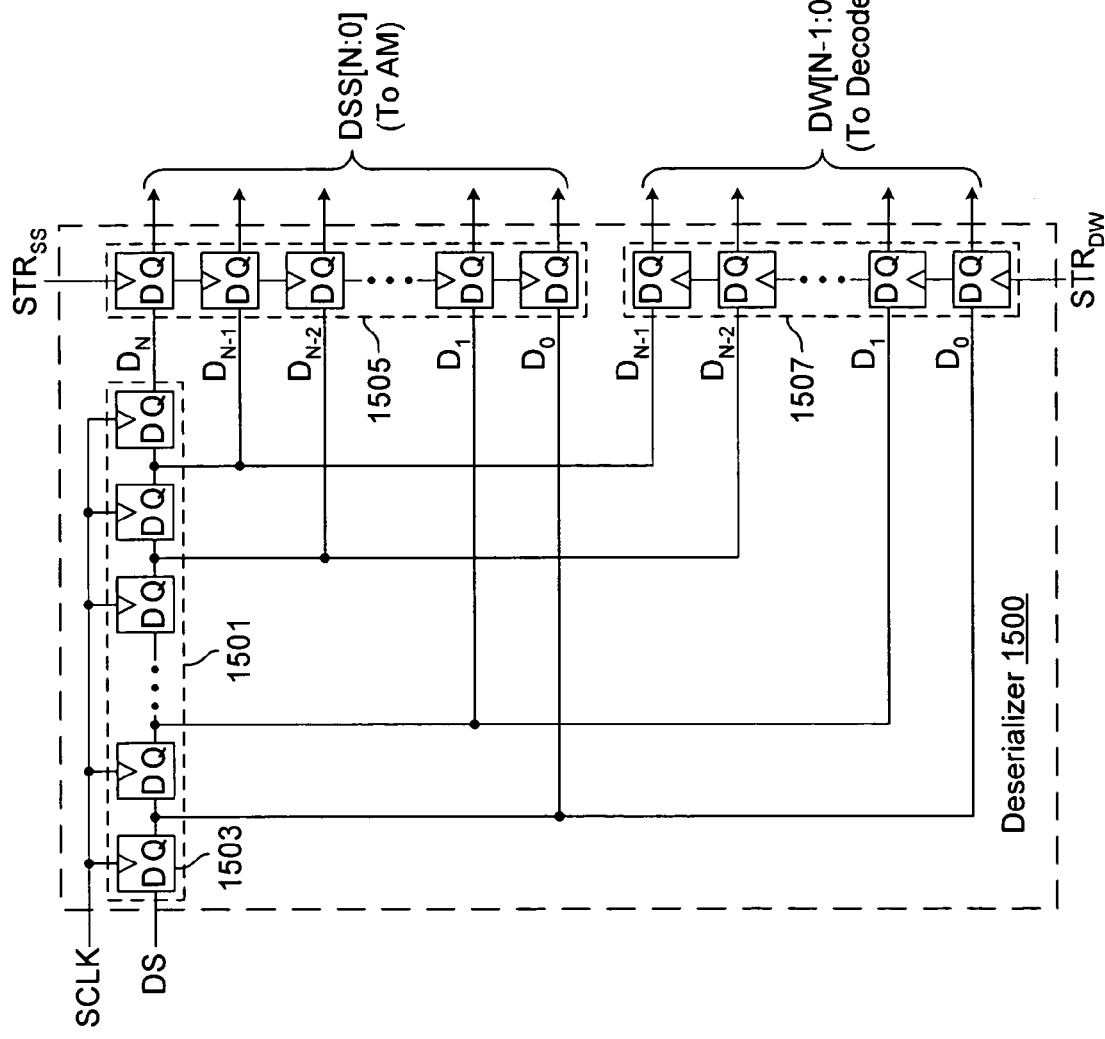
FIG. 75 illustrates an embodiment of a deserializer circuit that may be used to provide the data precessing operation shown in FIG. 74.

FIG. 75 illustrates an embodiment of a deserializer circuit 1500 that may be used to provide the data precessing operation shown in FIG. 74. The deserializer 1500 includes a shift register 1501 formed by N+1 storage elements 1503 (e.g., flip-flops) coupled input-to-output in a daisy chain. Data samples (DS) are shifted into the shift register 1501 in response to a sampling clock signal, SCLK, so that the shift register 1501 is completely reloaded with a new group of N+1 data samples every N+1 cycles of the sampling clock signal. As discussed above, a multi-phase sampling clock signal (e.g., clock and complement clock) may be used to load a shift register during even and odd phases (or to load separate even and odd shift registers) in double data rate embodiment, with such concept being extendable for other data rates. Also, each data sample may include more than a single bit in a multi-level signaling embodiment, with one shift register 1501 provided to capture most-significant bits (MSBs), another shift register 1501 provided to capture least-significant bits (LSBs) and, if necessary, other shift registers 1501 provided to capture bits of intermediate significance.

Still referring to FIG. 75, a snapshot strobe signal, STRSS, is asserted once every N+1 cycles of the sampling clock signal to transfer the entire contents (i.e., N+1 data samples) of shift register 1501 into a data snapshot register 1505 to form an updated data snapshot, DSS[N:0]. Similarly, a data word strobe signal, $STR_{DW}$, is asserted every N cycles of the sampling clock signal to transfer N samples from the shift register 1501 into a data word register 1507, thus forming an updated data word, DW[N−1:0]. The data snapshot register 1505 is coupled to supply each (N+1)-bit data snapshot to the adaptive module, and the data word register is coupled to supply each N-bit data word to the decoder or, if no decoding is necessary, to other application logic within the host integrated circuit device.

Figure 76:
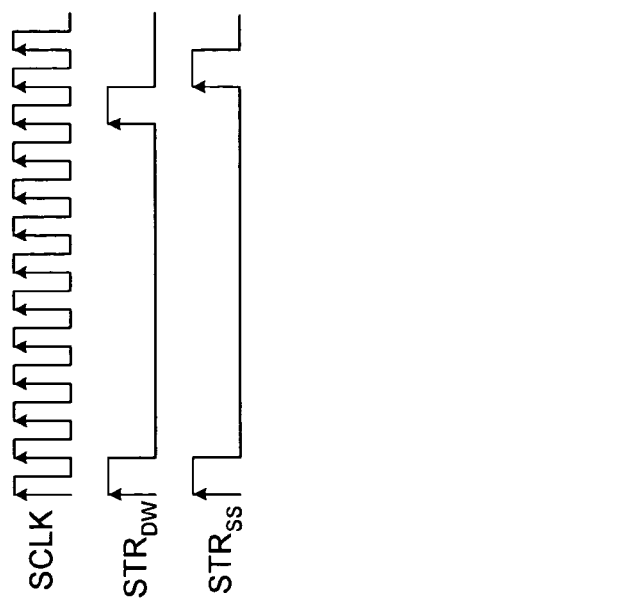
FIG. 76 illustrates an exemplary timing diagram for generation of the data word strobe signal, $STR_{DW}$, and snapshot strobe signal, $STR_{SS}$ described in reference to FIG. 75.

FIG. 76 illustrates an exemplary timing diagram for generation of the data word strobe signal, $STR_{DW}$, and snapshot strobe signal, $STR_{SS}$ described in reference to FIG. 75. In the particular embodiment shown, the data word strobe signal is asserted at every 10th rising edge of the sampling clock signal, SCLK, and the data snapshot strobe signal is asserted at every $11^{th}$ rising edge of the sampling clock signal. Because the assertion frequencies for the snapshot strobe signal and the data word strobe signal are unequal and, in this example offset by one sampling clock cycle, the data word will precess relative to the data snapshot in the manner illustrated in FIG. 74. As discussed, the relative sizes of the data word and data snapshot may be different in alternative embodiments. For example, the data snapshot may have fewer constituent bits than the data word and the data snapshot register may be loaded correspondingly more often than the data word register. Alternatively, the precess rate between the data word and data snapshot may be independent of the size ratio between the data word and data snapshot (e.g., the deserializer 1500 of FIG. 75 may simply load the data snapshot register 1505 less frequently than described above, dropping some data). Further, the data snapshot register may be loaded aperiodically rather than on even intervals to achieve a random relationship between the contents of data snapshots and data words. For example, a pseudorandom bit sequence generator (e.g., implemented by a linear-feedback shift register or the like) may be used to generate the snapshot strobe signal aperiodically.

Section headings have been provided in this detailed description for convenience of reference only, and in no way define, limit, construe or describe the scope or extent of such sections. Also, while the invention has been described with reference to specific embodiments thereof, it will be evident that various modifications and changes may be made thereto without departing from the broader spirit and scope of the invention. Accordingly, the specification and drawings are to be regarded in an illustrative rather than a restrictive sense.

What is claimed is:

1. A method of operation within an integrated circuit device, the method comprising:
   determining whether a plurality of samples of an incoming signal meets a threshold level of statistical periodicity, the threshold level representing a randomness criterion;
   updating a plurality of equalizer tap weights with an update circuit, the updating based, at least in part, on the plurality of samples if the plurality of samples meets the randomness criterion; and
   if the plurality of samples does not meet the randomness criterion, inhibiting update of the plurality of equalizer tap weights with the update circuit based on the plurality of samples.

2. The method of claim 1 wherein determining whether the plurality of samples of the incoming signal meets a threshold level comprises decoding an encoded data word formed by the plurality of samples.

3. The method of claim 2 wherein decoding the encoded data word formed by the plurality of samples comprises determining whether the encoded data word is a data value or a control value.

4. The method of claim 1 wherein determining whether the plurality of samples of the incoming signal meets a threshold level comprises determining whether at least one data word formed by the plurality of samples represents a control value or a data value.

5. The method of claim 4 wherein the control value comprises a plurality of control codes, and wherein determining whether the plurality of samples of the incoming signal meets threshold level comprises determining that the threshold level is not met if the at least one data word represents any one of the control codes.

6. The method of claim 4 wherein the control value comprises a plurality of control codes, and wherein determining whether the plurality of samples of the incoming signal meets a threshold level comprises determining that the threshold level is not met if the at least one data word represents any one of a subset of the control codes, the subset including at least one of the plurality of control codes but fewer than all the control codes.

7. The method of claim 1 wherein the plurality of samples comprises a first number of data words, each of the data words being either a data value or control value, and wherein determining whether the plurality of samples meets threshold level comprises determining that the plurality of samples does not meet the threshold level if the number of the data words that are control values exceeds a predetermined threshold.

8. The method of claim 7 further comprising storing a value that indicates the first number of data words within a configuration circuit of the integrated circuit device.

9. The method of claim 7 further comprising storing a value that indicates the predetermined threshold within a configuration circuit of the integrated circuit device.

10. The method of claim 1 wherein the plurality of samples comprises a first number of data words, each of the data words corresponding to either a data value or one of a plurality of control values, and wherein determining whether the plurality of samples meets a threshold level comprises:
generating a first count of the number of data words that correspond to a first control value of the plurality of control values; and
determining that the plurality of samples does not meet the threshold level if the first count exceeds a first threshold.

11. The method of claim 1 wherein the plurality of samples comprises a plurality of data words, each of the data words having one of a plurality of possible bit patterns, and wherein determining whether the plurality of samples meets a threshold level comprises:
generating a first count of the number of data words that correspond to a subset of the plurality of possible bit patterns, the subset including at least one bit pattern; and
determining that the plurality of samples does not meet the threshold level if the first count exceeds a first threshold.

12. The method of claim 11 wherein each of the plurality of data words is either a control value or a data value, and wherein the at least one bit pattern corresponds to a data value.

13. The method of claim 1 wherein the plurality of samples comprises a plurality of data words, each of the data words having one of a plurality of possible bit patterns, and wherein determining whether the plurality of samples meets a threshold level comprises determining whether the plurality of data words all match a subset of the plurality of possible bit patterns, the subset including at least one of the possible bit patterns.

14. The method of claim 1 wherein updating the plurality of equalizer tap weights comprises updating a plurality of transmit pre-emphasis tap weights.

15. The method of claim 1 wherein updating the plurality of equalizer tap weights comprises updating a plurality of decision-feed-back equalizer tap weights.

16. The method of claim 1 wherein inhibiting update of the plurality of equalizer tap weights based on the plurality of samples comprises inhibiting at least a portion of the plurality of samples from being included in a data set that is used to update the plurality of equalizer tap weights.

17. The method of claim 1 wherein inhibiting update of the plurality of equalizer tap weights based on the plurality of samples comprises inhibiting generation of an updated set of equalizer tap weights during a first interval.

18. An integrated circuit device comprising:
sampling circuitry to generate a plurality of samples of an incoming signal;
control circuitry to generate an inhibit signal in either a first state or a second state according to whether the plurality of samples meets a threshold level of statistical periodicity, the threshold level representing a randomness criterion; and
tap weight update circuitry coupled to receive the inhibit signal from the control circuitry and configured to update a plurality of equalizer tap weights based on the plurality of samples if the inhibit signal is in the first state, and to refrain from updating the plurality of equalizer tap weights based on the plurality of samples if the inhibit signal is in the second state.

19. The integrated circuit device of claim 18 wherein the sampling circuitry comprises a decision-feedback equalizing circuit coupled to receive at least a portion of the plurality of equalizer tap weights from the tap weight update circuitry.

20. The integrated circuit device of claim 18 wherein at least a portion of the plurality of equalizer tap weights are transmit pre-emphasis tap weights, and wherein the integrated circuit device further comprises an external communication interface coupled to the tap weight update circuitry and configured to transmit the transmit pre-emphasis tap weights to another integrated circuit device.

21. The integrated circuit device of claim 18 wherein the plurality of samples comprises a plurality of encoded data words, and wherein the integrated circuit device further comprises decoding circuitry to decode each data word of the plurality of data words and to generate a control signal that indicates whether the data word represents a control value or a data value.

22. The integrated circuit device of claim 21 wherein the control circuitry is coupled to receive the control signal from the decoding circuitry and is configured to generate the inhibit signal in the first state if the control signal indicates that a threshold number of the plurality of data words represent a control value.

23. The integrated circuit device of claim 22 wherein the threshold number is one.

24. The integrated circuit device of claim 22 further comprising a programmable register to store a value indicative of the threshold number.

25. The integrated circuit device of claim 21 wherein the control signal is a multi-bit signal that indicates which of a plurality of different control values, if any, is represented by the data word.

26. The integrated circuit device of claim 21 wherein the control circuitry is coupled to receive the control signal from the decoding circuitry and is configured to generate the inhibit signal in the first state if the control signal indicates that a threshold number of the plurality of data words represent a first control value of the plurality of different control values.

27. The integrated circuit device of claim 21 wherein the control circuitry is coupled to receive the control signal from the decoding circuitry and is configured to generate the inhibit signal in the first state if the control signal indicates that a threshold number of the plurality of successively received data words represents a control value.

28. The integrated circuit device of claim 18 wherein the tap weight update circuitry is configured to exclude at least a portion of the plurality of samples from a data set used to update the plurality of equalizer tap weights if the inhibit signal is in the second state.

29. The integrated circuit device of claim 18 wherein the tap weight update circuitry is configured to refrain from updating at least a portion of the equalizer tap weights during an update interval in which the inhibit signal is in the second state.

30. A signaling system comprising
a signaling path;
a first integrated circuit device having a transmit circuit to transmit a data signal on the signaling path; and
a second integrated circuit device having:
   sampling circuitry coupled to receive the data signal via the signaling path and configured to generate a plurality of samples of the data signal;
   control circuitry to generate an inhibit signal in either a first state or a second state according to whether the plurality of samples meets a threshold level of statistical periodicity, the threshold level representing a randomness criterion; and
   tap weight update circuitry coupled to receive the inhibit signal from the control circuitry and configured to update a plurality of equalizer tap weights based on the plurality of samples if the inhibit signal is in the first state, and to refrain from updating the plurality of equalizer tap weights based on the plurality of samples if the inhibit signal is in the second state.

31. The signaling system of claim 30 wherein the second integrated circuit device is configured to provide at least a portion of the equalizer tap weights to the first integrated circuit device for application within the transmit circuit.

32. The signaling system of claim 30 wherein the sampling circuitry comprises a decision-feedback equalizer coupled to receive at least a portion of the equalizer tap weights from the tap weight update circuitry.

33. Computer-readable media having information embodied therein that includes a description of an integrated circuit device, the information including descriptions of:
   sampling circuitry to generate a plurality of samples of an incoming signal;
   control circuitry to generate an inhibit signal in either a first state or a second state according to whether the plurality of samples meets a threshold level of statistical periodicity, the threshold level representing a randomness criterion; and
   tap weight update circuitry coupled to receive the inhibit signal from the control circuitry and configured to update a plurality of equalizer tap weights based on the plurality of samples if the inhibit signal is in the first state, and to refrain from updating the plurality of equalizer tap weights based on the plurality of samples if the inhibit signal is in the second state.

34. An integrated circuit device comprising:
   means for determining whether a plurality of samples of an incoming signal meets a threshold level of statistical periodicity, the threshold level representing randomness criterion;
   update circuit means for updating a plurality of equalizer tap weights based, at least in part, on the plurality of samples if the plurality of samples meets the randomness criterion; and
   the update circuit means inhibiting update of the plurality of equalizer tap weights-based on the plurality of samples if the plurality of samples does not meet the randomness criterion.

* * * * *